(12) United States Patent
Yamamoto et al.

(10) Patent No.: US 10,361,841 B2
(45) Date of Patent: *Jul. 23, 2019

(54) PROXY COMPUTING SYSTEM, COMPUTING APPARATUS, CAPABILITY PROVIDING APPARATUS, PROXY COMPUTING METHOD, CAPABILITY PROVIDING METHOD, PROGRAM, AND RECORDING MEDIUM

(71) Applicant: NIPPON TELEGRAPH AND TELEPHONE CORPORATION, Tokyo (JP)

(72) Inventors: Go Yamamoto, Tokyo (JP); Tetsutaro Kobayashi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/684,672

(22) Filed: Aug. 23, 2017

(65) Prior Publication Data
US 2017/0353296 A1    Dec. 7, 2017

Related U.S. Application Data

(62) Division of application No. 15/389,055, filed on Dec. 22, 2016, now abandoned, which is a division of
(Continued)

(30) Foreign Application Priority Data

Oct. 26, 2010  (JP) ................................. 2010-239342
Jan. 14, 2011  (JP) ................................. 2011-005899
(Continued)

(51) Int. Cl.
H04L 9/06    (2006.01)
G06F 21/60   (2013.01)
(Continued)

(52) U.S. Cl.
CPC .......... H04L 9/0618 (2013.01); G06F 21/602 (2013.01); H04L 9/006 (2013.01);
(Continued)

(58) Field of Classification Search
CPC ..... G06F 21/602; H04L 9/008; H04L 9/3013; H04L 2209/76; H04L 2209/08; H04L 9/3073; H04L 9/304
See application file for complete search history.

(56) References Cited

U.S. PATENT DOCUMENTS 6,509,728 B1 *  1/2003  Uchino .................. G01R 23/16
                                                   324/76.13
7,707,420 B1 *  4/2010  Little .................... H04L 9/3247
                                                   380/30
(Continued)

FOREIGN PATENT DOCUMENTS

EP        2 525 341 A1    11/2012
WO   WO 2006/117806 A2   11/2006

OTHER PUBLICATIONS

Manuel Blum et al., "Self-Testing/Correcting with Applications to Numerical Problems", Journal of Computer anc Sciences, vol. 47, No. 3, XP055089183, Dec. 1, 1993, pp. 549-595 (Year: 1993).*
(Continued)

*Primary Examiner* — Farid Homayounmehr
*Assistant Examiner* — Sanchit K Sarker
(74) *Attorney, Agent, or Firm* — Oblon, McClelland, Maier & Neustadt, L.L.P.

(57) ABSTRACT

A computing apparatus outputs $\tau_1$ and $\tau_2$ corresponding to a ciphertext x, a capability providing apparatus uses $\tau_1$ to
(Continued)

correctly compute $f(\tau_1)$ with a probability greater than a certain probability and sets the result of the computation as $z_1$, uses $\tau_2$ to correctly compute $f(\tau_2)$ with a probability greater than a certain probability and sets the result of the computation as $z_2$, the computing apparatus generates a computation result $u=f(x)^b x_1$ from $z_1$, generates a computation result $v=f(x)^a x_2$ from $z_2$, and outputs $u^{b'} v^{a'}$ if the computation results u and v satisfy a particular relation, where G and H are groups, $f(x)$ is a function for obtaining an element of the group G for $x \in H$, $X_1$ and $X_2$ are random variables having values in the group G, $x_1$ is a realization of the random variable $X_1$, and $x_2$ is a realization of the random variable $X_2$.

21 Claims, 45 Drawing Sheets

Related U.S. Application Data application No. 13/881,111, filed as application No. PCT/JP2011/074546 on Oct. 25, 2011, now Pat. No. 9,607,158.

(30) Foreign Application Priority Data

| Mar. 31, 2011 | (JP) | 2011-077779 |
| Apr. 12, 2011 | (JP) | 2011-088002 |

(51) Int. Cl.
| H04L 9/00 | (2006.01) |
| H04L 9/30 | (2006.01) |
| H04L 9/14 | (2006.01) |

(52) U.S. Cl.
CPC ............... *H04L 9/008* (2013.01); *H04L 9/14* (2013.01); *H04L 9/3013* (2013.01); *H04L 9/3073* (2013.01); *H04L 2209/08* (2013.01); *H04L 2209/76* (2013.01)

(56) References Cited

U.S. PATENT DOCUMENTS

| 7,991,151 | B2* | 8/2011 | Lefranc | G06Q 20/383 380/28 |
| 8,949,614 | B1* | 2/2015 | Jernigan, IV | H04L 63/00 711/114 |
| 9,037,623 | B2* | 5/2015 | Yamamoto | H04L 9/30 708/250 |
| 2007/0169179 | A1* | 7/2007 | Narad | H04L 45/16 726/4 |
| 2007/0260882 | A1* | 11/2007 | Lefranc | G06Q 20/383 713/168 |
| 2009/0080658 | A1* | 3/2009 | Waters | G06F 21/6218 380/277 |
| 2009/0129600 | A1* | 5/2009 | Brickell | H04L 9/3073 380/282 |
| 2010/0070768 | A1* | 3/2010 | Furukawa | H04L 9/0841 713/171 |
| 2010/0082973 | A1* | 4/2010 | Brickell | H04L 9/3073 713/155 |
| 2010/0098253 | A1* | 4/2010 | Delerablee | H04L 9/3073 380/259 |
| 2010/0211782 | A1 | 8/2010 | Auradkar et al. | |
| 2010/0329454 | A1* | 12/2010 | Takashima | H04L 9/3073 380/44 |
| 2011/0194698 | A1* | 8/2011 | Asano | H04L 9/0643 380/282 |
| 2011/0200186 | A1* | 8/2011 | Ghouti | H04L 9/3066 380/43 |
| 2012/0323981 | A1* | 12/2012 | Yamamoto | H04L 9/30 708/250 |
| 2013/0318360 | A1* | 11/2013 | Yamamoto | G06F 21/602 713/189 |
| 2015/0358162 | A1* | 12/2015 | Kobayashi | H04L 9/3013 713/189 |

OTHER PUBLICATIONS

Elgamal, T., "A Public Key Cryptosystem and a signature scheme based on Discrete Logarithms", IEEE Transactions on Information Theory V. IT-31, No. 4 or CRYPTO, vol. 84, pp. 10-18, (1985)_ (Year: 1985).*

Gentry, C., "A Simple BGN-type Cryptosystem from LWE", Advances in Cryptology-Eurocrypt, Total 16 Pages, (2010) (Year: 2010).*

Elgamal, T., "A Public Key Cryptosystem and a signature scheme based on Discrete Logarithms", IEEE Transactions on Information Theory V. IT-31, No. 4 or CRYPTO, vol. 84, pp. 10-18, (1985).

Gentry, C., "A Simple BGN-type Cryptosystem from LWE", Advances in Cryptology-Eurocrypt, Total 16 Pages, (2010).

Menezes, A. J., "Elliptic Curve Public Key Cryptosystems", Kluwer Academic Publishers, ISBN, Total 15 Pages, (1993).

Boyen, X. et al., "Identity Based Cryptography Standard (IBCS) #1: Supersingular Curve Implementations of the BF and BB1 Cryptosystems", Network Working Group, pp. 1-63, (Dec. 2007).

Dent, A. W., "Hidden Pairings and Trapdoor DDH Groups", ANTS, LNCS 4076, Total 17 Pages, (2006).

Miller, V., "Short Programs for functions on Curves", URL: http://crypto.stanford.edu/miller/miller/pdf, pp. 2-7, (May 6, 1986).

Miyaji, A., et al.,"New Explicit Conditions of Elliptic Curve Traces for FR-Reduction," IEICE Trans. Fundamentals., vol. E84-A, No. 5, pp. 1234-1243, (May 2001).

Barreto, P. S. L. M., et al., "Constructing Elliptic Curves with Prescribed Embedding Degrees," SCN 2002, LNCS 2576, pp. 257-267, (2003).

Dupont, R., et al., "Building curves with arbitrary small MOV degree over finite prime fields", URL: http://eprint.iacr.org/2002/094/, pp. 1-13, (Jul. 18, 2002).

Buchmann, J., "Introduction to Cryptography", Springer Verlag, pp. 52-56, (Jul. 2001) (with partial English translation).

International Search Report dated Nov. 22, 2011 in PCT/JP11/074546 Filed Oct. 25, 2011.

Supplementary Partial European Search Report dated Sep. 9, 2016 in Patent Application 11836267.2.

Go Yamamoto, et al., "On Self-Correctors for Homomorphic Functions" SCIS 2010, The 2010 Symposium on Cryptography and Information Security, XP008172377, Jan. 19, 2010, pp. 1-6.

Yevgeniy Dodis, et al., "Chosen-Ciphertext Security of Multiple Encryption" Theory of cryptography: Second Theory of Cryptography Conference, XP047029371, Feb. 10, 2005, pp. 188-209.

Marcos Kiwi, et al., "Exact and Approximate Testing/Correcting of Algebraic Functions: A Survey" Correct System Design, Springer International Publishing, vol. 2292, XP055290782, Jan. 1, 2002, pp. 30-83.

Extended European Search Report dated Dec. 13, 2016 in patent application No. 11836267.2.

Office Action dated Apr. 8, 2019 in European Application No. 11836267.2.

Office Action dated Apr. 9, 2019 in Indian Application No. 3357/DELNP/2013.

\* cited by examiner

PROXY COMPUTING SYSTEM, COMPUTING APPARATUS, CAPABILITY PROVIDING APPARATUS, PROXY COMPUTING METHOD, CAPABILITY PROVIDING METHOD, PROGRAM, AND RECORDING MEDIUM

CROSS-REFERENCE TO RELATED APPLICATIONS

The present application is a divisional application of and claims the benefit of priority under 35 U.S.C. § 120 to U.S. application Ser. No. 15/389,055, filed Dec. 22, 2016, which is a divisional of U.S. application Ser. No. 13/881,111, now U.S. Pat. No. 9,607,158, filed Jul. 9, 2013, the entire contents of each of which is hereby incorporated herein by reference and which is a national stage of International Application No. PCT/JP2011/074546, filed Oct. 25, 2011, which is based upon and claims the benefit of priority under 35 U.S.C. § 119 to prior Japanese Patent Applications No. 2010-239342, filed Oct. 26, 2010; No. 2011-005899, filed Jan. 14, 2011; No. 2011-077779, filed Mar. 31, 2011; and No. 2011-088002, filed Apr. 12, 2011, the entire contents of each of which is hereby incorporated herein by reference.

TECHNICAL FIELD

The present invention relates to a technique to perform computation using a result of computation performed on another apparatus.

BACKGROUND ART

Decryption of a ciphertext encrypted using an encryption scheme such as public key cryptography or common key cryptography requires a particular decryption key (see Non-patent literature 1, for example). In one of existing methods for a first apparatus that does not have a decryption key to obtain a result of decryption of a ciphertext, a second apparatus that has a decryption key provides the decryption key to the first apparatus and the first apparatus uses the decryption key to decrypt the ciphertext. In another existing method for the first apparatus to obtain a result of decryption of a ciphertext, the first apparatus provides the ciphertext to the second apparatus and the second apparatus decrypts the ciphertext and provides the result of decryption to the first apparatus.

PRIOR ART LITERATURE

Non-Patent Literature

Non-patent literature 1: Taher Elgamal, A Public-Key Cryptosystem and a Signature Scheme Based on Discrete Logarithms, IEEE Transactions on Information Theory, v. IT-31, n. 4, 1985, pp. 469-472 or CRYPTO 84, pp. 10-18, Springer-Verlag

SUMMARY OF THE INVENTION

Problems to be Solved by the Invention

However, in the method in which the second apparatus provides a decryption key to the first apparatus, the decryption key needs to be taken out from the second apparatus to the outside, which poses security concerns. On the other hand, in the method in which the first apparatus provides a ciphertext to the second apparatus and the second apparatus decrypts the ciphertext, the first apparatus cannot verify the validity of decryption performed by the second apparatus. These problems can be generalized to other processing besides decryption. That is, there was not a technique for the second apparatus to provide only a computing capability to the first apparatus without leaking secrete information so that the first apparatus uses the computing capability to correctly perform computations.

Means to Solve the Problems

According to the present invention, a computing apparatus outputs first input information $\tau_1$ and second input information $\tau_2$ that are elements of a group H and correspond to a ciphertext x, a capability providing apparatus uses the first input information $\tau_1$ to correctly compute $f(\tau_1)$ with a probability greater than a certain probability to provide the result of the computation as first output information $z_1$ and uses the second input information $\tau_2$ to correctly compute $f(\tau_2)$ with a probability greater than a certain probability to provide the result of the computation as second output information $z_2$, the computing apparatus generates a computation result $u=f(x)^b x_1$ from the first output information $z_1$ and generates a computation result $v=f(x)^a x_2$ from the second output information $z_2$ and, when the computation results u and v satisfy $u^a=v^b$, outputs $u^{b'}v^{a'}$ for integers a' and b' that satisfy a'a+b'b=1, where G and H are groups, f(x) is a decryption function for decrypting the ciphertext x which is an element of the group H with a particular decryption key to obtain an element of the group G, $X_1$ and $X_2$ are random variables having values in the group G, $x_1$ is a realization of the random variable $X_1$, $x_2$ is a realization of the random variable $X_2$, and a and b are natural numbers relatively prime to each other.

Effects of the Invention

According to the present invention, the capability providing apparatus provides only a computing capability to the computing apparatus without leaking secret information and the computing apparatus can use the computing capability to correctly perform computations.

DETAILED DESCRIPTION OF THE EMBODIMENTS

Embodiments of the present invention will be described below with reference to drawings.

First Embodiment

A first embodiment of the present invention will be described.

<Configuration>

Figure 1:
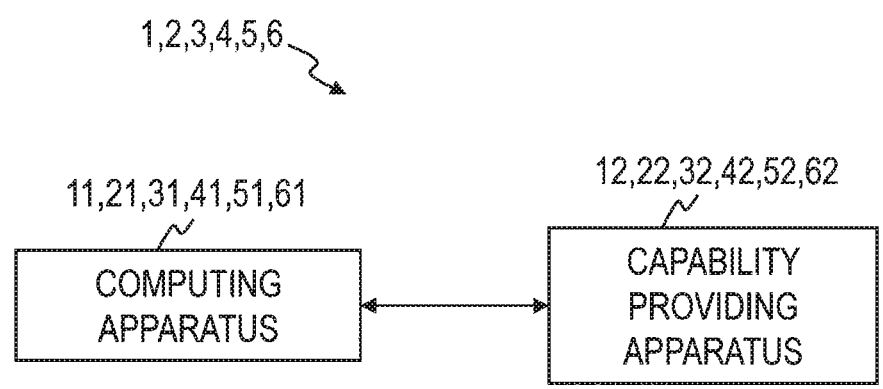
FIG. 1 is a block diagram illustrating a configuration of a proxy computing system of an embodiment.

As illustrated in FIG. 1, a proxy computing system 1 of the first embodiment includes, for example, a computing apparatus 11 which does not have a decryption key and a capability providing apparatus 12 which has a decryption key. The computing apparatus 11 requests the capability providing apparatus 12 to provide a capability of decrypting a ciphertext and uses the capability of decryption provided from the capability providing apparatus 12 to decrypt the ciphertext. The computing apparatus 11 and the capability providing apparatus 12 are configured to be able to exchange information. For example, the computing apparatus 11 and the capability providing apparatus 12 are configured to be able to exchange information through a transmission line, a network, a portable recording medium and/or other medium.

Figure 2:
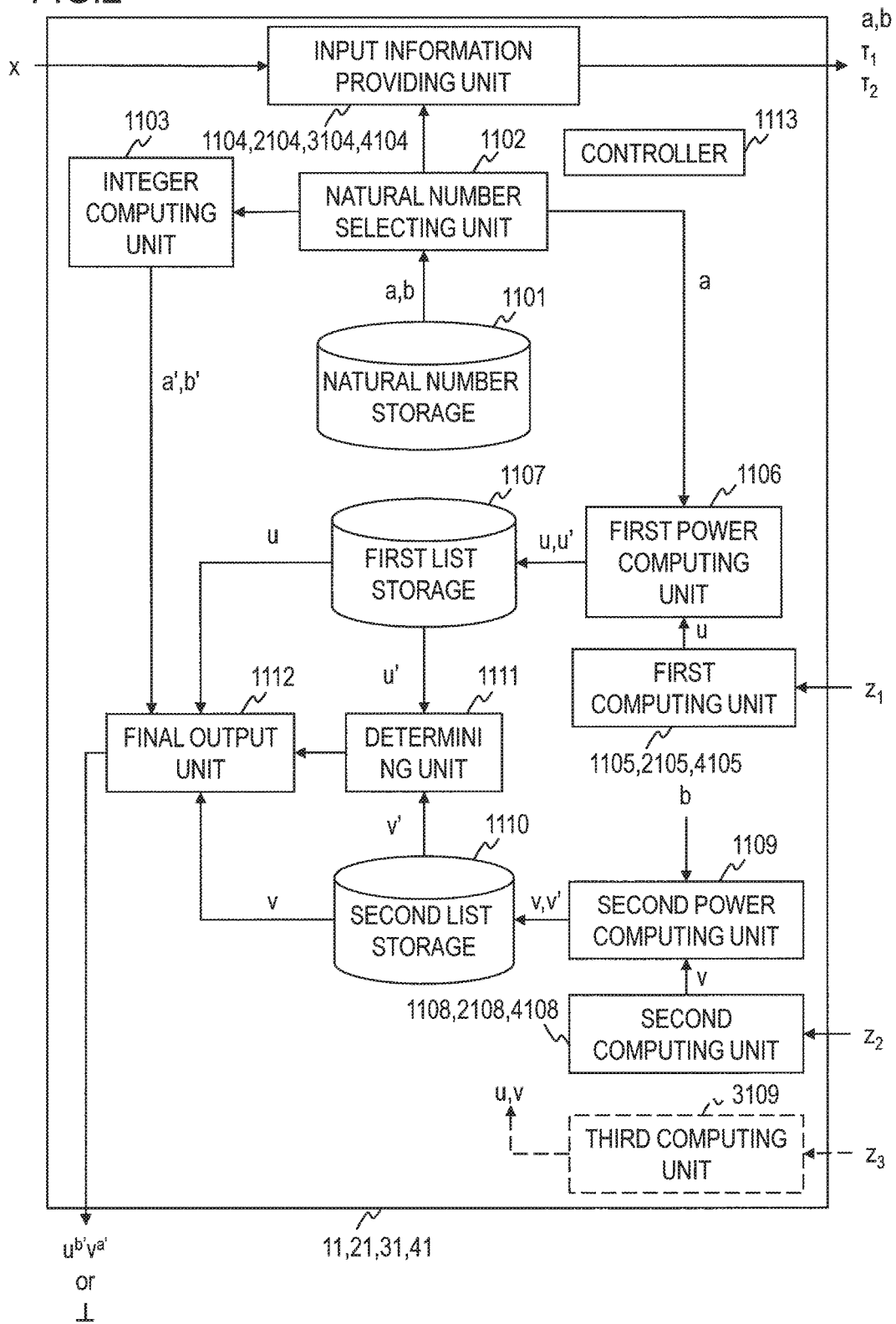
FIG. 2 is a block diagram illustrating a configuration of a computing apparatus of an embodiment.

As illustrated in FIG. 2, the computing apparatus 11 of the first embodiment includes, for example, a natural number storage 1101, a natural number selecting unit 1102, an integer computing unit 1103, an input information providing unit 1104, a first computing unit 1105, a first power computing unit 1106, a first list storage 1107, a second computing unit 1108, a second power computing unit 1109, a second list storage 1110, a determining unit 1111, a final output unit 1112, and a controller 1113. Examples of the computing apparatus 11 include a device having a computing function and a memory function, such as a card reader-writer apparatus and a mobile phone, and a well-known or specialized computer that includes a CPU (central processing unit) and a RAM (random-access memory) in which a special program is loaded.

Figure 3:
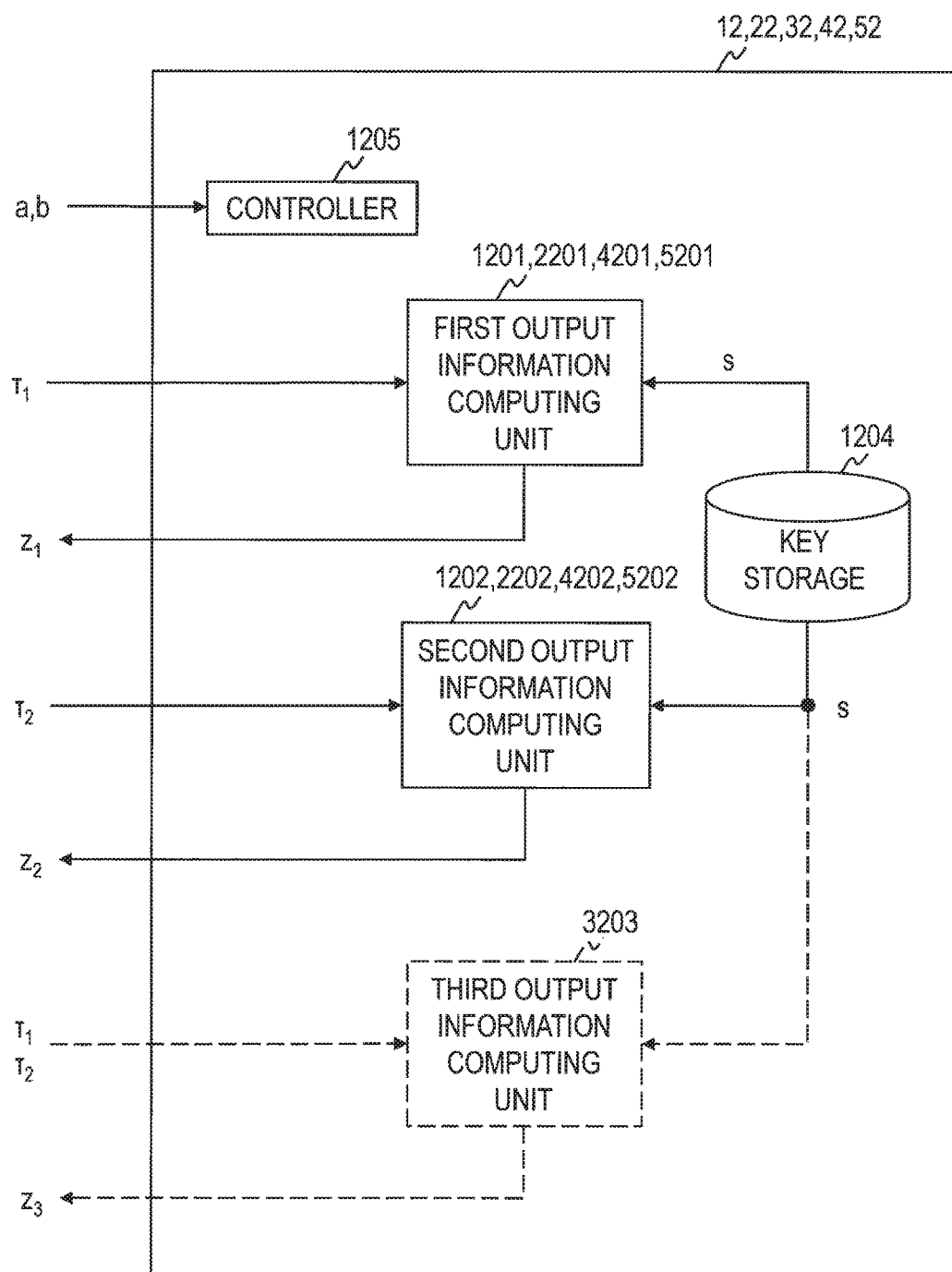
FIG. 3 is a block diagram illustrating a configuration of a capability providing apparatus of an embodiment.

As illustrated in FIG. 3, the capability providing apparatus 12 of the first embodiment includes, for example, a first output information computing unit 1201, a second output information computing unit 1202, a key storage 1204 and a controller 1205. Examples of the capability providing apparatus 12 include a tamper-resistant module such as an IC card and an IC chip, a device having computing and memory functions, such as a mobile phone, and a well-known or specialized computer including a CPU and a RAM in which a special program is loaded.

<Processes>

Processes of this embodiment will be described below. For the processes, let G and H be groups (for example commutative groups), f(x) be a decryption function for decrypting a ciphertext x, which is an element of the group H, with a particular decryption key s to obtain an element of the group G, generators of the groups G and H be $\mu_g$ and $\mu_h$, respectively, $X_1$ and $X_2$ be random variables having values in the group G, $x_1$ be a realization of the random variable $X_1$, and $x_2$ be a realization of the random variable $X_2$. It is assumed here that a plurality of pairs of natural numbers a, b that are relatively prime to each other (a, b) are stored in the natural number storage 1101 of the computing apparatus 11. The term "natural number" means an integer greater than or equal to 0. Let I be a set of pairs of relatively prime natural numbers that are less than the order of the group G, then it can be considered that pairs (a, b) of natural numbers a, b corresponding to a subset S of I are stored in the natural number storage 1101. It is also assumed that a particular decryption key s is stored in the key storage 1204 of the capability providing apparatus 12 in a secure manner. Processes of the computing apparatus 11 are performed under the control of the controller 1113 and processes of the capability providing apparatus 12 are performed under the control of the controller 1205.

Figure 6:
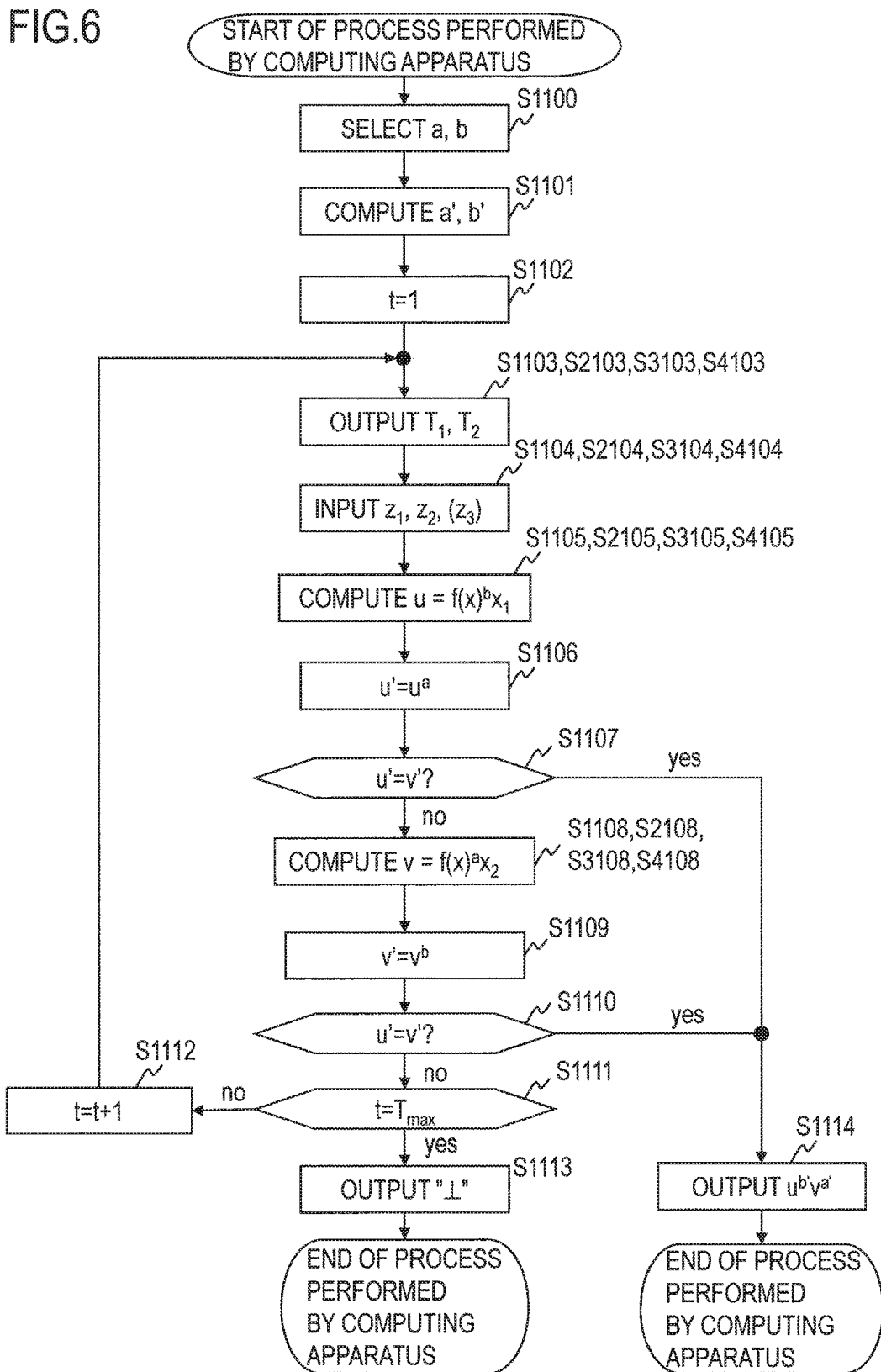
FIG. 6 is a flowchart illustrating a process performed by a computing apparatus of an embodiment.

As illustrated in FIG. 6, first, the natural number selecting unit 1102 of the computing apparatus 11 (FIG. 2) randomly reads one pair of natural numbers (a, b) from a plurality of pairs of natural numbers (a, b) stored in the natural number storage 1101. At least part of information on the read pair of natural numbers (a, b) is sent to the integer computing unit 1103, the input information providing unit 1104, the first power computing unit 1106, and the second power computing unit 1109 (step S1100).

The integer computing unit 1103 uses the sent pair of natural numbers (a, b) to compute integers a', b' that satisfy the relation a'a+b'b=1. Since the natural numbers a and b are relatively prime to each other, the integers a' and b' that satisfy the relation a'a+b'b=1 definitely exist. Information on the pair of natural numbers (a', b') is sent to the final output unit 1112 (step S1101).

The controller 1113 set t=1 (step S1102).

The input information providing unit 1104 generates and outputs first input information $\tau_1$ and second input information $\tau_2$ which are elements of the group H and each of which corresponds to the input ciphertext x. Preferably, each of the first input information $\tau_1$ and the second input information $\tau_2$ is information whose relation with the ciphertext x is scrambled. This enables the computing apparatus 11 to conceal the ciphertext x from the capability providing apparatus 12. Preferably, the first input information $\tau_1$ of this embodiment further corresponds to the natural number b selected by the natural number selecting unit 1102 and the second input information $\tau_2$ further corresponds to the natural number a selected by the natural number selecting unit 1102. This enables the computing apparatus 11 to evaluate the decryption capability provided by the capability providing apparatus 12 with a high degree of accuracy (step S1103).

Figure 7:
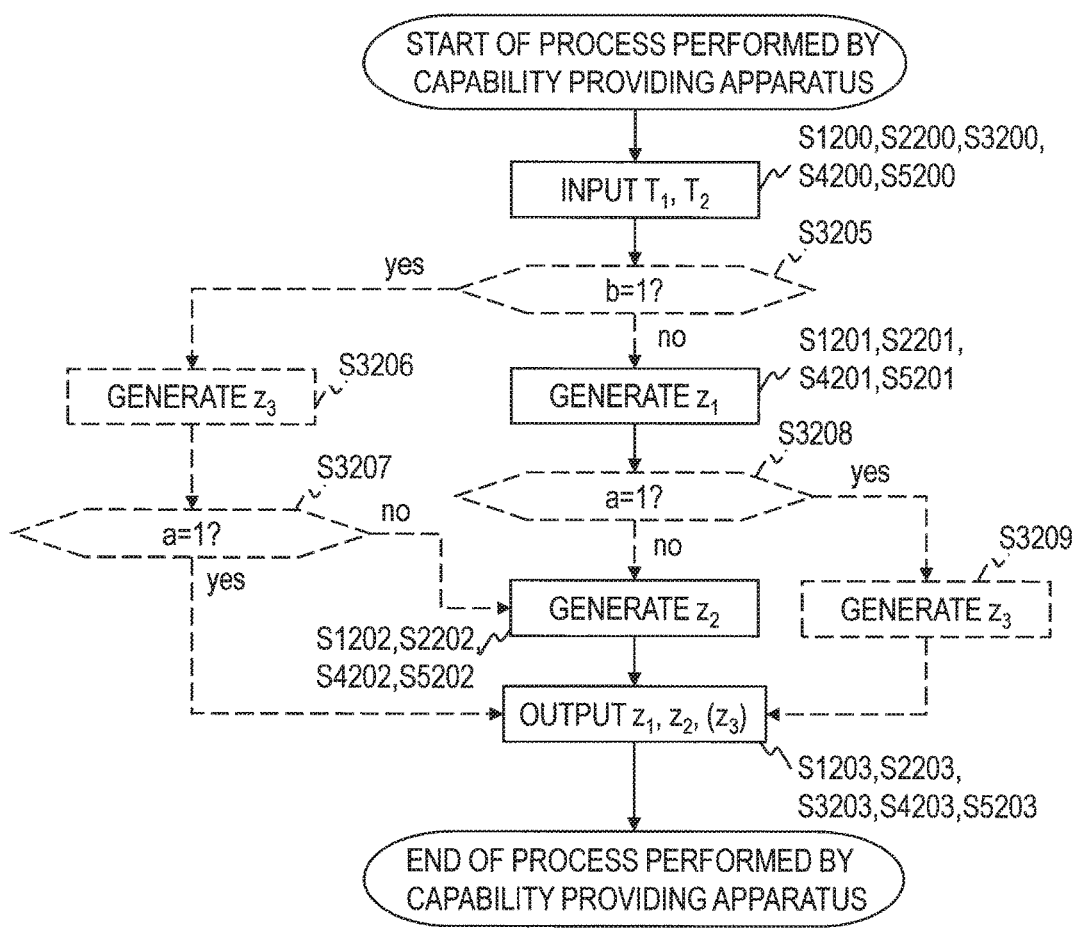
FIG. 7 is a flowchart illustrating a process performed by a capability providing apparatus of an embodiment.

As exemplified in FIG. 7, the first input information $\tau_1$ is input in the first output information computing unit 1201 of the capability providing apparatus 12 (FIG. 3) and the second input information $\tau_2$ is input in the second output information computing unit 1202 (step S1200).

The first output information computing unit 1201 uses the first input information $\tau_1$ and the decryption key s stored in the key storage 1204 to correctly compute $f(\tau_1)$ with a probability greater than a certain probability and sets the result of the computation as first output information $z_1$ (step S1201). The second output information computing unit 1202 uses the second input information $\tau_2$ and the decryption key s stored in the key storage 1204 to correctly compute $f(\tau_2)$ with a probability greater than a certain probability and sets the result of the computation as second output information $z_2$ (step S1202). Note that the "certain probability" is a probability less than 100%. An example of the "certain probability" is a nonnegligible probability and an example of the "nonnegligible probability" is a probability greater than or equal to 1/$\psi$(k), where $\psi$(k) is a polynomial that is a weakly increasing function (non-decreasing function) for a security parameter k. That is, the first output information computing unit 1201 and the second output information computing unit 1202 output computation results that have an intentional or unintentional error. In other words, the result of the computation by the first output information computing unit 1201 may or may not be $f(\tau_1)$ and the result of the computation by the second output information computing unit 1202 may or may not be $f(\tau_2)$.

The first output information computing unit 1201 outputs the first output information $z_1$ and the second output information computing unit 1202 outputs the second output information $z_2$ (step S1203).

Returning to FIG. 6, the first output information $z_1$ is input in the first computing unit 1105 of the computing apparatus 11 (FIG. 2) and the second output information $z_2$ is input in the second computing unit 1108. The first output information $z_1$ and the second output information $z_2$ are equivalent to the decryption capability provided by the capability providing apparatus 12 to the computing apparatus 11 (step S1104).

The first computing unit 1105 generates a computation result $u=f(x)^b x_1$ from the first output information $z_1$. Here, generating (computing) $f(x)^b x_1$ means computing a value of a formula defined as $f(x)^b x_1$. Any intermediate computation method may be used, provided that the value of the formula $f(x)^b x_1$ can be eventually computed. The same applies to computations of the other formulae that appear herein. In the first embodiment, a computation defined at a group is expressed multiplicatively. That is, "$\alpha^b$" for $\alpha \in G$ means that a computation defined at the group G is applied b times to $\alpha$ and "$\alpha_1 \alpha_2$" for $\alpha_1, \alpha_2 \in G$ means that a computation defined at the group G is performed on operands $\alpha_1$ and $\alpha_2$ (the same applies to second to fifth embodiments described later). The result u of the computation is sent to the first power computing unit 1106 (step S1105).

The first power computing unit 1106 computes $u'=u^a$. The pair of the result u of the computation and u' computed on the basis of the result of the computation, (u, u'), is stored in the first list storage 1107 (step S1106).

The determining unit 1111 determines whether or not there is one that satisfies u'=v' among the pairs (u, u') stored in the first list storage 1107 and the pairs (v, v') stored in the second list storage 1110 (step S1107). If no pair (v, v') is stored in the second list storage 1110, the process at step S1107 is omitted and a process at step S1108 is performed. If there is one that satisfies u'=v', the process proceeds to step S1114; if there is not one that satisfies u'=v', the process proceeds to step S1108.

At step S1108, the second computing unit 1108 generates a computation result $v=f(x)^a x_2$ from the second output information $z_2$. The result v of the computation is sent to the second power computing unit 1109 (step S1108).

The second power computing unit 1109 computes $v'=v^b$. The pair (v, v') of the result v of the computation and v' computed on the basis of the computation result is stored in the second list storage 1110 (step S1109).

The determining unit 1111 determines whether or not there is one that satisfies u'=v' among the pairs (u, u') stored in the first list storage 1107 and the pairs (v, v') stored in the second list storage 1110 (step S1110). If there is one that satisfies u'=v', the process proceeds to step S1114. If there is not one that satisfies u'=v', the process proceeds to step S1111.

At step S1111, the controller 1113 determines whether or not t=$T_{max}$ (step S1111). Here, $T_{max}$ is a predetermined natural number. If t=$T_{max}$, the controller 1113 outputs information indicating that the computation is impossible, for example the symbol "⊥" (step S1113) and the process ends.

If not $t=T_{max}$, the controller 1113 increments t by 1, that is, sets t=t+1 (step S1112) and the process returns to step S1103.

The information indicating the computation is impossible (the symbol "⊥" in this example) means that the level of reliability that the capability providing apparatus 12 correctly performs computation is lower than a criterion defined by $T_{max}$. In other words, the capability providing apparatus 12 was unable to perform a correct computation in $T_{max}$ trials.

At step S1114, the final output unit 1112 uses u and v that correspond to u' and v' that are determined to satisfy u'=v' to calculate and output $u^{b'}v^{a'}$ (step S1114). The $u^{b'}v^{a'}$ thus computed will be a result f(x) of decryption of the ciphertext x with the particular decryption key s with a high probability (the reason why $u^{b'}v^{a'}=f(x)$ with a high probability will be described later). Therefore, the process described above is repeated multiple times and the value obtained with the highest frequency among the values obtained at step S1114 can be provided as the result of decryption. As will be described, $u^{b'}v^{a'}=f(x)$ can result with an overwhelming probability, depending on settings. In that case, the value obtained at step S1114 can be directly provided as the result of decryption.

<<Reason why $u^{b'}v^{a'}=f(x)$ with a High Probability>>

Let X be a random variable having a value in the group G. For w∈G, an entity that returns wx' corresponding to a sample x' according to the random variable X in response to each request is called a sampler having an error X for w.

For w∈G, an entity that returns $w^a x'$ corresponding to a sample x' according to a random variable X whenever a natural number a is given is called a randomizable sampler having an error X for w. The randomizable sampler functions as the sampler if used with a=1.

The combination of the input information providing unit 1104, the first output information computing unit 1201 and the first computing unit 1105 of this embodiment is a randomizable sampler having an error $X_1$ for f(x) (referred to as the "first randomizable sampler") and the combination of the input information providing unit 1104, the second output information computing unit 1202 and the second computing unit 1108 is a randomizable sampler having an error $X_2$ for f(x) (referred to as the "second randomizable sampler").

The inventor has found that if u'=v' holds, that is, if $u^a=v^b$ holds, it is highly probable that the first randomizable sampler has correctly computed $u=f(x)^b$ and the second randomizable sampler has correctly computed $v=f(x)^a$ ($x_1$ and $x_2$ are identity elements $e_g$ of the group G). For simplicity of explanation, this will be proven in a fifth embodiment.

When the first randomizable sampler correctly computes $u=f(x)^b$ and the second randomizable sampler correctly computes $v=f(x)^a$ (when $x_1$ and $x_2$ are identity elements $e_g$ of the group G), then $u^{b'}v^{a'}=(f(x)^b x_1)^{b'}(f(x)^a x_2)^{a'}=(f(x)^b e_g)^{b'}(f(x)^a e_g)^{a'}=f(x)^{bb'}e_g^{b'}f(x)^{aa'}e_g^{a'}=f(x)^{(bb'+aa')}=f(x)$.

For $(q_1, q_2)\in I$, a function $\pi_i$ is defined by $\pi_i(q_1, q_2)=q_i$ for each of i=1, 2. Let L=min (#$\pi_1$(S), #$\pi_2$(S)), where #• is the order of a set •. If the group G is a cyclic group or a group whose order is difficult to compute, it can be expected that the probability that an output other than "⊥" of the computing apparatus 11 is not f(x) is at most approximately $T_{max}^2 L/\#S$ within a negligible error. If L/#S is a negligible quantity and $T_{max}$ is a quantity approximately equal to a polynomial order, the computing apparatus 11 outputs a correct f(x) with an overwhelming probability. An example of S that results in a negligible quantity of L/#S is S={(1, d)|d∈[2, |G|−1]}, for example.

Second Embodiment

A proxy computing system of a second embodiment is an example that embodies the first randomizable sampler and the second randomizable sampler described above. The following description will focus on differences from the first embodiment and repeated description of commonalities with the first embodiment will be omitted. In the following description, elements labeled with the same reference numerals have the same functions and the steps labeled with the same reference numerals represent the same processes.

<Configuration>

As illustrated in FIG. 1, the proxy computing system 2 of the second embodiment includes a computing apparatus 21 in place of the computing apparatus 11 and a capability providing apparatus 22 in place of the capability providing apparatus 12.

Figure 4:
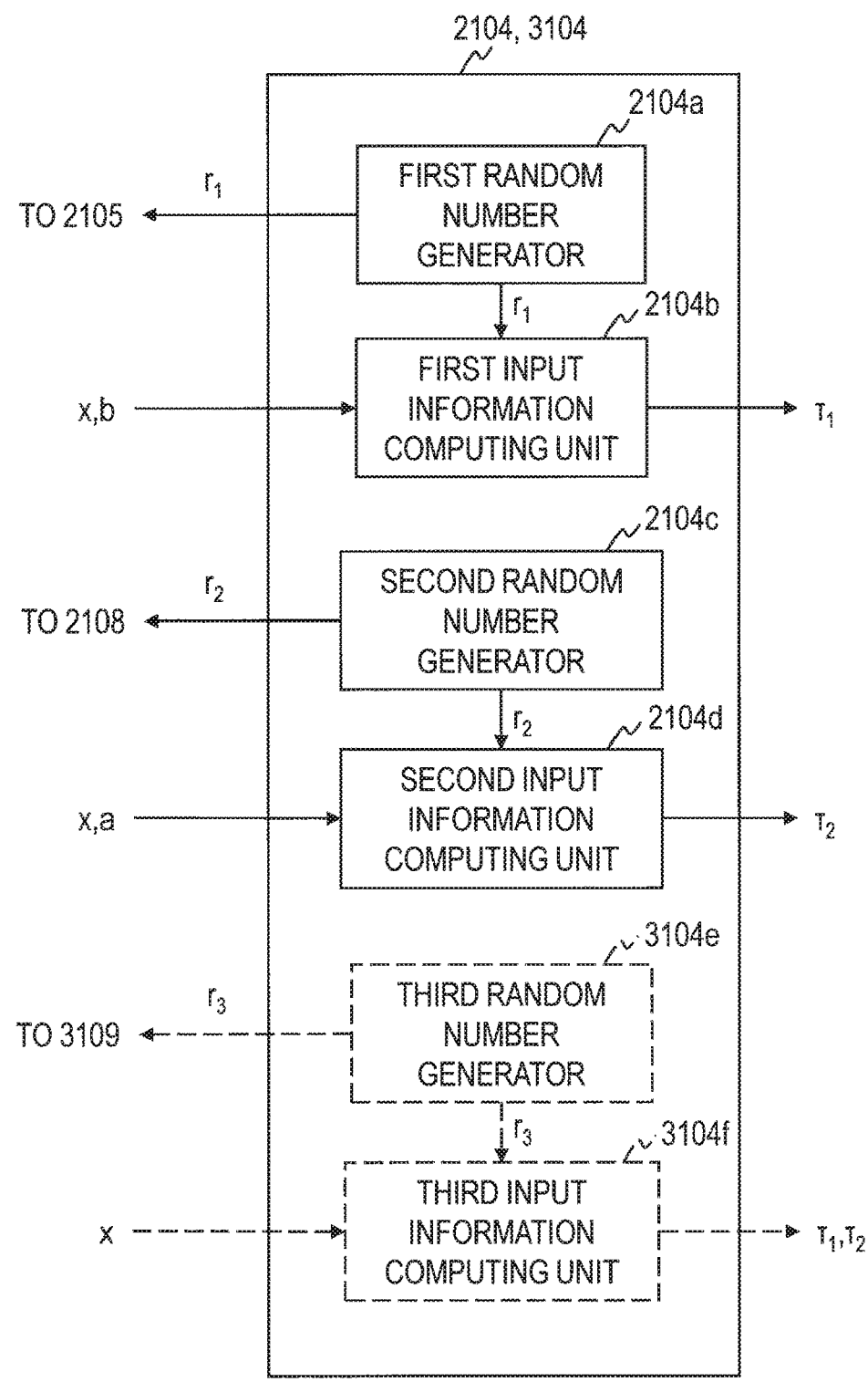
FIG. 4 is a block diagram illustrating a configuration of an input information providing unit of an embodiment.

As illustrated in FIG. 2, the computing apparatus 21 of the second embodiment includes, for example, a natural number storage 1101, a natural number selecting unit 1102, an integer computing unit 1103, an input information providing unit 2104, a first computing unit 2105, a first power computing unit 1106, a first list storage 1107, a second computing unit 2108, a second power computing unit 1109, a second list storage 1110, a determining unit 1111, a final output unit 1112 and a controller 1113. As illustrated in FIG. 4, the input information providing unit 2104 of this embodiment includes, for example, a first random number generator 2104a, a first input information computing unit 2104b, a second random number generator 2104c, and a second input information computing unit 2104d.

As illustrated in FIG. 3, the capability providing apparatus 22 of the second embodiment includes, for example, a first output information computing unit 2201, a second output information computing unit 2202, a key storage 1204, and a controller 1205.

<Processes>

Processes of this embodiment will be described below. In the second embodiment, a decryption function f(x) is a homomorphic function, a group H is a cyclic group, and a generator of the group H is $\mu_h$, the order of the group H is $K_H$, and $v=f(\mu_h)$. The rest of the assumptions are the same as those in the first embodiment, except that the computing apparatus 11 is replaced with the computing apparatus 21 and the capability providing apparatus 12 is replaced with the capability providing apparatus 22.

As illustrated in FIGS. 6 and 7, a process of the second embodiment is the same as the process of the first embodiment except that steps S1103 through S1105, S1108, and S1200 through S1203 of the first embodiment are replaced with steps S2103 through S2105, S2108, and S2200 through S2203, respectively. In the following, only processes at steps S2103 through S2105, S2108, and S2200 through S2203 will be described.

<<Process at Step S2103>>

The input information providing unit 2104 of the computing apparatus 21 (FIG. 2) generates and outputs first input information $\tau_1$ and second input information $\tau_2$ which are elements of the group H and each of which corresponds to an input ciphertext x (Step S2103 of FIG. 6). A process at step S2103 of this embodiment will be described with reference to FIG. 8.

The first random number generator 2104a (FIG. 4) generates a uniform random number $r_1$ that is a natural number greater than or equal to 0 and less than $K_H$. The generated random number $r_1$ is sent to the first input information computing unit 2104b and the first computing unit 2105

(step S2103a). The first input information computing unit 2104b uses the input random number $r_1$, the ciphertext x and a natural number b to compute first input information $\tau_1 = \mu_h^{r1} x^b$ (step S2103b). Here, the superscript r1 on $\mu_h$ represents $r_1$. When a notation $\alpha^{\beta\gamma}$ is used herein in this way, $\beta\gamma$ represents $\beta_\gamma$, namely $\beta$ with subscript $\gamma$, where $\alpha$ is a first letter, $\beta$ is a second letter, and $\gamma$ is a number.

The second random number generator 2104c generates a uniform random number $r_2$ that is a natural number greater than or equal to 0 and less than $K_H$. The generated random number $r_2$ is sent to the second input information computing unit 2104d and the second computing unit 2108 (step S2103c). The second input information computing unit 2104d uses the input random number $r_2$, the ciphertext x, and a natural number a to compute second input information $\tau_2 = \mu_h^{r2} x^a$ (step S2103d).

The first input information computing unit 2104b and the second input information computing unit 2104d output the first input information $\tau_1$ and the second input information $\tau_2$ thus generated (step S2103e). Note that the first input information $\tau_1$ and the second input information $\tau_2$ in this embodiment are information whose relation with the ciphertext x is scrambled using random numbers $r_1$, $r_2$, respectively. This enables the computing apparatus 21 to conceal the ciphertext x from the capability providing apparatus 22. The first input information $\tau_1$ of this embodiment further corresponds to the natural number b selected by the natural number selecting unit 1102 and the second input information $\tau_2$ further corresponds to the natural number a selected by the natural number selecting unit 1102. This enables the computing apparatus 21 to evaluate the decryption capability provided by the capability providing apparatus 22 with a high degree of accuracy.

<<Processes at Steps S2200 Through S2203>>

As illustrated in FIG. 7, first, the first input information $\tau_1 = \mu_h^{r1} x^b$ is input in the first output information computing unit 2201 of the capability providing apparatus 22 (FIG. 3) and the second input information $\tau_2 = \mu_h^{r2} x^a$ is input in the second output information computing unit 2202 (step S2200).

The first output information computing unit 2201 uses the first input information $\tau_1 = \mu_h^{r1} x^b$ and a decryption key s stored in the key storage 1204 to correctly compute $f(\mu_h^{r1} x^b)$ with a probability greater than a certain probability and sets the result of the computation as first output information $z_1$. The result of the computation may or may not be correct. That is, the result of the computation by the first output information computing unit 2201 may or may not be $f(\mu_h^{r1} x^b)$ (step S2201).

The second output information computing unit 2202 uses the second input information $\tau_2 = \mu_h^{r2} x^a$ and the decryption key s stored in the key storage 1204 to correctly compute $f(\mu_h^{r2} x^a)$ with a probability greater than a certain probability and sets the result of the computation as second output information $z_2$. The result of the computation may or may not be correct. That is, the result of the computation by the second output information computing unit 2202 may or may not be $f(\mu_h^{r2} x^a)$ (step S2202). The first output information computing unit 2201 outputs the first output information $z_1$ and the second output information computing unit 2202 outputs the second output information $z_2$ (step S2203).

<<Processes at Steps S2104 and S2105>>

Returning to FIG. 6, the first output information $z_1$ is input in the first computing unit 2105 of the computing apparatus 21 (FIG. 2) and the second output information $z_2$ is input in the second computing unit 2108. The first output information $z_1$ and the second output information $z_2$ are equivalent to the decryption capability provided by the capability providing apparatus 22 to the computing apparatus 21 (step S2104).

The first computing unit 2105 uses the input random number $r_1$ and the first output information $z_1$ to compute $z_1 v^{-r1}$ and sets the result of the computation as u. The result u of the computation is sent to the first power computing unit 1106. Here, $u = z_1 v^{-r1} = f(x)^b x_1$. That is, $z_1 v^{-r1}$ is an output of a randomizable sampler having an error $X_1$ for f(x). The reason will be described later (step S2105).

<<Process at Step S2108>>

The second computing unit 2108 uses the input random number $r_2$ and the second output information $z_2$ to compute $z_2 v^{-r2}$ and sets the result of the computation as v. The result v of the computation is sent to the second power computing unit 1109. Here, $v = z_2 v^{-r2} = f(x)^a x_2$. That is, $z_2 v^{-r2}$ is an output of a randomizable sampler having an error $X_2$ for f(x). The reason will be described later (step S2108).

<<Reason why $z_1 v^{-r1}$ and $z_2 v^{-r2}$ are Outputs of Randomizable Samplers Having Errors $X_1$ and $X_2$, Respectively, for f(x)>>

Let c be a natural number, R and R' be random numbers, and $B(\mu_h^R x^c)$ be the result of computation performed by the capability providing apparatus 22 using $\mu_h^R x^c$. That is, the results of computations that the first output information computing unit 2201 and the second output information computing unit 2202 return to the computing apparatus 21 are $z = B(\mu_h^R x^c)$. A random variable X that has a value in the group G is defined as $X = B(\mu_h^{R'}) f(\mu_h^{R'})^{-1}$.

Then, $zv^{-R} = B(\mu_h^R x^c) f(\mu_h)^{-R} = X f(\mu_h^R x^c) f(\mu_h)^{-R} = X f(\mu_h)^R f(x)^c f(\mu_h)^{-R} = f(x)^c X$. That is, $zv^{-R}$ is an output of a randomizable sampler having an error X for f(x).

The expansion of formula given above uses the properties such that $X = B(\tau_h^{R'}) f(\mu_h^{R'})^{-1} = B(\mu_h^R x^c) f(\mu_h^R x^c)^{-1}$ and that $B(\mu_h^R x^c) = X f(\mu_h^R x^c)$. The properties are based on the fact that the function f(x) is a homomorphic function and R and R' are random numbers.

Therefore, considering that a and b are natural numbers and $\tau_1$ and $r_2$ are random numbers, $z_1 v^{-r1}$ and $z_2 v^{-r2}$ are, likewise, outputs of randomizable samplers having errors $X_1$ and $X_2$, respectively, for f(x).

Third Embodiment

A third embodiment is a variation of the second embodiment and computes a value of u or v by using samplers described above when a=1 or b=1. The amounts of computations performed by samplers are in general smaller than the amounts of computations by randomizable samplers. Using samplers instead of randomizable samplers for computations when a=1 or b=1 can reduce the amounts of computations by a proxy computing system. The following description will focus on differences from the first and second embodiments and repeated description of commonalities with the first and second embodiments will be omitted.

<Configuration>

As illustrated in FIG. 1, a proxy computing system 3 of the third embodiment includes a computing apparatus 31 in place of the computing apparatus 21 and a capability providing apparatus 32 in place of the capability providing apparatus 22.

As illustrated in FIG. 2, the computing apparatus 31 of the third embodiment includes, for example, a natural number storage 1101, a natural number selecting unit 1102, an integer computing unit 1103, an input information providing unit 3104, a first computing unit 2105, a first power computing unit 1106, a first list storage 1107, a second computing unit 2108, a second power computing unit 1109, a second list storage 1110, a determining unit 1111, a final output unit 1112, a controller 1113, and a third computing unit 3109.

As illustrated in FIG. 3, the capability providing apparatus 32 of the third embodiment includes, for example, a first output information computing unit 2201, a second output information computing unit 2202, a key storage 1204, a controller 1205, and a third output information computing unit 3203.

<Processes>

Processes of this embodiment will be described below. Differences from the second embodiment will be described.

As illustrated in FIGS. 6 and 7, a process of the third embodiment is the same as the process of the second embodiment except that steps S2103 through S2105, S2108, and S2200 through S2203 of the second embodiment are replaced with steps S3103 through S3105, S3108, S3200 through S3203, and S3205 through 3209, respectively. The following description will focus on processes at steps S3103 through S3105, S3108, S3200 through S3203, and S3205 through S3209.

<<Process at Step S3103>>

The input information providing unit 3104 of the computing apparatus 31 (FIG. 2) generates and outputs first input information $\tau_1$ and second input information $\tau_2$ which are elements of a group H and each of which corresponds to an input ciphertext x (step S3103 of FIG. 6).

Figure 8:
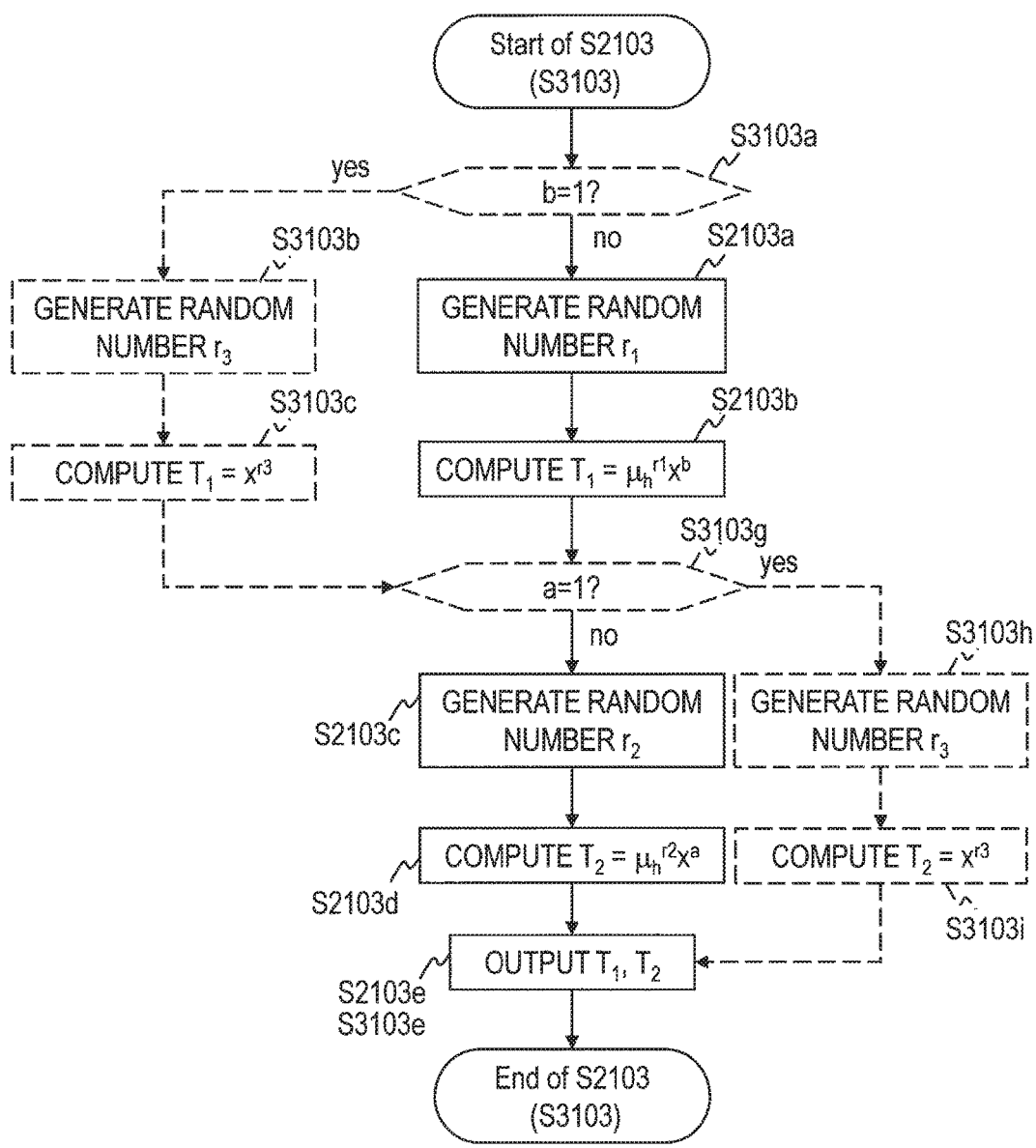
FIG. 8 is a flowchart illustrating a process at step S2103 (S3103)

A process at step S3103 of this embodiment will be described below with reference to FIG. 8.

The controller 1113 (FIG. 2) controls the input information providing unit 3104 according to natural numbers (a, b) selected by the natural number selecting unit 1102.

Determination is made by the controller 1113 as to whether b is equal to 1 (step S3103a). If it is determined that b≠1, the processes at steps S2103a and 2103b described above are performed and the process proceeds to step S3103g.

On the other hand, if it is determined at step S3103a that b=1, the third random number generator 3104e generates a random number $r_3$ that is a natural number greater than or equal to 0 and less than $K_H$. The generated random number $r_3$ is sent to the third input information computing unit 3104f and the third computing unit 3109 (step S3103b). The third input information computing unit 3104f uses the input random number $r_3$ and a ciphertext x to compute $x^{r_3}$ and sets $x^{r_3}$ as first input information $\tau_1$ (step S3103c). Then the process proceeds to step S3103g.

At step S3103g, determination is made by the controller 1113 as to whether a is equal to 1 (step S3103g). If it is determined that a≠1, the processes at steps S2103c and S2103d described above are performed.

On the other hand, if it is determined at step S3103g that a=1, the third random number generator 3104e generates a random number $r_3$ that is a natural number greater than or equal to 0 and less than $K_H$. The generated random number $r_3$ is sent to the third input information computing unit 3104f (step S3103h). The third input information computing unit 3104f uses the input random number $r_3$ and the ciphertext x to compute $x^{r_3}$ and sets $x^{r_3}$ as second input information $\tau_2$ (step S3103i).

The first input information computing unit 2104b, the second input information computing unit 2104d, and the third input information computing unit 3104f output the first input information $\tau_1$ and the second input information $\tau_2$ thus generated along with information on the corresponding natural numbers (a, b) (step S3103e). Note that the first input information $\tau_1$ and the second input information $\tau_2$ in this embodiment are information whose relation with the ciphertext x is scrambled using random numbers $r_1$, $r_2$ and $r_3$. This enables the computing apparatus 31 to conceal the ciphertext x from the capability providing apparatus 32.

<<Processes at S3200 Through S3203 and S3205 Through S3209>>

Processes at S3200 through S3203 and S3205 through S3209 of this embodiment will be described below with reference to FIG. 7.

The controller 1205 (FIG. 3) controls the first output information computing unit 2201, the second output information computing unit 2202 and the third output information computing unit 3203 according to input natural numbers (a, b).

Under the control of the controller 1205, the first input information $\tau_1 = \mu_h^{r_1} x^b$ when b≠1 is input in the first output information computing unit 2201 of the capability providing apparatus 32 (FIG. 3) and the second input information $\tau_2 = \mu_h^{r_2} x^a$ when a≠1 is input in the second output information computing unit 2202. The first input information $\tau_1 = x^{r_3}$ when b=1 and the second input information $\tau_2 = x^{r_3}$ when a=1 are input in the third output information computing unit 3203 (step S3200).

Determination is made by the controller 1113 as to whether b is equal to 1 (step S3205). If it is determined that b≠1, the process at step S2201 described above is performed. Then, determination is made by the controller 1113 as to whether a is equal to 1 (step S2208). If it is determined that a≠1, the process at step S2202 described above is performed and then the process proceeds to step S3203.

On the other hand, if it is determined at step S3208 that a=1, the third output information computing unit 3203 uses the second input information $\tau_2 = x^{r_3}$ to correctly compute $f(x^{r_3})$ with a probability greater than a certain probability and sets the obtained result of the computation as third output information $z_3$. The result of the computation may or may not be correct. That is, the result of the computation by the third output information computing unit 3203 may or may not be $f(x^{r_3})$ (step S3209). Then the process proceeds to step S3203.

If it is determined at step S3205 that b=1, the third output information computing unit 3203 uses the first input information $\tau_1 = x^{r_3}$ to correctly compute $f(x^{r_3})$ with a probability greater than a certain probability and sets the obtained result of the computation as third output information $z_3$. The result of the computation may or may not be correct. That is, the result of the computation by the third output information computing unit 3203 may or may not be $f(x^{r_3})$ (step S3206).

Then, determination is made by the controller 1113 as to whether a is equal to 1 (step S3207). If it is determined that a=1, the process proceeds to step S3203; if it is determined that a≠1, the process proceeds to step S2202.

At step S3203, the first output information computing unit 2201, which has generated the first output information $z_1$, outputs the first output information $z_1$, the second output information computing unit 2202, which has generated the second output information $z_2$, outputs the second output information $z_2$, and the third output information computing unit 3202, which has generated the third output information $z_3$, outputs the third output information $z_3$ (step S3203).

<<Processes at Steps S3104 and S3105>>

Returning to FIG. 6, under the control of the controller 1113, the first output information $z_1$ is input in the first computing unit 2105 of the computing apparatus 31 (FIG. 2), the second output information $z_2$ is input in the second computing unit 2108, and the third output information $z_3$ is input in the third computing unit 3109 (step S3104).

If b≠1, the first computing unit 2105 performs the process at step S2105 described above to generate u; if b=1, the third computing unit 3109 computes $z_3^{1/r3}$ and sets the result of the computation as u. The result u of the computation is sent to the first power computing unit 1106. Here, if b=1, then $u=z_3^{1/r3}=f(x)x_3$. That is, $z_3^{1/r3}$ serves as a sampler having an error $X_3$ for f(x). The reason will be described later (step S3105).

<<Process at Step S3108>>

If a≠1, the second computing unit 2108 performs the process at S2108 described above to generate v; if a=1, the third computing unit 3109 computes $z_3^{1/r3}$ and sets the result of the computation as v. The result v of the computation is sent to the second power computing unit 1109. Here, if a=1, then $v=z_3^{1/r3}=f(x)x_3$. That is, $z_3^{1/r3}$ serves as a sampler having an error $X_3$ for f(x). The reason will be described later (step S3108).

Note that if $z_3^{1/r3}$, that is, the radical root of $z_3$, is hard to compute, u and/or v may be calculated as follows. The third computing unit 3109 may store each pair of random number $r_3$ and $z_3$ computed on the basis of the random number $r_3$ in a storage, not depicted, in sequence as $(\alpha_1, \beta_1), (\alpha_2, \beta_2), \ldots, (\alpha_m, \beta_m), \ldots$. Here, m is a natural number. The third computing unit 3109 may compute $\gamma_1, \gamma_2, \ldots, \gamma_m$ that satisfies $\gamma_1\alpha_1+\gamma_2\alpha_2+ \ldots +\gamma_m\alpha_m=1$ when the least common multiple of $\alpha_1, \alpha_2, \ldots, \alpha_m$ is 1, where $\gamma_1, \gamma_2, \ldots, \gamma_m$ are integers. The third computing unit 3109 may then use the resulting $\gamma_1, \gamma_2, \ldots, \gamma_m$ to compute $\Pi_{i=1}^m \beta_i^{\gamma i}=\beta_1^{\gamma 1} \beta_2^{\gamma 2} \ldots \beta_m^{\gamma m}$ and may set the results of the computation as u and/or v.

<<Reason why $z_3^{1/r3}$ Serves as a Sampler Having an Error $X_3$ for f(x)>>

Let R be a random number and $B(x^R)$ be the result of computation performed by the capability providing apparatus 32 using $x^R$. That is, let $z=B(x^R)$ be the results of computations returned by the first output information computing unit 2201, the second output information computing unit 2202, and the third output information computing unit 3203 to the computing apparatus 31. Furthermore, a random variable X having a value in the group G is defined as $X=B(x^R)^{1/R}f(x)^{-1}$.

Then, $z^{1/R}=B(x^R)^{1/R}=Xf(x)=f(x)X$. That is, $z^{1/R}$ serves as a sampler having an error X for f(x).

The expansion of formula given above uses the properties such that $X=B(x^R)^{1/R}f(x^R)^{-1}$ and that $B(x^R)^{1/R}=Xf(x^R)$. The properties are based on the fact that R is a random number.

Therefore, considering that $r_3$ is a random number, $z^{1/R}$ serves as a sampler having an error $X_3$ for f(x) likewise.

Fourth Embodiment

A proxy computing system of a fourth embodiment is another example that embodies the first and second randomizable samplers described above. Specifically, the proxy computing system embodies an example of first and second randomizable samplers in the case where H=G×G, the decryption function f(x) is a decryption function of ElGamal encryption, that is, $f(c_1, c_2)=c_1c_2^{-s}$ for a decryption key s and a ciphertext $x=(c_1, c_2)$. The following description will focus on differences from the first embodiment and repeated description of commonalities with the first embodiment will be omitted.

As illustrated in FIG. 1, the proxy computing system 4 of the fourth embodiment includes a computing apparatus 41 in place of the computing apparatus 11 and a capability providing apparatus 42 in place of the capability providing apparatus 12.

Figure 5:
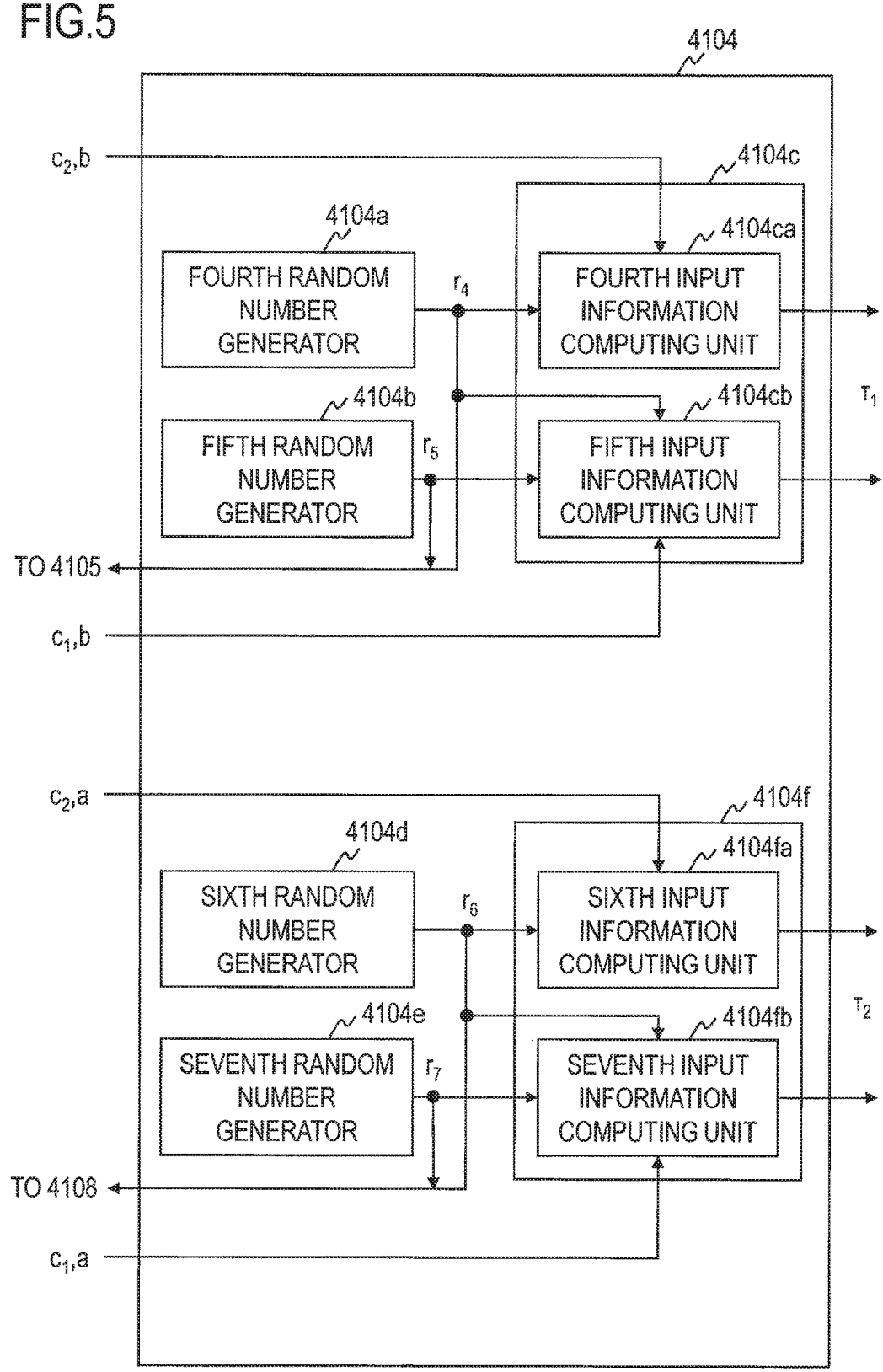
FIG. 5 is a block diagram illustrating a configuration of an input information providing unit of an embodiment.

As illustrated in FIG. 2, the computing apparatus 41 of the fourth embodiment includes, for example, a natural number storage 1101, a natural number selecting unit 1102, an integer computing unit 1103, an input information providing unit 4104, a first computing unit 4105, a first power computing unit 1106, a first list storage 1107, a second computing unit 4108, a second power computing unit 1109, a second list storage 1110, a determining unit 1111, a final output unit 1112, and a controller 1113. As illustrated in FIG. 5, the input information providing unit 4104 of this embodiment includes, for example, a fourth random number generator 4104a, a fifth random number generator 4104b, a first input information computing unit 4104c, a sixth random number generator 4104d, a seventh random number generator 4104e, and a second input information computing unit 4104f. The first input information computing unit 4104c includes, for example, a fourth input information computing unit 4104ca and a fifth input information computing unit 4104cb. The second input information computing unit 4104f includes, for example, a sixth input information computing unit 4104fa and a seventh input information computing unit 4104fb.

As illustrated in FIG. 3, the capability providing apparatus 42 of the fourth embodiment includes, for example, a first output information computing unit 4201, a second output information computing unit 4202, a key storage 1204, and a controller 1205.

<Processes>

Processes of this embodiment will be described below. In the fourth embodiment, it is assumed that a group H is the direct product group G×G of a group G, the group G is a cyclic group, a ciphertext $x=(c_1, c_2)\in H$, $f(c_1, c_2)$ is a homomorphic function, a generator of the group G is $\mu_g$, the order of the group G is $K_G$, a pair of a ciphertext $(V, W)\in H$ and a text $f(V, W)=Y\in G$ decrypted from the ciphertext for the same decryption key s is preset in the computing apparatus 41 and the capability providing apparatus 42, and the computing apparatus 41 and the capability providing apparatus 42 can use the pair.

As illustrated in FIGS. 6 and 7, a process of the fourth embodiment is the same as the process of the first embodiment except that steps S1103 through S1105, S1108, and S1200 through S1203 of the first embodiment are replaced with steps S4103 through S4105, S4108, and S4200 through S4203, respectively. In the following, only processes at steps S4103 through S4105, S4108, and S4200 through S4203 will be described.

<<Process at Step S4103>>

Figure 9:
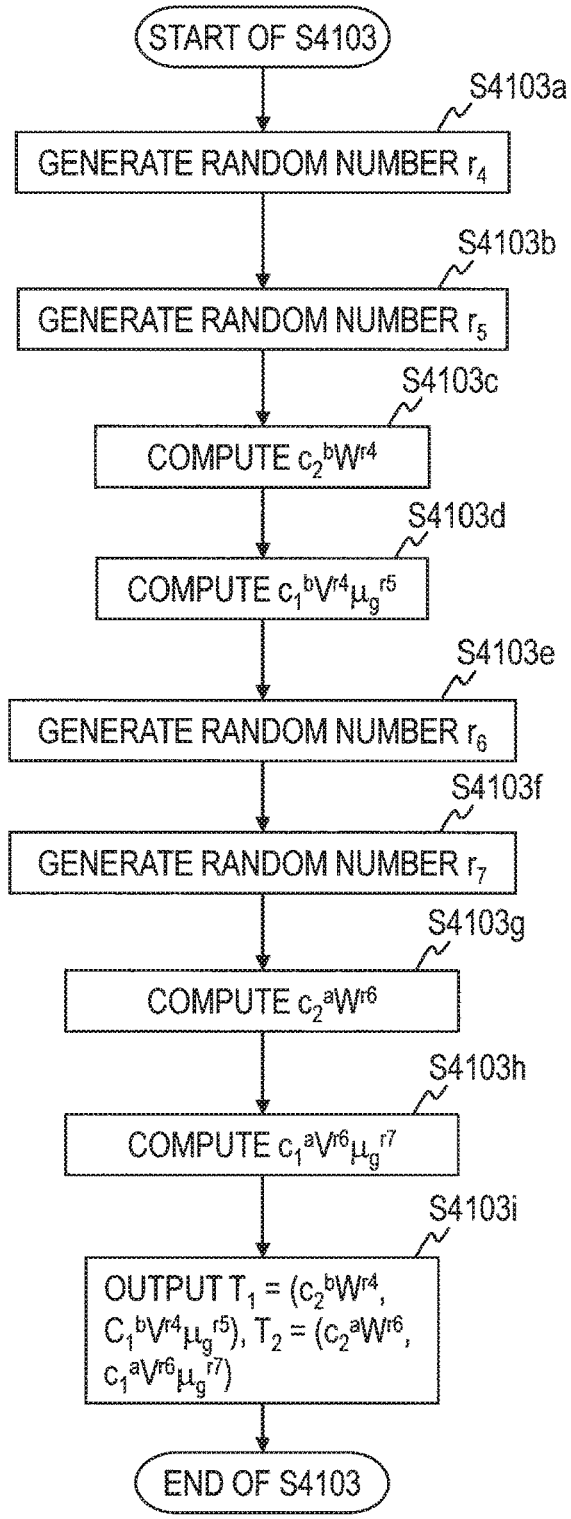
FIG. 9 is a flowchart illustrating a process at step S4103.

The input information providing unit 4104 of the computing apparatus 41 (FIG. 2) generates and outputs first input information $\tau_1$ which is an element of the group H and corresponds to an input ciphertext $x=(c_1, c_2)$ and second input information $\tau_2$ which is an element of the group H and corresponds to the ciphertext $x=(c_1, c_2)$ (step S4103 of FIG. 6). A process at step S4103 of this embodiment will be described below with reference to FIG. 9.

The fourth random number generator 4104a (FIG. 5) generates a uniform random number $r_4$ that is a natural number greater than or equal to 0 and less than $K_G$. The generated random number $r_4$ is sent to the fourth input information computing unit 4104ca, the fifth input information computing unit 4104cb, and the first computing unit 4105 (step S4103a). The fifth random number generator 4104b generates a uniform random number $r_5$ that is a natural number greater than or equal to 0 and less than $K_G$. The generated random number $r_5$ is sent to the fifth input information computing unit 4104cb and the first computing unit 4105 (step S4103b).

The fourth input information computing unit 4104ca uses a natural number b selected by the natural number selecting unit 1102, $c_2$ included in the ciphertext x, and the random number $r_4$ to compute fourth input information $c_2^b W^{r4}$ (step S4103c). The fifth input information computing unit 4104cb uses the natural number b selected by the natural number selecting unit 1102, $c_1$ included in the ciphertext x, and random numbers $r_4$ and $r_5$ to compute fifth input information $c_1^b V^{r4} \mu_g^{r5}$ (step S4103d).

The sixth random number generator 4104d generates a uniform random number $r_6$ that is a natural number greater than or equal to 0 and less than $K_G$. The generated random number $r_6$ is sent to the sixth input information computing unit 4104fa, the seventh input information computing unit 4104fb, and the second computing unit 4108 (step S4103e). The seventh random number generator 4104e generates a uniform random number $r_7$ that is a natural number greater than or equal to 0 and less than $K_G$. The generated random number $r_7$ is sent to the sixth input information computing unit 4104fa and the second computing unit 4108 (step S4103f).

The sixth input information computing unit 4104fa uses a natural number a selected by the natural number electing unit 1102, $c_2$ included in the ciphertext x, and the random number $r_6$ to compute sixth input information $c_2^a W^{r6}$ (step S4103g). The seventh input information computing unit 4104fb uses the natural number a selected by the natural number selecting unit 1102, $c_1$ included in the ciphertext x, and the random number $r_7$ to compute seventh input information $c_1^a V^{r6} \mu_g^{r7}$ (step S4103h).

The first input information computing unit 4104c outputs the fourth input information $c_2^b W^{r4}$ and the fifth input information $c_1^b V^{r4} \mu_g^{r5}$ generated as described above as first input information $\tau_1 = (c_2^b W^{r4}, c_1^b V^{r4} \mu_g^{r5})$. The second input information computing unit 4104f outputs the sixth input information $c_2^a W^{r6}$ and the seventh input information $c_1^a V^{r6} \mu_g^{r7}$ generated as described above as second input information $\tau_2 = (c_2^a W^{r6}, c_1^a V^{r6} \mu_g^{r7})$ (step S4103i).

<<Processes at Steps S4200 Through S4203>>

As illustrated in FIG. 7, first, the first input information $\tau_1 = (c_2^b W^{r4}, c_1^b V^{r4} \mu_g^{r5})$ is input in the first output information computing unit 4201 of the capability providing apparatus 42 (FIG. 3) and the second input information $\tau_2 = (c_2^a W^{r6}, c_1^a V^{r6} \mu_g^{r7})$ is input in the second output information computing unit 4202 (step S4200).

The first output information computing unit 4201 uses the first input information $\tau_1 = (c_2^b W^{r4}, c_1^b V^{r4} \mu_g^{r5})$ and the decryption key s stored in the key storage 1204 to correctly compute $f(c_1^b V^{r4} \mu_g^{r5}, c_2^b W^{r4})$ with a probability greater than a certain probability and sets the result of the computation as first output information $z_1$. The result of the computation may or may not be correct. That is, the result of the computation by the first output information computing unit 4201 may or may not be $f(c_1^b V^{r4} \mu_g^{r5}, c_2^b W^{r4})$ (step S4201).

The second output information computing unit 4202 can correctly compute $f(c_1^a V^{r6} \mu_g^{r7}, c_2^a W^{r6})$ with a probability greater than a certain probability by using the second input information $\tau_2 = (c_2^a W^{r6}, c_1^a V^{r6} \mu_g^{r7})$ and the decryption key s stored in the key storage 1204 and sets the result of the computation as second output information $z_2$. The result of the computation may or may not be correct. That is, the result of the computation by the second output information computing unit 4202 may or may not be $f(c_1^a V^{r6} \mu_g^{r7}, c_2^a W^{r6})$ (step S4202). The first output information computing unit 4201 outputs the first output information $z_1$ and the second output information computing unit 4202 outputs the second output information $z_2$ (step S4203).

<<Processes at Steps S4104 and S4105>>

Returning to FIG. 6, the first output information $z_1$ is input in the first computing unit 4105 of the computing apparatus 41 (FIG. 2) and the second output information $z_2$ is input in the second computing unit 4108 (step S4104).

The first computing unit 4105 uses the input first output information $z_1$ and random numbers $r_4$ and $r_5$ to compute $z_1 Y^{-r4} \mu_g^{-r5}$ and sets the result of the computation as u (step S4105). The result u of the computation is sent to the first power computing unit 1106. Here, $u = z_1 Y^{-r4} \mu_g^{-r5} = f(c_1, c_2)^b x_1$. That is, $z_1 Y^{-r4} \mu_g^{-r5}$ is an output of a randomizable sampler having an error $X_1$ for $f(c_1, c_2)$. The reason will be described later.

<<Process at Step S4108>>

The second computing unit 4108 uses the input second output information $z_2$ and random numbers $\tau_6$ and $\tau_7$ to compute $z_2 Y^{-r6} \mu_g^{-r7}$ and sets the result of the computation as v. The result v of the computation is sent to the second power computing unit 1109. Here, $v = z_2 Y^{-r6} \mu_g^{-r7} = f(c_1, c_2)^a x_2$. That is, $z_2 Y^{-r6} \mu^{-r7}$ is an output of a randomizable sampler having an error $X_2$ for $f(c_1, c_2)$. The reason will be described later.

<<Reason why $z_1 Y^{-r4} \mu_g^{-r5}$ and $z_2 Y^{-r6} \mu_g^{-r7}$ are Outputs of Randomizable Samplers Having Errors $X_1$ and $X_2$, Respectively, for $f(c_1, c_2)$>>

Let c be a natural number, $R_1$, $R_2$, $R_1'$ and $R_2'$ be random numbers, and $B(c_1^c V^{R1} \mu_g^{R2}, c_2^c W^{R1})$ be the result of computation performed by the capability providing apparatus 42 using $c_1^c V^{R1} \mu_g^{R2}$ and $c_2^c W^{R1}$. That is, the first output information computing unit 4201 and the second output information computing unit 4202 return $z = B(c_1^c V^{R1} \mu_g^{R2}, c_2^c W^{R1})$ as the results of computations to the computing apparatus 41. Furthermore, a random variable X having a value in a group G is defined as $X = B(V^{R1'} \mu_g^{R2'}, W^{R1'}) f (V^{R1'} \mu_g^{R2'}, W^{R1'})^{-1}$.

Here, $zY^{-R1} \mu_g^{-R2} = B(c_1^c V^{R1} \mu_g^{R2}, c_2^c W^{R1}) Y^{-R1} \mu_g^{-R2} = Xf (c_1^c V^{R1} \mu_g^{R2}, c_2^c W^{R1}) Y^{-R1} \mu_g^{-R2} = Xf(c_1, c_2)^c f(V, W)^{R1} f(\mu_g, e_g)^{R2} Y^{-R1} \mu_g^{-R2} = Xf(c_1, c_2)^c Y^{R1} \mu_g^{R2} Y^{-R1} \mu_g^{-R2} = f(c_1, c_2)^c X$. That is, $zY^{-R1} \mu_g^{R2}$ is an output of a randomizable sampler having an error X for $f(x)$. Note that $e_g$ is an identity element of the group G.

The expansion of formula given above uses the properties such that $X = B(V^{R1'} \mu_g^{R2'}, W^{R1'}) f(V^{R1'} \mu_g^{R2'}, W^{R1'})^{-1} = B(c_1^c V^{R1} \mu_g^{R2}, c_2^c W^{R1}) f(c_1^c V^{R1} \mu_g^{R2}, c_2^c W^{R1})$ and that $B(c_1^c V^{R1} \mu_g^{R2}, c_2^c W^{R1}) = Xf(c_1^c V^{R1} \mu_g^{R2}, c_2^c W^{R1})$. The properties are based on the fact that $R_1$, $R_2$, $R_1'$ and $R_2'$ are random numbers.

Therefore, considering that a and b are natural numbers and $r_4$, $r_5$, $r_6$ and $r_7$ are random numbers, $z_1 Y^{-r4} \mu_g^{5}$ and $z_2 Y^{-r6} \mu_g^{-r7}$ are, likewise, outputs of randomizable samplers having errors $X_1$ and $X_2$, respectively, for $f(c_1, c_2)$.

Fifth Embodiment

In the embodiments described above, a plurality of pairs (a, b) of natural numbers a and b that are relatively prime to each other are stored in the natural number storage 1101 of the computing apparatus and the pairs (a, b) are used to perform the processes. However, one of a and b may be a constant. For example, a may be fixed at 1 or b may be fixed at 1. In other words, one of the first randomizable sampler and the second randomizable sampler may be replaced with a sampler. If one of a and b is a constant, the process for selecting the constant a or b is unnecessary, the constant a or b is not input in the processing units and each processing units can treat it as a constant in computations. If a or b set as a constant is equal to 1, $f(x)=u^{b'}V^{a'}$ can be obtained as $f(x)=v$ or $f(x)=u$ without using a' or b'.

A fifth embodiment is an example of such a variation, in which b is fixed at 1 and the second randomizable sampler is replaced with a sampler. The following description will focus on differences from the first embodiment. Specific examples of the first randomizable sampler and the sampler are similar to those described in the second to fourth embodiments and therefore description of the first randomizable sampler and the sampler will be omitted.

<Configuration>

As illustrated in FIG. 1, a proxy computing system 5 of the fifth embodiment includes a computing apparatus 51 in place of the computing apparatus 11 of the first embodiment and a capability providing apparatus 52 in place of the capability providing apparatus 12.

Figure 10:
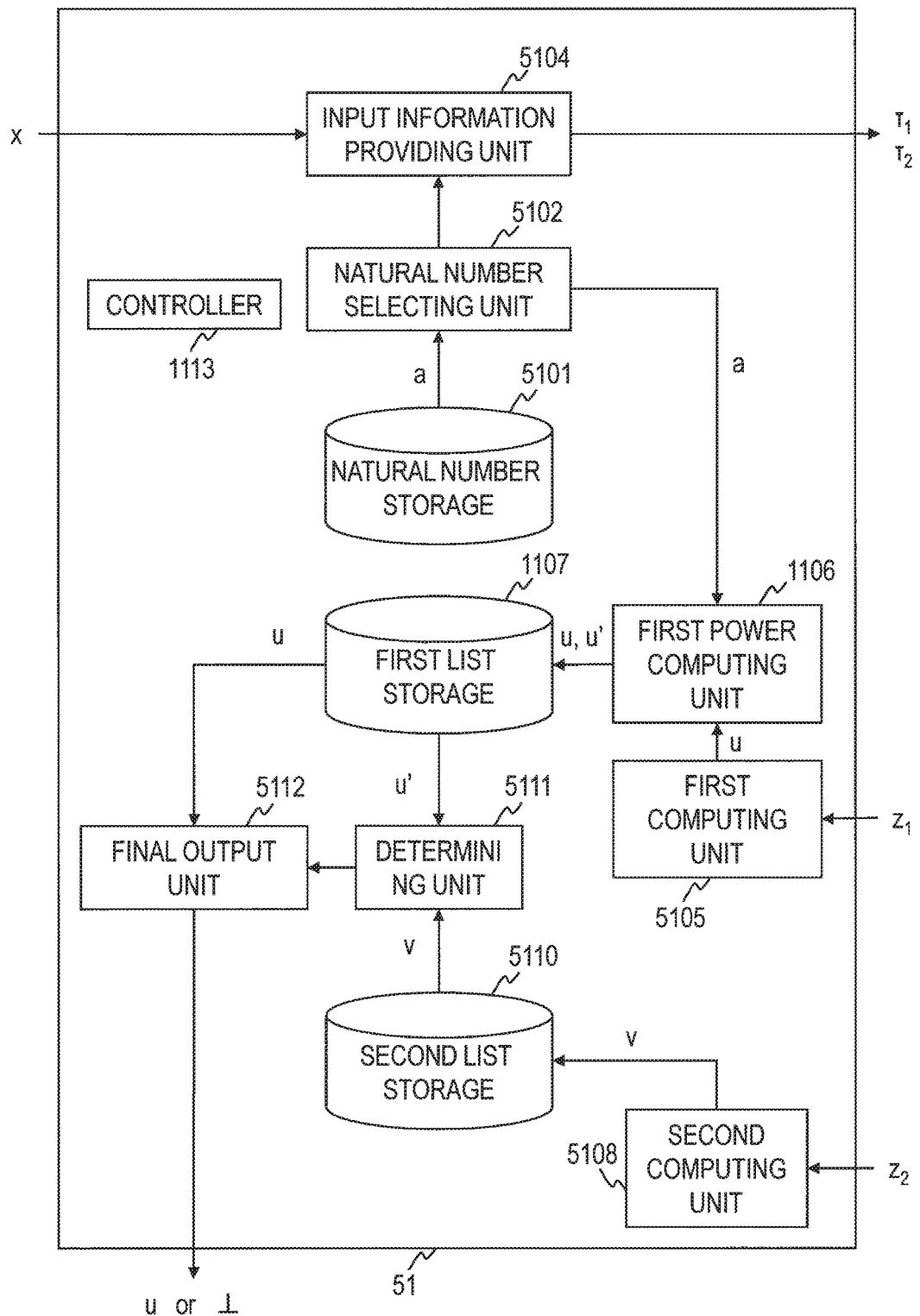
FIG. 10 is a block diagram illustrating a configuration of a computing apparatus of an embodiment.

As illustrated in FIG. 10, the computing apparatus 51 of the fifth embodiment includes, for example, a natural number storage 5101, a natural number selecting unit 5102, an input information providing unit 5104, a first computing unit 5105, a first power computing unit 1106, a first list storage 1107, a second computing unit 5108, a second list storage 5110, a determining unit 5111, a final output unit 1112, and a controller 1113.

As illustrated in FIG. 3, the capability providing apparatus 52 of the fifth embodiment includes, for example, a first output information computing unit 5201, a second output information computing unit 5202, a key storage 1204, and a controller 1205.

<Processes>

Processes of this embodiment will be described below. For the processes, let G and H be groups (for example commutative groups), f(x) be a decryption function for decrypting a ciphertext x, which is an element of the group H, with a particular decryption key s to obtain an element of the group G, generators of the groups G and H be $\mu_g$ and $\mu_h$, respectively, $X_1$ and $X_2$ be random variables having values in the group G, $x_1$ be a realization of the random variable $X_1$, and $x_2$ be a realization of the random variable $X_2$. It is assumed here that a plurality of natural numbers a are stored in the natural number storage 5101 of the computing apparatus 51.

Figure 11:
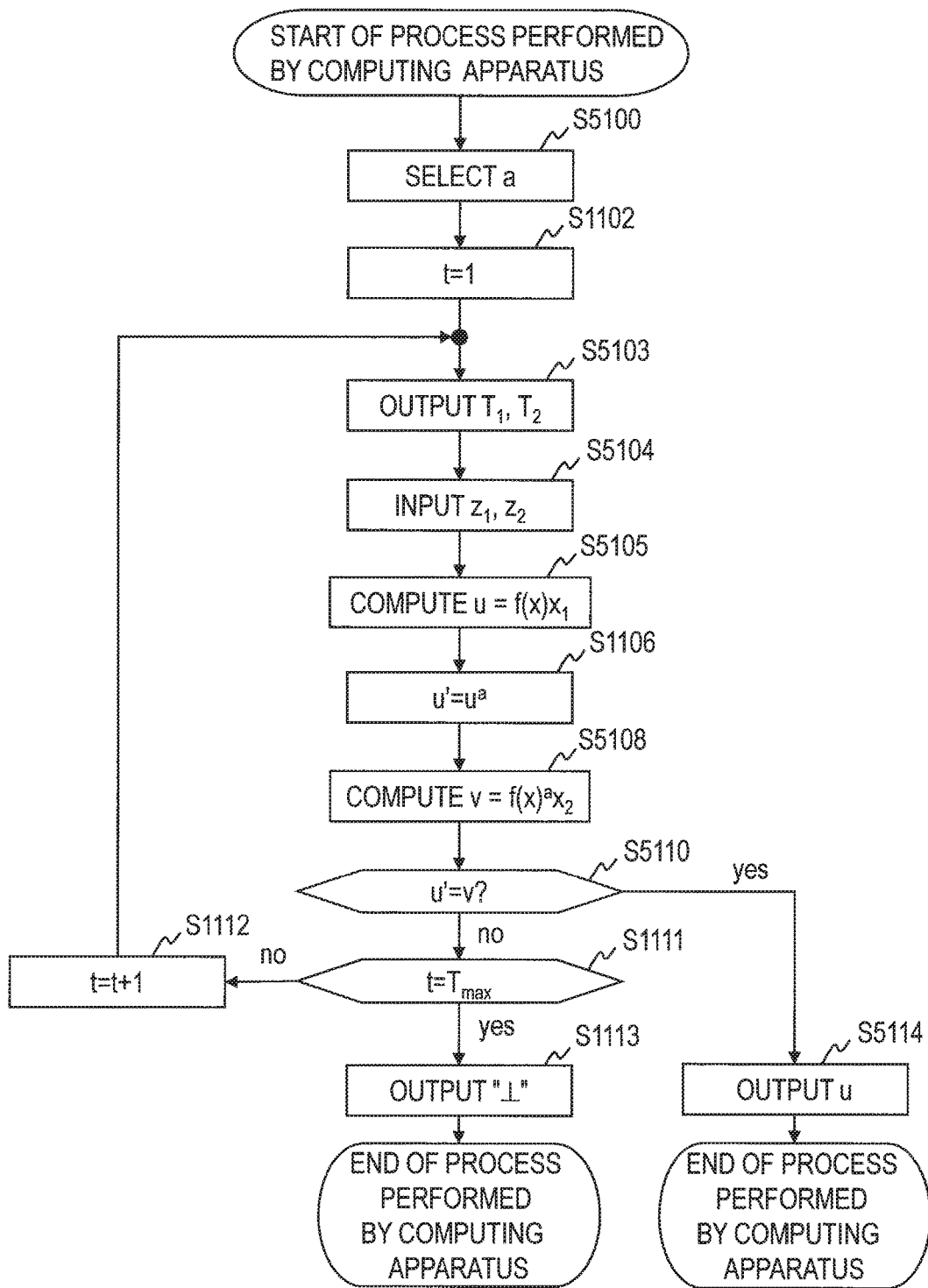
FIG. 11 is a flowchart illustrating a process performed by a computing apparatus of an embodiment.

As illustrated in FIG. 11, first, the natural number selecting unit 5102 of the computing apparatus 51 (FIG. 10) randomly reads one natural number a from among the plurality of natural numbers a stored in the natural number storage 5101. Information on the read natural number a is sent to the input information providing unit 5104 and the first power computing unit 1106 (step S5100).

The controller 1113 sets t=1 (step S1102).

The input information providing unit 5104 generates and outputs first input information $\tau_1$ and second input information $\tau_2$ which are elements of the group H and each of which corresponds to an input ciphertext x. Preferably, the first input information $\tau_1$ and the second input information $\tau_2$ are information whose relation with the ciphertext x is scrambled. This enables the computing apparatus 51 to conceal the ciphertext x from the capability providing apparatus 52. Preferably, the second input information $\tau_2$ of this embodiment further corresponds to the natural number a selected by the natural number selecting unit 5102. This enables the computing apparatus 51 to evaluate the decryption capability provided by the capability providing apparatus 52 with a high degree of accuracy (step S5103). A specific example of the pair of the first input information $\tau_1$ and the second input information $\tau_2$ is a pair of first input information $\tau_1$ and the second input information $\tau_2$ of any of the second to fourth embodiments when b=1.

As illustrated in FIG. 7, the first input information $\tau_1$ is input in the first output information computing unit 5201 of the capability providing apparatus 52 (FIG. 3) and the second input information $\tau_2$ is input in the second output information computing unit 5202 (step S5200).

The first output information computing unit 5201 uses the first input information $\tau_1$ and the decryption key s stored in the key storage 1204 to correctly compute $f(\tau_1)$ with a probability greater than a certain probability and sets the result of the computation as first output information $z_1$ (step S5201). The second output information computing unit 5202 uses the second input information $\tau_2$ and the decryption key s stored in the key storage 1204 to correctly compute $f(\tau_2)$ with a probability greater than a certain probability and sets the result of the computation as second output information $z_2$ (step S5202). That is, the first output information computing unit 5201 and the second output information computing unit 5202 output computation results that have an intentional or unintentional error. In other words, the result of the computation by the first output information computing unit 5201 may or may not be $f(\tau_1)$ and the result of the computation by the second output information computing unit 5202 may or may not be $f(\tau_2)$. A specific example of the pair of the first output information $z_1$ and the second output information $z_2$ is a pair of first output information $z_1$ and the second output information $z_2$ of any of the second to fourth embodiments when b=1.

The first output information computing unit 5201 outputs the first output information $z_1$ and the second output information computing unit 5202 outputs the second output information $z_2$ (step S5203).

Returning to FIG. 11, the first output information $z_1$ is input in the first computing unit 5105 of the computing apparatus 51 (FIG. 10) and the second output information $z_2$ is input in the second computing unit 5108. The first output information $z_1$ and the second output information $z_2$ are equivalent to the decryption capability provided by the capability providing apparatus 52 to the computing apparatus 51 (step S5104).

The first computing unit 5105 generates a computation result $u=f(x)x_1$ from the first output information $z_1$. A specific example of the computation result u is a result u of computation of any of the second to fourth embodiments when b=1. The result u of the computation is sent to the first power computing unit 1106 (step S5105).

The first power computing unit 1106 computes $u'=u^a$. The pair of the result u of the computation and u' computed on the basis of the result of the computation, (u, u'), is stored in the first list storage 1107 (step S1106).

The second computing unit 5108 generates a computation result $v=f(x)^a x_2$ from the second output information $z_2$. A specific example of the result v of the computation is a result v of the computation of any of the second to fourth embodiments. The result v of the computation is stored in the second list storage 5110 (step S5108).

The determining unit 5111 determines whether or not there is one that satisfies u'=v among the pairs (u, u') stored in the first list storage 1107 and v stored in the second list storage 5110 (step S5110). If there is one that satisfies u'=v, the process proceeds to step S5114; if there is not one that satisfies u'=v, the process proceeds to step S1111.

At step S1111, the controller 1113 determines whether or not $t=T_{max}$ (step S1111). Here, $T_{max}$ is a predetermined natural number. If $t=T_{max}$, the controller 1113 outputs information indicating that the computation is impossible, for example the symbol "⊥" (step S1113), then the process ends. If not $t=T_{max}$, the controller 1113 increments t by 1, that is, sets t=t+1 (step S1112), then the process returns to step S5103.

At step S5114, the final output unit 1112 outputs u corresponding to u' that has been determined to satisfy u'=v (step S5114). The obtained u is equivalent to $u^b v^{a'}$ when b=1 in the first to fourth embodiments. That is, u thus obtained can be a result f(x) of decryption of the ciphertext x with a particular decryption key s with a high probability. Therefore, the process described above is repeated multiple times and the value that has most frequently obtained among the values obtained at step S5114 can be chosen as the decryption result. As will be described later, u=f(x) can result with an overwhelming probability, depending on settings. In that case, the value obtained at step S5114 can be directly provided as a result of decryption.

<<Reason why Decryption Result f(x) can be Obtained>>

The reason why a decryption result f(x) can be obtained on the computing apparatus 51 of this embodiment will be described below. Terms required for the description will be defined first.

Black-Box:

A black-box $F(\tau_1)$ of $f(\tau_1)$ is a processing unit that takes an input of $\tau \in H$ and outputs $z \in G$. In this embodiment, each of the first output information computing unit 5201 and the second output information computing unit 5202 is equivalent to the black box $F(\tau)$ for the decryption function $f(\tau)$. A black-box $F(\tau)$ that satisfies $z=f(\tau)$ for an element $\tau \in_U H$ arbitrarily selected from a group H and $z=F(\tau)$ with a probability greater than $\delta(0 \leq \delta \leq 1)$, that is, a black-box $F(\tau)$ for $f(\tau)$ that satisfies $$\Pr[z=f(\tau)|\tau \in_U H, z=F(\tau)] > \delta \qquad (1)$$

is called a δ-reliable black-box $F(\tau)$ for $f(\tau)$. Here, δ is a positive value and is equivalent to the "certain probability" stated above.

Self-Corrector:

A self-corrector $C^F(x)$ is a processing unit that takes an input of $x \in H$, performs computation by using a black-box $F(\tau)$ for $f(\tau)$, and outputs $j \in G \cup \bot$. In this embodiment, the computing apparatus 51 is equivalent to the self-corrector $C^F(x)$.

Almost Self-Corrector:

Assume that a self-corrector $C^F(x)$ that takes an input of $x \in H$ and uses a δ-reliable black-box $F(\tau)$ for $f(\tau)$ to perform computation outputs a correct value j=f(x) with a probability sufficiently greater than the provability with which the self-corrector $C^F(x)$ outputs an incorrect value j≠f(x). That is, assume that a self-corrector $C^F(x)$ satisfies $$\Pr[j=f(x)|j=C^F(x), j \neq \bot] > \Pr[j \neq f(x)|j=C^F(x), j \neq \bot] + \Delta \qquad (2)$$

Here, Δ is a certain positive value (0<Δ<1). If this is the case, the self-corrector $C^F(x)$ is called an almost self-corrector. For example, for a certain positive value Δ'(0<Δ'<1), if a self-corrector $C^F(x)$ satisfies $$\Pr[j=f(x)|j=C^F(x)] > (1/3)+\Delta'$$

$$\Pr[j=\bot|j=C^F(x)] < 1/3$$

$$\Pr[j \neq f(x) \text{ and } j \neq \bot|j=C^F(x)] < 1/3,$$

then the self-corrector $C^F(x)$ is an almost self-corrector. Examples of Δ' include Δ'=1/12 and Δ'=1/3.

Robust Self-Corrector:

Assume that a self-corrector $C^F(x)$ that takes an input of $x \in H$ and uses a δ-reliable black-box $F(\tau)$ for $f(\tau)$ outputs a correct value j=f(x) or j=⊥ with an overwhelming probability. That is, assume that for a negligible error ξ (0≤ξ<1), a self-corrector $C^F(x)$ satisfies $$\Pr[j=f(x) \text{ or } j=\bot|j=C^F(x)] > 1-\xi \qquad (3)$$

If this is the case, the self-corrector $C^F(x)$ is called a robust self-corrector. An example of the negligible error ξ is a function vale ξ(k) of a security parameter k. An example of the function value ξ(k) is a function value ξ(k) such that {ξ(k)p(k)} converges to 0 for a sufficiently large k, where p(k) is an arbitrary polynomial. Specific examples of the function value ξ(k) include $\xi(k)=2^{-k}$ and $\xi(k)=2^{-\sqrt{k}}$.

A robust self-corrector can be constructed from an almost self-corrector. Specifically, a robust self-corrector can be constructed by executing an almost self-constructor multiple times for the same x and selecting the most frequently output value, except ⊥, as j. For example, an almost self-corrector is executed O(log(1/ξ)) times for the same x and the value most frequently output is selected as j to construct robust self-corrector. Here, O(•) represents O notation.

Pseudo-Free Action:

An Upper Bound of the Probability $$\Pr[\alpha^a = \beta \text{ and } \alpha \neq e_g | a \in_U \Omega, \alpha \in X_1, \beta \in X_2] \qquad (4)$$

of satisfying $\alpha^a = \beta$ for all possible $X_1$ and $X_2$ is called a pseudo-free indicator of a pair (G, Ω) and is represented as P(G, Ω), where G is a group, Ω is a set of natural numbers Ω={0, ..., M} (M is a natural number greater than or equal to 1), α and β are realizations $\alpha \in X_1$ ($\alpha \neq e_g$) and $\beta \in X_2$ of random variables $X_1$ and $X_2$ that have values in the group G, and a∈Ω. If a certain negligible function ζ(k) exists and $$P(G, \Omega) < \zeta(k) \qquad (5),$$

then a computation defined by the pair (G, Ω) is called a pseudo-free action. Note that a computation defined by a group is expressed multiplicatively in the fifth embodiment. That is, "$\alpha^a$" for α∈G means that a computation defined at the group G is applied a times to α. An example of the negligible function ζ(k) is such that {ζ(k)p(k)} converges to 0 for a sufficiently large k, where p(k) is an arbitrary polynomial. Specific examples of the function ζ(k) include $\zeta(k)=2^{-k}$ and $\zeta(k)=2^{-\sqrt{k}}$. For example, if the probability of Formula (4) is less than $O(2^{-k})$ for a security parameter k, a computation defined by the pair (G, Ω) is a pseudo-free action. For example, if the number of the elements |Ω·α| of a set Ω·α={a(α)|a∈Ω} exceeds $2^k$ for any α∈G where $\alpha \neq e_g$, a computation defined by the pair (G, Ω) can be a pseudo-free action. There are many such examples. For example, if the group G is a residue group Z/pZ modulo prime p, the prime p is the order of $2^k$, the set Ω={0, ..., p−2}, a(α) is $\alpha^a \in Z/pZ$, and $\alpha \neq e_g$, then $\Omega \cdot \alpha = \{\alpha^a | a=0, ..., p-2\} = \{e_g, \alpha^1, ..., \alpha^{p-2}\}$ and |Ω·α|=p−1. If a certain constant C exists and k is sufficiently large, $|\Omega \cdot \alpha| > C 2^k$ is satisfied because the prime p is the order of $2^k$. Here, the probability of Formula (4) is less than $C^{-1} 2^{-k}$ and a computation defined by such pair (G, Ω) is a pseudo-free action.

$\delta^\gamma$-Reliable Randomizable Sampler:

A randomizable sampler that whenever a natural number a is given, uses the δ-reliable black-box $F(\tau)$ for $f(\tau)$ and returns $w^a x'$ corresponding to a sample x' that depends on a random number X for w∈G and in which the probability that $w^a x' = w^a$ is greater than $\delta^\gamma$ (γ is a positive constant), that is, $$\Pr[w^a x' = w^a] > \delta^\gamma \qquad (6)$$

is satisfied, is called a $\delta^\gamma$-reliable randomizable sampler. The combination of the input information providing unit 5104, the second output information computing unit 5202, and the second computing unit 5108 of this embodiment is a $\delta$-reliable randomizable sampler for w=f(x).

The definitions given above will be used to describe the reason why a decryption result f(x) can be obtained by using the computing apparatus 51 of this embodiment.

At step S5110 of this embodiment, determination is made as to whether u'=v, that is, whether $u^a$=v. Since the combination of the input information providing unit 5104, the second output information computing unit 5202, and the second computing unit 5108 of this embodiment is a $\delta^\gamma$-reliable randomizable sampler (Formula (6)), $u^a$=v holds (Yes at step S5110) with an asymptotically large probability if $T_{max}$ is greater than a certain value determined by k, $\delta$ and $\gamma$. For example, Markov's inequality shows that if $T_{max} \geq 4/\delta^\gamma$, the probability that $u^a$=v holds (Yes at step S5110) is greater than ½.

Since u=f(x)$x_1$ and v=f(x)$^a x_2$ in this embodiment, $x_1{}^a$=$x_2$ holds if $u^a$=v holds. $x_1{}^a$=$x_2$ holds if $x_1$=$x_2$=$e_g$ or $x_1 \neq e_g$. If $x_1$=$x_2$=$e_g$, then u=f(x) and therefore u output at step S5114 is a correct decryption result f(x). On the other hand, if $x_1 \neq e_g$, then u$\neq$f(x) and therefore u output at step S5114 is not a correct decryption result f(x).

If a computation defined by a pair (G, $\Omega$) of a group G and a set $\Omega$ to which a natural number a belongs is a pseudo-free action or $T_{max}{}^2 P(G, \Omega)$ is asymptotically small for a pseudo-free index P(G, $\Omega$), the probability that $x_1 \neq e_g$ (Formula (4)) when $u^a$=v is asymptotically small. Accordingly, the probability that $x_1$=$e_g$ when $u^a$=v is asymptotically large. Therefore, if a computation defined by a pair (G, $\Omega$) is a pseudo-free action or $T_{max}{}^2 P(G, \Omega)$ is asymptotically small, the probability that an incorrect decryption result f(x) is output when $u^a$=v is sufficiently smaller than the probability that a correct decryption result f(x) is output when $u^a$=v. In this case, it can be said that the computing apparatus 51 is an almost self-corrector (see Formula (2)). Therefore, a robust self-corrector can be constructed from the computing apparatus 51 as described above and a correct decryption result f(x) can be obtained with an overwhelming probability. If a computation defined by (G, $\Omega$) is a pseudo-free action, the probability that an incorrect decryption result f(x) is output when $u^a$=v is also negligible. In that case, the computing apparatus 51 outputs a correct decryption result f(x) or $\perp$ with an overwhelming probability.

Note that "$\eta$(k') is asymptotically small" means that $k_0$ is determined for an arbitrary constant $\rho$ and the function value $\eta$(k') for any k' that satisfies $k_0$<k' for $k_0$ is less than $\rho$. An example of k' is a security parameter k.

"$\eta$(k') is asymptotically large" means that $k_0$ is determined for an arbitrary constant $\rho$ and the function value 1-$\eta$(k') for any k' that satisfies $k_0$<k' for $k_0$ is less than $\rho$.

<<$\delta^\gamma$-Reliable Randomizable Sampler and Security>>

Consider the following attack.

A black-box F($\tau$) or a part of the black-box F($\tau$) intentionally outputs an invalid z or a value output from the black-box F($\tau$) is changed to an invalid z.

$w^a x'$ corresponding to the invalid z is output from the randomizable sampler.

$w^a x'$ corresponding to the invalid z increases the probability with which the self-corrector $C^F(x)$ outputs an incorrect value even though $u^a$=v holds (Yes at step S5110) in the self-corrector $C^F(x)$.

This attack is possible if the probability distribution $D_a = w^a x' w^{-a}$ of an error of $w^a x'$ output from the randomizable sampler for a given natural number a depends on the natural number a. For example, if tampering is made so that v output from the second computing unit 5108 is $f(x)^a x_1{}^a$, then $u^a$=v always holds regardless of the value of $x_1$. Therefore, it is desirable that the probability distribution $D_a = w^a x' w^{-a}$ of an error of $w^a x'$ output from the randomizable sampler for a given natural number a do not depend on the natural number a.

Alternatively, it is desirable that the randomizable sampler be such that a probability distribution D that has a value in a group G that cannot be distinguished from the probability distribution $D_a = w^a x' w^{-a}$ of an error of $w^a x'$ for any element $a \in^\forall \Omega$ of a set $\Omega$ exists (the probability distribution $D_a$ and the probability distribution D are statistically close to each other). Note that the probability distribution D does not depend on a natural number a. That the probability distribution $D_a$ and the probability distribution D cannot be distinguished from each other means that the probability distribution $D_a$ and the probability distribution D cannot be distinguished from each other by a polynomial time algorithm. For example, if $$\Sigma_{g \in G} |Pr[g \in D] - Pr[g \in D_a]| < \zeta \quad (7)$$

is satisfied for negligible $\zeta$ ($0 \leq \zeta \leq 1$), the probability distribution $D_a$ and the probability distribution D cannot be distinguished from each other by the polynomial time algorithm. An example of negligible $\zeta$ is a function value $\zeta$(k) of the security parameter k. An example of the function value $\zeta$(k) is a function value such that $\{\zeta(k)p(k)\}$ converges to 0 for a sufficiently large k, where p(k) is an arbitrary polynomial. Specific examples of the function $\zeta$(k) include $\zeta(k) = 2^{-k}$ and $\zeta(k) = 2^{-\sqrt{k}}$. These facts also apply to the first to fourth embodiments which use natural numbers a and b.

Sixth Embodiment

A sixth embodiment is a mode in which the present invention is applied to decryption of the GHV encryption scheme (see Reference literature 1 "C, Genrty, S. Halevi and V. Vaikuntanathan, 'A Simple BGNType Cryptosystem from LWE,' Advances in Cryptology—EUROCRYPT 2010, LNCS 6110, pp. 506-522, Springer-Verlag, 2010", for example), which is a type of lattice-based cryptography. The following description will focus on differences from the embodiments described above.

<Configuration>

As illustrated in FIG. 1, a proxy computing system 6 of the sixth embodiment includes a computing apparatus 61 in place of the computing apparatus 11 of the first embodiment and a capability providing apparatus 62 in place of the capability providing apparatus 12.

Figure 12:
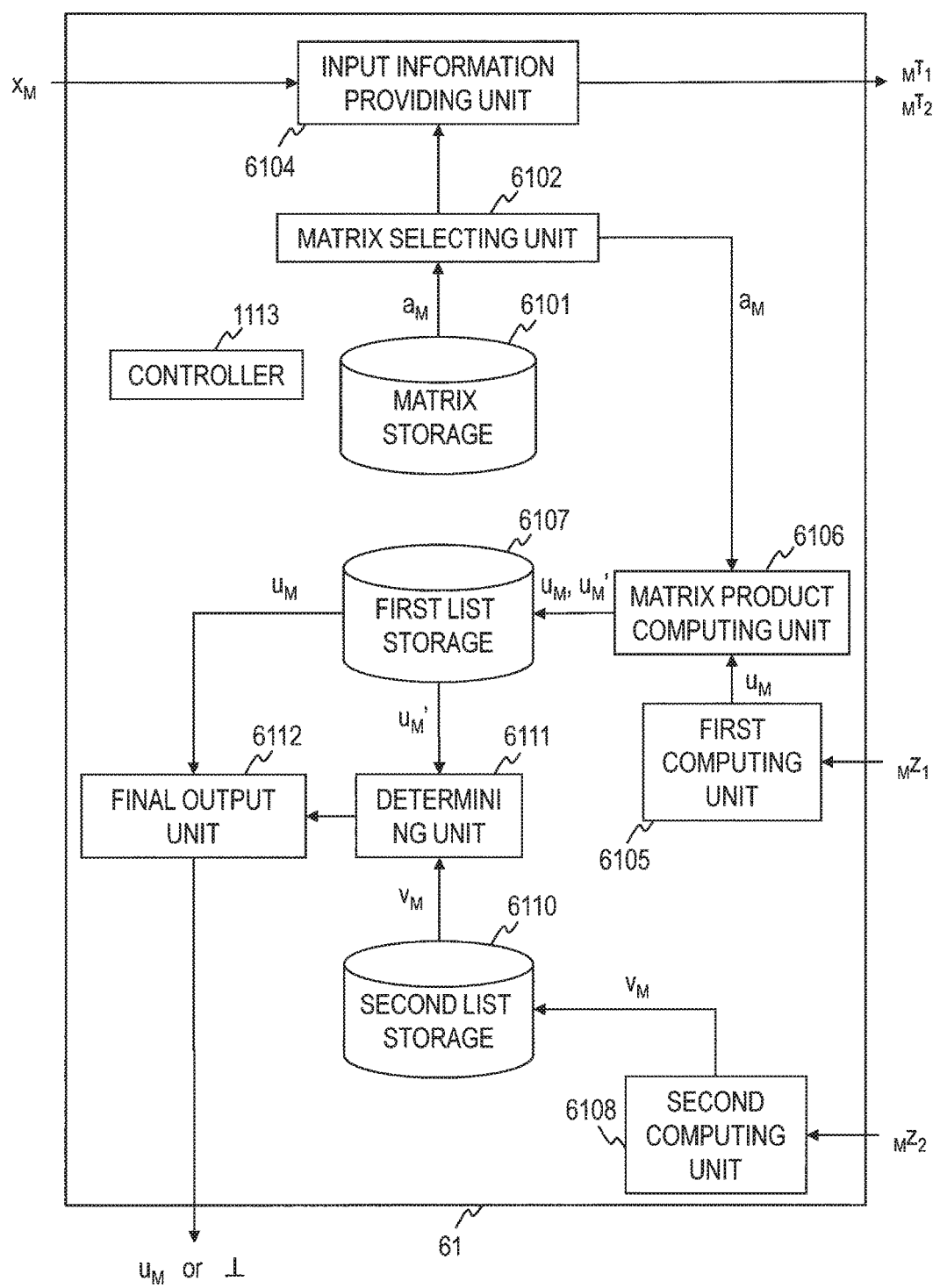
FIG. 12 is a block diagram illustrating a configuration of a computing apparatus of an embodiment.

As illustrated in FIG. 12, the computing apparatus 61 of the sixth embodiment includes, for example, a matrix storage 6101, a matrix selecting unit 6102, an input information providing unit 6104, a first computing unit 6105, a matrix product computing unit 6106, a first list storage 6107, a second computing unit 6108, a second list storage 6110, a determining unit 6111, a final output unit 6112, and a controller 1113.

Figure 14:
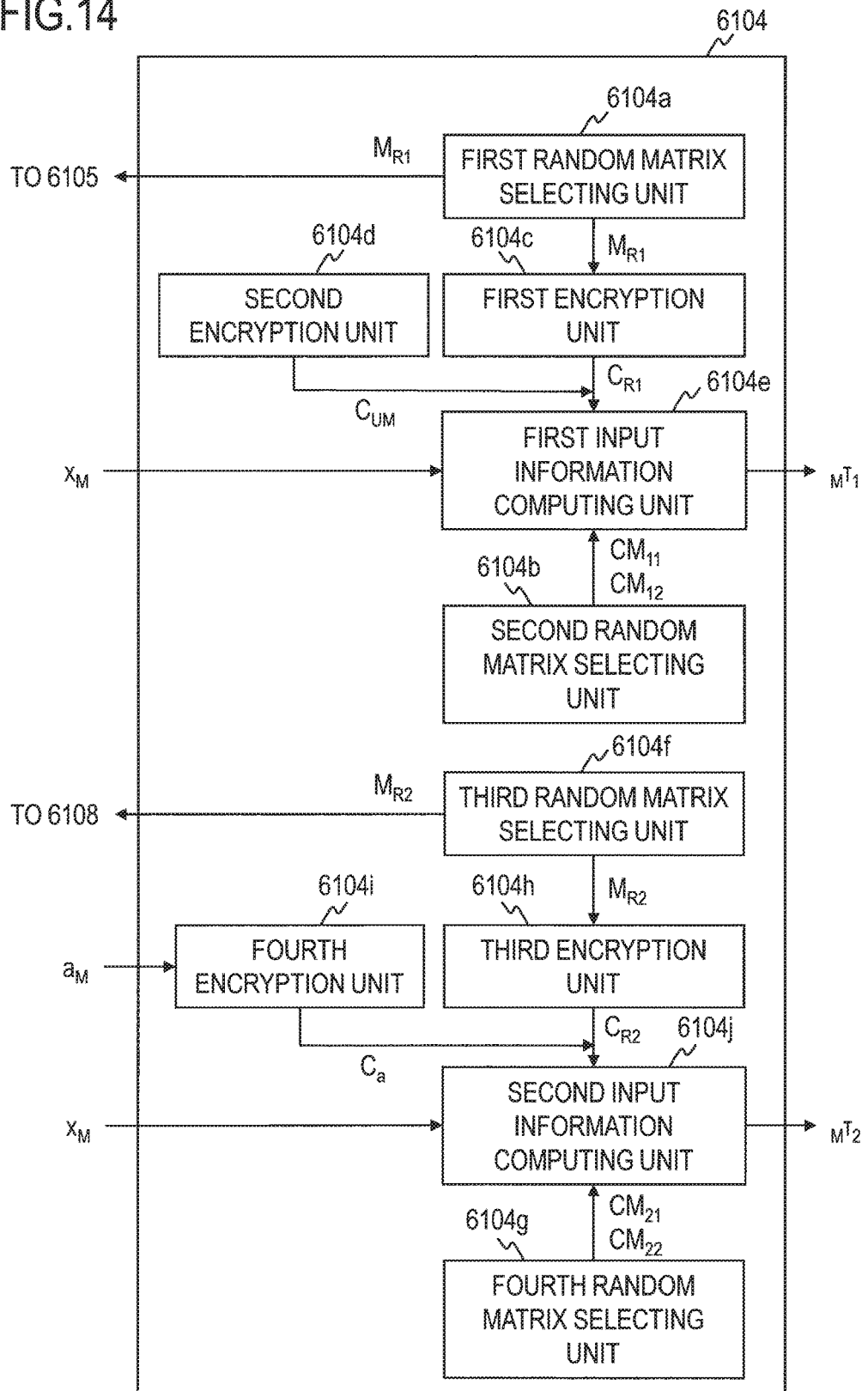
FIG. 14 is a block diagram illustrating a configuration of an input information providing unit of an embodiment.

As illustrated in FIG. 14, the input information providing unit 6104 of this embodiment includes, for example, a first random matrix selecting unit 6104a, a second random matrix selecting unit 6104b, a first encryption unit 6104c, a second encryption unit 6104d, a first input information computing unit 6104e, a third random matrix selecting unit 6104f, a fourth random matrix selecting unit 6104g, a third encryption unit 6104h, a fourth encryption unit 6104i, and a second input information computing unit 6104j.

Figure 13:
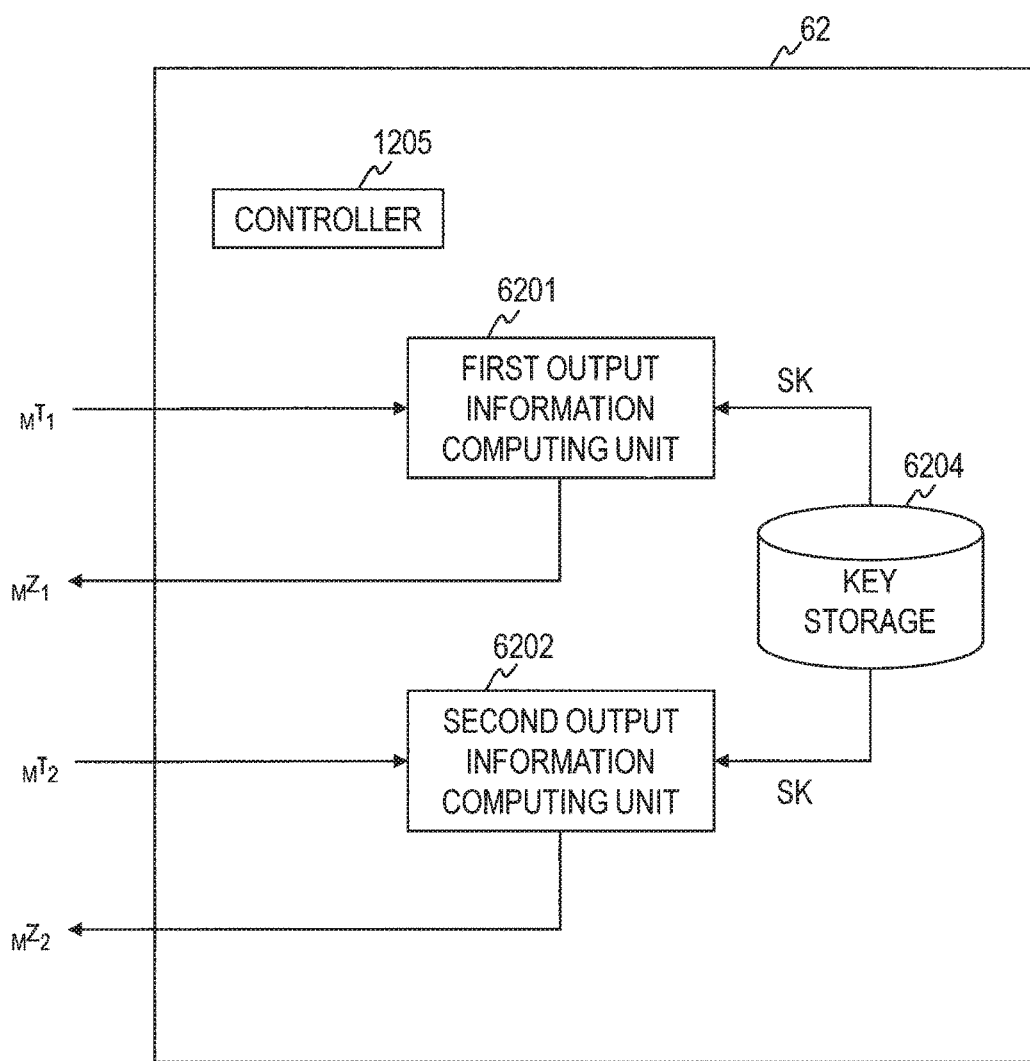
FIG. 13 is a block diagram illustrating a configuration of a capability providing apparatus of an embodiment.

As illustrated in FIG. 13, the capability providing apparatus 62 of the sixth embodiment includes, for example, a first output information computing unit 6201, a second output information computing unit 6202, a key storage 6204, and a controller 1205.

<Processes>

Processes of this embodiment will be described below. In this embodiment, let $G_M$ be a set of $\iota \times \iota$ matrices, $H_M$ be a set of $\iota \times \iota$ matrices, $_M X_1$ and $_M X_2$ be random variables having values in the set $G_M$, $_M x_1$ be a realization of the random variable $_M X_1$, $N_M x_2$ be a realization of the random variable $_M X_2$, and $a_M$ be an element of the set $H_M$. In this embodiment, PK be a $\iota \times \kappa$ matrix which is an encryption key (public key), SK be a decryption key (secret key) which is a $\iota \times \iota$ matrix that satisfies PK·SK=0, CM be a $\kappa \times \iota$ matrix, NM be a $\iota \times \iota$ matrix, UM be a $\iota \times \iota$ unit matrix, PT be a plaintext PT$\in G_M$ which is an element of the set $G_M$, $x_M$ be a ciphertext $x_M \in H_M$ which is an element of the set $H_M$, ENC$_M$ be an encryption function for encrypting the plaintext PT which is an element of the set $G_M$ to obtain the ciphertext $x_M \in H_M$, and $f_M(x_M)$ be a decryption function for decrypting the ciphertext $x_M \in H_M$ with a particular decryption key SK to obtain the plaintext PT which is an element of the set $G_M$. The decryption function $f_M(x_M)$ is a homomorphic function. For example, let $G_M$ be a set of $\iota \times \iota$ matrices $(Z/2Z)^{\iota \times \iota}$, $H_M$ be a set of $\iota \times \iota$ matrices $(Z/qZ)^{\iota \times \iota}$, the encryption key PK be a $\iota \times \kappa$ matrix $(Z/qZ)^{\iota \times \kappa}$, the decryption key SK be a $\iota \times \iota$ matrix $(Z/qZ)^{\iota \times \iota}$, CM be a randomly selected $\kappa \times \iota$ matrix $(Z/qZ)^{\kappa \times \iota}$, NM be a $\iota \times \iota$ matrix $(Z/qZ)^{\iota \times \iota}$ according to a Gaussian distribution, UM be a $\iota \times \iota$ unit matrix $(Z/2Z)^{\iota \times \iota}$, the encryption function ENC$_M$ (PT) be PK·CM+2·NM+PT(mod q), and the decryption function $f_M(x_M)$ be $SK^{-1}\{SK \cdot x_M \cdot SK^T \pmod{q}\}(SK^K)^{-1} \pmod{2}$. Here, $\kappa$, $\iota$ and q are positive integers, $\bullet^T$ is the transposed matrix of $\bullet$, and $(Z/qZ)^{\kappa \times \iota}$ is a matrix of $\kappa$ rows and $\iota$ columns having members of a factor ring Z/qZ modulo q as elements. In the sixth embodiment, the product between matrices $\alpha_1$ and $\alpha_2$ is written as $\alpha_1 \cdot \alpha_2$ and the sum of matrices $\alpha_1$ and $\alpha_2$ is written as $\alpha_1 + \alpha_2$. A matrix that is equal to the each element of a matrix $\alpha$ by a natural number $\beta$ is written as $\beta \cdot \alpha$.

Figure 15:
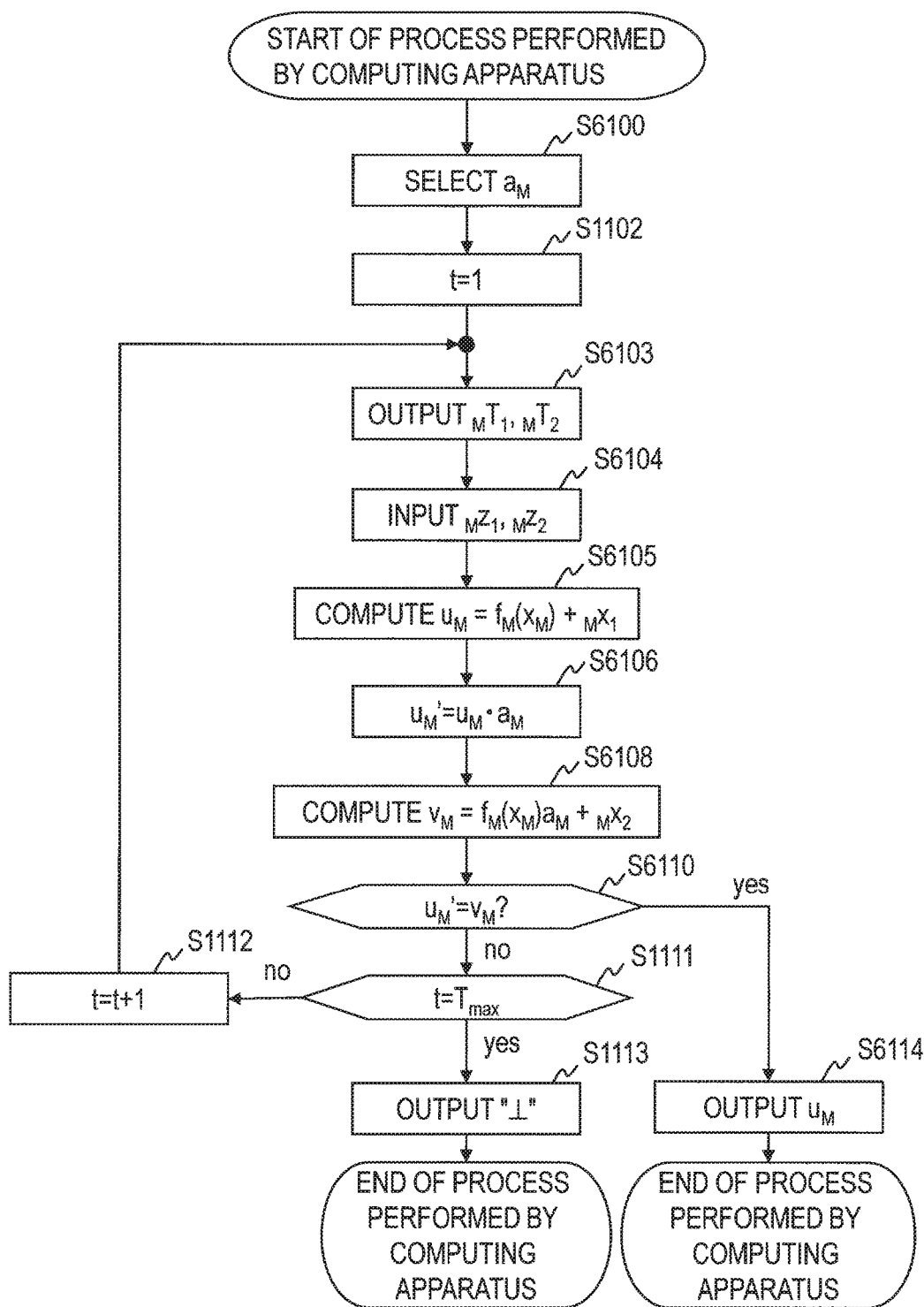
FIG. 15 is a flowchart illustrating a process performed by a computing apparatus of an embodiment.

It is assumed in this embodiment that a plurality of matrices $\alpha_M \in H_M$ are stored in the matrix storage 6101 of the computing apparatus 61 (FIG. 12) and a decryption key SK is stored in the key storage 6204 of the capability providing apparatus 62 (FIG. 13) in a secure manner. As illustrated in FIG. 15, first, the matrix selecting unit 6102 of the computing apparatus 61 (FIG. 12) uniformly randomly selects and reads one matrix $a_M$ from among the plurality of matrices stored in the matrix storage 6101. Information of the read matrix $a_M$ is sent to the input information providing unit 6104 and the matrix product computing unit 6106 (step S6100).

The controller 1113 sets t=1 (step S1102).

Figure 16:
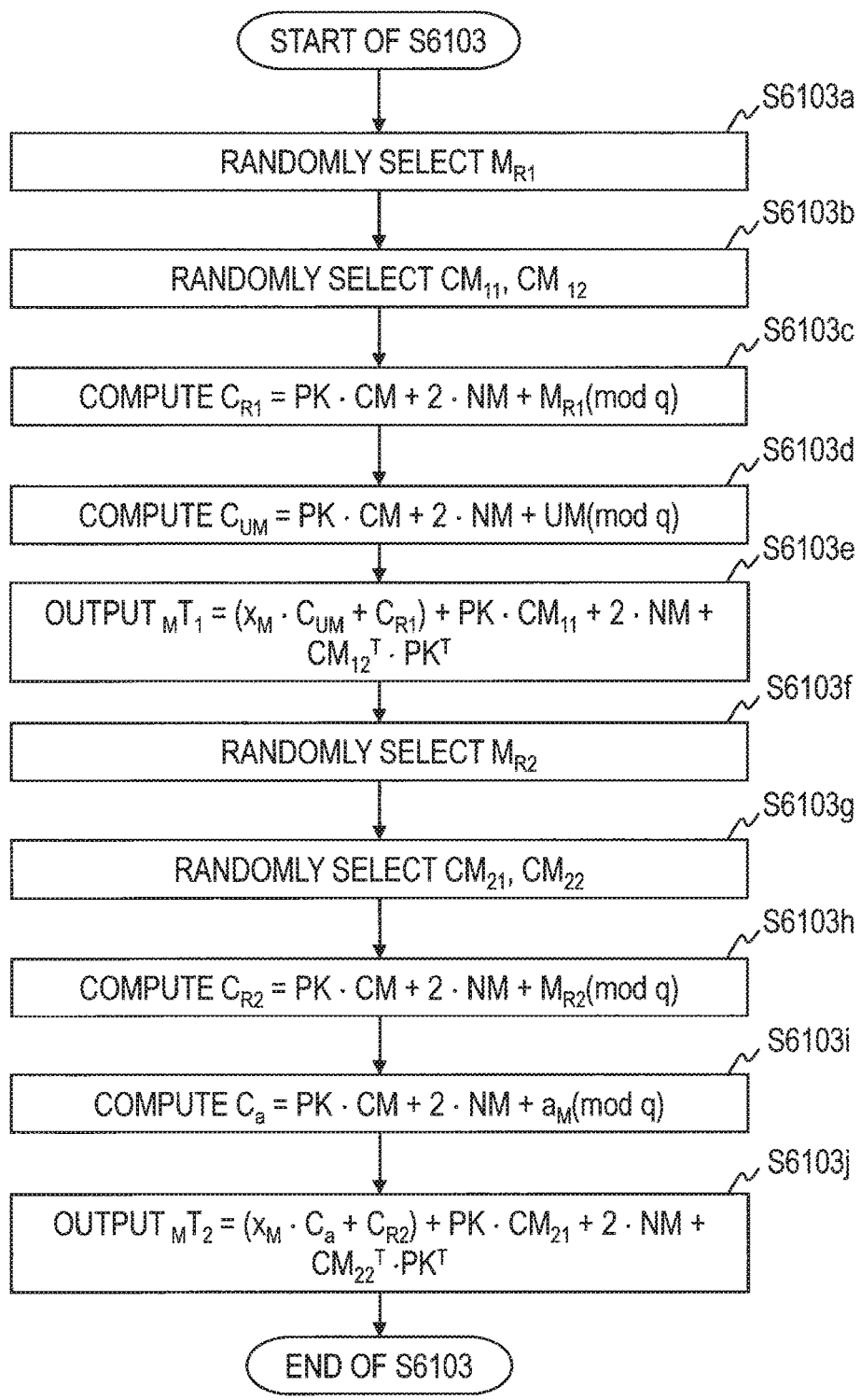
FIG. 16 is a flowchart illustrating an example of a process at step S6103.

The input information providing unit 6104 generates and outputs first input information $_M \tau_1$ and second input information $_M \tau_2$ which are elements of the set $H_M$ and each of which corresponds to an input ciphertext $x_M$. Preferably, the first input information $_M \tau_1$ and the second input information $_M \tau_2$ are information whose relation with the ciphertext $x_M$ is scrambled. This enables the computing apparatus 61 to conceal the ciphertext $x_M$ from the capability providing apparatus 62. The second input information $_M \tau_2$ further corresponds to an element $a_M$. This enables the computing apparatus 61 to evaluate the decryption capability provided by the capability providing apparatus 62 with a high degree of accuracy (step S6103). A specific example of step S6103 will be described below with reference to FIG. 16.

[Specific Example of Step S6103]

The first random matrix selecting unit 6104a of the input information providing unit 6104 (FIG. 14) uniformly randomly selects an element $M_{R1}$ of the set $G_M$ (step 6103a). The selected $M_{R1}$ is sent to the first encryption unit 6104c and the first computing unit 6105 (step S6103a). The second random matrix selecting unit 6104b selects uniform and random matrices $CM_{11}$ and $CM_{12} \in (Z/qZ)^{\kappa \times \iota}$ of $\kappa \times \iota$. The selected $CM_{11}$ and $CM_{12}$ are sent to the first input information computing unit 6104e (step S6103b). The first encryption unit 6104c uses the public key PK to generate a first ciphertext $C_{R1}$=PK·CM+2·NM+$M_{R1}$ (mod q) which is a ciphertext ENC$_M(M_{R1})$ Of $M_{R1}$. The first ciphertext $C_{R1}$ is sent to the first input information computing unit 6104e (step S6103c). The second encryption unit 6104d uses the public key PK to generate a second ciphertext $C_{UM}$=PK·CM+2·NM+UM (mod q) which is a ciphertext ENC$_M$(UM) of the unit matrix UM. The second ciphertext $C_{UM}$ is sent to the first input information computing unit 6104e (step S6103d). The first input information computing unit 6104e further takes an input of the ciphertext $x_M$. The first input information computing unit 6104e obtains and outputs $(x_M \cdot C_{UM} + C_{R1})$+PK·CM$_{11}$+2·NM+CM$_{12}{}^T$·PK$^T$ as first input information $_M \tau_1$. Note that the order of the products of the matrices is not particularly specified. That is, the first input information computing unit 6104e may compute Re($C_x$)=$C_x$+PK·CM$_{11}$+2·NM+CM$_{12}{}^T$·PK$^T$ where $C_x$=$x_M \cdot C_{UM}+C_{R1}$, to generate the first input information $_M \tau_1$ or may compute Re($C_x$) where $C_x$=$C_{UM} \cdot x_M + C_{R1}$ to generate the first input information $_M \tau_1$ (step S6103e).

The third random matrix selecting unit 6104f uniformly randomly selects an element $M_{R2}$ of the set $G_M$. The selected $M_{R2}$ is sent to the third encryption unit 6104h and the second computing unit 6108 (step S6103f). The fourth random matrix selecting unit 6104g selects random matrices $CM_{21}$ and $CM_{22} \in (Z/qZ)^{\kappa \times \iota}$ of $\kappa \times \iota$. The selected $CM_{21}$ and $CM_{22}$ are sent to the second input information computing unit 6104j (step S6103g). The third encryption unit 6104h uses the public key PK to generate a third ciphertext $C_{R2}$=PK·CM+2·NM+$M_{R2}$(mod q) which is a ciphertext ENC$_M(M_{R2})$ of $M_{R2}$. The third ciphertext $C_{R2}$ is sent to the second input information computing unit 6104j (step S6103h). Matrix $a_M$ is input in the fourth encryption unit 6104i. The fourth encryption unit 6104i uses the public key PK to generate a fourth ciphertext $C_a$=PK·CM+2·NM+$a_M$ (mod q) which is a ciphertext ENC$_M(a_1)$ of the matrix $a_M$. The fourth ciphertext $C_a$ is sent to the second input information computing unit 6104j (step S6103i). The second input information computing unit 6104j further takes an input of the ciphertext $x_M$. The second input information computing unit 6104j obtains and outputs $(x_M \cdot C_a + C_{R2})$+PK·CM$_{21}$+2·NM+CM$_{22}{}^T$·PK$^T$ as second input information $_M \tau_2$. The second input information computing unit 6104j may compute Re($C_x$) where $C_x$=$x_M \cdot C_a + C_{R2}$ to generate the second input information $_M \tau_2$ or may compute Re($C_x$) where $C_x$=$C_a \cdot x_M + C_{R2}$ to generate the second input information $_M \tau_2$ ((step S6103j)/end of description of [Specific example of step S6103]).

Figure 17:
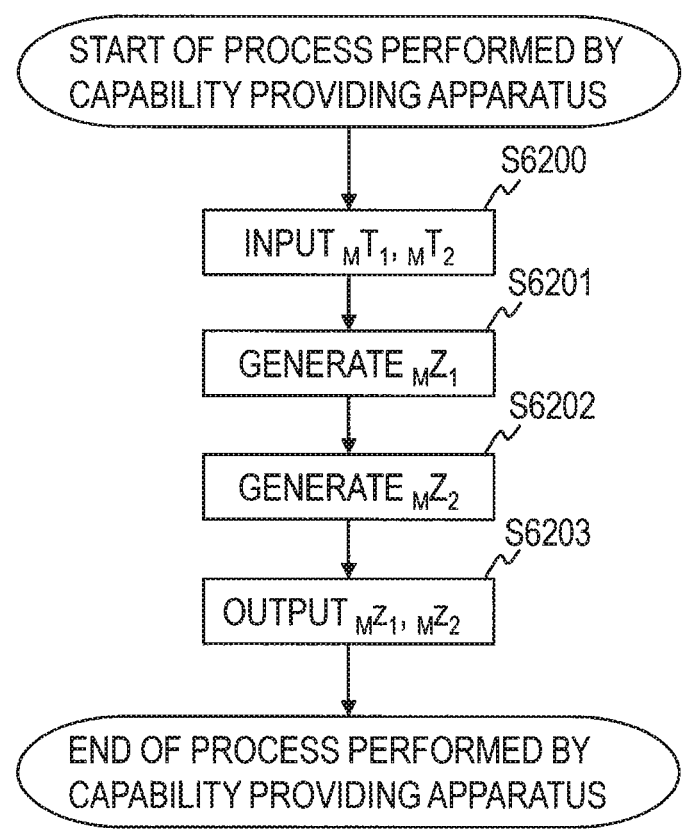
FIG. 17 is a flowchart illustrating a process performed by a capability providing apparatus of an embodiment.

As illustrated in FIG. 17, the first input information $_M \tau_1$ is input in the first output information computing unit 6201 of the capability providing apparatus 62 (FIG. 13) and the second input information $_M \tau_2$ is input in the second output information computing unit 6202 (step S6200).

The first output information computing unit 6201 uses the first input information $_M \tau_1$ and the decryption key SK stored in the key storage 6204 to correctly compute $f_M(_M \tau_1)$= $SK^{-1}\{SK \cdot _M \tau_1 \cdot SK^T \pmod{q}\}(SK^T)^{-1} \pmod{2}$ with a probability greater than a certain probability and sets the obtained result of the computation as first output information $_Mz_1$ (step S6201). The second output information computing unit 6202 uses the second input information $_M\tau_2$ and the decryption key SK stored in the key storage 6204 to correctly compute $f_M(_M\tau_2) = SK^{-1}\{SK \cdot _M\tau_2 \cdot SK^T (\mathrm{mod}\ q)\}(SK^T)^{-1}(\mathrm{mod}\ 2)$ with a probability greater than a certain probability and sets the obtained result of the computation as second output information $_Mz_2$ (step S6202). That is, the first output information computing unit 6201 and the second output information computing unit 6202 outputs computation results that have an intentional or unintentional error. In other words, the result of the computation by the first output information computing unit 6201 may or may not be $f_M(_M\tau_1)$ and the result of the computation by the second output information computing unit 6202 may or may not be $f_M(_M\tau_2)$.

The first output information computing unit 6201 outputs the first output information $_Mz_1$ and the second output information computing unit 6202 outputs the second output information $_Mz_2$ (step S6203).

Returning to FIG. 15, the first output information $_Mz_1$ is input in the first computing unit 6105 of the computing apparatus 61 (FIG. 12) and the second output information $_Mz_2$ is input in the second computing unit 6108. The first output information $_Mz_1$ and the second output information $_Mz_2$ are equivalent to the decryption capability provided by the capability providing apparatus 62 to the computing apparatus 61 (step S6104).

The first computing unit 5105 uses the first output information $_Mz_1$ to compute $_Mz_1 - M_{R1}$ and sets the result of the computation as $u_M$. The result $u_M$ of the computation is sent to the matrix product computing unit 6106. Here, $u_M = {_Mz_1} - M_{R1} = f_M(x_M) + {_M}x_1$. That is, $u_M$ serves as a sampler having an error $_MX_1$ for $f_M(x_M)$. The reason will be described later (step S6105).

The matrix product computing unit 6106 obtains $u_M' = u_M \cdot a_M$. Note that the matrix product computing unit 6106 may compute $u_M \cdot a_M$ to obtain $u_M'$ or may compute $a_M \cdot u_M$ to obtain $u_M'$. The pair $(u_M, u_M')$ of the result $u_M$ of the computation and $u_M'$ computed on the basis of the result of the computation is stored in the first list storage 6107 (step S6106).

The second computing unit 6108 uses the second output information $_Mz_2$ to compute $_Mz_2 - M_{R2}$ and sets the result of the computation as $v_M$. The result $v_M$ of the computation is stored in the second list storage 6110. Here, $v_M = {_Mz_2} - M_{R2} = f_M(x_M) \cdot a_M + {_M}x_2$. That is, $v_M$ is an output of a randomizable sampler having an error $_MX_2$ for $f_M(x_M)$. The reason will be described later (step S6108).

The determining unit 6111 determines whether or not there is one that satisfies $u_M' = v_M$ among the pairs $(u_M, u_M')$ stored in the first list storage 6107 and $v_M$ stored in the second list storage 6110 (step S6110). If there is one that satisfies $u_M' = v_M$, the process proceeds to step S6114; if there is not one that satisfies $u_M' = v_M$, the process proceeds to step S1111.

At step S1111, the controller 1113 determines whether or not $t = T_{max}$ (step S1111). Here, $T_{max}$ is a predetermined natural number. If $t = T_{max}$, the controller 1113 outputs information indicating that the computation is impossible, for example, the symbol "⊥" (step S1113), then the process ends. If not $t = T_{max}$, the controller 1113 increments t by 1, that is, sets $t = t + 1$ (step S1112), then the process returns to step S6103.

At step S6114, the final output unit 6112 outputs $u_M$ corresponding to $u_M'$ that has been determined to satisfy $u_M' = v_M$ (step S6114). The $u_M$ thus obtained can be a decryption result $f_M(x_M)$ resulting from decrypting the ciphertext $x_M$ with the decryption key SK with a high probability (the reason will be described later). Therefore, the process described above is repeated multiple times and the value most frequently obtained among the values obtained at step S6114 can be chosen as the decryption result. Depending on settings, $u_M = f_M(x_M)$ can result with an overwhelming probability. In that case, the value obtained at step S6114 can be directly provided as the result of decryption.

<<Reason why $_Mz_1 - M_{r1}$ and $_Mz_2 - M_{r2}$ are Outputs of a Sampler and Randomizable Sampler that have Errors $_MX_1$ and $_MX_2$, Respectively, for $f_M(x_M)$>>

Because of the homomorphy of $f_M(x_M)$, $f_M(x_M \cdot C_a + C_{R2}) = f_M(x_M) \cdot f_M(C_a) + f_M(C_{R2}) = f_M(x_M) \cdot a_M + M_{R2}$ is satisfied, $f_M(x_M) \cdot a_M = f_M(x_M \cdot C_a + C_{R2}) - M_{R2} = f_M(_M\tau_2) - M_{R2}$ is satisfied, and $M_{R2} = f_M(_M\tau_2) - f_M(x_M) \cdot a_M$ is satisfied. Therefore, letting $_Mz_2 = F_M(_M\tau_2)$, then $_Mz_2 - M_{R2} = F_M(_M\tau_2) - f_M(_M\tau_2) + f_M(x_M) \cdot a_M = f_M(x_M) \cdot a_M + \{F_M(_M\tau_2) - f_M(_M\tau_2)\}$ is satisfied. Because of the uniform randomness of $CM_{21}$, $CM_{22}$ and $M_{R2}$ corresponding to $_M\tau_2$, $_Mz_2 - M_{R2}$ is statistically close to $f_M(x_M) \cdot a_M + {_M}x_2$. Here, $_Mx_2$ is a realization of the random variable $_MX_2 = F_M(\mathrm{ENC}_M(_MU_2)) - {_MU_2}$ ($_MU_2$ uniformly randomly distributes on $G_M$). Therefore, $_Mz_2 - M_{R2}$ is an output of a randomizable sampler having an error $_MX_2$ for $f_M(x_M)$.

Likewise, $f_M(x_M \cdot C_{UM} + C_{R1}) = f_M(x_M) \cdot f_M(C_{UM}) + f_M(C_{R1}) = f_M(x_M) \cdot UM + M_{R1}$ is satisfied, $f_M(x_M) = f_M(x_M \cdot C_U M + C_{R1}) - M_{R1} = f_M(_M\tau_1) - M_{R1}$ is satisfied, and $M_{R1} = f_M(_M\tau_1) - f_M(x_M)$ is satisfied. Therefore, letting $_Mz_1 = F_M(_M\tau_1)$, then $_Mz_1 - M_{R1} = F(_M\tau_1) - f_M(_M\tau_1) + f_M(x_M) = f_M(x_M) + \{F_M(_M\tau_1) - f_M(_M\tau_1)\}$ is satisfied. Because of the uniform randomness of $CM_{11}$, $CM_{12}$ and $M_{R1}$ corresponding to $_M\tau_1$, $_Mz_1 - M_{R1}$ is statistically close to $f_M(x_M) + {_M}x_1$. Here, $_Mx_1$ is a realization of the random variable $_MX_1 = F_M(\mathrm{ENC}_M(_MU_1)) - {_MU_1}$ ($_MU_1$ uniformly randomly distributes on $G_M$). Therefore, the above-described configuration which outputs $_Mz_1 - M_{R1}$ serves as a sampler having an error $_MX_1$ for $f_M(x_M)$.

<<Reason why Decryption Result $f_M(x_M)$ can be Obtained>>

For the same reason described in the section <<Reason why decryption result f(x) can be obtained>> in the fifth embodiment, a correct decryption result $f_M(x_M)$ can be obtained in the sixth embodiment as well. However, since the sixth embodiment deals with matrices, G and H in the section <<Reason why decryption result f(x) can be obtained>> in the fifth embodiment are replaced with $G_M$ and $H_M$, $f(x)$ is replaced with $f_M(x_M)$, $\tau$ is replaced with $_M\tau$, $F(\tau)$ is replaced with $F_M(_M\tau)$, $z$ is replaced with $_Mz$, $x$ is replaced with $x_M$, $X_1$ and $X_2$ are replaced with $_MX_1$ and $_MX_2$, $x_1$ and $x_2$ are replaced with $_Mx_1$ and $_Mx_2$, $e_g$ is replaced with a unit matrix $_Me_g$ of ι×ι, and multiplicative expressions are replaced with additive expressions (for example $\alpha^\beta \gamma$ is replaced with $\alpha \cdot \beta + \gamma$). Furthermore, "pseudo-free action" in the sixth embodiment is defined as follows.

Pseudo-Free Action:

An Upper Bound of the Probability $$\Pr[\alpha_M \cdot a_M \text{ and } \alpha_M \neq {_Me_g} | a_M \in_U \Omega_M, \alpha_M \in {_MX_1}, \beta_M \in {_MX_2}]$$

of satisfying $\alpha_M \cdot a_M = \beta_M$ for all possible $_MX_1$ and $_MX_2$ is called a pseudo-free indicator of a pair $(G_M, \Omega_M)$ and is represented as $P(G_M, \Omega_M)$, where $G_M$ is a matrix, $\Omega_M$ is a set of matrices $\Omega_M = \{0_M, \ldots, M_M\}$, $\alpha_M$ and $\beta_M$ are realizations $\alpha_M \in {_MX_1}(\alpha_M \neq {_Me_g})$ and $\beta_M \in {_MX_2}$ of random variables $_MX_1$ and $_MX_2$ on $G_M$, and $a_M \in \Omega_M$. If a certain negligible function $\zeta(k)$ exists and $$P(G_M, \Omega_M) < \zeta(k)$$

then a computation defined by the pair $(G_m, \Omega_M)$ is called a pseudo-free action.

[Variations of First to Sixth Embodiments]

As has been described above, the capability providing apparatus provides first output information $z_1$ and second output information $z_2$ to the computing apparatus without providing a decryption key and the computing apparatus outputs $u^{b'}v^{a'}$ in the embodiments described above. The probability of $u^{b'}v^{a'}$ being the decryption value of the ciphertext x is high. Thus, the capability providing apparatus can provide the decryption capability to the computing apparatus without providing a decryption key.

Note that the present invention is not limited to the embodiments described above. For example, the random variables $X_1$, $X_2$ and $X_3$ may be the same or different. Similarly, the random variables $_MX_1$ and $_MX_2$ may be the same or different.

Each of the first random number generator, the second random number generator, the third random number generator, the fourth random number generator, the fifth random number generator, the sixth random number generator and the seventh random number generator generates uniform random numbers to achieve the highest security of the proxy computing system. However, if the level of security required is not so high, at least some of the first random number generator, the second random number generator, the third random number generator, the fourth random number generator, the fifth random number generator, the sixth random number generator and the seventh random number generator may generate random numbers that are not uniform random numbers. Similarly, a non-uniform random matrix may be selected in the sixth embodiment instead of uniformly randomly selecting a matrix. While it is desirable from the computational efficiency point of view that random numbers which are natural numbers greater than or equal to 0 and less than $K_H$ or random numbers that are natural numbers greater than or equal to 0 and less than $K_G$ be selected as in the embodiments described above, random numbers that are natural numbers greater than or equal to $K_H$ or $K_G$ may be selected instead.

The process of the capability providing apparatus may be performed multiple times each time the computing apparatus provides first input information $\tau_1$ and second input information $\tau_2$ which are elements of a group H and correspond to the same a and b to the capability providing apparatus. This enables the computing apparatus to obtain a plurality of pieces of first output information $z_1$, second output information $z_2$, and third output information $z_3$ each time the computing apparatus provides first input information $\tau_1$ and the second input information $\tau_2$ to the capability providing apparatus. Consequently, the number of exchanges and the amount of communication between the computing apparatus and the capability providing apparatus can be reduced. The same applies to the first input information $_M\tau_1$ and the second input information $_M\tau_2$ of the sixth embodiment.

The computing apparatus may provide a plurality of pieces of first input information $\tau_1$ and second input information $\tau_2$ to the capability providing apparatus at once and may obtain a plurality of pieces of corresponding first output information $z_1$, second output information $z_2$ and third output information $z_3$ at once. This can reduce the number of exchanges between the computing apparatus and the capability providing apparatus. The same applies to the first input information $_M\tau_1$ and the second input information $_M\tau_2$ of the sixth embodiment.

Check may be made to see whether u and v obtained at the first computing unit and the second computing unit of any of the first to fifth embodiments are elements of the group G. If u and v are elements of the group G, the process described above may be continued; if u or v is not an element of the group G, information indicating that the computation is impossible, for example, the symbol "⊥" may be output. Similarly, check may be made to see whether $u_M$ and $v_M$ obtained at the first computing unit and the second computing unit of the sixth embodiment is an element of $G_M$. If $u_M$ and $v_M$ are elements of $G_M$, the process described above may be continued; if $u_M$ or $G_M$ is not an element of $G_M$, information indicating that the computation is impossible, for example, the symbol "⊥" may be output.

The units of the computing apparatus may exchange data among them directly or through a memory, which is not depicted. Similarly, the units of the capability providing apparatus may exchange data among them directly or through a memory, which is not depicted.

Furthermore, the processes described above may be performed in time sequence as described, or may be performed in parallel with one another or individually, depending on the throughput of the apparatuses that performs the processes or as needed. It would be understood that other modifications can be made without departing from the spirit of the present invention.

Seventh Embodiment

A seventh embodiment of the present invention will be described.

<Configuration>

Figure 18:
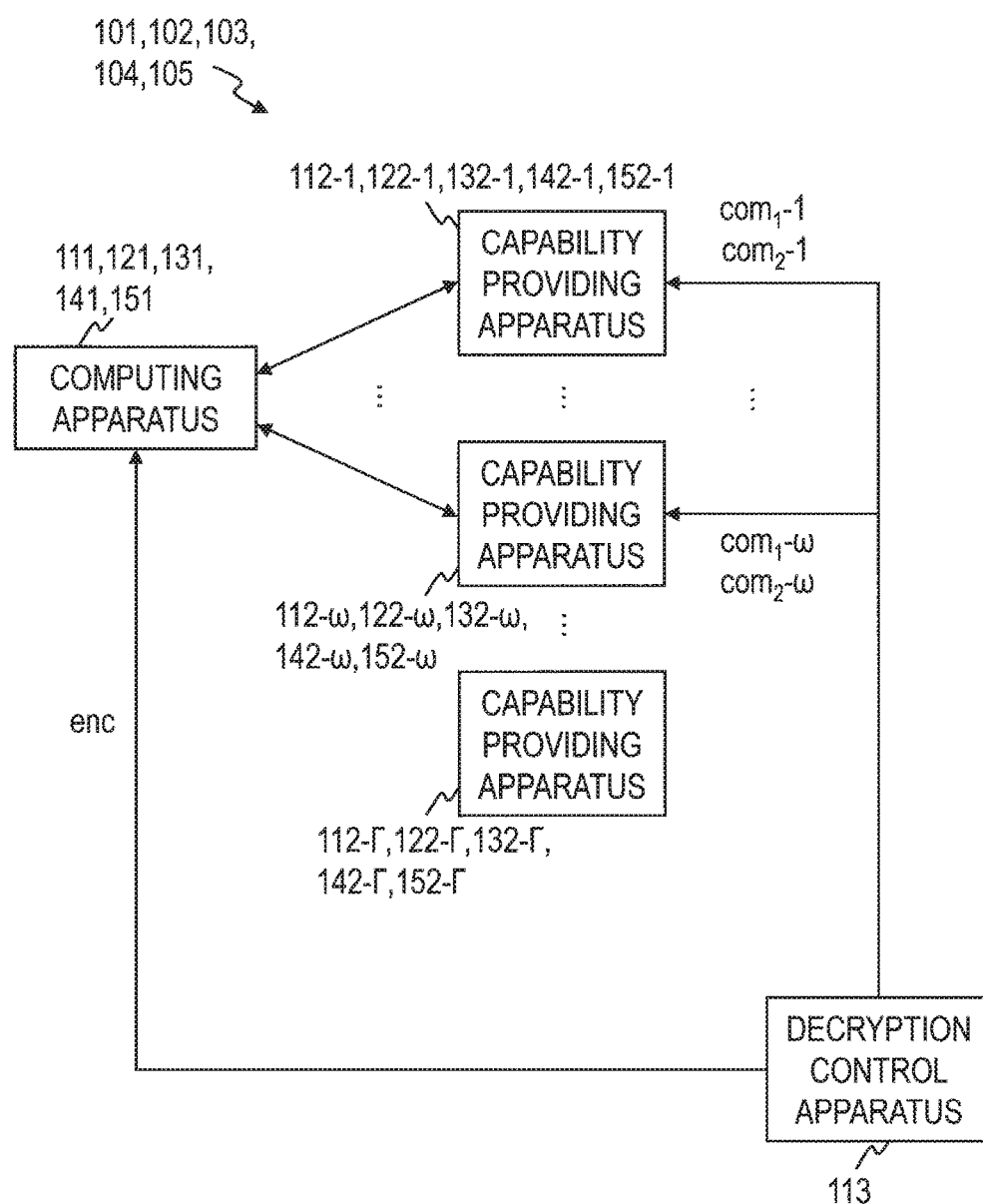
FIG. 18 is a block diagram illustrating a configuration of a proxy computing system of an embodiment.

As illustrated in FIG. 18, a proxy computing system 101 of the seventh embodiment includes, for example, a computing apparatus 111 that not have a decryption key, capability providing apparatuses 112-1, . . . , 112-Γ (Γ is an integer greater than or equal to 2) that has decryption keys $s_1, \ldots, s_\Gamma$, respectively, and a decryption control apparatus 113 that controls a decryption capability of the computing apparatus 111. The decryption control apparatus 113 controls a decryption capability provided by the capability providing apparatuses 112-1, . . . , 112-Γ to the computing apparatus 111 and the computing apparatus 111 uses the decryption capability provided by the capability providing apparatus 112-1, . . . , 112-Γ to decrypt a ciphertext. The computing apparatus 111, the capability providing apparatuses 112-1, . . . , 112-Γ, and the decryption control apparatus 113 are configured so that information can be exchanged between them. For example, the computing apparatus 111, the probability providing apparatuses 112-1, . . . , 112-Γ, and the decryption control apparatus 113 are capable of exchange information through a transmission line, a network, a portable recording medium, and/or other medium.

Figure 19:
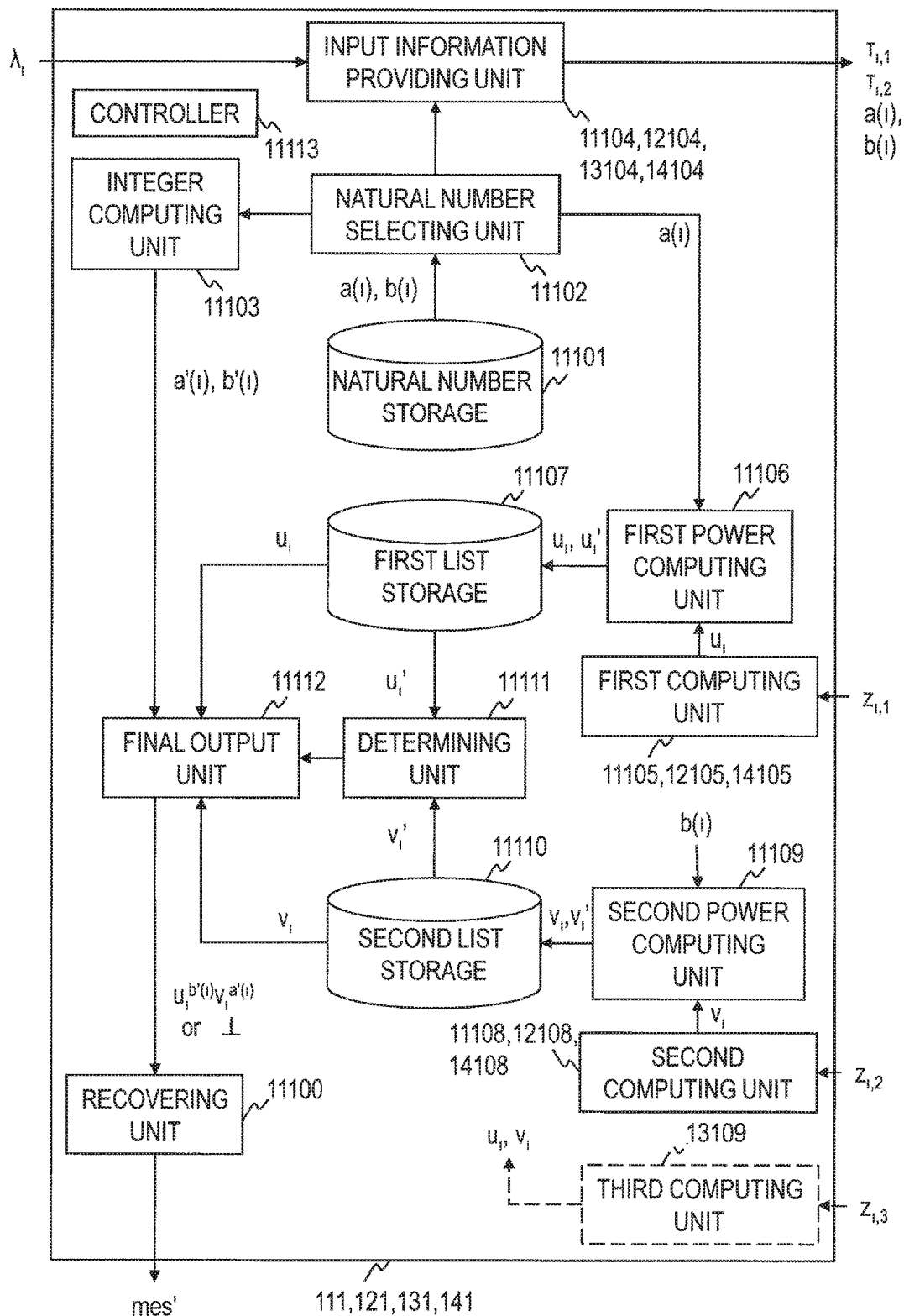
FIG. 19 is a block diagram illustrating a configuration of a computing apparatus of an embodiment.

As illustrated in FIG. 19, the computing apparatus 111 of the seventh embodiment includes, for example, a natural number storage 11101, a natural number selecting unit 11102, an integer computing unit 11103, an input information providing unit 11104, a first computing unit 11105, a first power computing unit 11106, a first list storage 11107, a second computing unit 11108, a second power computing unit 11109, a second list storage 11110, a determining unit 11111, a final output unit 11112, a recovering unit 11100, and a controller 11113. Examples of the computing apparatus 111 include a device having a computing function and a memory function, such as a card reader-writer apparatus and a mobile phone, and a well-known or specialized computer that includes a CPU (central processing unit) and a RAM (random-access memory) in which a special program is loaded.

Figure 20:
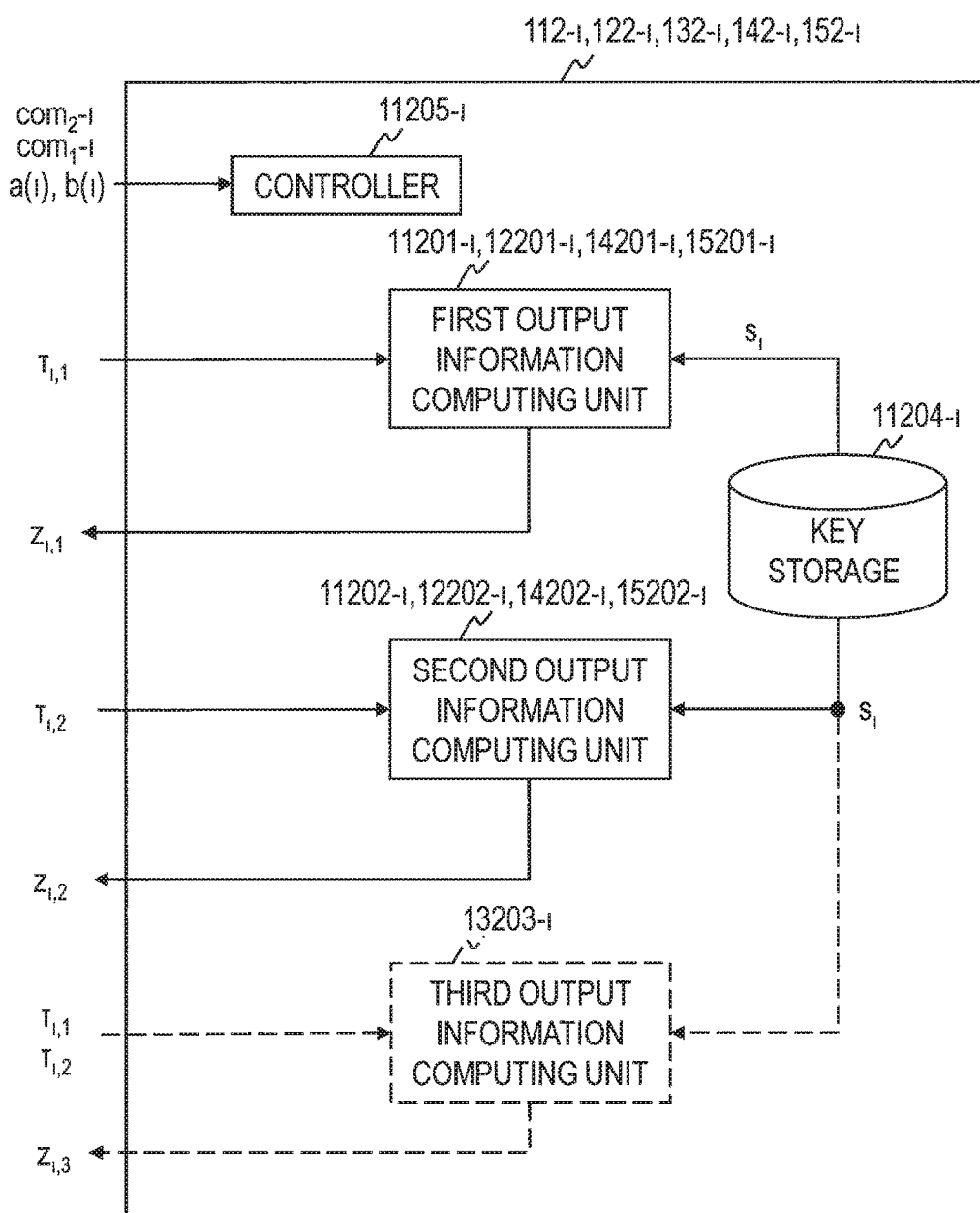
FIG. 20 is a block diagram illustrating a configuration of a capability providing apparatus of an embodiment.

As illustrated in FIG. 20, the capability providing apparatus 112-ι (ι=1, ... ω, where ω is an integer greater than or equal to 2 and less than or equal to Γ) of this embodiment includes, for example, a first output information computing unit 11201-ι, a second output information computing unit 11202-ι, a key storage 11204-ι, and a controller 11205-ι. Examples of the capability providing apparatus 112-ι include a tamper-resistant module such as an IC card and an IC chip, a device having computing and memory functions, such as a mobile phone, and a well-known or specialized computer including a CPU and a RAM in which a special program is loaded. As will be described later, the capability providing apparatuses 112-1, ..., 112-ω are selected from the capability providing apparatuses 112-1, ..., 112-Γ. If there are capability providing apparatuses 112-(ι+1), ..., 112-Γ, the capability providing apparatuses 112-(ι+1), ..., 112-Γ have the same configuration as the capability providing apparatus 112-ι.

Figure 21:
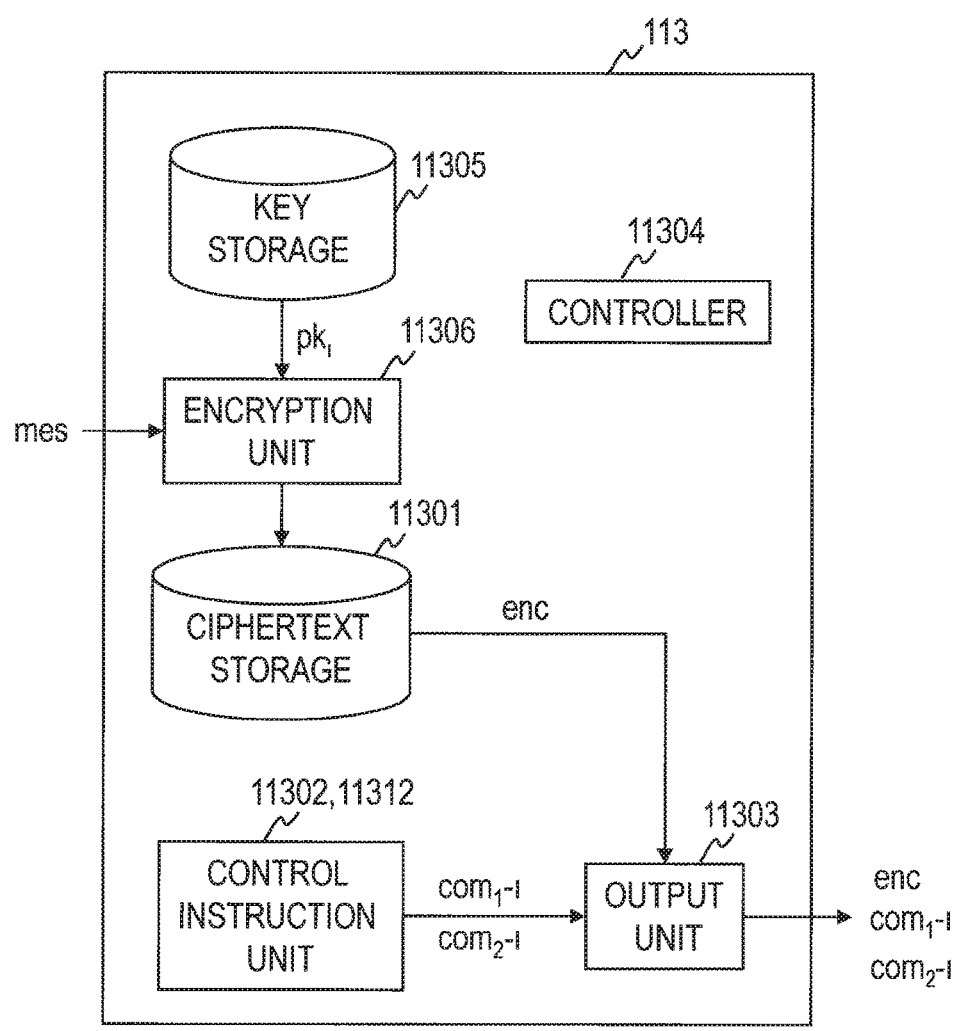
FIG. 21 is a block diagram illustrating a configuration of a decryption control apparatus of an embodiment.

As illustrated in FIG. 21, the decryption control apparatus 113 of the seventh embodiment includes, for example, an ciphertext storage 11301, a control instruction unit 11302, an output unit 11303, a controller 11304, a key storage 11305, and an encryption unit 11306. Examples of the decryption control apparatus 113 include a device having computing and memory functions, such as a mobile phone, and a well-known or specialized computer that includes a CPU and a RAM in which a special program is loaded.

<Processes>

Processes of this embodiment will be described below. For the processes, let $G_\iota$ and $H_\iota$ be groups (for example commutative groups), ω be an integer greater than or equal to 2, ι=1, ..., ω, $f_\iota(\lambda_\iota)$ be a decryption function for decrypting a ciphertext $\lambda_\iota$ which is an element of the group Hι with a particular decryption key $s_\iota$ to obtain an element of the group Gι generators of the groups $G_\iota$ and $H_\iota$ be $\mu_{\iota,g}$ and $\mu_{\iota,h}$, respectively, $X_{\iota,1}$ and $X_{\iota,2}$ be random variables having values in the group $G_\iota$, $x_{\iota,1}$ be a realization of the random variable $X_{\iota,1}$, and $x_{\iota,2}$ be a realization of the random variable $X_{\iota,2}$. Note that ω in this embodiment is a constant. It is assumed here that a plurality of pairs of natural numbers a(ι) and b(ι) that are relatively prime to each other (a(ι), b(ι)) are stored in the natural number storage 11101 of the computing apparatus 111. The term "natural number" means an integer greater than or equal to 0. Let $I_\iota$ be a set of pairs of relatively prime natural numbers that are less than the order of the group $G_\iota$, then it can be considered that pairs (a(ι), b(ι)) of natural numbers a(ι) and b(ι) corresponding to a subset $S_\iota$ of $I_\iota$ are stored in the natural number storage 11101. It is also assumed that a particular decryption key sι is stored in the key storage 12104 of the capability providing apparatus 112-ι in a secure manner. It is assumed that encryption keys $pk_1, \ldots, pk_\Gamma$ corresponding to the decryption keys $s_1, \ldots, s_\Gamma$, respectively, are stored in the key storage 11305 of the decryption control apparatus 113. Examples of the decryption keys $s_\iota$ and encryption keys $pk_\iota$ are secret keys and public keys of public key cryptography. Processes of the computing apparatus 111 are performed under the control of the controller 11113, processes of the capability providing apparatus 112-ι are performed under the control of the controller 11205-ι, and processes of the decryption control apparatus 113 are performed under the control of the controller 11304.

<Encryption Process>

Figure 24:
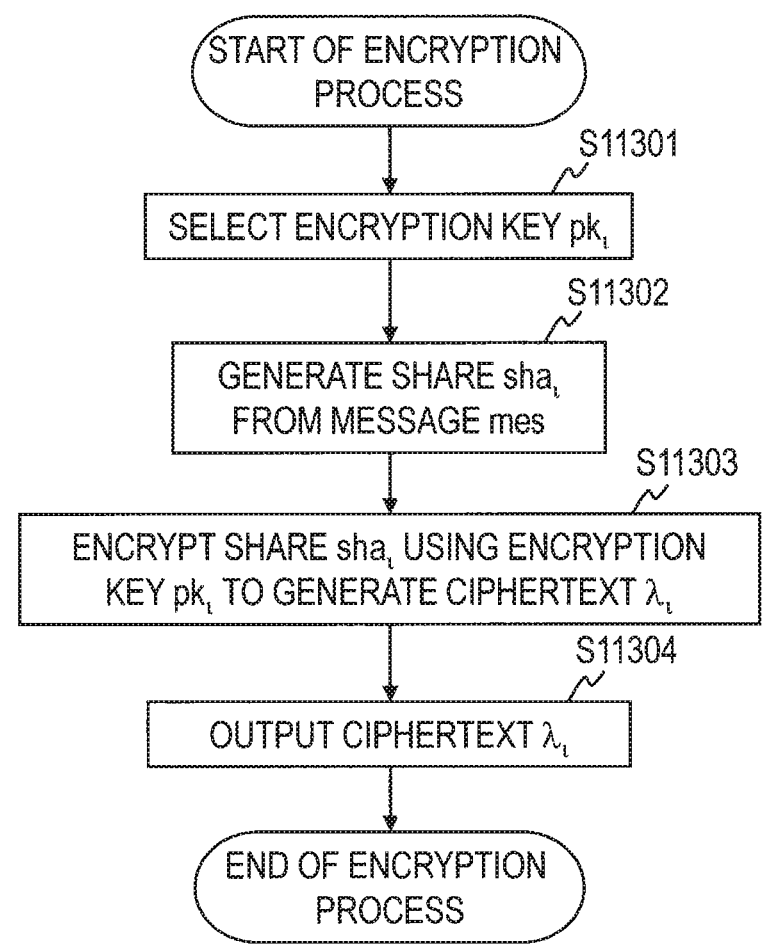
FIG. 24 is a flowchart illustrating an encryption process of an embodiment.

As illustrated in FIG. 24, first, a message mes is input in the encryption unit 11306 of the decryption control apparatus 113 (FIG. 21). The encryption unit 11306 randomly selects ω encryption keys $pk_1, \ldots, pk_\omega$ from the encryption keys $pk_1, \ldots, pk_\Gamma$ (step S11301). The encryption unit 11306 generates ω shares $sha_1, \ldots, sha_\omega$ from the message mes (step S11302). A method for generating the shares $sha_1, \ldots, sha_\omega$ will be described below.

<<Example 1 of Shares>>

Shares $sha_1, \ldots, sha_\omega$ are generated so that a bit combination value $sha_1 | \ldots | sha_\omega$ of the ω shares $sha_1, \ldots, sha_\omega$ is the message mes.

<<Example 2 of Shars>>

Shares $sha_1, \ldots, sha_\omega$ are generated so that the exclusive OR of the ω shares $sha_1, \ldots, shar_\omega$ is the message mes.

<<Example 3 of Shars>>

The message mes is secret-shared by a secret sharing scheme such as Shamir's secret sharing to generate shares $sha_1, \ldots, sha_\omega$ (End of description of examples of the method for generating shares).

Then, the encryption unit 11306 encrypts the share $sha_\iota$ with an encryption key $pk_\iota$ to generate a ciphertext $\lambda_\iota$ for each of ι=1, ..., ω. The generated ciphertexts $\lambda_1, \ldots, \lambda_\omega$ are stored in the ciphertext storage 11301 (step S11303).

Then, the ciphertexts $\lambda_1, \ldots, \lambda_\omega$ stored in the ciphertext storage 11301 are output from the output unit 11301 and input in the computing apparatus 111 (FIG. 19) (step S11304). The ciphertexts $\lambda_1, \ldots, \lambda_\omega$ may or may not be sent at a time.

<Decryption Process>

A decryption process for decrypting a ciphertext $\lambda_\iota$ according to this embodiment will be described with reference to FIG. 25. The process described below is performed for each of ι=1, ..., ω.

First, the natural number selecting unit 11102 of the computing apparatus 111 (FIG. 19) randomly reads one pair (a(ι), b(ι)) of natural numbers from among a plurality of pairs of natural numbers (a(ι), b(ι)) stored in the natural number storage 11101. At least part of information on the read pair of natural numbers (a(ι), b(ι)) is sent to the integer computing unit 11103, the input information providing unit 11104, the first power computing unit 11106, and the second power computing unit 11109 (step S11100).

The integer computing unit 11103 uses the sent pair of natural numbers (a(ι), b(ι)) to compute integers a'(ι) and b'(ι) that satisfy the relation a'(ι)a(ι)+b'(ι)b(ι)=1. Since the natural numbers a(ι) and b(ι) are relatively prime to each other, the integers a'(ι) and b'(ι) that satisfy the relation a'(ι)a(ι)+b'(ι)b(ι)=1 definitely exist. Methods for computing such integers are well known. For example, a well-known algorithm such as the extended Euclidean algorithm may be used to compute the integers a'(ι) and b'(ι). Information on the pair of natural numbers (a'(ι), b'(ι)) is sent to the final output unit 11112 (step S11101).

The controller 11113 sets $t_\iota=1$ (step S11102).

The input information providing unit 11104 of the computing apparatus 111 generates and outputs first input information $\tau_{\iota,1}$ and second input information $\tau_{\iota,2}$ which are elements of a group $H_\iota$ and each of which corresponds to the input ciphertext $\lambda_\iota$. Preferably, the first input information $\tau_{\iota,1}$ and the second input information $\tau_{\iota,2}$ are information whose relation with the ciphertext $\lambda_\iota$ is scrambled. This enables the computing apparatus 111 to conceal the ciphertext $\lambda_\iota$ from the capability providing apparatus 112-ι. Preferably, the first input information $\tau_{\iota,1}$ of this embodiment further corresponds to the natural number b(ι) selected by the natural number selecting unit 11102 and the second input information $\tau_{\iota,2}$ further corresponds to the natural number a(ι) selected by the natural number selecting unit 11102. This enables the computing apparatus 111 to evaluate the decryption capability provided by the capability providing apparatus 112-ι with a high degree of accuracy (step S11103).

Figure 26:
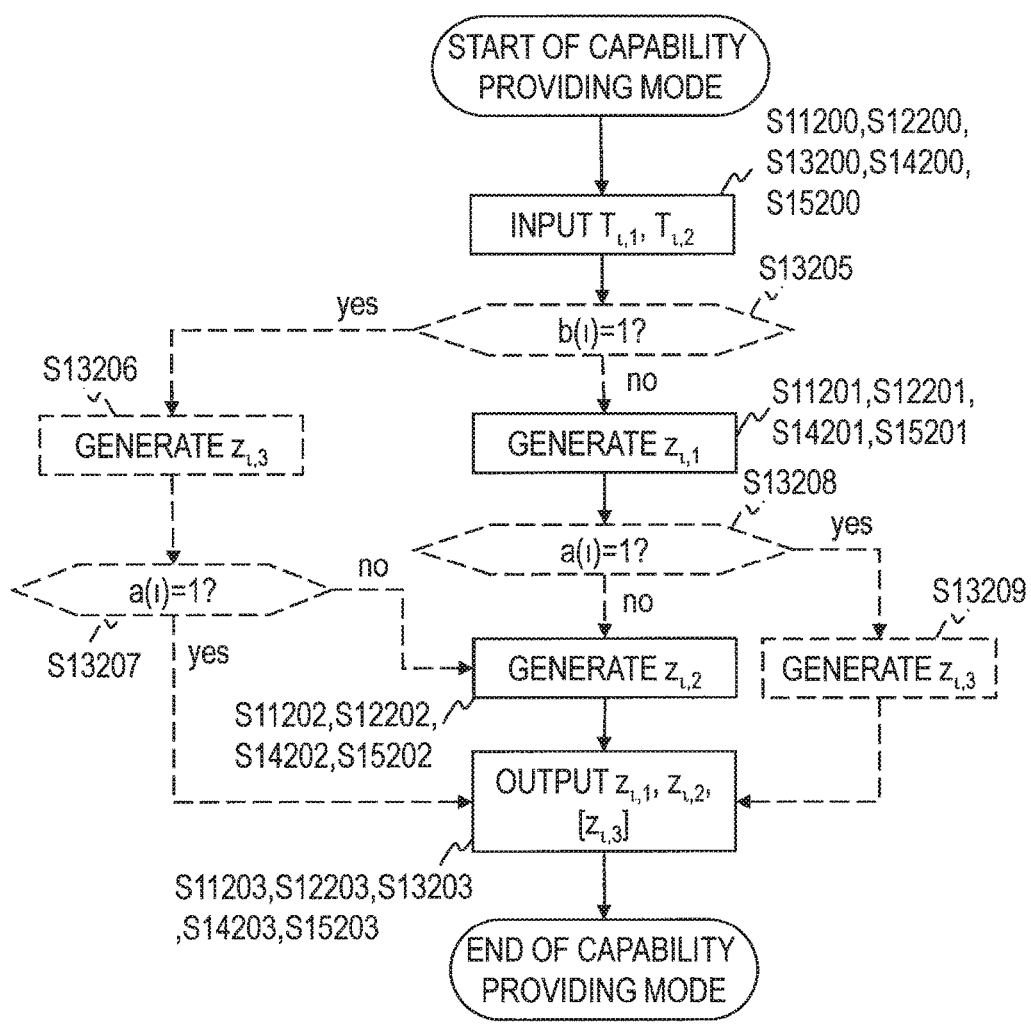
FIG. 26 is a flowchart illustrating a decryption capability providing process of an embodiment.

As illustrated in FIG. 26, the first input information $\tau_{\iota,1}$ is input in the first output information computing unit 11201-ι of the capability providing apparatus 112-ι (FIG. 20) and the second input information $\tau_{\iota,2}$ is input in the second output information computing unit 11202-ι (step S11200).

The first output information computing unit 11201 uses the first input information $\tau_{\iota,1}$ and the decryption key $s_\iota$ stored in the key storage 11204-ι to correctly compute $f_\iota(\tau_{\iota,1})$ with a probability greater than a certain probability and sets the result of the computation as first output information $z_{\iota,1}$ (step S11201). The second output information computing unit 11202-ι uses the second input information $\tau_{\iota,2}$ and the decryption key $s_\iota$ stored in the key storage 11204-ι to correctly computes $f_\iota(\tau_{\iota,2})$ with a probability greater than a certain probability and sets the result of the computation as second output information $z_{\iota,2}$ (step S11202). Note that the "certain probability" is a probability less than 100%. An example of the "certain probability" is a nonnegligible probability and an example of the "nonnegligible probability" is a probability greater than or equal to $1/\psi(k)$, where $\psi(k)$ is a polynomial that is a weakly increasing function (non-decreasing function) for a security parameter k. That is, the first output information computing unit 11201-ι and the second output information computing unit 11202-ι can output computation results that have an intentional or unintentional error. In other words, the result of the computation by the first output information computing unit 11201-ι may or may not be $f_\iota(\tau_{\iota,1})$ and the result of the computation by the second output information computing unit 11202-ι may or may not be $f_\iota(\tau_{\iota,2})$. The first output information computing unit 11201-ι outputs the first output information $z_{\iota,1}$ and the second output information computing unit 11202-ι outputs the second output information $z_{\iota,2}$ (step S11203).

Returning to FIG. 25, the first output information $z_{\iota,1}$ is input in the first computing unit 11105 of the computing apparatus 111 (FIG. 19) and the second output information $z_{\iota,2}$ is input in the second computing unit 11108. The first output information $z_{\iota,1}$ and the second output information $z_{\iota,2}$ are equivalent to the decryption capability provided by the capability providing apparatus 112-ι to the computing apparatus 111 (step S11104).

The first computing unit 11105 generates computation result $u_\iota = f_\iota(\lambda_\iota)^{b(\iota)} x_{\iota,1}$ from the first output information $z_{\iota,1}$. Here, generating (computing) $f_\iota(\lambda_\iota)^{b(\iota)} x_{\iota,1}$ means computing a value of a formula defined as $f_\iota(\lambda_\iota)^{b(\iota)} x_{\iota,1}$. Any intermediate computation method may be used, provided that the value of the formula $f_\iota(\lambda_\iota)^{b(\iota)} x_{\iota,1}$ can eventually be computed. The same applies to computations of the other formulae that appear herein. The result $u_\iota$ of the computation is sent to the first power computing unit 11106 (step S11105).

The first power computing unit 11106 computes $u_\iota' = u_\iota^{a(\iota)}$. The pair of the result $u_\iota$ of the computation and $u_\iota'$ computed on the basis of the result of the computation, $(u_\iota, u_\iota')$, is stored in the first list storage 11107 (step S11106).

The determining unit 11111 determines whether or not there is a pair that satisfies $u_\iota' = v_\iota'$ among the pairs $(u_\iota, u_\iota')$ stored in the first list storage 11107 and the pairs $(v_\iota, v_\iota')$ stored in the second list storage 11110 (step S11107). If no pair $(v_\iota, v_\iota')$ is stored in the second list storage 11110, the process at step S11107 is omitted and the process at step S11108 is performed. If there is a pair that satisfies $u_\iota' = v_\iota'$, the process proceeds to step S11114; if there is not a pair that satisfies $u_\iota' = v_\iota'$, the process proceeds to step S11108.

At step S11108, the second computing unit 11108 generates a computation result $v_\iota = f_\iota(\lambda_\iota)^{a(\iota)} x_{\iota,2}$ from the second output information $z_{\iota,2}$. The result $v_\iota$ of the computation is sent to the second power computing unit 11109 (step S11108).

The second power computing unit 11109 computes $v_\iota' = v_\iota^{b(\iota)}$. The pair of the result $v_\iota$ of the computation and $v_\iota'$ computed on the basis of the computation result, $(v_\iota, v_\iota')$, is stored in the second list storage 11110 (step S11109).

The determining unit 11111 determines whether or not there is a pair that satisfies $u_\iota' = v_\iota'$ among the pairs $(u_\iota, u_\iota')$ stored in the first list storage 11107 and the pairs $(v_\iota, v_\iota')$ stored in the second list storage 11110 (step S11110). If there is a pair that satisfies $u_\iota' = v_\iota'$, the process proceeds to step S11114. If there is not a pair that satisfies $u_\iota' = v_\iota'$, the process proceeds to step S11111.

At step S11111, the controller 11113 determines whether or not $t_\iota = T_\iota$ (step S11111). Here, $T_\iota$ is a predetermined natural number. If $t_\iota = T_\iota$, the final output unit 11112 outputs information indicating that the computation is impossible, for example the symbol "⊥" (step S11113) and the process ends. If not $t_\iota = T_\iota$, the controller 11113 increments $t_\iota$ by 1, that is, sets $t_\iota = t_\iota + 1$ (sets $t_\iota + 1$ as a new $t_\iota$) (step S11112) and the process returns to step S11103.

The information indicating the computation is impossible (the symbol "⊥" in this example) means that the reliability that the capability providing apparatus 112-ι correctly performs computation is lower than a criterion defined by $T_\iota$. In other words, it means that the capability providing apparatus 112-ι was unable to perform a correct computation in $T_\iota$ trials.

At step S11114, the final output unit 11112 uses $u_\iota$ and $v_\iota$ that correspond to $u_\iota'$ and $v_\iota'$ that are determined to satisfy $u_\iota' = v_\iota'$ to calculate and output $u_\iota^{b'(\iota)} v_\iota^{a'(\iota)}$ (step S11114). The $u_\iota^{b'(\iota)} v_\iota^{a'(\iota)}$ thus computed will be a result $f_\iota(\lambda_\iota)$ of decryption of the ciphertext $\lambda_\iota$ with the particular decryption key $s_\iota$ with a high probability (the reason why $u_\iota^{b'(\iota)} v_\iota^{a'(\iota)} = f_\iota(\lambda_\iota)$ with a high probability will be described later). Therefore, the process described above is repeated multiple times and the value obtained with the highest frequency among the values obtained at step S11114 can be provided as the result of decryption $f_\iota(\lambda)$. As will be described later, $u_\iota^{b'(\iota)} v_\iota^{a'(\iota)} = f_\iota(\lambda_\iota)$ can result with an overwhelming probability, depending on settings. In that case, the value obtained at step S11114 can be directly provided as the result of decryption $f_\iota(\lambda_\iota)$.

The decryption results $f_\iota(\lambda_\iota)$ obtained by performing the process described above on each of $\iota = 1, \ldots, \omega$ are input in the recovering unit 11100. The recovering unit 11100 uses $f_\iota(\lambda_\iota) = u_\iota^{b'(\iota)} v_\iota^{a'(\iota)}$ for each $\iota = 1, \ldots, \omega$ to perform a recovering process for obtaining a recovered value that can be recovered only if all of decrypted values that can be obtained by decrypting a ciphertext $\lambda_\iota$ for each $\iota = 1, \ldots, \omega$ with the decryption key $s_\iota$ are obtained. For example, if the shares have been generated by <<Example 1 of shares>> described above, the recovering unit 11100 generates a bit combination value $f_1(\lambda_1) | \ldots | f_\omega(\lambda_\omega)$ as the recovered value mes'. For example if the shares have been generated by <<Example 2 of shares>> described above, the recovering unit 11100 generates the exclusive OR of the decryption results $f_1(\lambda_1), \ldots, f_\omega(\lambda_\omega)$ as the recovered value mes'. For example, if the shares have been generated by <<Example 3 of shares>> described above, the recovering unit 11100 generates the recovered value mes' from the decryption results $f_1(\lambda_1), \ldots, f_\omega(\lambda_\omega)$ by using a recovering method corresponding to the secret sharing scheme.

If all of the decryption results $f_1(\lambda_1), \ldots, f_\omega(\lambda_\omega)$ are correct, the recovered value mes' obtained by the recovering unit 11100 is equal to the message mes. On the other hand, if all of the decryption results $f_1(\lambda_1), \ldots, f_\omega(\lambda_\omega)$ are incorrect, the probability that the recovered value mes' obtained by the recovering unit 11100 is equal to the message mes is negligibly small.

<<Reason why $u_\iota^{b'(\iota)} v_\iota^{a'(\iota)} = f_\iota(\lambda_\iota)$ with High Probability>>

For simplicity of notation, $\iota$ is omitted in the following description.

Let X be a random variable having a value in the group G. For w∈G, an entity that returns wx' corresponding to a sample x' according to the random variable X in response to each request is called a sampler having an error X for w.

For w∈G, an entity that returns $w^a x'$ corresponding to a sample x' according to a random variable X whenever a natural number a is given is called a randomizable sampler having an error X for w. The randomizable sampler functions as the sampler if used with a=1.

The combination of the input information providing unit 11104, the first output information computing unit 11201 and the first computing unit 11105 of this embodiment is a randomizable sampler having an error $X_1$ for $f(\lambda)$ (referred to as the "first randomizable sampler") and the combination of the input information providing unit 11104, the second output information computing unit 11202 and the second computing unit 11108 is a randomizable sampler having an error $X_2$ for $f(\lambda)$ (referred to as the "second randomizable sampler").

The inventor has found that if u'=v' holds, that is, if $u^a = v^b$ holds, it is highly probable that the first randomizable sampler has correctly computed $u = f(\lambda)^b$ and the second randomizable sampler has correctly computed $v = f(\lambda)^a$ ($x_1$ and $x_2$ are identity elements $e_g$ of the group G). For simplicity of explanation, this will be proven in an eleventh embodiment.

When the first randomizable sampler correctly computes $u = f(\lambda)^b$ and the second randomizable sampler correctly computes $v = f(\lambda)^a$ (when $x_1$ and $x_2$ are identity elements $e_g$ of the group G), then $u^{b'} v^{a'} = (f(\lambda)^b x_1)^{b'} (f(\lambda)^a x_2)^{a'} = (f(\lambda)^b e_g)^{b'} (f(\lambda)^a e_g)^{a'} = f(\lambda)^{bb'} e_g^{b'} f(\lambda)^{aa'} e_g^{a'} = f(\lambda)^{(bb'+aa')} = f(\lambda)$.

For $(q_1, q_2) \in I$, a function $\pi_i$ is defined by $\pi_i(q_1, q_2) = q_i$ for each of i=1, 2. Let $L = \min(\#\pi_1(S), \#\pi_2(S))$, where #• is the order of a set •. If the group G is a cyclic group or a group whose order is difficult to compute, it can be expected that the probability that an output other than "⊥" of the computing apparatus 111 is not $f(\lambda)$ is at most approximately $T^2 L/\#S$ within a negligible error. If $L/\#S$ is a negligible quantity and T is a quantity approximately equal to an polynomial order, the computing apparatus 11 outputs a correct $f_\iota(\lambda)$ with an overwhelming probability. An example of S that results in a negligible quantity of $L/\#S$ is $S = \{(1, d) | d \in [2, |G|-1]\}$.

<Decryption Control Process>

A decryption control process of this embodiment will be described below.

When the decryption control apparatus 113 controls the decryption process performed by the computing apparatus 111, the decryption control apparatus 113 outputs a decryption control instruction that controls the decryption process of the computing apparatus 111 to all of the capability providing apparatuses 112-$\iota$. The capability providing apparatuses 112-$\iota$ in which the decryption control instruction is input controls whether to output both of first output information $z_{\iota,1}$ and second output information $z_{\iota,2}$ according to the input decryption control instruction. The computing apparatus 111 cannot decrypt the ciphertext $\lambda_\iota$ unless the first output information $z_{\iota,1}$ and second output information $z_{\iota,2}$ are provided. Therefore, the decryption capability of the computing apparatus 111 can be controlled by controlling whether or not to output both of the first output information $z_{\iota,1}$ and second output information $z_{\iota,2}$. Exemplary methods for controlling the decryption process will be described below.

<<Example 1 of Method for Controlling Decryption Process>>

In example 1 of the method for controlling the decryption process, decryption control instructions include a decryption restricting instruction $com_1$-$\iota$ for restricting the decryption capability of the computing apparatus 111. When the decryption restricting instruction $com_1$-$\iota$ is input in the controller 11205-$\iota$ of the capability providing apparatus 112-$\iota$, the controller 11205-$\iota$ prevents output of both of the first output information $z_{\iota,1}$ and the second output information $z_{\iota,2}$.

To restrict the decryption capability of the computing apparatus 111, the control instruction unit 11302 of the decryption control apparatus 113 (FIG. 21) outputs the decryption restricting instruction $com_1$-$\iota$ for all $\iota$. The decryption restricting instruction $com_1$-$\iota$ is output from the output unit 11303 to the capability providing apparatus 112-$\iota$.

The controller 11205-$\iota$ of the capability providing apparatus 112-$\iota$ (FIG. 20) determines whether or not the decryption restricting instruction $com_1$-$\iota$ has been input. If the decryption restriction instruction $com_1$-$\iota$ has not been input in the controller 11205-$\iota$, the controller 11205-$\iota$ does not perform the decryption control process. On the other hand, if the decryption restriction instruction $com_1$-$\iota$ has been input in the controller 11205-$\iota$, the controller 11205-$\iota$ performs control to prevent output of both of the first output information $z_{\iota,1}$ and second output information $z_{\iota,2}$ (decryption restriction mode).

In the decryption restriction mode, the controller 11205-$\iota$ prevents the first output information computing unit 11201-$\iota$ from outputting first output information $z_{\iota,1}$ and also prevents the second output information computing unit 11202-$\iota$ from outputting second output information $z_{\iota,2}$. An example of control to prevent output of the first output information $z_{\iota,1}$ and/or the second output information $z_{\iota,2}$ is control to prevent output of the first output information $z_{\iota,1}$ and the second output information $z_{\iota,2}$ without preventing generation of the output information $z_{\iota,1}$ and/or the second output information $z_{\iota,2}$. Another example of control to prevent output of the first output information $z_{\iota,1}$ and/or the second output information $z_{\iota,2}$ is control to causing the first output information computing unit 11201-$\iota$ and the second output information computing unit 11202-$\iota$ to output dummy information instead of the first output information $z_{\iota,1}$ and/or the second output information $z_{\iota,2}$. Note that an example of the dummy information is a random number or other information that is independent of the ciphertexts $\lambda_\iota$. Another example of control to prevent output of the first output information $z_{\iota,1}$ and/or the second output information $z_{\iota,2}$ is control to prevent generation of the first output information $z_{\iota,1}$ and the second output information $z_{\iota,2}$. If control to prevent generation of the first output information $z_{\iota,1}$ and the second output information $z_{\iota,2}$ is performed, information required for generating the first output information $z_{\iota,1}$ and the second output information $z_{\iota,2}$ may optionally be nullified or removed. For example, the decryption key s$\iota$ stored in the key storage 11204-$\iota$ may optionally be nullified or removed.

If output of both of the first output information $z_{\iota,1}$ and the second output information $z_{\iota,2}$ is prevented, the capability providing apparatus 112-$\iota$ outputs neither of the first output information $z_{\iota,1}$ and the second output information $z_{\iota,2}$ at step S11203. Accordingly, the computing apparatus 111 can obtain neither of the first output information $z_{\iota,1}$ and the second output information $z_{\iota,2}$ at step S11104 and cannot compute computation results $u_\iota$ and $v_\iota$. Therefore a correct decryption result $f_\iota(\lambda)$ cannot be obtained. If correct decryption results $f_\iota(\lambda)$ cannot be obtained for all $\iota$, the probability that a recovered value mes' obtained by the recovering unit 11100 will be equal to the message mes is negligibly small. Thus, the decryption capability of the computing apparatus 111 can be restricted.

<<Example 2 of Method for Controlling Decryption Process>>

In example 2 of the method for controlling the decryption process, the decryption control instructions include a decryption permitting instruction $com_2$-$\iota$ for removing restriction on the decryption capability of the computing apparatus 111. When the decryption permitting instruction $com_2$-$\iota$ is input in the controller 11205-$\iota$ of the capability providing apparatus 112-$\iota$, the controller 11205-$\iota$ permits output of at least one of the first output information $z_{\iota,1}$ and the second output information $z_{\iota,2}$. Example 2 of the method for controlling the decryption process is performed when, for example, output of the first output information $z_{\iota,1}$ and the second output information $z_{\iota,2}$ is to be permitted again after output of both of first output information $z_{\iota,1}$ and second output information $z_{\iota,2}$ is prevented by example 1 of the method for controlling the decryption process. In that case, if information required for generating the first output information $z_{\iota,1}$ and/or the second output information $z_{\iota,2}$ has been nullified or removed, the decryption permitting instruction $com_2$-$\iota$ may include the information and the information may be re-set in the capability providing apparatus 112-$\iota$. Example 2 of the method for controlling the decryption process may also be performed to permit output of the first output information $z_{\iota,1}$ and the second output information $z_{\iota,2}$ when, for example, output of both of the first output information $z_{\iota,1}$ and the second output information $z_{\iota,2}$ is prevented in an initial state.

To remove restriction on the decryption capability of the computing apparatus 111, the control instruction unit 11302 of the decryption control apparatus 113 (FIG. 21) outputs the decryption permitting instruction $com_2$-$\iota$ for all $\iota$. The decryption permitting instruction $com_2$-$\iota$ is output from the output unit 11303 to the capability providing apparatus 112-$\iota$.

The controller 11205-$\iota$ of the capability providing apparatus 112-$\iota$ (FIG. 20) determines whether or not the decryption permitting instruction $com_2$-$\iota$ is input. If the decryption permitting instruction $com_2$-$\iota$ is not input in the controller 11205-$\iota$, the controller 11205-$\iota$ does not perform decryption control process. On the other hand, if the decryption permitting instruction $com_2$-$\iota$ is input in the controller 11205-$\iota$, the controller 11205-$\iota$ performs control to permit output of both of first output information $z_{\iota,1}$ and second output information $z_{\iota,2}$ (decryption permission mode).

If output of both of the first output information $z_{\iota,1}$ and the second output information $z_{\iota,2}$ is permitted, the capability providing apparatus 112-$\iota$ outputs both of the first output information $z_{\iota,1}$ and the second output information $z_{\iota,2}$ at step S11203. Accordingly, the computing apparatus 111 can obtain both of the first output information $z_{\iota,1}$ and the second output information $z_{\iota,2}$ at step S11104 and can compute $u_\iota$ or $v_\iota$ as a computation result. Therefore a correct decryption result can be obtained with a high probability. Thus, the restriction on the decryption capability of the computing apparatus 111 can be removed.

<<Example 3 of Method for Controlling Decryption Process>>

In examples 1 and 2 of the method for controlling the decryption process, each decryption control instruction corresponds to any one of $\iota$ (corresponds to the decryption function $f_\iota$) and the controller 11205-$\iota$ of the capability providing apparatus 112-$\iota$ controls whether to output all of the first output information $z_{\iota,1}$ and the second output information $z_{\iota,2}$ that correspond to the decryption control instruction (corresponds to the decryption function $f_\iota$ corresponding to the decryption control instruction). However, a decryption control instruction may correspond to a plurality of $\iota$ and the controller 11205-$\iota$ of the capability providing apparatus 112-$\iota$ may control whether to output the first output information $z_{\iota,1}$ and the second output information $z_{\iota,2}$ corresponding to the decryption control instruction.

Eighth Embodiment

A proxy computing system of an eighth embodiment is an example that embodies the first randomizable sampler and the second randomizable sampler described above. The following description will focus on differences from the seventh embodiment and repeated description of commonalities with the seventh embodiment, including the decryption control process, will be omitted. In the following description, elements labeled with the same reference numerals have the same functions and the steps labeled with the same reference numerals represent the same processes.

<Configuration>

As illustrated in FIG. 18, the proxy computing system 102 of the eighth embodiment includes a computing apparatus 121 in place of the computing apparatus 111 and capability providing apparatuses 122-1, . . . , 122-Γ in place of the capability providing apparatuses 112-1, . . . , 112-Γ.

Figure 22:
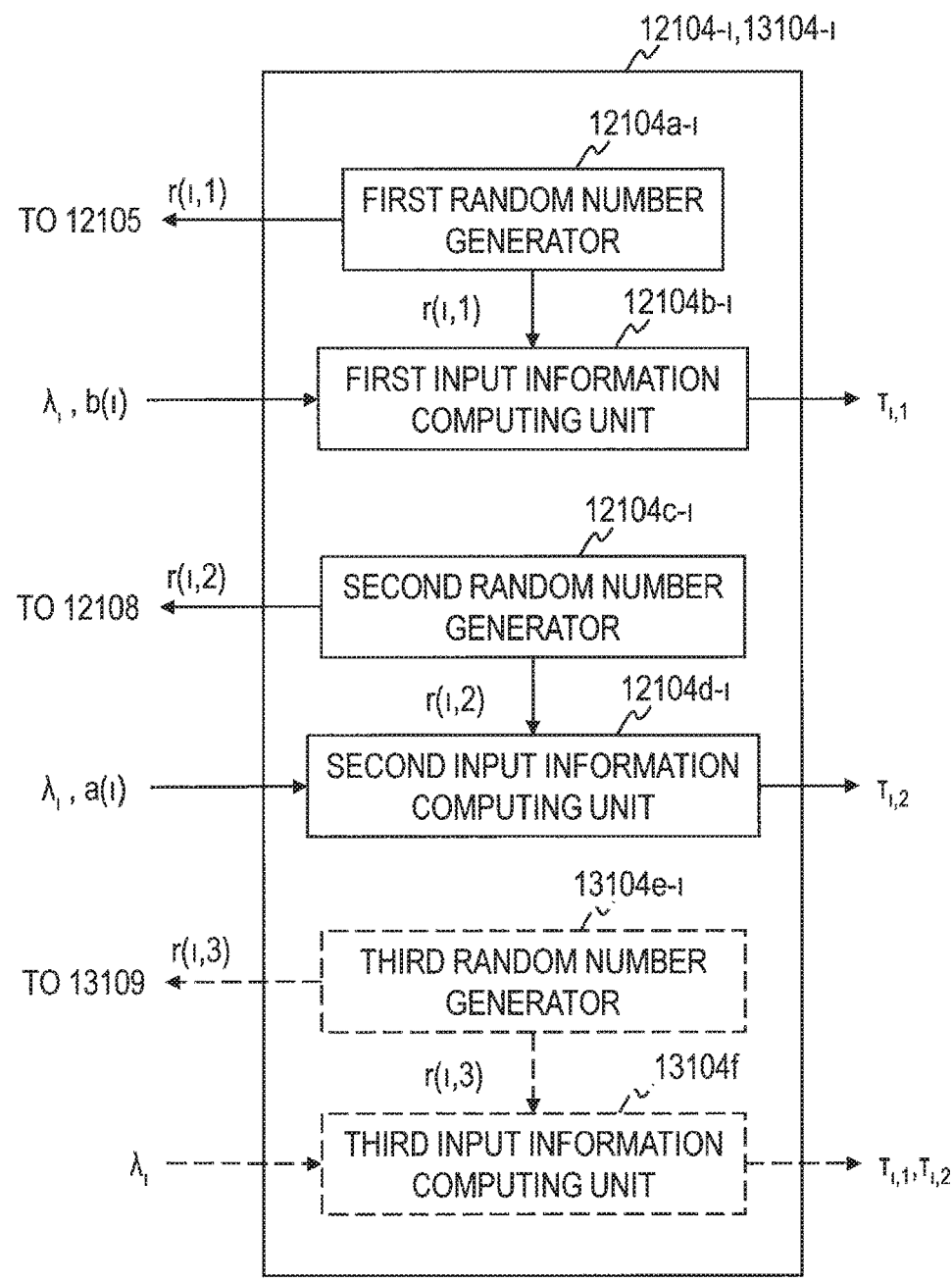
FIG. 22 is a block diagram illustrating a configuration of an input information providing unit of an embodiment.

As illustrated in FIG. 19, the computing apparatus 121 of the eighth embodiment includes, for example, a natural number storage 11101, a natural number selecting unit 11102, an integer computing unit 11103, an input information providing unit 12104, a first computing unit 12105, a first power computing unit 11106, a first list storage 11107, a second computing unit 12108, a second power computing unit 11109, a second list storage 11110, a determining unit 11111, a final output unit 11112 and a controller 11113. As illustrated in FIG. 22, the input information providing unit 12104 of this embodiment includes, for example, a first random number generator 12104$a$, a first input information computing unit 12104$b$, a second random number generator 12104$c$, and a second input information computing unit 12104$d$.

As illustrated in FIG. 20, the capability providing apparatus 122-$\iota$ of the eighth embodiment ($\iota=1, \ldots, \omega$, where $\omega$ is an integer greater than or equal to 2 and less than or equal to Γ) includes, for example, a first output information computing unit 12201-$\iota$, a second output information computing unit 12202-$\iota$, a key storage 11204-$\iota$, and a controller 11205-$\iota$. If there are capability providing apparatuses 122-($\iota$+1), . . . , 122-Γ, the capability providing apparatuses 122-($\iota$+1), . . . , 122-Γ have the same configuration as the capability providing apparatus 122-$\iota$.

<Decryption Process>

A decryption process of this embodiment will be described below. In the eighth embodiment, a decryption function $f_\iota$ is a homomorphic function, a group H is a cyclic group, and a generator of the group H is $\mu_{\iota,h}$, the order of the group H is $K_{A,H}$, and $v_\iota = f_\iota(\mu_{\iota,h})$. An example of cryptography in which the decryption function $f_\iota$ is a homomorphic function is RSA cryptography. The rest of the assumptions are the same as those in the seventh embodiment, except that the computing apparatus 111 is replaced with the computing apparatus 121 and the capability providing apparatuses 112-1, . . . , 112-Γ are replaced with the capability providing apparatuses 122-1, . . . , 122-Γ.

Figure 25:
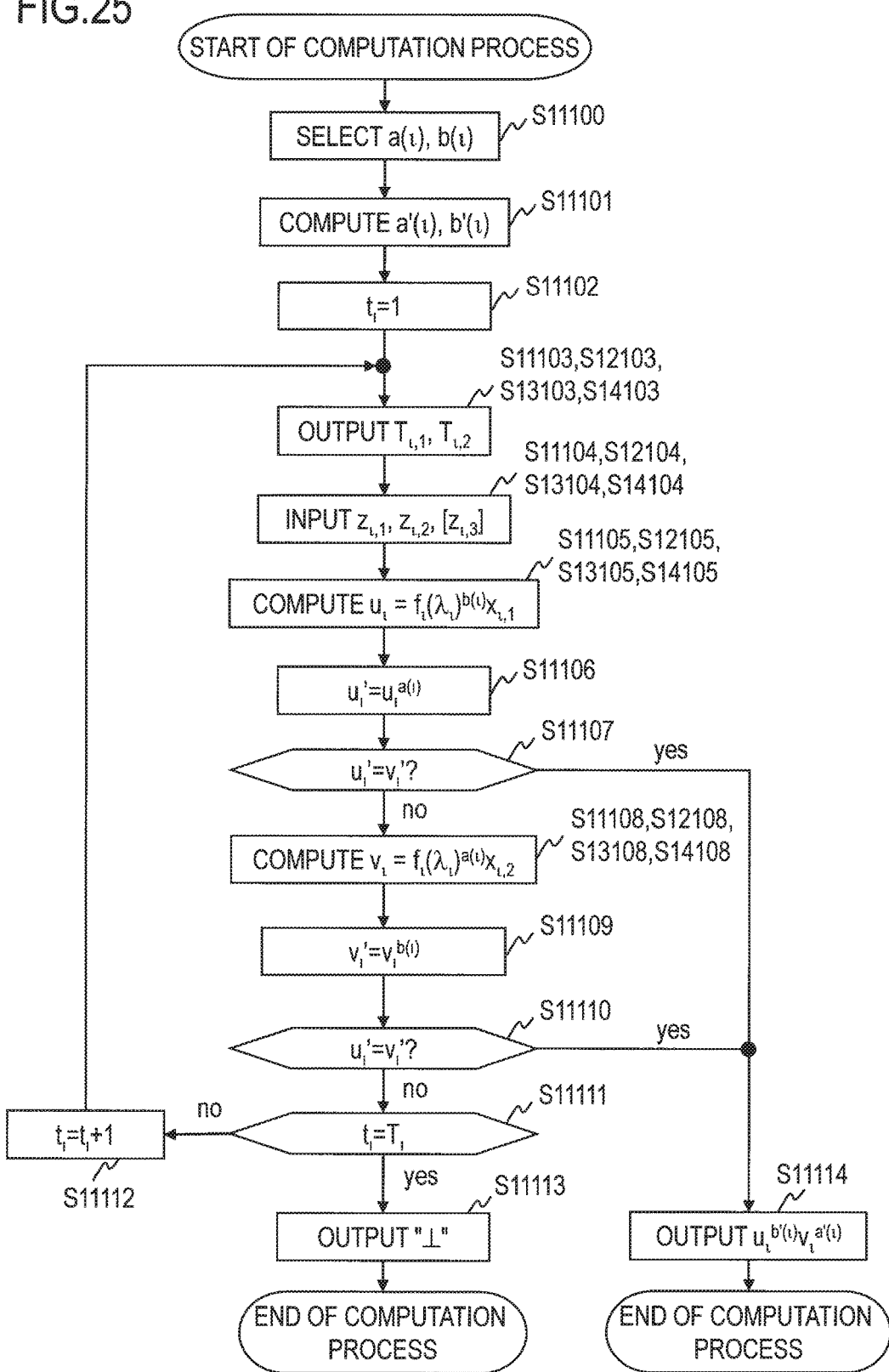
FIG. 25 is a flowchart illustrating a decryption process of an embodiment.

As illustrated in FIGS. 25 and 26, the process of the eighth embodiment is the same as the process of the seventh embodiment except that steps S1103 through S11105, S1108, and S11200 through S11203 of the seventh embodiment are replaced with steps S12103 through S12105, S12108, and S12200 through S12203, respectively. In the following, only processes at steps S12103 through S12105, S12108, and S12200 through S12203 will be described.

<<Process at Step S12103>>

The input information providing unit 12104 of the computing apparatus 121 (FIG. 19) generates and outputs first input information $\tau_{\iota,1}$ and second input information $\tau_{\iota,2}$ which corresponds to an input ciphertext $\lambda_\iota$ (step S12103 of FIG. 25). A process at step S12103 of this embodiment will be described with reference to FIG. 27.

The first random number generator 12104a (FIG. 22) generates a uniform random number $r(\iota, 1)$ that is a natural number greater than or equal to 0 and less than $K_{\iota,H}$. The generated random number $r(\iota, 1)$ is sent to the first input information computing unit 12104b and the first computing unit 12105 (step S12103a). The first input information computing unit 12104b uses the input random number $r(\iota, 1)$, the ciphertext $\lambda_\iota$ and a natural number $b(\iota)$ to compute first input information $\tau_{\iota,1} = \mu_{\iota,h}^{r(\iota,1)} \lambda_\iota^{b(\iota)}$ (step S12103b).

The second random number generator 12104c generates a uniform random number $r(\iota, 2)$ that is a natural number greater than or equal to 0 and less than $K_{\iota,H}$. The generated random number $r(\iota, 2)$ is sent to the second input information computing unit 12104d and the second computing unit 12108 (step S12103c). The second input information computing unit 12104d uses the input random number $r(\iota, 2)$, the ciphertext $\lambda_\iota$, and a natural number $a(\iota)$ to compute second input information $\tau_{\iota,2} = \mu_{\iota,h}^{r(\iota,2)} \lambda_\iota^{a(\iota)}$ (step S12103d).

The first input information computing unit 12104b and the second input information computing unit 12104d output the first input information $\tau_{\iota,1}$ and the second input information $\tau_{\iota,2}$ thus generated (step S12103e). Note that the first input information $\tau_{\iota,1}$ and the second input information $\tau_{\iota,2}$ in this embodiment are information whose relation with the ciphertext $\lambda_\iota$ is scrambled by using random numbers $r(\iota, 1)$ and $r(\iota, 2)$, respectively. This enables the computing apparatus 121 to conceal the ciphertext $\lambda_\iota$ from the capability providing apparatus 122-ι. The first input information $\tau_{\iota,1}$ in this embodiment further corresponds to the natural number $b(\iota)$ selected by the natural number selecting unit 11102 and the second input information $\tau_{\iota,2}$ further corresponds to the natural number $a(\iota)$ selected by the natural number selecting unit 11102. This enables the computing apparatus 121 to evaluate the decryption capability provided by the capability providing apparatus 122-ι with a high degree of accuracy.

<<Processes at Steps S12200 Through S12203>>

As illustrated in FIG. 26, first, the first input information $\tau_{\iota,1} = \mu_{\iota,h}^{r(\iota,1)} \lambda_\iota^{b(\iota)}$ is input in the first output information computing unit 12201-ι of the capability providing apparatus 122-ι (FIG. 20) and the second input information $\tau_{\iota,2} = \mu_{\iota,h}^{r(\iota,2)} \lambda_\iota^{a(\iota)}$ is input in the second output information computing unit 12202-ι (step S12200).

The first output information computing unit 12201-ι uses the first input information $\tau_{\iota,1} = \mu_{\iota,h}^{r(\iota,1)} \lambda_\iota^{b(\iota)}$ and a decryption key $s_\iota$ stored in the key storage 11204-ι to correctly compute $f_\iota(\mu_{\iota,h}^{r(\iota,1)} \lambda_\iota^{b(\iota)})$ with a probability greater than a certain probability and sets the result of the computation as first output information $z_{\iota,1}$. The result of the computation may or may not be correct. That is, the result of the computation by the first output information computing unit 12201-ι may or may not be $f_\iota(\mu_{\iota,h}^{r(\iota,1)} \lambda_\iota^{b(\iota)})$ (step S12201).

The second output information computing unit 12202-ι uses the second input information $\tau_{\iota,2} = \mu_{\iota,h}^{r(\iota,2)} \lambda_\iota^{a(\iota)}$ and the decryption key $s_\iota$ stored in the key storage 11204-ι to correctly compute $f_\iota(\mu_{\iota,h}^{r(\iota,2)} \lambda_\iota^{a(\iota)})$ with a probability greater than a certain probability and provides the result of the computation as second output information $z_{\iota,2}$. The result of the computation may or may not be correct. That is, the result of the computation by the second output information computing unit 12202-ι may or may not be $f_\iota(\mu_{\iota,h}^{r(\iota,2)} \lambda_\iota^{a(\iota)})$ (step S12202).

The first output information computing unit 12201-ι outputs the first output information $z_{\iota,1}$ and the second output information computing unit 12202-ι outputs the second output information $z_{\iota,2}$ (step S2203).

<<Processes at Steps S12104 and S12105>>

Returning to FIG. 25, the first output information $z_{\iota,1}$ is input in the first computing unit 12105 of the computing apparatus 121 (FIG. 19) and the second input information $z_{\iota,2}$ is input in the second computing unit 12108. The first output information $z_{\iota,1}$ and the second output information $z_{\iota,2}$ are equivalent to the decryption capability provided by the capability providing apparatus 122-ι to the computing apparatus 121 (step S12104).

The first computing unit 12105 uses the input random number $r(\iota, 1)$ and the first output information $z_{\iota,1}$ to compute $z_{\iota,1} v_\iota^{-r(\iota,1)}$ and sets the result of the computation as $u_\iota$. The result $u_\iota$ of the computation is sent to the first power computing unit 11106. Here, $u_\iota = z_{\iota,1} v_\iota^{-r(\iota,1)} = f_\iota(\lambda_\iota)^{b(\iota)} x_{\iota,1}$. That is, $z_{\iota,1} v_\iota^{-r(\iota,1)}$ is an output of a randomizable sampler having an error $X_{\iota,1}$ for $f_\iota(\lambda_\iota)$. The reason will be described later (step S12105).

<<Process at Step S12108>>

The second computing unit 12108 uses the input random number $r(\iota, 2)$ and the second output information $z_{\iota,2}$ to compute $z_{\iota,2} v_\iota^{-r(\iota,2)}$ and sets the result of the computation as $v_\iota$. The result $v_\iota$ of the computation is sent to the second power computing unit 11109. Here, $v_\iota = z_{\iota,1} v_\iota^{-r(\iota,2)} = f_\iota(\lambda_\iota)^{a(\iota)} x_{\iota,2}$. That is, $z_{\iota,2} v_\iota^{-r(\iota,2)}$ is an output of a randomizable sampler having an error $X_{\iota,2}$ for $f_\iota(\lambda_\iota)$. The reason will be described later (step S12108).

<<Reason why $z_{\iota,1} v_\iota^{-r(\iota,1)}$ and $z_{\iota,2} v_\iota^{-r(\iota,2)}$ are Outputs of Randomizable Samplers Having Errors $X_{\iota,1}$ and $X_{\iota,2}$, Respectively, for $f_\iota(\lambda_\iota)$>>

Let c be a natural number, R be a random number, and $B(\mu_h^R \lambda^c)$ be the result of computation performed by the capability providing apparatus 122 using $\mu_h^R \lambda^c$. That is, the results of computations that the first output information computing unit 12201-ι and the second output information computing unit 12202-ι return to the computing apparatus 121 are $z = B(\mu_h^R \lambda^c)$. A random variable X that has a value in the group G is defined as $X = B(\mu_h^R) f(\mu_h^R)^{-1}$.

Then, $zv^{-R} = B(\mu_h^R \lambda^c) f(\mu_h)^{-R} = X f(\mu_h^R \lambda^c) f(\mu_h)^{-R} = X f(\mu_h)^R f(\lambda)^c f(\mu_h)^{-R} = f(\lambda)^c X$. That is, $zv^{-R}$ is an output of a randomizable sampler having an error X for $f(\lambda)$.

The expansion of formula given above uses the properties such that $X = B(\mu_h^R) f(\mu_h^R)^{-1} = B(\mu_h^R \lambda^c) f(\mu_h^R \lambda^c)^{-1}$ and that $B(\mu_h^R \lambda^c) = X f(\mu_h^R \lambda^c)$. The properties are based on the fact that the function $f_\iota$ is a homomorphic function and R is a random number.

Therefore, considering that $a(\iota)$ and $b(\iota)$ are natural numbers and $r(\iota, 1)$ and $r(\iota, 2)$ are random numbers, $z_{\iota,1} v_\iota^{-r(\iota,1)}$ and $z_{\iota,2}v_\iota^{-r(\iota,2)}$ are, likewise, outputs of randomizable samplers having errors $X_{\iota,1}$ and $X_{\iota,2}$, respectively, for $f_\iota(\lambda_\iota)$.

Ninth Embodiment

A ninth embodiment is a variation of the eighth embodiment and computes a value of $u_\iota$ or $v_\iota$ by using samplers described above when $a(\iota)=1$ or $b(\iota)=1$. The amounts of computation performed by samplers in general are smaller than randomizable samplers. Using samplers instead of randomizable samplers for computations when $a(\iota)=1$ or $b(\iota)=1$ can reduce the amount of computation by the proxy computing system. The following description will focus on differences from the seventh and eighth embodiments and repeated description of commonalities with the seventh and eighth embodiments, including the decryption control process, will be omitted.

<Configuration>

As illustrated in FIG. 18, a proxy computing system 103 of the ninth embodiment includes a computing apparatus 131 in place of the computing apparatus 121 and capability providing apparatuses 132-1, . . . , 132-Γ in place of the capability providing apparatuses 122-1, . . . , 122-Γ.

As illustrated in FIG. 19, the computing apparatus 131 of the ninth embodiment includes, for example, a natural number storage 11101, a natural number selecting unit 11102, an integer computing unit 11103, an input information providing unit 12104, a first computing unit 12105, a first power computing unit 11106, a first list storage 11107, a second computing unit 12108, a second power computing unit 11109, a second list storage 11110, a determining unit 11111, a final output unit 11112, a controller 11113, and a third computing unit 13109.

As illustrated in FIG. 20, the capability providing apparatus 132-ι of the ninth embodiment includes, for example, a first output information computing unit 12201-ι, a second output information computing unit 12202-ι, a key storage 11204-ι, a controller 11205-ι, and a third output information computing unit 13203-ι.

<Decryption Process>

A decryption process of this embodiment will be described below. Differences from the eighth embodiment will be described.

As illustrated in FIGS. 25 and 26, the process of the ninth embodiment is the same as the process of the eighth embodiment except that steps S12103 through S12105, S12108, and S12200 through S12203 of the eighth embodiment are replaced with steps S13103 through S13105, S13108, S12200 through S12203, and S13205 through 13209, respectively. The following description will focus on processes at steps S13103 through S13105, S13108, S12200 through S12203, and S13205 through S13209.

<<Process at Step S13103>>

The input information providing unit 13104 of the computing apparatus 131 (FIG. 19) generates and outputs first input information $\tau_{\iota,1}$ and second input information $\tau_{\iota,2}$ each of which corresponds to a input ciphertext $\lambda_\iota$ (step S13103 of FIG. 25).

Figure 27:
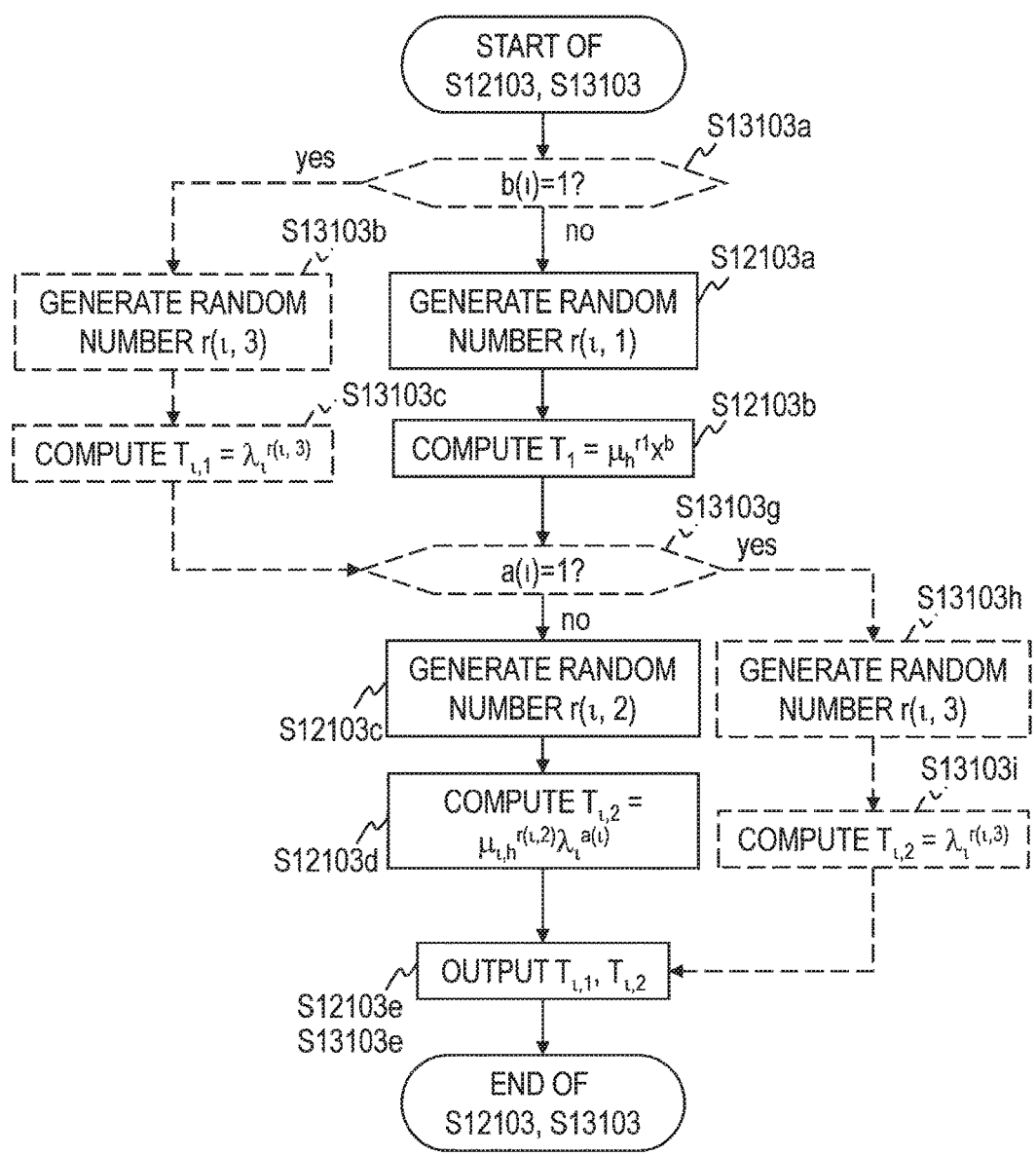
FIG. 27 is a flowchart illustrating a process at step S12103 (S13103)

A process at SI 3103 of this embodiment will be described below with reference to FIG. 27.

The controller 11113 (FIG. 19) controls the input information providing unit 13104 according to natural numbers (a(ι), b(ι)) selected by the natural number selecting unit 11102.

Determination is made by the controller 11113 as to whether b is equal to 1 (step S13103a). If it is determined that b≠1, the processes at steps S12103a and 12103b described above are performed and the process proceeds to step S13103g.

On the other hand, if it is determined at step S13103a that b(ι)=1, the third random number generator 13104e generates a random number r(ι3) that is a natural number greater than or equal to 0 and less than $K_{\iota,H}$. The generated random number r(ι, 3) is sent to the third input information computing unit 13104f and the third computing unit 13109 (step S13103b). The third input information computing unit 13104f uses the input random number r(ι, 3) and the ciphertext $\lambda_\iota$ to compute $\lambda_\iota^{r(\iota,3)}$ and sets it as first input information $\tau_{\iota,1}$ (step S13103c). Then the process proceeds to step S13103g.

At step S13103g, determination is made by the controller 11113 as to whether a(ι) is equal to 1 (step S13103g). If it is determined that a(ι)≠1, the processes at steps S12103c and S12103d described above are performed.

On the other hand, if it is determined at step S13103g that a(ι)=1, the third random number generator 3104e generates a random number r(ι, 3) that is a natural number greater than or equal to 0 and less than $K_{\iota,H}$. The generated random number r(ι, 3) is sent to the third input information computing unit 13104f (step S13103h). The third input information computing unit 13104f uses the input random number r(ι, 3) and the ciphertext $\lambda_\iota$ to compute $\lambda_\iota^{r(\iota,3)}$ and sets it as second input information $\tau_{\iota,2}$ (step S13103i).

The first input information computing unit 12104b, the second input information computing unit 12104d, and the third input information computing unit 13104f output the first input information $\tau_{\iota,1}$ and the second input information $\tau_{\iota,2}$ thus generated along with information on corresponding natural numbers (a(ι), b(ι)) (step S13103e). Note that the first input information $\tau_{\iota,1}$ and the second input information $\tau_{\iota,2}$ in this embodiment are information whose relation with the ciphertext $\lambda_\iota$ is scrambled by using the random numbers r(ι, 1), r(ι, 2), and r(ι, 3), respectively. This enables the computing apparatus 131 to conceal the ciphertext $\lambda_\iota$ from the capability providing apparatus 132-ι.

<<Processes at S12200 Through S12203 and S13205 Through S13209>>

Processes at S12200 through S12203 and S13205 through S13209 of this embodiment will be described below with reference to FIG. 26.

The controller 11205-ι (FIG. 20) controls the first output information computing unit 12201-ι, the second output information computing unit 12202-ι, and the third output information computing unit 13203-ι according to input natural numbers (a(ι), b(ι)).

Under the control of the controller 11205-ι, the first input information $\tau_{\iota,1}=\mu_{\iota,h}^{r(\iota,1)}\lambda_\iota^{b(\iota)}$ when b(ι)≠1 is input in the first output information computing unit 12201-ι of the capability providing apparatus 132-ι (FIG. 20) and the second input information $\tau_{\iota,2}=\mu_{\iota,h}^{r(\iota,2)}\lambda_\iota^{a(\iota)}$ when a(ι)≠1 is input in the second output information computing unit 12202-ι. The first input information $\tau_{\iota,1}=\lambda_\iota^{r(\iota,3)}$ when b(ι)=1 and the second input information $\tau_{\iota,2}=\lambda_\iota^{r(\iota,3)}$ when a(ι)=1 are input in the third output information computing unit 13203-ι (step S13200).

Determination is made by the controller 11113 as to whether b(ι) is equal to 1 (step S13205). If it is determined that b(ι)≠1, the process at step S12201 described above is performed. Then, determination is made by the controller 11113 as to whether a(ι) is equal to 1 (step S13208). If it is determined that a(ι)≠1, the process at step S12202 described above is performed and then the process proceeds to step S13203.

On the other hand, if it is determined at step S13208 that a(ι)=1, the third output information computing unit 13203-ι uses the second input information $\tau_{\iota,2}=\lambda_\iota^{r(\iota,3)}$ to correctly compute $f_\iota(\lambda_\iota^{r(\iota,3)})$ with a probability greater than a certain probability and sets the obtained result of the computation as third output information $z_{\iota,3}$. The result of the computation may or may not be correct. That is, the result of the computation by the third output information computing unit 13203-ι may or may not be $f_\iota(\lambda_\iota^{r(\iota,3)})$ (step S13209). Then the process proceeds to step S13203.

If it is determined at step S13205 that b(ι)=1, the third output information computing unit 13203-ι uses the second input information $\tau_{\iota,1}=\lambda_\iota^{r(\iota,3)}$ to correctly compute $f_\iota(\lambda_\iota^{r(\iota,3)})$ with a probability greater than a certain probability and sets the obtained result of the computation as third output information $z_{\iota,3}$. The result of the computation may or may not be correct. That is, the result of the computation by the third output information computing unit 13203-ι may or may not be $f_\iota(\lambda_\iota^{r(\iota,3)})$ (step S13206).

Then, determination is made by the controller 11113 as to whether a(ι) is equal to 1 (step S13207). If it is determined that a(ι)=1, the process proceeds to step S13203; if it is determined a(ι)≠1, the process proceeds to step S12202.

At step S13203, the first output information computing unit 12201-ι, which has generated the first output information $z_{\iota,1}$, outputs the first output information $z_{\iota,1}$, the second output information computing unit 12202-ι, which has generated the second output information $z_{\iota,2}$, outputs the second output information $z_{\iota,2}$, and the third output information computing unit 13203-ι, which has generated the third output information $z_{\iota,3}$, outputs the third output information $z_{\iota,3}$ (step S13203).

<<Processes at Steps S13104 and S13105>>

Returning to FIG. 25, under the control of the controller 11113, the first output information $z_{\iota,1}$ is input in the first computing unit 12105 of the computing apparatus 131 (FIG. 19), the second output information $z_{\iota,2}$ is input in the second computing unit 12108, and the third output information $z_{\iota,3}$ is input in the third computing unit 13109 (step S13104).

If b(ι)≠1, the first computing unit 12105 performs the process at step S12105 described above to generate $u_\iota$; if b(ι)=1, the third computing unit 13109 computes $z_{\iota,3}^{1/r(\iota,3)}$ and sets the result of the computation as $u_\iota$. The result $u_\iota$ of the computation is sent to the first power computing unit 11106. Here, if b(ι)=1, then $u_\iota = z_{\iota,3}^{1/r(\iota,3)} = f_\iota(\lambda_\iota)x_{\iota,3}$. That is, $z_{\iota,3}^{1/r(\iota,3)}$ serves as a sampler having an error $X_{\iota,3}$ for $f_\iota(\lambda_\iota)$. The reason will be described later (step S13105).

<<Process at Step S13108>>

If a(ι)≠1, the second computing unit 12108 performs the process at step S12108 to generate $v_\iota$; if a(ι)=1, the third computing unit 13109 computes $z_{\iota,3}^{1/r(\iota,3)}$ and sets the result of the computation as $v_\iota$. The result $v_\iota$ of the computation is sent to the second power computing unit 11109. Here, if a(ι)=1, then $v_\iota = z_{\iota,3}^{1/r(\iota,3)} = f_\iota(\lambda_\iota)x_{\iota,3}$. That is, $z_{\iota,3}^{1/r(\iota,3)}$ serves as a sampler having an error $X_{\iota,3}$ for $f_\iota(\lambda_\iota)$. The reason will be described later (step S13108).

Note that if $z_{\iota,3}^{1/r(\iota,3)}$, that is, the radical root of $z_{\iota,3}$, is hard to compute, $u_\iota$ and/or $v_\iota$ may be calculated as follows. The third computing unit 13109 may store each pair of the random number r(ι, 3) and $z_{\iota,3}$ computed on the basis of the random number r(ι, 3) in a storage, not depicted, in sequence as $(\alpha_1, \beta_1), (\alpha_2, \beta_2), \ldots, (\alpha_{m(\iota)}, \beta_{m(\iota)}), \ldots$. Here, m(ι) is a natural number greater than or equal to 1. The third computing unit 13109 may compute $\gamma_1, \gamma_2, \ldots, \gamma_{m(\iota)}$ that satisfies $\gamma_1\alpha_1 + \gamma_2\alpha_2 + \ldots + \gamma_{m(\iota)}\alpha_{m(\iota)} = 1$ if the least common multiple of $\alpha_1, \alpha_2, \ldots, \alpha_{m(\iota)}$ is 1, where $\gamma_1, \gamma_2, \ldots, \gamma_{m(\iota)}$ are integers. The third computing unit 13109 then may use the resulting $\gamma_1, \gamma_2, \ldots, \gamma_{m(\iota)}$ to compute $\Pi_{i=1}^{m(\iota)} \beta_i^{\gamma i} = \beta_1^{\gamma 1} \beta_2^{\gamma 2} \ldots \beta_{m(\iota)}^{\gamma m(\iota)}$ and may set the results of the computation as $u_\iota$ and/or $v_\iota$. Note that when a notation $\alpha^{\beta\gamma}$ is used herein in this way, βγ represents $\beta_\gamma$, namely β with subscript γ, where α is a first letter, β is a second letter, and γ is a number.

<<Reason why $z_{\iota,3}^{1/r(\iota,3)}$ Serves as a Sampler Having an Error $X_{\iota,3}$ for $f_\iota(\lambda_\iota)$>>

Let R and R' be random numbers and $B(\lambda^R)$ be the result of computation performed by the capability providing apparatus 132-ι by using $\lambda^R$. That is, let $z = B(x^R)$ be the results of computations returned by the first output information computing unit 12201-ι, the second output information computing unit 12202-ι, and the third output information computing unit 13203-ι to the computing apparatus 131. Furthermore, a random variable X having a value in the group G is defined as $X = B(\lambda^R)^{1/R} f(\lambda)^{-1}$.

Then $z^{1/R} = B(\lambda^R)^{1/R} = Xf(\lambda) = f(\lambda)X$. That is, $z^{1/R}$ serves as a sampler having an error X for $f(\lambda)$.

The expansion of formula given above uses the properties such that $X = B(\lambda^R)^{1/R} f(\lambda^R)^{-1}$ and that $B(\lambda^R)^{1/R} = Xf(\lambda^R)$. The properties are based on the fact that R and R' are random numbers.

Therefore, considering that r(ι, 3) is a random number, $z_{\iota,3}^{1/r(\iota,3)}$ serves as a sampler having an error $X_{\iota,3}$ for $f_\iota(\lambda_\iota)$, likewise.

Tenth Embodiment

A proxy computing system of a tenth embodiment is another example that embodies the first and second randomizable samplers described above. Specifically, the proxy computing system embodies an example of the first and second randomizable samplers in the case where $H_\iota = G_\iota \times G_\iota$ and the decryption function $f_\iota$ is a decryption function of ElGamal encryption, that is, $f_\iota(c_{\iota,1}, c_{\iota,2}) = c_{\iota,1} \cdot c_{\iota,2}^{-s_\iota}$ for a decryption key $s_\iota$ and a ciphertext $\lambda_\iota = (c_{\iota,1}, c_{\iota,2})$. The following description will focus on differences from the seventh embodiment and repeated description of commonalities with the seventh embodiment, including the decryption control process, will be omitted.

As illustrated in FIG. 18, the proxy computing system 104 of the tenth embodiment includes a computing apparatus 141 in place of the computing apparatus 111 and capability providing apparatuses 142-1, ..., 142-Γ in place of the capability providing apparatuses 112-1, ..., 112-Γ.

Figure 23:
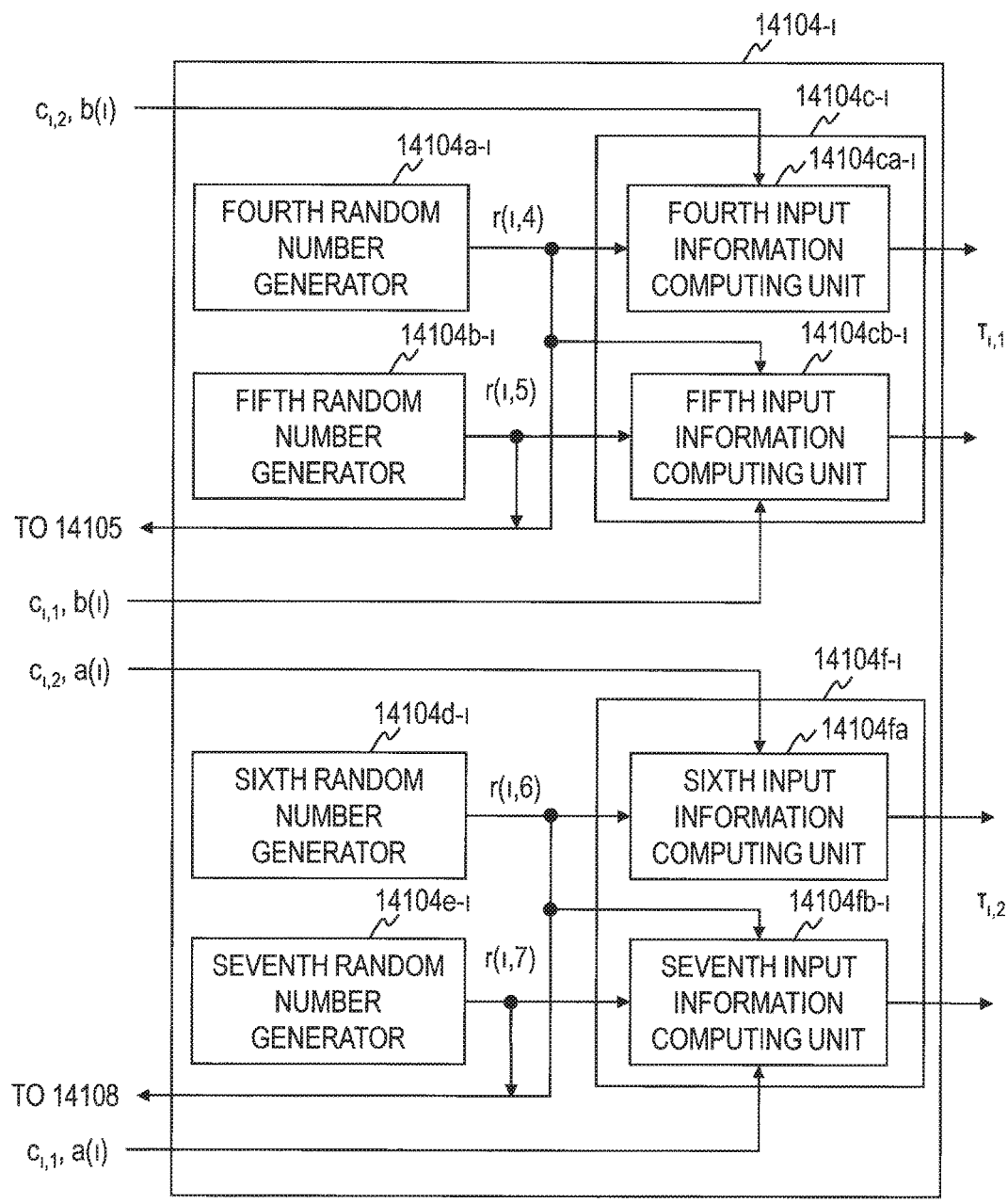
FIG. 23 is a block diagram illustrating a configuration of an input information providing unit of an embodiment.

As illustrated in FIG. 19, the computing apparatus 141 of the tenth embodiment includes, for example, a natural number storage 11101, a natural number selecting unit 11102, an integer computing unit 11103, an input information providing unit 14104, a first computing unit 14105, a first power computing unit 11106, a first list storage 11107, a second computing unit 14108, a second power computing unit 11109, a second list storage 11110, a determining unit 11111, a final output unit 11112, and a controller 11113. As illustrated in FIG. 23, the input information providing unit 14104 of this embodiment includes, for example, a fourth random number generator 14104a, a fifth random number generator 14104b, a first input information computing unit 14104c, a sixth random number generator 14104d, a seventh random number generator 14104e, and a second input information computing unit 14104f. The first input information computing unit 14104c includes, for example, a fourth input information computing unit 14104ca and a fifth input information computing unit 14104cb. The second input information computing unit 14104f includes, for example, a sixth input information computing unit 14104*fa* and a seventh input information computing unit 14104*fb*.

As illustrated in FIG. 20, the capability providing apparatus 142-$\iota$ of the tenth embodiment includes, for example, a first output information computing unit 14201-$\iota$, a second output information computing unit 14202-$\iota$, a key storage 11204-$\iota$, and a controller 11205-$\iota$. If there are capability providing apparatuses 142-($\iota$+1), . . . , 42-$\Gamma$, the capability providing apparatuses 142-($\iota$+1), . . . , 142-$\Gamma$ have the same configuration as the capability providing apparatus 142-$\iota$.

<Decryption Process>

A decryption process of this embodiment will be described below. In the tenth embodiment, it is assumed that a group $H_\iota$ is the direct product group $G_\iota \times G_\iota$ of a group $G_\iota$, the group $G_\iota$ is a cyclic group, a ciphertext $\lambda_\iota = (c_{\iota,1}, c_{\iota,2}) \in H_\iota$, $f_\iota(c_{\iota,1}, c_{\iota,2})$ is a homomorphic function, a generator of the group $G_\iota$ is $\mu_{\iota,g}$, the order of the group $G_\iota$ is $K_{\iota,G}$, a pair of a ciphertext $(V_\iota, W_\iota) \in H_\iota$ and a decrypted text $f_\iota(V_\iota, W_\iota) = Y_\iota \in G_\iota$ decrypted from the ciphertext for the same decryption key $s_\iota$ is preset in the computing apparatus 141 and the capability providing apparatus 142-$\iota$, and the computing apparatus 141 and the capability providing apparatus 142-$\iota$ can use the pair.

As illustrated in FIGS. 25 and 26, the process of the tenth embodiment is the same as the process of the seventh embodiment except that steps S1103 through S1105, S1108, and S11200 through S11203 of the seventh embodiment are replaced with steps S14103 through S14105, S14108, and S14200 through S14203, respectively. In the following, only processes at steps S14103 through S14105, S14108, and S14200 through S14203 will be described.

<<Process at Step S14103>>

Figure 28:
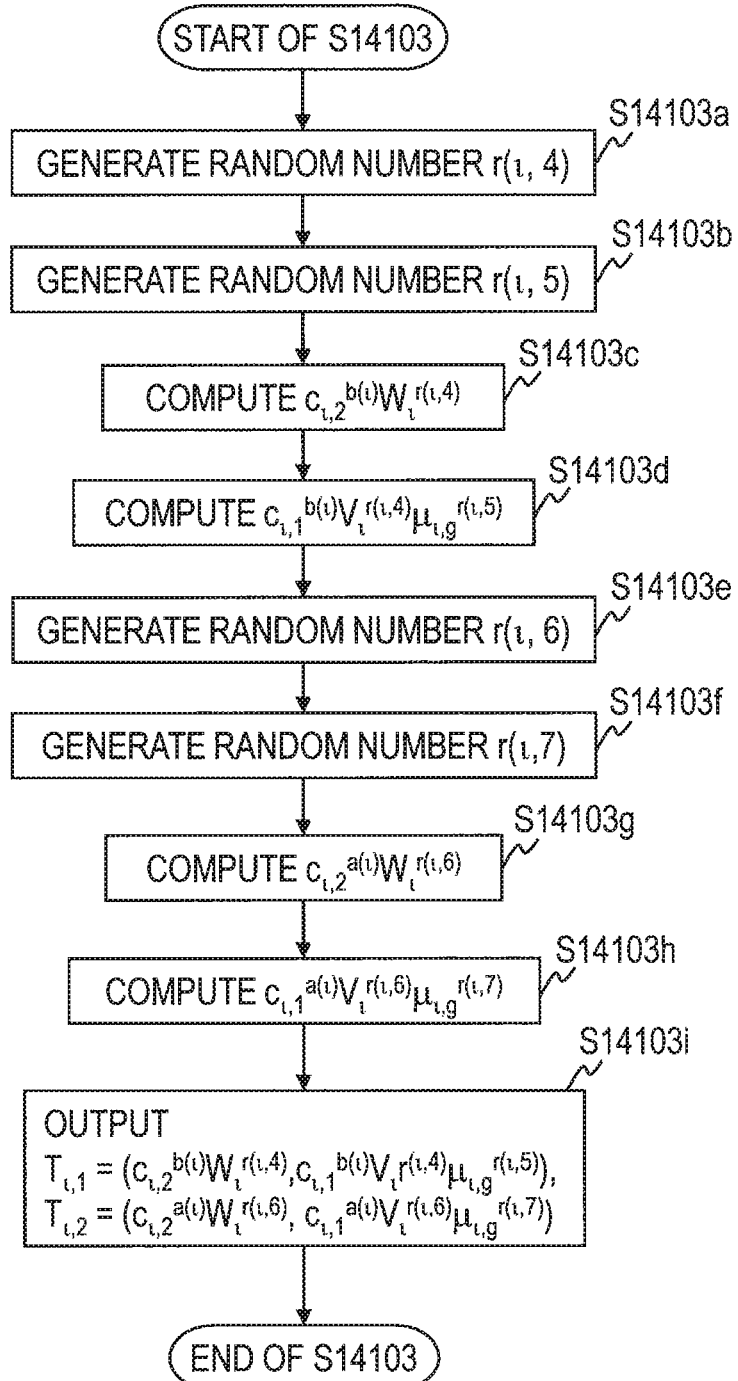
FIG. 28 is a flowchart illustrating a process at step S14103.

The input information providing unit 14104 of the computing apparatus 141 (FIG. 19) generates and outputs first input information $\tau_{\iota,1}$ corresponding to an input ciphertext $\lambda_\iota = (c_{\iota,1}, c_{\iota,2})$ and second input information $\tau_{\iota,2}$ corresponding to the ciphertext $\lambda_\iota = (c_{\iota,1}, c_{\iota,2})$ (step S14103 of FIG. 25). A process at step S14103 of this embodiment will be described below with reference to FIG. 28.

The fourth random number generator 14104*a* (FIG. 23) generates a uniform random number $r(\iota,4)$ that is a natural number greater than or equal to 0 and less than $K_{\iota,G}$. The generated random number $r(\iota, 4)$ is sent to the fourth input information computing unit 14104*ca*, the fifth input information computing unit 14104*cb*, and the first computing unit 14105 (step S14103*a*). The fifth random number generator 14104*b* generates a uniform random number $r(\iota, 5)$ that is a natural number greater than or equal to 0 and less than $K_{\iota,G}$. The generated random number $r(\iota, 5)$ is sent to the fifth input information computing unit 14104*cb* and the first computing unit 14105 (step S14103*b*).

The fourth input information computing unit 14104*ca* uses a natural number $b(\iota)$ selected by the natural number selecting unit 11102, $c_{\iota,2}$ included in the ciphertext $\lambda_\iota$, and the random number $r(\iota, 4)$ to compute fourth input information $c_{\iota,2}^{b(\iota)} W_\iota^{r(\iota,4)}$ (step S14103*c*). The fifth input information computing unit 14104*cb* uses the natural number $b(\iota)$ selected by the natural number selecting unit 11102, $c_{\iota,1}$ included in the ciphertext $\lambda_\iota$, and random numbers $r(\iota, 4)$ and $r(\iota, 5)$ to compute fifth input information $c_{\iota,1}^{b(\iota)} V_\iota^{r(\iota,4)} \mu_{\iota,g}^{r(\iota,5)}$ (step S14103*d*).

The sixth random number generator 14104*d* generates a uniform random number $r(\iota, 6)$ that is a natural number greater than or equal to 0 and less than $K_{\iota,G}$. The generated random number $r(\iota, 6)$ is sent to the sixth input information computing unit 14104*fa*, the seventh input information computing unit 14104*fb*, and the second computing unit 14108 (step S14103*e*). The seventh random number generator 14104*e* generates a uniform random number $r(\iota 7)$ that is a natural number greater than or equal to 0 and less than $K_{\iota,G}$. The generated random number $r(\iota, 7)$ is sent to the seventh input information computing unit 14104*fb* and the second computing unit 14108 (step S14103*f*).

The sixth input information computing unit 14104*fa* uses a natural number $a(\iota)$ selected by the natural number selecting unit 11102, $c_{\iota,2}$ included in the ciphertext $\lambda_\iota$, and the random number $r(\iota, 6)$ to compute sixth input information $c_{\iota,2}^{a(\iota)} W_\iota^{r(\iota,6)}$ (step S14103*g*). The seventh input information computing unit 14104*fb* uses a natural number $a(\iota)$ selected by the natural number selecting unit 11102, $c_{\iota,1}$ included in the ciphertext $\lambda_\iota$, and the random numbers $r(\iota, 6)$ and $r(\iota, 7)$ to compute seventh input information $c_{\iota,1}^{a(\iota)} V_\iota^{r(\iota,6)} \mu_{\iota,g}^{r(\iota,7)}$ (step S14103*h*).

The first input information computing unit 14104*c* outputs the fourth input information $c_{\iota,2}^{b(\iota)} W_\iota^{r(\iota,4)}$ and the fifth input information $c_{\iota,1}^{b(\iota)} V_\iota^{r(\iota,4)} \mu_{\iota,g}^{r(\iota,5)}$ generated as described above as first input information $\tau_{\iota,1} = (c_{\iota,2}^{b(\iota)} W_\iota^{r(\iota,4)}, c_{\iota,1}^{b(\iota)} V_\iota^{r(\iota,4)} \mu_{\iota,g}^{r(\iota,5)})$. The second input information computing unit 14104*f* outputs the sixth input information $c_{\iota,2}^{a(\iota)} W_\iota^{r(\iota,6)}$ and the seventh input information $c_{\iota,1}^{a(\iota)} V_\iota^{r(\iota,6)} \mu_{\iota,g}^{r(\iota,7)}$ generated as described above as second input information $\tau_{\iota,2} = (c_{\iota,2}^{a(\iota)} W_\iota^{r(\iota,6)}, c_{\iota,1}^{a(\iota)} V_\iota^{r(\iota,6)} \mu_{\iota,g}^{r(\iota,7)})$ (step S14103*i*).

<<Processes at Steps S14200 Through S14203>>

As illustrated in FIG. 26, first, the first input information $\tau_{\iota,1} = (c_{\iota,2}^{b(\iota)} W_\iota^{r(\iota,4)}, c_{\iota,1}^{b(\iota)} V_\iota^{r(\iota,4)} \mu_{\iota,g}^{r(\iota,5)})$ is input in the first output information computing unit 14201-$\iota$ of the capability providing apparatus 142-$\iota$ (FIG. 20) and the second input information $\tau_{\iota,2} = (c_{\iota,2}^{a(\iota)} W_\iota^{r(\iota,6)}, c_{\iota,1}^{a(\iota)} V_\iota^{r(\iota,6)} \mu_{\iota,g}^{r(\iota,7)})$ is input in the second output information computing unit 14202-$\iota$ (step S14200).

The first output information computing unit 14201-$\iota$ uses the first input information $\tau_{\iota,1} = (c_{\iota,2}^{b(\iota)} W_\iota^{r(\iota,4)}, c_{\iota,1}^{b(\iota)} V_\iota^{r(\iota,4)} \mu_{\iota,g}^{r(\iota,5)})$ and the decryption key $s_\iota$ stored in the key storage 11204-$\iota$ to correctly compute $f_\iota(c_{\iota,1}^{b(\iota)} V_\iota^{r(\iota,4)} \mu_{\iota,g}^{r(\iota,5)}, c_{\iota,2}^{b(\iota)} W_\iota^{r(\iota,4)})$ with a probability greater than a certain probability and sets the result of the computation as first output information $z_{\iota,1}$. The result of the computation may or may not be correct. That is, the result of the computation by the first output information computing unit 14201-$\iota$ may or may not be $f_\iota(c_{\iota,1}^{b(\iota)} V_\iota^{r(\iota,4)} \mu_{\iota,g}^{r(\iota,5)}, c_{\iota,2}^{b(\iota)} W_\iota^{r(\iota,4)})$ (step S14201).

The second output information computing unit 14202-$\iota$ can correctly compute $f_\iota(c_{\iota,1}^{a(\iota)} V_\iota^{r(\iota,6)} \mu_{\iota,g}^{r(\iota,7)}, c_{\iota,2}^{a(\iota)} W_\iota^{r(\iota,6)})$ with a probability greater than a certain probability by using the second input information $\tau_{\iota,2} = (c_{\iota,2}^{a(\iota)} W_\iota^{r(\iota,6)}, c_{\iota,1}^{a(\iota)} V_\iota^{r(\iota,6)} \mu_{\iota,g}^{r(\iota,7)})$ and the decryption key $s_\iota$ stored in the key storage 11204-$\iota$ and provides the result of the computation as second input information $z_{\iota,2}$. The result of the computation may or may not be correct. That is, the result of the computation by the second output information computing unit 14202-$\iota$ may or may not be $f_\iota(c_{\iota,1}^{a(\iota)} V_\iota^{r(\iota,6)} \mu_{\iota,g}^{r(\iota,7)}, c_{\iota,2}^{a(\iota)} W_\iota^{r(\iota,6)})$ (step S14202).

The first output information computing unit 14201-$\iota$ outputs the first output information $z_{\iota,1}$ and the second output information computing unit 14202-$\iota$ outputs the second output information $z_{\iota,2}$ (step S14203).

<<Processes at Steps S14104 and S14105>>

Returning to FIG. 25, the first output information $z_{\iota,1}$ is input in the first computing unit 14105 of the computing apparatus 141 (FIG. 19) and the second output information $z_{\iota,2}$ is input in the second computing unit 14108 (step S14104).

The first computing unit 14105 uses the input first output information $z_{\iota,1}$ and the random numbers $r(\iota, 4)$ and $r(\iota, 5)$ to compute $z_{\iota,1} Y_\iota^{-r(\iota,4)} \mu_{\iota,g}^{-r(\iota,5)}$ and sets the result of the computation as $u_\iota$ (step S14105). The result $u_\iota$ of the computation is sent to the first power computing unit 11106. Here, $u_\iota = z_{\iota,1} Y_\iota^{-r(\iota,4)} \mu_{\iota,g}^{-r(\iota,5)} = f_\iota(c_{\iota,1}, c_{\iota,2})^{b(\iota)} x_{\iota,1}$. That is, $z_{\iota,1} Y_\iota^{-r(\iota,4)} \mu_{\iota,g}^{-r(\iota,5)}$ is an output of a randomizable sampler having an error $X_{\iota,1}$ for $f_\iota(c_{\iota,1}, c_{\iota,2})$. The reason will be described later.

<<Process at Step S14108>>

The second computing unit 14108 uses the input second output information $z_{\iota,2}$ and the random numbers $r(\iota, 6)$ and $r(\iota, 7)$ to compute $z_{\iota,2} Y_\iota^{-r(\iota,6)} \mu_{\iota,g}^{-r(\iota,7)}$ and sets the result of the computation as $v_\iota$. The result $v_\iota$ of the computation is sent to the second power computing unit 11109. Here, $v_\iota = z_{\iota,2} Y_\iota^{-r(\iota,6)} \mu_{\iota,g}^{-r(\iota,7)} = f_\iota(c_{\iota,1}, c_{\iota,2})^{a(\iota)} x_{\iota,2}$. That is, $z_{\iota,2} Y_\iota^{-r(\iota,6)} \mu_{\iota,g}^{-r(\iota,7)}$ is an output of a randomizable sampler having an error $X_{\iota,2}$ for $f_\iota(c_{\iota,1}, c_{\iota,2})$. The reason will be described later.

<<Reason why $z_{\iota,1} Y^{-r(\iota,4)} \mu_{\iota,g}^{-r(\iota,5)}$ and $z_{\iota,2} Y_\iota^{-r(\iota,6)} \mu_{\iota,g}^{-r(\iota,7)}$ are Outputs of Randomizable Samplers Having Errors $X_{\iota,1}$ and $X_{\iota,2}$, Respectively, for $(c_{\iota,1}, c_{\iota,2})$>>

Let c be a natural number, $R_1$, $R_2$, $R_1'$ and $R_2'$ be random numbers, and $B(c_1{}^c V^{R1} \mu_g^{R2}, c_2{}^c W^{R1})$ be the result of computation performed by the capability providing apparatus 142-ι by using $c_1{}^c V^{R1} \mu_g^{R2}$ and $c_2{}^c W^{R1}$. That is, the first output information computing unit 14201-ι and the second output information computing unit 14202-ι return $z = B(c_1{}^c V^{R1} \mu_g^{R2}, c_2{}^c W^{R1})$ as the results of computations to the computing apparatus 141. A random variable X having a value in a group G is defined as $X = B(V^{R1'} \mu_g^{R2'}, W^{R1'}) f (V^{R1'} \mu_g^{R2'}, W^{R1'})^{-1}$.

Then, $zY^{-R1} \mu_g^{-R2} = B(c_1{}^c V^{R1} \mu_g^{R2}, c_2{}^c W^{R1}) Y^{-R1} \mu_g^{-R2} = Xf (c_1{}^c V^{R1} \mu_g^{R2}, c_2{}^c W^{R1}) Y^{-R1} \mu_g^{-R2} = Xf(c_1, c_2)^c f(V, W)^{R1} f(\mu_g, e_g)^{R2} Y^{-R1} \mu_g^{-R2} = Xf(c_1, c_2)^c Y^{R1} \mu_g^{R2} Y^{-R1} \mu_g^{-R2} = f(c_1, c_2)^c X$. That is, $zY^{-R1} \mu_g^{-R2}$ is an output of a randomizable sampler having an error X for f(x). Note that $e_g$ is an identity element of the group G.

The expansion of formula given above uses the properties such that $X = B(V^{R1'} \mu_g^{R2'}, W^{R1'}) f(V^{R1'} \mu_g^{R2'}, W^{R1'})^{-1} = B(c_1{}^c V^{R1} \mu_g^{R2}, c_2{}^c W^{R1}) f(c_1{}^c V^{R1} \mu_g^{R2}, c_2{}^c W^{R1})$ and that $B(c_1{}^c V^{R1} \mu_g^{R2}, c_2{}^c W^{R1}) = Xf(c_1{}^c V^{R1} \mu_g^{R2}, c_2{}^c W^{R1})$. The properties are based on the fact that $R_1$, $R_2$, $R_1'$ and $R_2'$ are random numbers.

Therefore, considering that $a(\iota)$ and $b(\iota)$ are natural numbers and $r(\iota, 4)$, $r(\iota, 5)$, $r(\iota, 6)$ and $r(\iota, 7)$ are random numbers, $z_{\iota,1} Y_\iota^{-r(\iota,4)} \mu_{\iota,g}^{-r(\iota,5)}$ and $z_{\iota,2} Y_\iota^{-r(\iota,6)} \mu_{\iota,g}^{-r(\iota,7)}$ are outputs of randomizable samplers having errors $X_{\iota,1}$ and $X_{\iota,2}$, respectively, for $f_\iota(c_{\iota,1}, c_{\iota,2})$.

Eleventh Embodiment

In the seventh to tenth embodiments described above, a plurality of pairs $(a(\iota), b(\iota))$ of natural numbers $a(\iota)$ and $b(\iota)$ that are relatively prime to each other are stored in the natural number storage 11101 of the computing apparatus and these pairs $(a(\iota), b(\iota))$ are used to perform processes. However, one of $a(\iota)$ and $b(\iota)$ may be a constant. For example, $a(\iota)$ may be fixed at 1 or $b(\iota)$ may be fixed at 1. Which of natural number $a(\iota)$ and $b(\iota)$ is a constant may be varied depending on ι. In other words, one of the first randomizable sampler and the second randomizable sampler may be replaced with a sampler. If one of $a(\iota)$ and $b(\iota)$ is a constant, the need for the process for selecting the constant $a(\iota)$ or $b(\iota)$ is eliminated, the constant $a(\iota)$ or $b(\iota)$ is not input in the processing units and the processing units can treat it as a constant to perform computations. If $a(\iota)$ or $b(\iota)$ set as a constant is equal to 1, $f_\iota(\lambda_\iota) = u_\iota^{b(\iota)} v_\iota^{a'(\iota)}$ can be obtained as $f_\iota(\lambda_\iota) = v_\iota$ or $f_\iota(\lambda_\iota) = u_\iota$ without using $a'(\iota)$ or $b'(\iota)$.

An eleventh embodiment is an example of such a variation, in which $b(\iota)$ is fixed at 1 and the second randomizable sampler is replaced with a sampler. The following description will focus on differences from the seventh embodiment and description of commonalities with the seventh embodiment, including the decryption control process, will be omitted. Specific examples of the first randomizable sampler and the sampler are similar to those described in the eighth to tenth embodiments and therefore description of the first randomizable sampler and the sampler will be omitted.

<Configuration>

As illustrated in FIG. 18, a proxy computing system 105 of the eleventh embodiment includes a computing apparatus 151 in place of the computing apparatus 111 of the seventh embodiment and capability providing apparatuses 152-1, . . . , 152-Γ in place of the capability providing apparatuses 112-1, . . . , 12-Γ.

Figure 29:
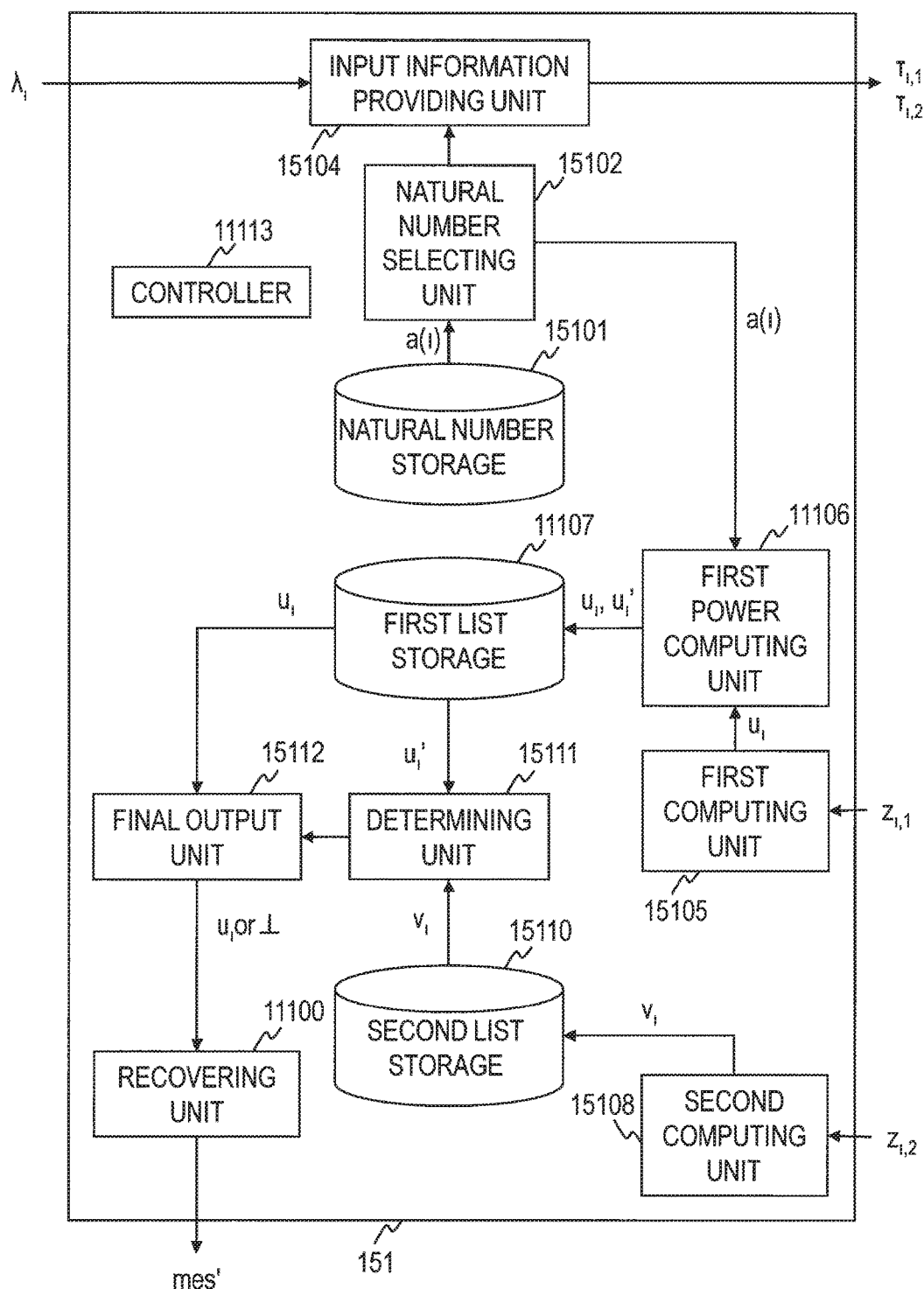
FIG. 29 is a block diagram illustrating a configuration of a computing apparatus of an embodiment.

As illustrated in FIG. 29, the computing apparatus 151 of the eleventh embodiment includes, for example, a natural number storage 15101, a natural number selecting unit 15102, an input information providing unit 15104, a first computing unit 15105, a first power computing unit 11106, a first list storage 11107, a second computing unit 15108, a second list storage 15110, a determining unit 15111, a final output unit 15112, and a controller 11113.

As illustrated in FIG. 20, the capability providing apparatus 152-ι of the eleventh embodiment includes, for example, a first output information computing unit 15201-ι, a second output information computing unit 15202-ι, a key storage 11204-ι, and a controller 11205-ι. If there are capability providing apparatuses 152-(ι+1), . . . , 52-Γ, the capability providing apparatuses 152-(ι+1), . . . , 52-Γ have the same configuration as the capability providing apparatus 152-ι.

<Decryption Process>

A decryption process of this embodiment will be described below. For the decryption process, let $G_\iota$ and $H_\iota$ be groups (for example commutative groups), $f_\iota(\lambda_\iota)$ be a decryption function for decrypting a ciphertext $\lambda_\iota$, which is an element of the group $H_\iota$, with a particular decryption key $s_\iota$ to obtain an element of the group $G_\iota$, generators of the groups $G_\iota$ and $H_\iota$ be $\mu_{\iota,g}$ and $\mu_{\iota,h}$, respectively, $X_{\iota,1}$ and $X_{\iota,2}$ be random variables having values in the group $G_\iota$, $x_{\iota,1}$ be a realization of the random variable $X_{\iota,1}$, and $x_{\iota,2}$ be a realization of the random variable $X_{\iota,2}$. It is assumed here that a plurality of natural numbers $a(\iota)$ are stored in the natural number storage 15101 of the computing apparatus 151.

Figure 30:
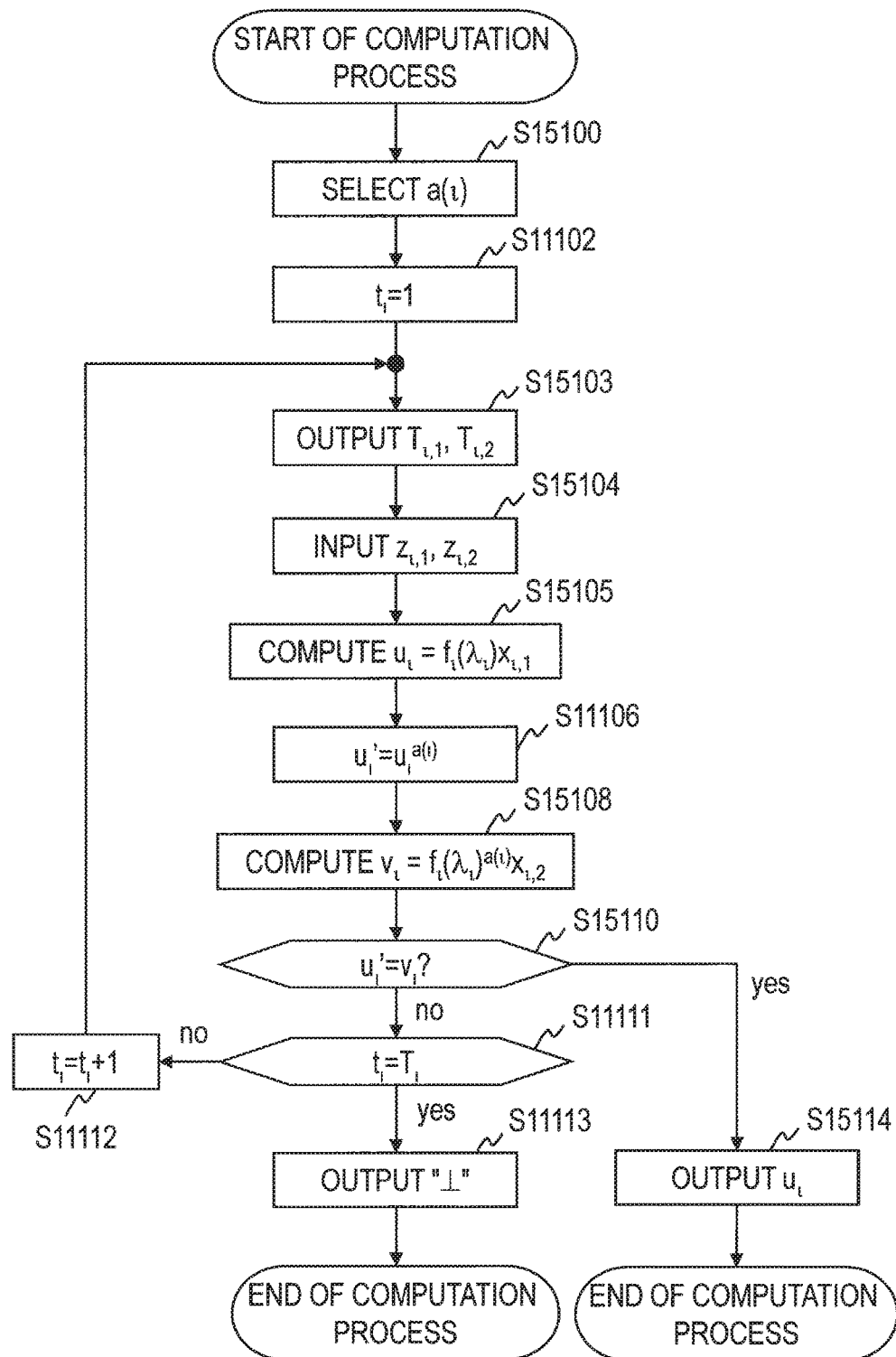
FIG. 30 is a flowchart illustrating a decryption process of an embodiment.

As illustrated in FIG. 30, first, the natural number selecting unit 15102 of the computing apparatus 151 (FIG. 29) randomly reads one natural number $a(\iota)$ from among the plurality of natural numbers $a(\iota)$ stored in the natural number storage 15101. Information on the read natural number $a(\iota)$ is sent to the input information providing unit 15104 and the first power computing unit 11106 (step S15100).

The controller 11113 sets $t_\iota = 1$ (step S11102).

The input information providing unit 15104 generates and outputs first input information $\sigma_{\iota,1}$ and second input information $\tau_{\iota,2}$ each of which corresponds to the input ciphertext $\lambda_\iota$. Preferably, the first input information $\tau_{\iota,1}$ the ciphertext $\lambda_{\iota,2}$ is scrambled. This enables the computing apparatus 151 to conceal the ciphertext $\lambda_\iota$ from the capability providing apparatus 152-ι. Preferably, the second input information $\tau_{\iota,2}$ of this embodiment further corresponds to the natural number $a(\iota)$ selected by the natural number selecting unit 15102. This enables the computing apparatus 151 to evaluate the decryption capability provided by the capability providing apparatus 152-ι with a high degree of accuracy (step S15103). A specific example of the pair of the first input information $\tau_{\iota,1}$ and the second input information $\tau_{\iota,2}$ is a pair of first input information $\tau_{\iota,1}$ and the second input information $\tau_{\iota,2}$ of any of the eighth to tenth embodiments when $b(\iota)=1$.

As illustrated in FIG. 26, the first input information $\tau_{\iota,1}$ is input in the first output information computing unit 15201-$\iota$ of the capability providing apparatus 152-$\iota$ (FIG. 20) and the second input information $\tau_{\iota,2}$ is input in the second output information computing unit 15202-$\iota$ (step S15200).

The first output information computing unit 15201-$\iota$ uses the first input information $\tau_{\iota,1}$ and the decryption key $s_\iota$ stored in the key storage 11204-$\iota$ to correctly compute $f_\iota(\tau_{\iota,1})$ with a probability greater than a certain probability and sets the result of the computation as first output information $z_{\iota,1}$ (step S15201). The second output information computing unit 15202-$\iota$ uses the second input information $\tau_{\iota,2}$ and the decryption key $s_\iota$ stored in the key storage 11204-$\iota$ to correctly compute $f_\iota(\tau_{\iota,2})$ with a probability greater than a certain probability and sets the result of the computation as second output information $z_{\iota,2}$ (step S15202). That is, the first output information computing unit 15201-$\iota$ and the second output information computing unit 15202-$\iota$ output computation results that have an intentional or unintentional error. In other words, the result of the computation by the first output information computing unit 15201-$\iota$ may or may not be $f_\iota(\tau_{\iota,1})$ and the result of the computation by the second output information computing unit 15202-$\iota$ may or may not be $f_\iota(\tau_{\iota,2})$. A specific example of the pair of the first output information $z_{\iota,1}$ and the second output information $z_{\iota,2}$ is a pair of first output information $z_{\iota,1}$ and the second output information $z_{\iota,2}$ of any of the eighth to tenth embodiments when $b(\iota)=1$.

The first output information computing unit 15201-$\iota$ outputs the first output information $z_{\iota,1}$ and the second output information computing unit 15202-$\iota$ outputs the second output information $z_{\iota,2}$ (step S15203).

Returning to FIG. 30, the first output information $z_{\iota,1}$ is input in the first computing unit 15105 of the computing apparatus 151 (FIG. 29) and the second output information $z_{\iota,2}$ is input in the second computing unit 15108. The first output information $z_{\iota,1}$ and the second output information $z_{\iota,2}$ are equivalent to the decryption capability provided by the capability providing apparatus 152-$\iota$ to the computing apparatus 151 (step S15104).

The first computing unit 15105 generates a computation result $u_\iota = f_\iota(\lambda_\iota)x_{\iota,1}$ from the first output information $z_{\iota,1}$. A specific example of the computation result $u_\iota$ is a result $u_\iota$ of computation of any of the eighth to tenth embodiments when $b(\iota)=1$. The computation result $u_\iota$ is sent to the first power computing unit 11106 (step S15105).

The first power computing unit 11106 computes $u_\iota' = u_\iota^{a(\iota)}$. The pair of the result $u_\iota$ of the computation and $u_\iota'$ computed on the basis of the result of the computation, $(u_\iota, u_\iota')$, is stored in the first list storage 11107 (step S11106).

The second computing unit 15108 generates a computation result $v_\iota = f_\iota(\lambda_\iota)^{a(\iota)} x_{\iota,2}$ from the second output information $z_{\iota,2}$. A specific example of the result $v_\iota$ of the computation is a result $v_\iota$ of the computation in any of the eighth to tenth embodiments. The result $v_\iota$ of the computation is stored in the second list storage 15110 (step S15108).

The determining unit 15111 determines whether or not there is one that satisfies $u_\iota' = v_\iota$ among the pairs $(u_\iota, u_\iota')$ stored in the first list storage 11107 and $v_\iota$ stored in the second list storage 15110 (step S5110). If there is one that satisfies $u_\iota' = v_\iota$, the process proceeds to step S15114; if there is not one that satisfies $u_\iota' = v_\iota$, the process proceeds to step S11111.

At step S11111, the controller 11113 determines whether or not $t_\iota = T_\iota$ (step S11111). Here, $T_\iota$ is a predetermined natural number. If $t_\iota = T_\iota$, the final output unit 15112 outputs information indicating that the computation is impossible, for example, the symbol "$\perp$" (step S11113), then the process ends. If not $t_\iota = T_\iota$, the controller 11113 increments $t_\iota$ by 1, that is, sets $t_\iota = t_\iota + 1$ (step S11112), then the process returns to step S15103.

At step S15114, the final output unit 15112 outputs $u_\iota$ corresponding to $u_\iota'$ determined to satisfy $u_\iota' = v_\iota$ (step S15114). The obtained $u_\iota$ is equivalent to $u_\iota^{b(\iota)} v_\iota^{a(\iota)}$ in the seventh to tenth embodiments when $b(\iota)=1$. That is, $u_\iota$ thus obtained can be the decryption result $f_\iota(\lambda_\iota)$ resulting from decrypting the ciphertext $\lambda_\iota$ with the particular decryption key $s_\iota$ with a high probability. Therefore, the process described above is repeated multiple times and the value that has most frequently obtained among the values obtained at step S15114 can be chosen as the decryption result $f_\iota(\lambda_\iota)$. As will be described later, $u_\iota = f_\iota(\lambda_\iota)$ can result with an overwhelming probability, depending on settings. In that case, the value obtained at step S15114 can be directly provided as a result of decryption $f_\iota(\lambda_\iota)$. The rest of the process is as described in the seventh embodiment.

<<Reason why Decryption Result $f_\iota(\lambda_\iota)$ can be Obtained>>

The reason why a decryption result $f_\iota(\lambda_\iota)$ can be obtained on the computing apparatus 151 of this embodiment will be described below. For simplicity of notation, $\iota$ will be omitted in the following description. Terms required for the description will be defined first.

Black-Box:

A black-box $F(\tau)$ of $f(\tau)$ is a processing unit that takes an input of $\tau \in H$ and outputs $z \in G$. In this embodiment, each of the first output information computing unit 15201 and the second output information computing unit 15202 is equivalent to the black box $F(\tau)$ for the decryption function $f(\tau)$. A black-box $F(\tau)$ that satisfies $z = f(\tau)$ for an element $\tau \in_U H$ arbitrarily selected from a group H and $z = F(\tau)$ with a probability greater than $\delta$ ($0 < \delta \leq 1$), that is, a black-box $F(\tau)$ for $f(\tau)$ that satisfies $$\Pr[z = f(\tau) | \tau \in_U H, z = F(\tau)] > \delta \qquad (8)$$

is called a $\delta$-reliable black-box $F(\tau)$ for $f(\tau)$. Here, $\delta$ is a positive value and is equivalent to the "certain probability" stated above.

Self-Corrector

A self-corrector $C^F(\lambda)$ is a processing unit that takes an input of $\lambda \in H$, performs computation by using a black-box $F(\tau)$ for $f(\tau)$, and outputs $j \in G \cup \perp$. In this embodiment, the computing apparatus 151 is equivalent to the self-corrector $C^F(\lambda)$.

Almost Self-Corrector:

Assume that a self-corrector $C^F(\lambda)$ that takes an input of $\lambda \in H$ and uses a $\delta$-reliable black-box $F(\tau)$ for $f(\tau)$ to perform computation outputs a correct value $j = f(\lambda)$ with a probability sufficiently greater than the provability with which the self-corrector $CF(\lambda)$ outputs an incorrect value $j \neq f(\lambda)$. That is, assume that a self-corrector $C^F(\lambda)$ satisfies $$\Pr[j = f(\lambda) | j = C^F(\lambda), j \neq \perp] > \Pr[j \neq f(\lambda) | j = C^F(\lambda), j \neq \perp] + \Delta \qquad (9)$$

Here, $\Delta$ is a certain positive value ($0 < \Delta < 1$). If this is the case, the self-corrector $C^F(\lambda)$ is called an almost self-corrector. For example, for a certain positive value $\Delta'(0 < \Delta' < 1)$, if a self-corrector $C^F(\lambda)$ satisfies $$\Pr[j=f(\lambda)|j=C^F(\lambda)]>(\frac{1}{3})+\Delta'$$

$$\Pr[j=\perp|j=C^F(\lambda)]<\frac{1}{3}$$

$$\Pr[j\neq f(\lambda) \text{ and } j\neq\perp|j=C^F(\lambda)]<\frac{1}{3},$$

then the self-corrector $C^F(\lambda)$ is an almost self-corrector. Examples of $\Delta'$ include $\Delta'=\frac{1}{12}$ and $\Delta'=\frac{1}{3}$.

Robust Self-Corrector:

Assume that a self-corrector $C^F(\lambda)$ that takes an input of $\lambda \in H$ and uses a $\delta$-reliable black-box $F(\tau)$ for $f(\tau)$ outputs a correct value $j=f(\lambda)$ or $j=\perp$ with an overwhelming probability. That is, assume that for a negligible error $\xi$ ($0\leq\xi<1$), a self-corrector $C^F(\lambda)$ satisfies $$\Pr[j=f(\lambda) \text{ or } j=\perp|j=C^F(\lambda)]>1-\xi \quad (10)$$

If this is the case, the self-corrector $C^F(\lambda)$ is called a robust self-corrector. An example of the negligible error $\xi$ is a function vale $\xi(k)$ of a security parameter $k$. An example of the function value $\xi(k)$ is a function value $\xi(k)$ such that $\{\xi(k)p(k)\}$ converges to 0 for a sufficiently large $k$, where $p(k)$ is an arbitrary polynomial. Specific examples of the function value $\xi(k)$ include $\xi(k)=2^{-k}$ and $\xi(k)=2^{-\sqrt{k}}$.

A robust self-corrector can be constructed from an almost self-corrector. Specifically, a robust self-corrector can be constructed by executing an almost self-corrector multiple times for the same $\lambda$ and selecting the most frequently output value, except $\perp$, as $j$. For example, an almost self-corrector is executed $O(\log(1/\xi))$ times for the same $\lambda$ and the value most frequently output is selected as $j$, thereby a robust self-corrector can be constructed. Here, $O(\cdot)$ represents O notation.

Pseudo-Free Action:

An Upper Bound of the Probability $$\Pr[\alpha^a=\beta \text{ and } \alpha\neq e_g|a\in_U\Omega,\alpha\in X_1,\beta\in X_2] \quad (11)$$

of satisfying $\alpha^a=\beta$ for all possible $X_1$ and $X_2$ is called a pseudo-free indicator of a pair $(G, \Omega)$ and is represented as $P(G, \Omega)$, where $G$ is a group, $\Omega$ is a set of natural numbers $\Omega=\{0, \ldots, M\}$ (M is a natural number greater than or equal to 1), $\alpha$ and $\beta$ are realizations $\alpha \in X_1$ ($\alpha \neq e_g$) and $\beta \in X_2$ of random variables $X_1$ and $X_2$ that have values in the group $G$, and $a \in \Omega$. If a certain negligible function $\zeta(k)$ exists and $$P(G,\Omega)<\zeta(k) \quad (12),$$

then a computation defined by the pair $(G, \Omega)$ is called a pseudo-free action. Note that "$\alpha^a$" means that a computation defined at the group $G$ is applied a times to $\alpha$. An example of the negligible function $\zeta(k)$ is such that $\{\zeta(k)p(k)\}$ converges to 0 for a sufficiently large $k$, where $p(k)$ is an arbitrary polynomial. Specific examples of the function $\zeta(k)$ include $\zeta(k)=2^{-k}$ and $\zeta(k)=2^{-\sqrt{k}}$. For example, if the probability of Formula (11) is less than $O(2^{-k})$ for a security parameter $k$, a computation defined by the pair $(G, \Omega)$ is a pseudo-free action. For example, if the number of the elements $|\Omega \cdot \alpha|$ of a set $\Omega \cdot \alpha = \{a(\alpha)|a \in \Omega\}$ exceeds $2^k$ for any $\forall \alpha \in G$ where $\alpha \neq e_g$, a computation defined by the pair $(G, \Omega)$ is a pseudo-free action. Note that $a(\alpha)$ represents the result of a given computation on a and $\alpha$. There are many such examples. For example, if the group $G$ is a residue group $Z/pZ$ modulo prime $p$, the prime $p$ is the order of $2^k$, the set $\Omega=\{0, \ldots, p-2\}$, $a(\alpha)$ is $\alpha^a \in Z/pZ$, and $\alpha \neq e_g$, then $\Omega \cdot \alpha = \{\alpha^a|a=0, \ldots, p-2\} = (e_g, \alpha^1, \ldots, \alpha^{p-2})$ and $|\Omega \cdot \alpha|=p-1$. If a certain constant $C$ exists and $k$ is sufficiently large, $|\Omega \cdot \alpha|>C2^k$ is satisfied because the prime $p$ is the order of $2^k$. Here, the probability of Formula (11) is less than $C^{-1}2^{-k}$ and a computation defined by such pair $(G, \Omega)$ is a pseudo-free action.

$\delta^\gamma$-Reliable Randomizable Sampler:

A randomizable sampler that whenever a natural number a is given, uses the $\delta$-reliable black-box $F(\tau)$ for $f(\tau)$ and returns $w^a x'$ corresponding to a sample $x'$ that depends on a random variable $X$ for $w \in G$ and in which the probability that $w^a x'=w^a$ is greater than $\delta^\gamma$ ($\gamma$ is a positive constant), that is, $$\Pr[w^a x'=w^a]>\delta^\gamma \quad (13)$$

is satisfied, is called a $\delta^\gamma$-reliable randomizable sampler. The combination of the input information providing unit 15104, the second output information computing unit 15202, and the second computing unit 15108 of this embodiment is a $\delta^\gamma$-reliable randomizable sampler for $w=f(\lambda)$.

The definitions given above will be used to describe the reason why a decryption result $f(\lambda)$ can be obtained by using the computing apparatus 151 of this embodiment.

At step S15110 of this embodiment, determination is made as to whether $u'=v$, that is, whether $u^a=v$. Since the combination of the input information providing unit 15104, the second output information computing unit 15202, and the second computing unit 15108 of this embodiment is a $\delta^\gamma$-reliable randomizable sampler (Formula (13)), $u^a=v$ holds (Yes at step S15110) with an asymptotically large probability if T is greater than a certain value determined by $k$, $\delta$ and $\gamma$. For example, Markov's inequality shows that if $T \geq 4/\delta^\gamma$, the probability that $u^a=v$ holds (Yes at step S15110) is greater than $\frac{1}{2}$.

Since $u=f(\lambda)x_1$ and $v=f(\lambda)^a x_2$ in this embodiment, $x_1^a=x_2$ holds if $u^a=v$ holds. $x_1^a=x_2$ holds if $x_1=x_2=e_g$ or $x \neq e_g$. If $x_1=x_2=e_g$, then $u=f(\lambda)$ and therefore u output at step S15114 is a correct decryption result $f(\lambda)$. On the other hand, if $x_1 \neq e_g$, then $u \neq f(\lambda)$ and therefore u output at step S15114 is not a correct decryption result $f(\lambda)$.

If an computation defined by a pair $(G, \Omega)$ of a group $G$ and a set $\Omega$ to which a natural number a belongs is a pseudo-free action or $T^2 P(G, \Omega)$ is asymptotically small for a pseudo-free index $P(G, \Omega)$, the probability that $x_1 \neq e_g$ (Formula (11)) when $U^a=v$ is asymptotically small. Accordingly, the probability that $x_1=e_g$ when $u^a=v$ is asymptotically large. Therefore, if a computation defined by a pair $(G, \Omega)$ is a pseudo-free action or $T^2 P(G, \Omega)$ is asymptotically small, the probability that an incorrect decryption result $f(\lambda)$ is output when $u^a=v$ is sufficiently smaller than the probability that a correct decryption result $f(\lambda)$ is output when $u^a=v$. In this case, it can be said that the computing apparatus 151 is an almost self-corrector (see Formula (9)). Therefore, a robust self-corrector can be constructed from the computing apparatus 151 as described above and a correct decryption result $f(\lambda)$ can be obtained with an overwhelming probability. If a computation defined by $(G, \Omega)$ is a pseudo-free action, the probability that an incorrect decryption result $f(\lambda)$ is output when $u^a=v$ is also negligible. In that case, the computing apparatus 151 outputs a correct decryption result $f(\lambda)$ or $\perp$ with an overwhelming probability.

Note that "$\eta(k')$ is asymptotically small" means that $k_0$ is determined for an arbitrary constant $\rho$ and the function value $\eta(k')$ for any $k'$ that satisfies $k_0<k'$ for $k_0$ is less than $\rho$. An example of $k'$ is a security parameter $k$.

"$\eta(k')$ is asymptotically large" means that $k_0$ is determined for an arbitrary constant $\rho$ and the function value $1-\eta(k')$ for any $k'$ that satisfies $k_0<k'$ for $k_0$ is less than $\rho$.

Note that the proof given above also proves that "if $u'=v'$ holds, it is highly probable that the first randomizable sampler has correctly computed $u=f(\lambda)^b$ and the second randomizable sampler has correctly computed $v=f(\lambda)^a$ ($x_1$ and $x_2$ are identity elements $e_g$ of the group G)" stated in the seventh embodiment, as can be seen by replacing a with a/b.

<<$\delta^\gamma$-Reliable Randomizable Sampler and Security>>

Consider the following attack.

A black-box $F(\tau)$ or part of the black-box $F(\tau)$ intentionally outputs an invalid z or a value output from the black-box $F(\tau)$ is changed to an invalid z.

$w^a x'$ corresponding to the invalid z is output from the randomizable sampler.

$w^a x'$ corresponding to the invalid z increases the probability with which the self-corrector $C^F(\lambda)$ outputs an incorrect value even though $u^a = v$ holds (Yes at step S15110) in the self-corrector $C^F(\lambda)$.

Such an attack is possible if the probability distribution $D_a = w^a x' w^{-a}$ of an error of $w^a x'$ output from the randomizable sampler for a given natural number a depends on the natural number a. For example, if tampering is made so that v output from the second computing unit 15108 is $f(\lambda)^a x_1^a$, always $u^a = v$ holds regardless of the value of $x_1$. Therefore, it is desirable that the probability distribution $D_a = w^a x' w^{-a}$ of an error of $w^a x'$ output from the randomizable sampler for a given natural number a do not depend on the natural number a.

Alternatively, it is desirable that the randomizable sampler be such that a probability distribution D that has a value in a group G that cannot be distinguished from the probability distribution $D_a = w^a x' w^{-a}$ of an error of $w^a x'$ for any element $a \in {}^\forall \Omega$ of a set $\Omega$ exists (the probability distribution $D_a$ and the probability distribution D are statistically close to each other). Note that the probability distribution D does not depend on a natural number a. That the probability distribution $D_a$ and the probability distribution D cannot be distinguished from each other means that the probability distribution $D_a$ and the probability distribution D cannot be distinguished from each other by a polynomial time algorithm. For example, if $$\Sigma_{g \in G} |\Pr[g \in D] - \Pr[g \in D_a]| < \zeta \quad (14)$$

is satisfied for negligible $\zeta (0 \le \zeta 1)$, the probability distribution $D_a$ and the probability distribution D cannot be distinguished from each other by the polynomial time algorithm. An example of negligible $\zeta$ is a function value $\zeta(k)$ of the security parameter k. An example of the function value $\zeta(k)$ is a function value such that $\{\zeta(k)p(k)\}$ converges to 0 for a sufficiently large k, where $p(k)$ is an arbitrary polynomial. Specific examples of the function $\zeta(k)$ include $\zeta(k) = 2^{-k}$ and $\zeta(k) = 2^{\sqrt{k}}$. These facts also apply to the seventh to tenth embodiments which use natural numbers a and b.

[Variations of Seventh to Eleventh Embodiment]

In the seventh to eleventh embodiments, when the first output information $z_{\iota,1}$ and the second output information $z_{\iota,2}$ are provided to the computing apparatus, the computing apparatus can output $u_\iota^{b'(\iota)} v_\iota^{a'(\iota)}$ with a certain probability. $u_\iota^{b'(\iota)} v_\iota^{a'(\iota)}$ will be the decryption value of the ciphertext $\lambda_\iota$. On the other hand, if neither of the first output information $z_{\iota,1}$ and the second output information $z_{\iota,2}$ is provided to the computing apparatus, the computing apparatus cannot obtain the decryption value of the ciphertext $\lambda_\iota$.

The capability providing apparatus in any of the seventh to eleventh embodiment can control whether or not to output both of the first output information $z_{\iota,1}$ and second output information $z_{\iota,2}$ to control the ciphertext decryption capability of the computing apparatus without providing a decryption key to the computing apparatus.

The present invention is not limited to the embodiments described above. For example, while $\omega$ is an integer greater than or equal to 2 in the embodiments described above, $\omega$ may be 1. That is, a configuration in which only one capability providing apparatus exists may be used. In that case, the computing apparatus does not need to include a recovering unit and may directly output a value output from the final output unit. For example, the system of any of the first to fifth embodiments described above may further include a decryption control apparatus, the decryption control apparatus may output a decryption control instruction for controlling the decryption process of the computing apparatus to the capability providing apparatus, and the capability providing apparatus may control whether or not to output both of first output information $z_1$ and second output information $z_2$ from the first output information computing unit and the second output information computing unit according to the decryption control instruction. For example, the system of the sixth embodiment described above may further include a decryption control apparatus, the decryption control apparatus may output a decryption control instruction for controlling the decryption process of the computing apparatus to the capability providing apparatus, and the capability providing apparatus may control whether or not to output first output information $_M z_1$ and second output information $_M z_2$ from the first output information computing unit and the second output information computing unit according to the decryption control instruction.

Random variables $X_{\iota,1}$, $X_{\iota,2}$ and $X_{\iota,3}$ may or may not be the same.

Each of the first random number generator, the second random number generator, the third random number generator, the fourth random number generator, the fifth random number generator, the sixth random number generator and the seventh random number generator generates uniform random numbers to increase the security of the proxy computing system. However, if the level of security required is not so high, at least some of the first random number generator, second random number generator, the third random number generator, the fourth random number generator, the fifth random number generator, the sixth random number generator and the seventh random number generator may generate random numbers that are not uniform random numbers. While it is desirable from the computational efficiency point of view that random numbers that are natural numbers greater than or equal to 0 and less than $K_{\iota,H}$ or random numbers that are natural numbers greater than or equal to 0 and less than $K_{\iota,G}$ be selected as in the embodiments described above, random numbers that are natural numbers greater than or equal to $K_{\iota,H}$ or $K_{\iota,G}$ may be selected instead.

The process of the capability providing apparatus may be performed multiple times each time the computing apparatus provides first input information $\tau_{\iota,1}$ and second input information $\tau_{\iota,2}$ corresponding to the same $a(\iota)$ and $b(\iota)$ to the capability providing apparatus. This enables the computing apparatus to obtain a plurality of pieces of first output information $z_{\iota,1}$, second output information $z_{\iota,2}$, and third output information $z_{\iota,3}$ each time the computing apparatus provides first input information $\tau_{\iota,1}$, and the second input information $\tau_{\iota,2}$ to the capability providing apparatus. Consequently, the number of exchanges and the amount of communication between the computing apparatus and the capability providing apparatus can be reduced.

The computing apparatus may provide a plurality of pieces of the first input information $\tau_{\iota,1}$ and the second input information $\tau_{\iota,2}$ to the capability providing apparatus at once and may obtain a plurality of pieces of corresponding first output information $z_{\iota,1}$, second output information $z_{\iota,2}$ and third output information $z_{\iota,3}$ at once. This can reduce the number of exchanges between the computing apparatus and the capability providing apparatus.

While ω in the embodiments is a constant, ω may be a variable, provided that a value of ω can be shared in the proxy computing system.

The units of the computing apparatus may exchange data directly or through a memory, which is not depicted. Similarly, the units of the capability providing apparatus may exchange data directly or through a memory, which is not depicted.

Check may be made to see whether $u_t$ and $v_t$ obtained at the first computing unit and the second computing unit of any of the embodiments are elements of the group $G_t$. If they are elements of the group $G_t$, the process described above may be continued; if $u_t$ or $v_t$ is not an element of the group $G_t$, information indicating that the computation is impossible, for example the symbol "⊥", may be output.

Furthermore, the processes described above may be performed not only in time sequence as is written or may be performed in parallel with one another or individually, depending on the throughput of the apparatuses that perform the processes or requirements. A plurality of capability providing apparatus may be configured in a single apparatus. It would be understood that other modifications can be made without departing from the spirit of the present invention.

Twelfth Embodiment

A twelfth embodiment of the present invention will be described. In this embodiment, Φ computing apparatuses (Φ is an integer greater than or equal to 2) shares one capability providing apparatus to perform computations and the capability providing apparatus receives payment for the capability. However, this does not limit the present invention and Φ computing apparatuses may share a plurality of capability providing apparatuses to perform computations.

<Configuration>

Figure 31:
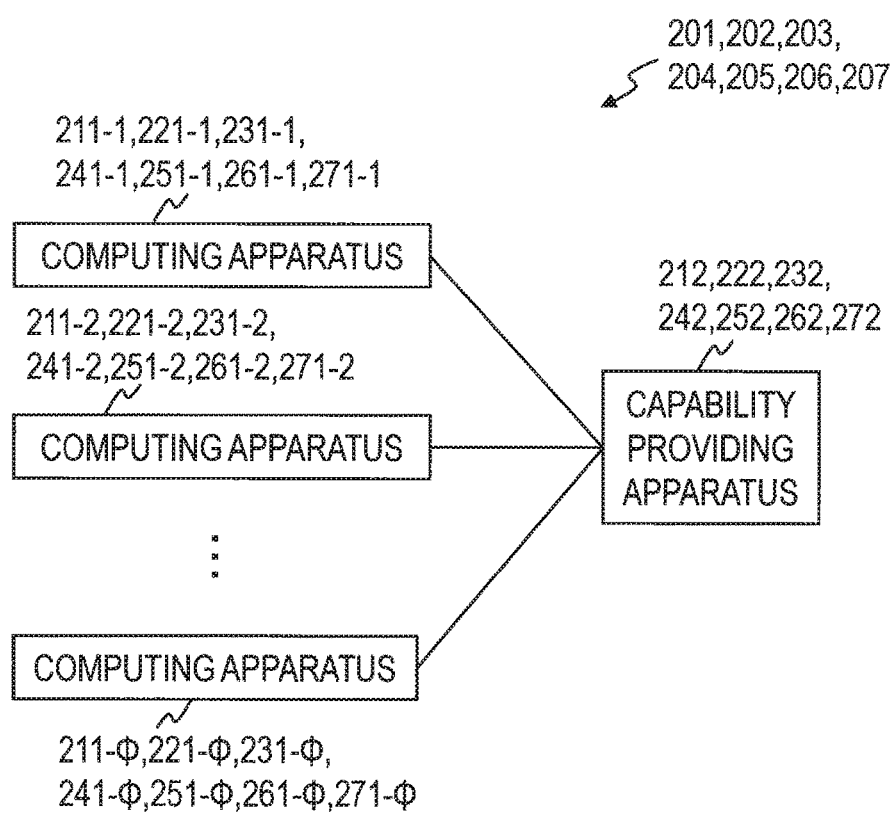
FIG. 31 is a block diagram illustrating a configuration of a proxy computing system of an embodiment.

As illustrated in FIG. 31, a proxy computing system 201 of the twelfth embodiment includes, for example, Φ computing apparatuses 211-φ (φ=1, . . . , Φ) and one capability providing apparatus 212. The apparatuses are configured to be able to exchange data between them. For example, the apparatuses can exchange information through a transmission line, a network, a portable recording medium and other media.

In this embodiment, the capability providing apparatus 212 provides the capability of computing a function $f_\varphi$ that maps elements of a group $H_\varphi$ to elements of a group $G_\varphi$ (the computing capability) to each computing apparatus 211-φ. Each computing apparatus 211-φ pays the capability providing apparatus 212 for the capability. The computing apparatus 211-φ uses the provided capability to compute an element $f_\varphi(x_\varphi)$ of the group $G_\varphi$ that corresponds to an element $x_\varphi$ of the group $H_\varphi$.

Figure 32:
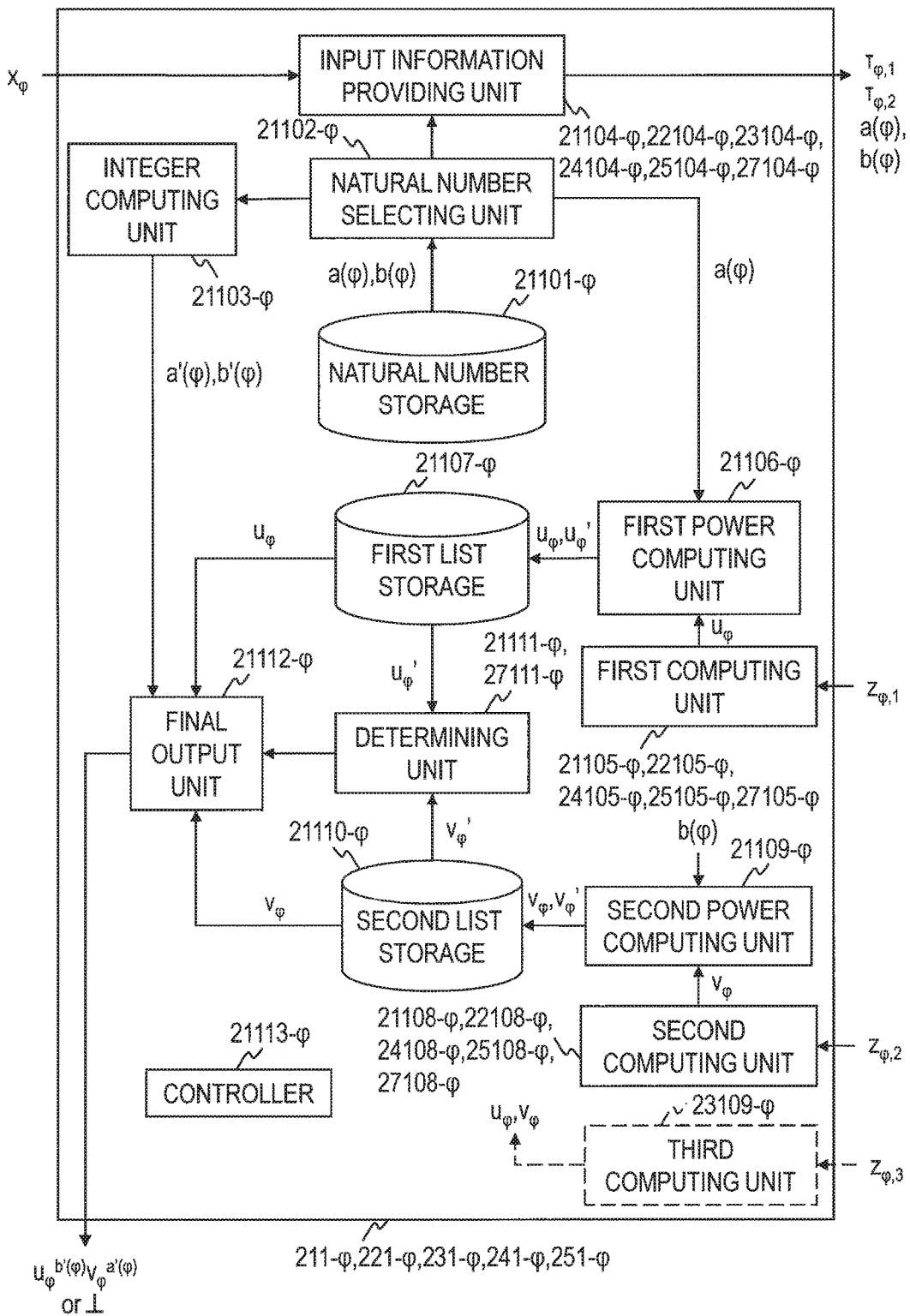
FIG. 32 is a block diagram illustrating a configuration of a computing apparatus of an embodiment.

As illustrated in FIG. 32, the computing apparatus 211-φ of the twelfth embodiment includes, for example, a natural number storage 21101-φ, a natural number selecting unit 21102-φ, an integer computing unit 21103-φ, an input information providing unit 21104-φ, a first computing unit 21105-φ, a first power computing unit 21106-φ, a first list storage 21107-φ, a second computing unit 21108-φ, a second power computing unit 21109-φ, a second list storage 21110-φ, a determining unit 21111-φ, a final output unit 21112-φ, and a controller 21113-φ. The computing apparatus 211-φ performs processes under the control of the controller 21113-φ. Examples of the computing apparatuses 211-φ include devices having computing and memory functions, such as well-known or specialized computers, that include a CPU (central processing unit) and a RAM (random-access memory) in which a special program is loaded, server devices, a gateway devices, card reader-writer apparatuses and mobile phones.

Figure 33:
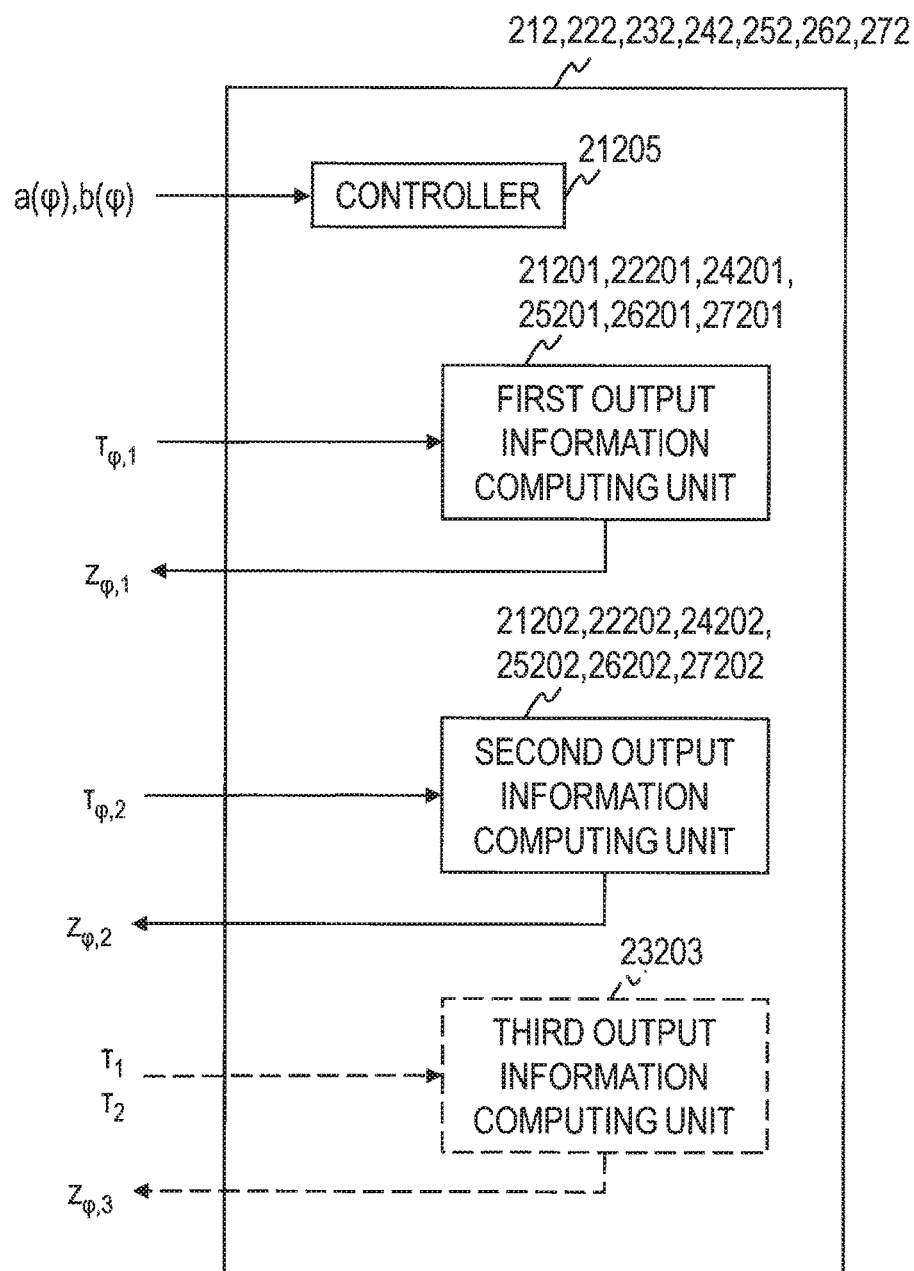
FIG. 33 is a block diagram illustrating a configuration of a capability providing apparatus of an embodiment.

As illustrated in FIG. 33, the capability providing apparatus 212 of the twelfth embodiment includes, for example, a first output information computing unit 21201, a second output information computing unit 21202, and a controller 21205. The capability providing apparatus 212 performs processes under the control of the controller 21205. Examples of the capability providing apparatus 212 include a well-known or specialized computer, a device including computing and memory functions, such as a mobile phone, and a tamper-resistant module such as an IC card and an IC chip, that include a CPU and a RAM in which a special program is loaded.

<Assumptions for Processes>

Let $G_\varphi$, $H_\varphi$ be groups (for example commutative groups), $X_{\varphi,1}$ and $X_{\varphi,2}$ be random variables having values in the group $G_\varphi$, $x_{\varphi,1}$ be a realization of the random variable $X_{\varphi,1}$, $x_{\varphi,2}$ be a realization of the random variable $X_{\varphi,2}$, $f_\varphi$ be a function that maps an element of the group $H_\varphi$ to an element of the group $G_\varphi$, and $a(\varphi)$ and $b(\varphi)$ be natural numbers that are relatively prime to each other. Specific examples of $f_\varphi$ include an encryption function, a decryption function, a re-encryption function, an image processing function, and a speech processing function. $G_\varphi$ may be equal to $H_\varphi$ or $G_\varphi$ may be unequal to $H_\varphi$. All of the groups $G_\varphi$ (φ=1, . . . , Φ) may be the same or at least some groups $G_{\varphi'}$ may differ from the other groups $G_\varphi$, where φ'≠φ. All of the groups $H_\varphi$ (φ=1, . . . , Φ) may be the same or at some groups $H_{\varphi'}$ may differ from the other groups $H_\varphi$, where φ'≠φ. In the following description, computations on the groups $G_\varphi$ and $H_\varphi$ are multiplicatively expressed. $a(\varphi)$ and $b(\varphi)$ are natural numbers that are relatively prime to each other. The term "natural number" refers to an integer greater than or equal to 0. A set whose members are elements $f_\varphi(M_\varphi)^{a(\varphi)b(\varphi)}$ of the group $G_\varphi$ that correspond to elements $M_\varphi$ of the group $H_\varphi$ is referred to as a "class $CL_\varphi(M_\varphi)$ corresponding to elements $M_{\varphi'}$". Here, $CL_\varphi(M_\varphi)$ and $CL_{\varphi'}((M_{\varphi'})$ (φ'≠φ) are classes different from each other. If a function $f_\varphi(M_\varphi)$ is an injective function for an element $M_\varphi$, only one member belongs to the class $CL_\varphi(M_\varphi)$ corresponding to the same element $M_\varphi$ for a pair of $a(\varphi)$ and $b(\varphi)$. If only one member belongs to the class $CL_\varphi(M_\varphi)$ corresponding to the same element $M_\varphi$ for each pair of $a(\varphi)$ and $b(\varphi)$, that two values belong to the class $CL_\varphi(M_\varphi)$ corresponding to the same $M_\varphi$ is equivalent to that the two values are equal to each other. That is, if the function $f_\varphi(M_\varphi)$ is a injective function for the element $M_\varphi$, determination as to whether two values belong to the class $CL_\varphi(M_\varphi)$ corresponding to the same element $M_\varphi$ or not can be made by determining whether the two values are equal to each other or not. On the other hand, if the function $f_\varphi(M_\varphi)$ is not an injective function for the element $M_\varphi$ (for example if the function $f_\varphi$ is an encryption function of probabilistic encryption such as ElGamal encryption), a plurality of members belong to the class $CL_\varphi(M_\varphi)$ corresponding to the same element $M_\varphi$ for the pair of $a(\varphi)$ and $b(\varphi)$ because a plurality of ciphertexts correspond to a pair of a plaintext and an encryption key.

It is assumed here that a plurality of pairs $(a(\varphi), b((\varphi))$ of natural numbers $a(\varphi)$ and $b(\varphi)$ are stored in the natural number storage 21101-φ of each computing apparatus 211-φ (FIG. 32). Let $I_\varphi$ be a set of pairs of relatively prime natural numbers that are less than the order of the group $G_\varphi$. Then it can be considered that pairs $(a(\varphi), b(\varphi))$ of natural numbers a(φ) and b(φ) corresponding to a subset $S_φ$ of $I_φ$ are stored in the natural number storage 21101-φ.

<Processes>

Processes performed by the computing apparatus 211-φ by using the capability providing apparatus 212 will be described. The processes may be performed by any one of the computing apparatuses 211-φ occupying the capability providing apparatus 212 for a certain period of time or may be performed concurrently by a plurality of computing apparatuses 211-φ accessing the capability providing apparatus 212.

An element $x_φ$ of the group $H_φ$ is input in the input information providing unit 21104-φ of a computing apparatus 211-φ (FIG. 32). If the element $x_φ$ has been already input in the input information providing unit 21104-φ, the input operation may be omitted.

Figure 37:
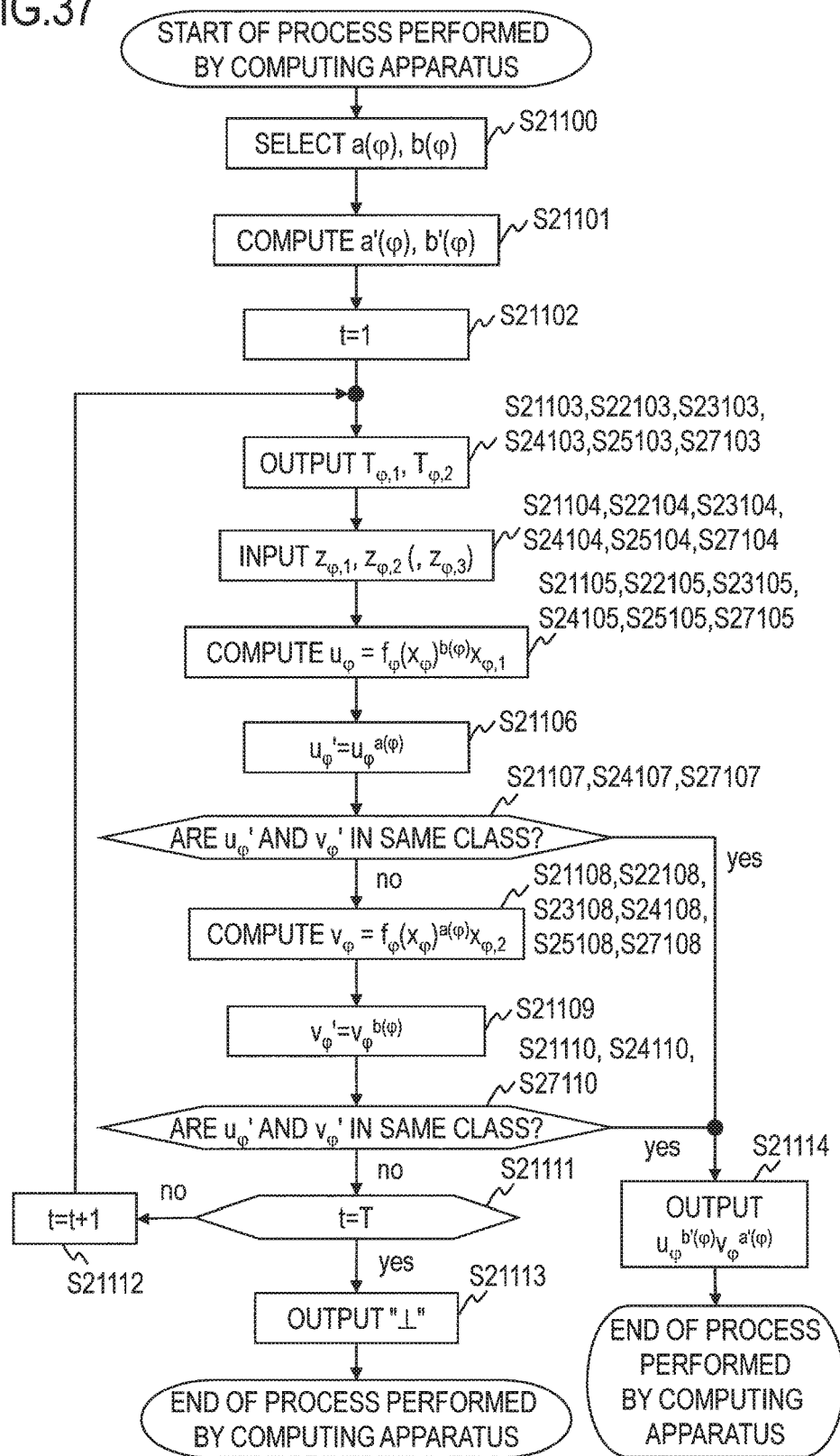
FIG. 37 is a flowchart illustrating a process performed by a computing apparatus of an embodiment.

As illustrated in FIG. 37, the natural number selecting unit 21102-φ of the computing apparatus 211-φ in which the element $x_φ$ is input in the input information providing unit 21104-φ randomly reads one pair of natural numbers (a(φ), b((φ)) from among the plurality of pairs of natural numbers (a(φ), b(φ)) stored in the natural number storage 21101-φ. At least some of information on the read pair of natural numbers (a((φ), b(φ)) is sent to the integer computing unit 21103-φ, the input information providing unit 21104-φ, the first power computing unit 21106-φ and the second power computing unit 21109-φ (step S21100).

The integer computing unit 21103-φ uses the sent pair of natural numbers (a(φ), b(φ)) to computer integers a'(φ) and b'(φ) that satisfy the relation a'(φ)a(φ)+b'(φ)b(φ)=1. Since the natural numbers a(φ) and (φ) are relatively prime to each other, the integers a'(φ) and b'(φ) that satisfy the relation a'(φ)a(φ)+b'(φ)b(φ)=1 definitely exist. Methods for computing such integers are well known. For example, a well-known algorithm such as the extended Euclidean algorithm may be used to compute the integers a'(φ) and b'(φ). Information on the pair of natural numbers (a'(φ), b'(φ)) is sent to the final output unit 21112-φ (step S21101).

The controller 21113-φ sets t=1 (step S21102).

The input information providing unit 21104-φ generates and outputs first input information $τ_{φ,1}$ and second input information $τ_{φ,2}$ each of which corresponds to the input element $x_φ$. Preferably, the first input information $τ_{φ,1}$ and the second input information $τ_{φ,2}$ are information whose relation with the element $x_φ$ is scrambled. This enables the computing apparatus 211-φ to conceal the element $x_φ$ from the capability providing apparatus 212. Preferably, the first input information $τ_{φ,1}$ of this embodiment further corresponds to the natural number b(φ) selected by the natural number selecting unit 21102-φ and the second input information $τ_{φ,2}$ further corresponds to the natural number a(φ) selected by the natural number selecting unit 21102-φ. This enables the computing apparatus 211-φ to evaluate the computation capability provided by the capability providing apparatus 212 with a high degree of accuracy (step S21103).

Figure 38:
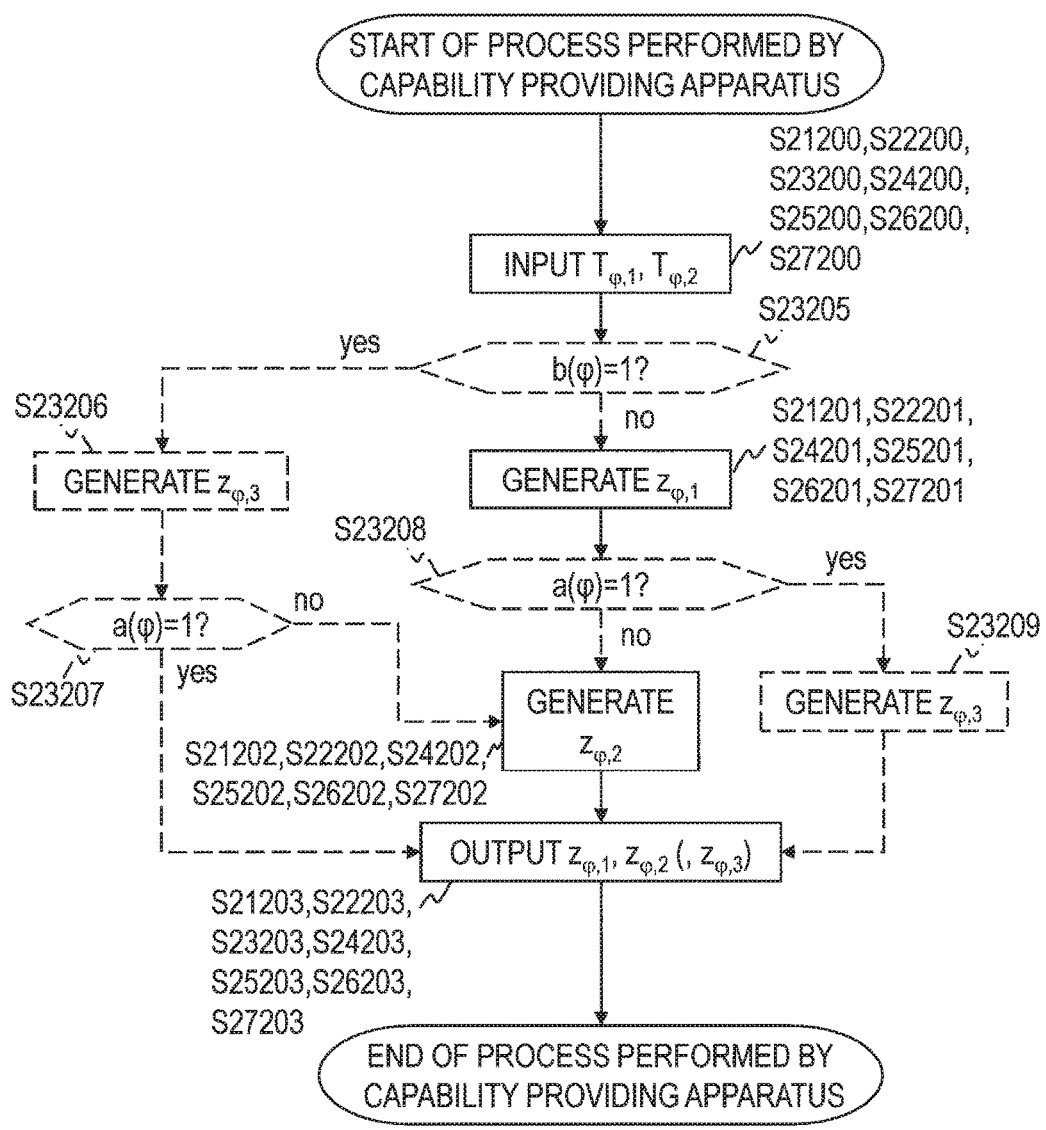
FIG. 38 is a flowchart illustrating a process performed by a capability providing apparatus of an embodiment.

As illustrated in FIG. 38, the first input information $τ_{φ,1}$ is input in the first output information computing unit 21201 of the capability providing apparatus 212 (FIG. 33) and the second input information $τ_{φ,2}$ is input in the second output information computing unit 21202 (step S21200).

The first output information computing unit 21201 uses the first input information $τ_{φ,1}$ to correctly compute $f_q(τ_{φ,1})$ with a probability greater than a certain probability and sets the obtained result of the computation as first output information $z_{φ,1}$ (step S21201). The second output information computing unit 21202 uses the second input information $τ_{φ,2}$ to correctly computes $f_q(τ_{φ,2})$ with a probability greater than a certain probability and sets the obtained result of the computation as second output information $z_{φ,2}$ (step S21202). Note that the "certain probability" is a probability less than 100%. An example of the "certain probability" is a nonnegligible probability and an example of the "nonnegligible probability" is a probability greater than or equal to 1/ψ(k), where ψ(k) is a polynomial that is a weakly increasing function (non-decreasing function) for a security parameter k. That is, the first output information computing unit 21201 and the second output information computing unit 21202 can output computation results that have an intentional or unintentional error. In other words, the result of the computation by the first output information computing unit 21201 may or may not be $f_q(τ_{φ,1})$ and the result of the computation by the second output information computing unit 21202 may or may not be $f_q(τ_{φ,2})$. The first output information computing unit 21201 outputs the first output information $z_{φ,1}$ and the second output information computing unit 21202 outputs the second output information $z_{φ,2}$ (step S21203).

Returning to FIG. 37, the first output information $z_{φ,1}$ is input in the first computing unit 21105-φ of the computing apparatus 211-φ (FIG. 32) and the second output information $z_{φ,2}$ is input in the second computing unit 21108-φ. The first output information $z_{φ,1}$ and the second output information $z_{φ,2}$ are equivalent to the computation capability provided by the capability providing apparatus 212 to the computing apparatus 211-φ (step S21104). A user of the computing apparatus 211-φ to which the computation capability has been provided pays the capability providing apparatus 212 for the computation capability. The payment may be made through a well-known electronic payment process, for example.

The first computing unit 21105-φ generates computation result $u_φ = f_φ(x_φ)^{b(φ)} x_{φ,1}$ from the first output information $z_{φ,1}$. Here, generating (computing) $f_φ(x_φ)^{b(φ)} x_{φ,1}$ means computing a value of a formula defined as $f_φ(x_φ)^{b(φ)} x_{φ,1}$. Any intermediate computation method may be used that can eventually compute the value of the formula $f_φ(x_φ)^{b(φ)} x_{φ,1}$. The same applies to computations of the other formulae that appear herein. The result $u_φ$ of the computation is sent to the first power computing unit 21106-φ (step S21105).

The first power computing unit 21106-φ computes $u_φ' = u_φ^{a(φ)}$. The pair of the result $u_φ$ of the computation and $u_φ'$ computed on the basis of the result of the computation, ($u_φ$, $u_φ'$), is stored in the first list storage 21107-φ (step S21106).

The determining unit 21111-φ determines whether or not there is a pair of $u_φ'$ and $v_φ'$ that belong to a class $CL_φ(M_φ)$ corresponding to the same element $M_φ$ among the pairs ($u_φ$, $u_φ'$) stored in the first list storage 21107-φ and the pairs ($v_φ$, $v_φ'$) stored in the second list storage 21110-φ. Whether $M_φ = x_φ$ does not need to be determined (The same applies to the following determinations.). In other words, the determining unit 21111-φ determines whether there is a pair of $u_φ'$ and $v_φ'$ that belong to the class $CL_φ(M_φ)$ corresponding to the same element $M_φ$. For example, if the function $f_φ(M_φ)$ is an injective function for the element $M_φ$, the determining unit 21111-φ determines whether or not $u_φ' = v_φ'$ (step S21107). If a pair ($v_φ$, $v_φ'$) is not stored in the second list storage 21110-φ, the process at step S21107 is omitted and the process at step S21108 is performed. If there is a pair of $u_φ'$ and $v_φ'$ that belong to the class $CL_φ(M_φ)$ corresponding to the same element $M_φ$, the process proceeds to step S21114. If there is not a pair of $u_φ'$ and $v_φ'$ that belong to the class $CL_φ(M_φ)$ corresponding to the same element $M_φ$, the process proceeds to step S21108.

At step S21108, the second computing unit 21108-$\varphi$ generates a computation result $v_\varphi = f_\varphi(x_\varphi)^{a(\varphi)} x_{\varphi,2}$ from the second output information $z_{\varphi,2}$. The result $v_\varphi$ of the computation is sent to the second power computing unit 21109-$\varphi$ (step S21108).

The second power computing unit 21109-$\varphi$ computes $v_\varphi' = v_\varphi^{b(\varphi)}$. The pair of the result $v_\varphi$ of the computation and $v_\varphi'$ computed on the basis of the computation result, ($v_\varphi$, $v_\varphi'$), is stored in the second list storage 21110-$\varphi$ (step S21109).

The determining unit 21111-$\varphi$ determines whether or not there is a pair of $u_\varphi'$ and $v_\varphi'$ that belong to a class $CL_\varphi(M_\varphi)$ corresponding to the same element $M_\varphi$ among the pairs ($u_\varphi$, $u_\varphi'$) stored in the first list storage 21107-$\varphi$ and the pairs ($v_\varphi$, $v_\varphi'$) stored in the second list storage 21110-$\varphi$. For example, if the function $f_\varphi(M_\varphi)$ is an injective function for the element $M_\varphi$, the determining unit 21111-$\varphi$ determines whether or not $u_\varphi' = v_\varphi'$ (step S21110). If there is a pair of $u_\varphi'$ and $v_\varphi'$ that belong to the class $CL_\varphi(M_\varphi)$ corresponding to the same element $M_\varphi$, the process proceeds to step S21114. If there is not a pair of $u_\varphi'$ and $v_\varphi'$ that belong to the class $CL_\varphi(M_\varphi)$ corresponding to the same element $M_\varphi$, the process proceeds to step S21111.

At step S21111, the controller 21113-$\varphi$ determines whether or not t=T (step S21111). Here, T is a predetermined natural number. T may have the same value for all of $\varphi$ or the value of T in the self-correction process for $\varphi$ and the value of T in the self-correction process for $\varphi'$ ($\varphi' \neq \varphi$, $\varphi' = 1, \ldots, \Phi$) may be different. If t=T, the final output unit 21112-$\varphi$ outputs information indicating that the computation is impossible, for example the symbol "⊥" (step S21113) and the process ends. If not t=T, the controller 21113-$\varphi$ increments t by 1, that is, sets t=t+1 (sets t+1 as a new t) (step S21112) and the process returns to step S21103.

The information indicating that the computation is impossible (the symbol "⊥" in this example) means that the reliability that the capability providing apparatus 212 correctly performs computation is lower than a criterion defined by T. In other words, the capability providing apparatus 212 was unable to perform a correct computation in T trials.

At step S21114, the final output unit 21112-$\varphi$ uses $u_\varphi$ and $v_\varphi$ that correspond to the pair of $u_\varphi'$ and $v_\varphi'$ that are determined to belong to the class $CL_\varphi(M_\varphi)$ corresponding to the same element $M_\varphi$ to calculate and output $u_\varphi^{b'(\varphi)} v_\varphi^{a'(\varphi)}$, and then the process ends (step S21114).

The $u_\varphi^{b'(\varphi)} v_\varphi^{a'(\varphi)}$ thus computed is equal to $f_\varphi(x_\varphi) \in G_\varphi$ with a high probability (the reason why $u_\varphi^{b'(\varphi)} v_\varphi^{a'(\varphi)} = f_\varphi(x_\varphi)$ with a high probability will be described later). Therefore, $u_\varphi^{b'(\varphi)} v_\varphi^{a'(\varphi)} = f_\varphi(x_\varphi)$ results with a given reliability (such as a probability) or greater by repeating at least the process for $\varphi$ described above multiple times and selecting the value $u_\varphi^{b'(\varphi)} v_\varphi^{a'(\varphi)}$ obtained with the highest frequency among the values obtained at step S21114. As will be described later, $u_\varphi^{b'(\varphi)} v_\varphi^{a'(\varphi)} = f_\varphi(x_\varphi)$ can result with an overwhelming probability, depending on settings. This also holds true even if the capability providing apparatus 212 does not necessarily return a correct response. Therefore, the computing apparatus 211-$\varphi$ does not perform verification for confirming the validity of the capability providing apparatus 212. Even if a process performed between another computing apparatus 211-$\varphi'$ ($\varphi' \neq \varphi$) and the capability providing apparatus 212 affects the process performed between the computing apparatus 211-$\varphi$ and the capability providing apparatus 212, the computing apparatus 211-$\varphi$ can obtain a correct computation result $f_\varphi(x_\varphi)$ if the capability providing apparatus 212 returns a correct solution with a probability greater than a certain probability.

<<Reason why $u_\varphi^{b'(\varphi)} v_\varphi^{a'(\varphi)} = f_\varphi(x_\varphi)$ with High Probability>>

Let $X_\varphi$ be a random variable having a value in the group $G_\varphi$. For $w_\varphi \in G_\varphi$, an entity that returns $w_\varphi x_\varphi'$ corresponding to a sample $x_\varphi'$ according to a random variable $X_\varphi$ in response to each request is called a sampler having an error $X_\varphi$ for $w_\varphi$.

For $w_\varphi \in G_\varphi$, an entity that returns $w_\varphi^{a(\varphi)} x_\varphi'$ corresponding to a sample $x_\varphi'$ according to a random variable $X_\varphi$ whenever a natural number a($\varphi$) is given is called a randomizable sampler having an error $X_\varphi$ for $w_\varphi$. The randomizable sampler functions as a sampler if used with a($\varphi$)=1.

The combination of the input information providing unit 21104-$\varphi$, the first output information computing unit 21201 and the first computing unit 21105-$\varphi$ of this embodiment is a randomizable sampler having an error $X_{\varphi,1}$ for $f_\varphi(x_\varphi)$ (referred to as the "first randomizable sampler") and the combination of the input information providing unit 21104-$\varphi$, the second output information computing unit 21202 and the second computing unit 21108-$\varphi$ is a randomizable sampler having an error $X_{\varphi,2}$ for $f_\varphi(x_\varphi)$ (referred to as the "second randomizable sampler").

The inventor has found that if $u_\varphi'$ and $v_\varphi'$ belong to class $CL_\varphi(M_\varphi)$ corresponding to the same element $M_\varphi$, it is highly probable that the first randomizable sampler has correctly computed $u_\varphi = f_\varphi(x_\varphi)^{b(\varphi)}$ and the second randomizable sampler have correctly computed $v_\varphi = f_\varphi(x_\varphi)^{a(\varphi)}$ ($x_{\varphi,1}$ and $x_{\varphi,2}$ are identity elements $e_{\varphi,g}$ of the group $G_\varphi$). For simplicity of explanation, this will be proven in an eighteenth embodiment.

When the first randomizable sampler correctly computes $u_\varphi = f_\varphi(x_\varphi)^{b(\varphi)}$ and the second randomizable sampler correctly computes $v_\varphi = f_\varphi(x_\varphi)^{a(\varphi)}$ (when $x_{\varphi,1}$ and $x_{\varphi,2}$ are identity elements $e_{\varphi,g}$ of the group $G_\varphi$), then $u_\varphi^{b'(\varphi)} = (f_\varphi(x_\varphi)^{b(\varphi)} x_{\varphi,1})^{b'(\varphi)} = (f_\varphi(x_\varphi)^{b(\varphi)} e_{\varphi,g})^{b'(\varphi)} = f_\varphi(x_\varphi)^{b(\varphi)b'(\varphi)}$ and $v_\varphi^{a'(\varphi)} = (f_\varphi(x_\varphi)^{a(\varphi)} x_{\varphi,2})^{a'(\varphi)} = (f_\varphi(x_\varphi)^{a(\varphi)} e_{\varphi,g})^{a'(\varphi)} = f_\varphi(x_\varphi)^{a(\varphi)a'(\varphi)}$.

Therefore, if the function $f_\varphi(M_\varphi)$ is an injective function for the element $M_\varphi$, then $u_\varphi^{b'(\varphi)} v_\varphi^{a'(\varphi)} = f_\varphi(x_\varphi)^{(b(\varphi)b'(\varphi)+a(\varphi)a'(\varphi))} = f_\varphi(x_\varphi)$. On the other hand, if the function $f_\varphi(M_\varphi)$ is not an injective function for the element $M_\varphi$ but if a homomorphic function, then $u_\varphi^{b'(\varphi)} v_\varphi^{a'(\varphi)} = f_\varphi(x_\varphi)^{(b(\varphi)b'(\varphi)+a(\varphi)a'(\varphi))} = f_\varphi(x_\varphi)$.

For $(q_1, q_2) \in I$, a function $\pi_i$ is defined as $\pi_i(q_1, q_2) = q_i$ for each of i=1, 2. Let $L = \min(\#\pi_1(S), \#\pi_2(S))$, where #• is the order of a set •. If the group $G_\varphi$ is a cyclic group or a group whose order is difficult to compute, it can be expected that the probability that an output of the computing apparatus 211-$\varphi$ other than "⊥" is not $f_\varphi(x_\varphi)$ is at most approximately $T^2 L/\#S$ within a negligible error. If L/#S is a negligible quantity and T is a quantity approximately equal to a polynomial order, the computing apparatus 211-$\varphi$ outputs a correct $f_\varphi(x_\varphi)$ with an overwhelming probability. An example of S that results in a negligible quantity of L/#S is $S = \{(1, d) | d \in [2, |G_\varphi|-1]\}$.

Thirteenth Embodiment

A proxy computing system of an thirteenth embodiment is an example that embodies the first randomizable sampler and the second randomizable sampler described above. The following description will focus on differences from the twelfth embodiment and repeated description of commonalities with the twelfth embodiment will be omitted. In the following description, elements labeled with the same reference numerals have the same functions and the steps labeled with the same reference numerals represent the same processes.

<Configuration>

As illustrated in FIG. 31, the proxy computing system 202 of the thirteenth embodiment includes a computing apparatus 221-φ in place of the computing apparatus 211-φ and a capability providing apparatus 222 in place of the capability providing apparatus 212.

Figure 34:
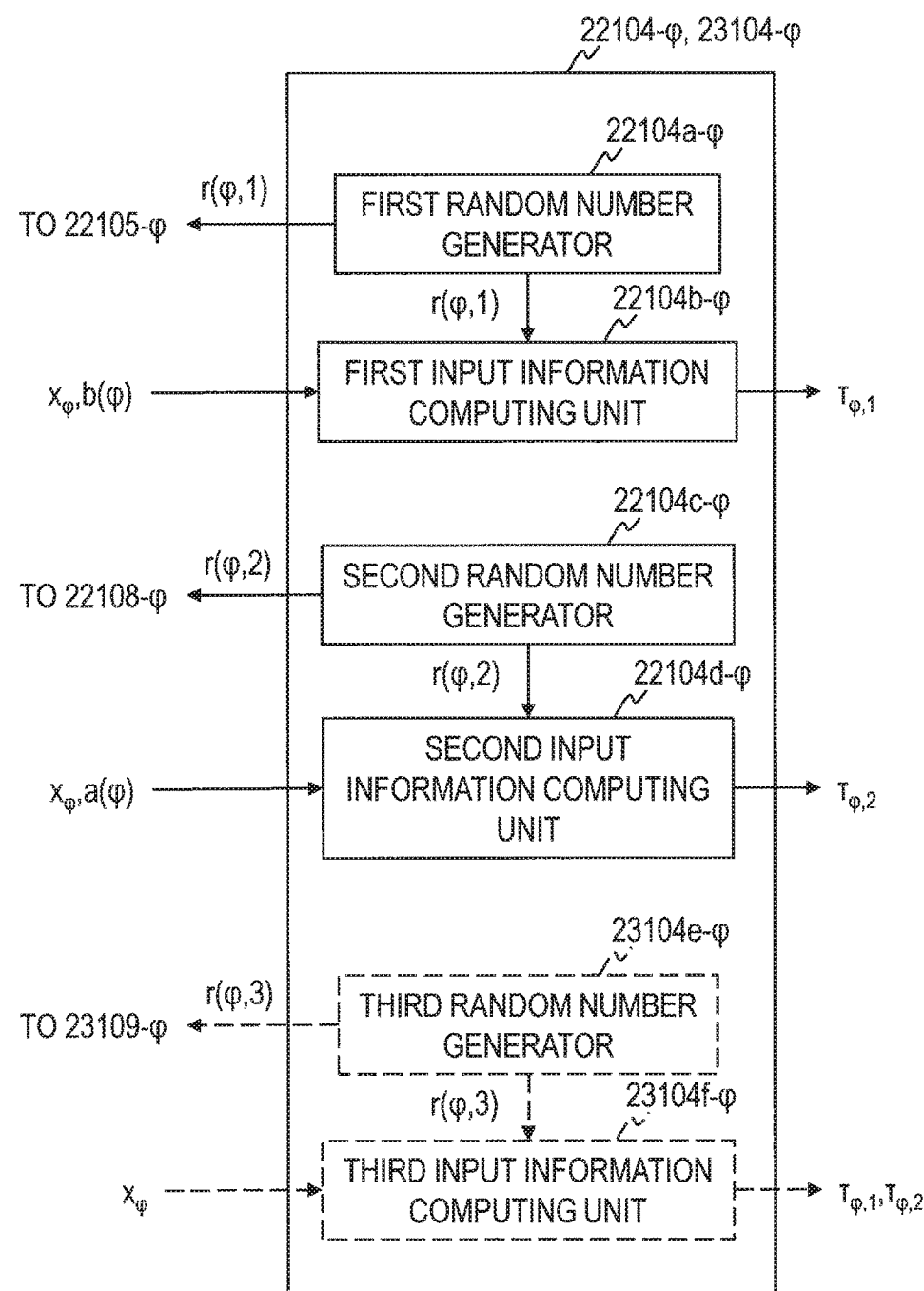
FIG. 34 is a block diagram illustrating a configuration of an input information providing unit of an embodiment.

As illustrated in FIG. 32, the computing apparatus 221-φ of the thirteenth embodiment includes, for example, a natural number storage 21101-φ, a natural number selecting unit 21102-φ, an integer computing unit 21103-φ, an input information providing unit 22104-φ, a first computing unit 22105-φ, a first power computing unit 21106-φ, a first list storage 21107-φ, a second computing unit 22108-φ, a second power computing unit 21109-φ, a second list storage 21110-φ, a determining unit 21111-φ, a final output unit 21112-φ, and a controller 21113-φ. As illustrated in FIG. 34, the input information providing unit 22104-φ of this embodiment includes, for example, a first random number generator 22104a-φ, a first input information computing unit 22104b-φ, a second random number generator 22104c-φ, and a second input information computing unit 22104d-φ.

As illustrated in FIG. 33, the capability providing unit 222 of the thirteenth embodiment includes, for example, a first output information computing unit 22201, a second output information computing unit 22202, and a controller 21205.

<Assumptions for Processes>

In the thirteenth embodiment, a function $f_\varphi$ is a homomorphic function, a group $H_\varphi$ is a cyclic group, a generator of the group $H_\varphi$ is $\mu_{\varphi,h}$, the order of the group $H_\varphi$ is $K_{\varphi,H}$, and $v_\varphi = f_\varphi(\mu_{\varphi,h})$. The rest of the assumptions are the same as those in the twelfth embodiment, except that the computing apparatus 211-φ is replaced with the computing apparatus 221-φ and the capability providing apparatus 212 is replaced with the capability providing apparatuses 222.

<Process>

As illustrated in FIGS. 37 and 38, the process of the thirteenth embodiment is the same as the process of the twelfth embodiment except that steps S21103 through S21105, S21108, and S21200 through S21203 of the twelfth embodiment are replaced with steps S22103 through S22105, S22108, and S22200 through S22203, respectively. In the following, only processes at steps S22103 through S22105, S22108, and S22200 through S22203 will be described.

<<Process at Step S22103>>

The input information providing unit 22104-φ of the computing apparatus 221-φ (FIG. 32) generates and outputs first input information $\tau_{\varphi,1}$ and second input information $\tau_{\varphi,2}$ each of which corresponds to an input element $x_\varphi$ (step S22103 of FIG. 37). A process at step S22103 of this embodiment will be described below with reference to FIG. 39.

The first random number generator 22104a-φ (FIG. 34) generates a uniform random number $r(\varphi, 1)$ that is a natural number greater than or equal to 0 and less than $K_{\varphi,H}$. The generated random number $r(\varphi, 1)$ is sent to the first input information computing unit 22104b-φ and the first computing unit 22105-φ (step S22103a). The first input information computing unit 22104b-φ uses the input random number $r(\varphi, 1)$, the element $x_\varphi$ and a natural number $b(\varphi)$ to compute first input information $\tau_{\varphi,1} = \mu_{\varphi,h}^{r(\varphi,1)} x_\varphi^{b(\varphi)}$ (step S22103b).

The second random number generator 22104c-φ generates a uniform random number $r(\varphi, 2)$ that is a natural number greater than or equal to 0 and less than $K_{\varphi,H}$. The generated random number $r(\varphi, 2)$ is sent to the second input information computing unit 22104d-φ and the second computing unit 22108-φ (step S22103c). The second input information computing unit 22104d-φ uses the input random number $r(\varphi, 2)$, the element $x_\varphi$, and a natural number $a(\varphi)$ to compute second input information $\tau_{\varphi,2} = \mu_{\varphi,h}^{r(\varphi,2)} x_\varphi^{a(\varphi)}$ (step S22103d).

The first input information computing unit 22104b-φ and the second input information computing unit 22104d-φ output the first input information $\tau_{\varphi,1}$ and the second input information $\tau_{\varphi,2}$ thus generated (step S22103e). Note that the first input information $\tau_{\varphi,1}$ and the second input information $\tau_{\varphi,2}$ of this embodiment are information whose relation with the element $x_\varphi$ is scrambled using random numbers $r(\varphi, 1)$ and $r(\varphi, 2)$, respectively. This enables the computing apparatus 221-φ to conceal the element $x_\varphi$ from the capability providing apparatus 222. The first input information $\tau_{\varphi,1}$ of this embodiment further corresponds to the natural number $b(\varphi)$ selected by the natural number selecting unit 21102-φ and the second input information $\tau_{\varphi,2}$ further corresponds to the natural number $a(\varphi)$ selected by the natural number selecting unit 21102-φ. This enables the computing apparatus 221-φ to evaluate the computing capability provided by the capability providing apparatus 222 with a high degree of accuracy.

<<Processes at Steps S22200 Through S22203>>

As illustrated in FIG. 38, first, the first input information $\tau_{\varphi,1} = \mu_{\varphi,h}^{r(\varphi,1)} x_\varphi^{b(\varphi)}$ is input in the first output information computing unit 22201 of the capability providing apparatus 222 (FIG. 33) and the second input information $\tau_{\varphi,2} = \mu_{\varphi,h}^{r(\varphi,2)} x_\varphi^{a(\varphi)}$ is input in the second output information computing unit 22202 (step S22200).

The first output information computing unit 22201 uses the first input information $\tau_{\varphi,1} = \mu_{\varphi,h}^{r(\varphi,1)} x_\varphi^{b(\varphi)}$ to correctly compute $f_\varphi(\mu_{\varphi,h}^{r(\varphi,1)} x_\varphi^{b(\varphi)})$ with a probability greater than a certain probability and sets the obtained result of the computation as first output information $z_{\varphi,p}$. The result of the computation may or may not be correct. That is, the result of the computation by the first output information computing unit 22201 may or may not be $f_\varphi(\mu_{\varphi,h}^{r(\varphi,1)} x_\varphi^{b(\varphi)})$ (step S22201).

The second output information computing unit 22202 uses the second input information $\tau_{\varphi,2} = \mu_{\varphi,h}^{r(\varphi,2)} x_\varphi^{a(\varphi)}$ to correctly compute $f_\varphi(\mu_{\varphi,h}^{r(\varphi,2)} x_\varphi^{a(\varphi)})$ with a probability greater than a certain probability and sets the obtained result of the computation as second output information $z_{\varphi,2}$. The result of the computation may or may not be correct. That is, the result of computation by the second output information computing unit 22202 may or may not be $f_\varphi(\mu_{\varphi,h}^{r(\varphi,2)} x_\varphi^{a(\varphi)})$ (step S22202).

The first output information computing unit 22201 outputs the first output information $z_{\varphi,1}$ and the second output information computing unit 22202 outputs the second output information $z_{\varphi,2}$ (step S22203).

<<Processes at Steps S22104 and S22105>>

Returning to FIG. 37, the first output information $z_{\varphi,1}$ is input in the first computing unit 22105-φ of the computing apparatus 221-φ (FIG. 32) and the second input information $z_{\varphi,2}$ is input in the second computing unit 22108-φ. The first output information $z_{\varphi,1}$ and the second output information $z_{\varphi,2}$ are equivalent to the computing capability provided by the capability providing apparatus 222 to the computing apparatus 221-φ (step S22104).

The first computing unit 22105-φ uses the input random number $r(\varphi, 1)$ and the first output information $z_{\varphi,1}$ to compute $z_{\varphi,1} v_\varphi^{-r(\varphi,1)}$ and sets the result of the computation as $u_\varphi$. The result $u_\varphi$ of the computation is sent to the first power computing unit 21106-φ. Here, $u_\varphi = z_{\varphi,1} v_\varphi^{-r(\varphi,1)} = f_\varphi(x_\varphi)^{b(\varphi)} x_{\varphi,1}$. That is, $z_{\varphi,1} v_\varphi^{-r(\varphi,1)}$ is an output of a randomizable sampler having an error $X_{\varphi,1}$ for $f_\varphi(x_\varphi)$. The reason will be described later (step S22105).

<<Process at Step S22108>>

The second computing unit 22108-$\varphi$ uses the input random number r($\varphi$, 2) and the second output information $z_{\varphi,2}$ to compute $z_{\varphi,2}v_\varphi^{-r(\varphi,2)}$ and sets the result of the computation as $v_\varphi$. The result $v_\varphi$ of the computation is sent to the second power computing unit 21109-$\varphi$. Here, $v_\varphi = z_{\varphi,1} v_\varphi^{-r(\varphi,2)} = f_\varphi(x_\varphi)^{a(\varphi)} x_{\varphi,2}$. That is, $z_{\varphi,2}v_\varphi^{-r(\varphi,2)}$ is an output of a randomizable sampler having an error $X_{\varphi,2}$ for $f_\varphi(x_\varphi)$. The reason will be described later (step S22108).

<<Reason why $z_{\varphi,1}v_\varphi^{-r(\varphi,1)}$ and $z_{\varphi,2}v_\varphi^{-r(\varphi,2)}$ are Outputs of Randomizable Samplers Having Errors $X_{\varphi,1}$ and $X_{\varphi,2}$, Respectively, for $f_\varphi(x_\varphi)$>>

Let c be a natural number, R and R' be random numbers, and $B(\mu_{\varphi,h}^R x_\varphi^c)$ be the result of computation performed by the capability providing apparatus 222 using $\mu_{\varphi,h}^R x_\varphi^c$. That is, the results of computations that the first output information computing unit 22201 and the second output information computing unit 22202 return to the computing apparatus 221-$\varphi$ are $z_\varphi = B(\mu_{\varphi,h}^R x_\varphi^c)$. A random variable $X_\varphi$ that has a value in the group G, is defined as $X_\varphi = B(\mu_{\varphi,h}^{R'}) f_\varphi(\mu_{\varphi,h}^{R'})^{-1}$.

Then, $z_\varphi v_\varphi^{-R} = B(\mu_{\varphi,h}^R x_\varphi^c) f(\mu_{\varphi,h})^{-R} = X_\varphi f_\varphi(\mu_{\varphi,h}^R x_\varphi^c) f_\varphi(\mu_{\varphi,h})^{-R} = X_\varphi f_\varphi(\mu_{\varphi,h})^R f_\varphi(x_\varphi)^c f_\varphi(\mu_{\varphi,h})^{-R} = f_\varphi(x_\varphi)^c X_\varphi$. That is, $z_\varphi v_\varphi^{-R}$ is an output of a randomizable sampler having an error $X_\varphi$ for $f_\varphi(x_\varphi)$.

The expansion of formula given above uses the properties such that $X_\varphi = B(\mu_{\varphi,h}^{R'}) f_\varphi(\mu_{\varphi,h}^{R'})^{-1} = B(\mu_{\varphi,h}^R x_\varphi^c) f_\varphi(\mu_{\varphi,h}^R x_\varphi^c)^{-1}$ and that $B(\mu_{\varphi,h}^R x_\varphi^c) = X_\varphi f_\varphi(\mu_{\varphi,h}^R x_\varphi^c)$. The properties are based on the fact that the function $f_\varphi$ is a homomorphic function and R and R' are random numbers.

Therefore, considering that a($\varphi$) and b($\varphi$) are natural numbers and r($\varphi$, 1) and r($\varphi$, 2) are random numbers, $z_{\varphi,1}v^{-r(\varphi,1)}$ and $z_{\varphi,2}v_\varphi^{-r(\varphi,2)}$ are, likewise, outputs of randomizable samplers having errors $X_{\varphi,1}$ and $X_{\varphi,2}$, respectively, for $f_\varphi(x_\varphi)$.

Fourteenth Embodiment

A fourteenth embodiment is a variation of the thirteenth embodiment and computes a value of $u_\varphi$ or $v_\varphi$ by using samplers described above when a($\varphi$)=1 or b($\varphi$)=1. The amounts of computations performed by samplers in general are smaller than the amounts of computations by randomizable samplers. Using samplers instead of randomizable samplers for computations when a($\varphi$)=1 or b($\varphi$)=1 can reduce the amounts of computations by the proxy computing system. The following description will focus on differences from the twelfth and thirteenth embodiments and repeated description of commonalities with the twelfth and thirteenth embodiments will be omitted.

<Configuration>

As illustrated in FIG. 31, a proxy computing system 203 of the fourteenth embodiment includes a computing apparatus 231-$\varphi$ in place of the computing apparatus 221-$\varphi$ and a capability providing apparatus 232 in place of the capability providing apparatus 222.

As illustrated in FIG. 32, the computing apparatus 231-$\varphi$ of the fourteenth embodiment includes, for example, a natural number storage 21101-$\varphi$, a natural number selecting unit 21102-$\varphi$, an integer computing unit 21103-$\varphi$, an input information providing unit 22104-$\varphi$, a first power computing unit 22105-$\varphi$, a first computing unit 21106-$\varphi$, a first list storage 21107-$\varphi$, a second computing unit 22108-$\varphi$, a second power computing unit 21109-$\varphi$, a second list storage 21110-$\varphi$, a determining unit 21111-$\varphi$, a final output unit 21112-$\varphi$, a controller 21113-$\varphi$, and a third computing unit 23109-$\varphi$.

As illustrated in FIG. 33, the capability providing apparatus 232 of the fourteenth embodiment includes, for example, a first output information computing unit 22201, a second output information computing unit 22202, a controller 21205, and a third output information computing unit 23203.

<Processes>

Processes of this embodiment will be described below. What follows is a description of differences from the thirteenth embodiment.

As illustrated in FIGS. 37 and 38, a process of the fourteenth embodiment is the same as the process of the thirteenth embodiment except that steps S22103 through S22105, S22108, and S22200 through S22203 of the thirteenth embodiment are replaced with steps S23103 through S23105, S23108, S22200 through S22203, and S23205 through 23209, respectively. The following description will focus on processes at steps S23103 through S23105, S23108, S22200 through S22203, and S23205 through S23209.

<<Process at Step S23103>>

The input information providing unit 23104-$\varphi$ of the computing apparatus 231-$\varphi$ (FIG. 32) generates and outputs first input information $T_{\varphi,1}$ and second input information $\tau_{\varphi,2}$ each of which corresponds to an input element $x_\varphi$ (step S23103 of FIG. 37).

Figure 39:
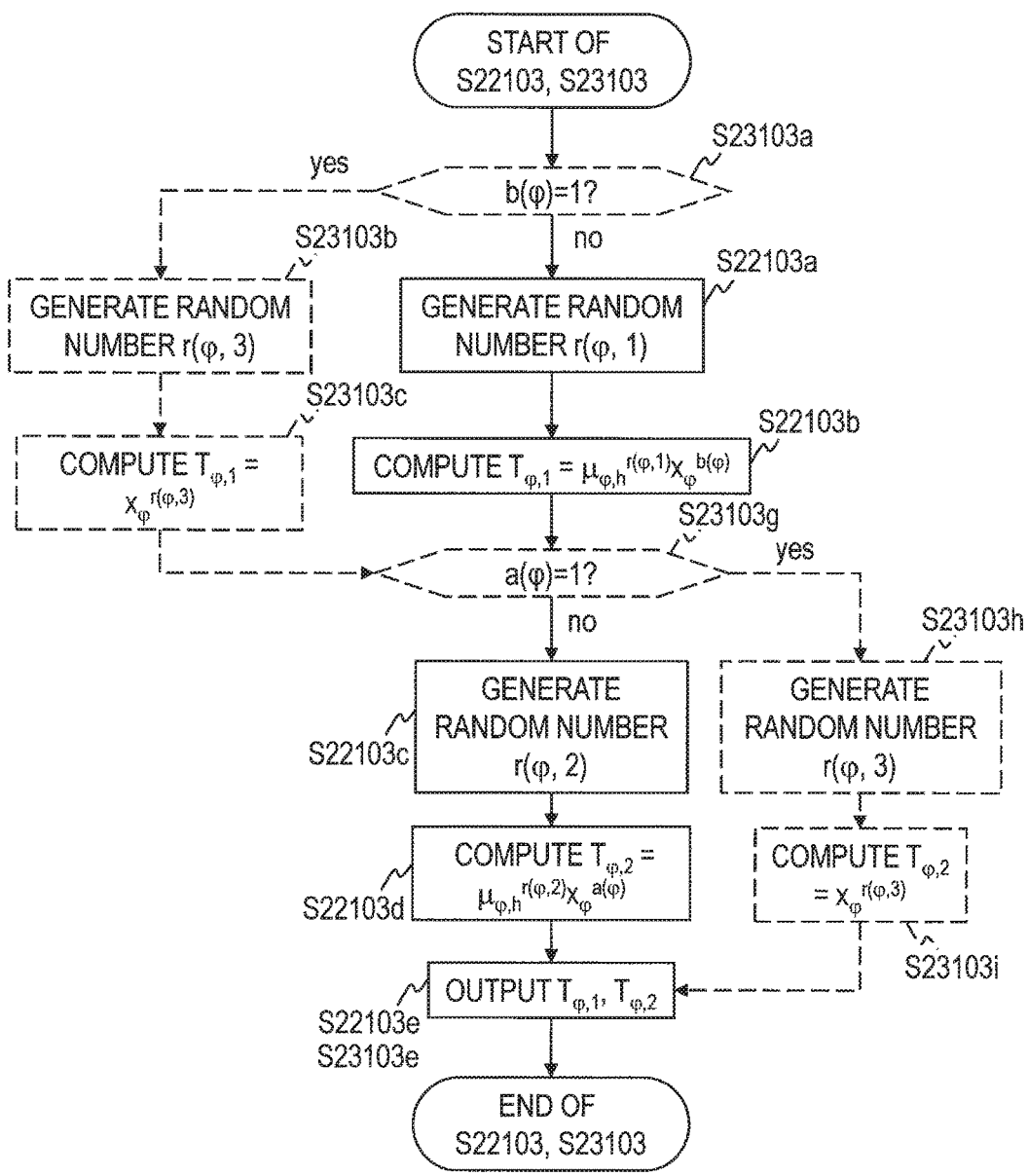
FIG. 39 is a flowchart illustrating a process at step S22103 (S23103)

A process at S23103 of this embodiment will be described below with reference to FIG. 39.

The controller 21113-$\varphi$ (FIG. 32) controls the input information providing unit 23104-$\varphi$ according to natural numbers (a($\varphi$), b($\varphi$)) selected by the natural number selecting unit 21102-$\varphi$.

Determination is made by the controller 21113-$\varphi$ as to whether b($\varphi$) is equal to 1 (step S23103a). If it is determined that b($\varphi$)≠1, the processes at steps S22103a and 22103b described above are performed and the process proceeds to step S23103g.

On the other hand, if it is determined at step S23103a that b($\varphi$)=1, the third random number generator 23104e-$\varphi$ generates a random number r($\varphi$, 3) that is a natural number greater than or equal to 0 and less than $K_{\varphi,H}$. The generated random number r($\varphi$,3) is sent to the third input information computing unit 23104f-$\varphi$ and the third computing unit 23109-$\varphi$ (step S23103b). The third input information computing unit 23104f-$\varphi$ uses the input random number r($\varphi$, 3) and the element $x_\varphi$ to compute $x_\varphi^{r(\varphi,3)}$ and sets it as first input information $\tau_{\varphi,1}$ (step S23103c). Then the process proceeds to step S23103g.

At step S23103g, determination is made by the controller 21113a-$\varphi$ as to whether a($\varphi$) is equal to 1 (step S23103g). If it is determined that a($\varphi$)≠1, the processes at steps S22103c and S22103d described above are performed.

On the other hand, if it is determined at step S23103g that a($\varphi$)=1, the third random number generator 23104e-$\varphi$ generates a random number r($\varphi$, 3) that is a natural number greater than or equal to 0 and less than $K_{\varphi,H}$. The generated random number r($\varphi$, 3) is sent to the third input information computing unit 23104f-$\varphi$ (step S23103h). The third input information computing unit 23104f-$\varphi$ uses the input random number r($\varphi$, 3) and the element $x_\varphi$ to compute $x_\varphi^{(\varphi,3)}$ and sets it as second input information $\tau_{\varphi,2}$ (step S23103i).

The first input information computing unit 22104b-$\varphi$, the second input information computing unit 22104d-$\varphi$, and the third input information computing unit 23104f-$\varphi$ output the first input information $\tau_{\varphi,1}$ and the second input information $\tau_{\varphi,2}$ thus generated along with information on the corresponding natural numbers $(a(\varphi), b(\varphi))$ (step S23103e). Note that the first input information $\tau_{\varphi,1}$ and the second input information $\tau_{\varphi,2}$ in this embodiment are information whose relation with the element $x_\varphi$ is scrambled using the random numbers $r(\varphi, 1)$, $r(\varphi, 2)$ and $r(3, \varphi)$. This enables the computing apparatus 231-$\varphi$ to conceal the element $x_\varphi$ from the capability providing apparatus 232.

<<Processes at S22200 Through S22203 and S23205 Through S23209>>

Processes at S22200 through S22203 and S23205 through S23209 of this embodiment will be described below with reference to FIG. 38.

The controller 21205 (FIG. 33) controls the first output information computing unit 22201, the second output information computing unit 22202 and the third output information computing unit 23203 according to input natural numbers $(a(\varphi), b(\varphi))$.

Under the control of the controller 21205, the first input information $\tau_{\varphi,1} = \mu_{\varphi,h}^{r(\varphi,1)} x_\varphi^{b(\varphi)}$ when $b(\varphi) \neq 1$ is input in the first output information computing unit 22201 of the capability providing apparatus 232 (FIG. 33) and the second input information $\tau_{\varphi,2} = \mu_{\varphi,h}^{r(\varphi,2)} x_\varphi^{a(\varphi)}$ when $a(\varphi) \neq 1$ is input in the second output information computing unit 22202. The first input information $\tau_{\varphi,1} = x_\varphi^{r(\varphi,3)}$ when $b(\varphi)=1$ and the second input information $\tau_{\varphi,2} = x_\varphi^{r(\varphi,3)}$ when $a(\varphi)=1$ are input in the third output information computing unit 23203 (step S23200).

Determination is made by the controller 21113-$\varphi$ as to whether $b(\varphi)$ is equal to 1 (step S23205). If it is determined that $b(\varphi) \neq 1$, the process at step S22201 described above is performed. Then, determination is made by the controller 21113-$\varphi$ as to whether $a(\varphi)$ is equal to 1 (step S23208). If it is determined that $a(\varphi) \neq 1$, the process at step S22202 described above is performed and then the process proceeds to step S23203.

On the other hand, if it is determined at step S23208 that $a(\varphi)=1$, the third output information computing unit 23203 uses the second input information $\tau_{\varphi,2} = x_\varphi^{r(\varphi,3)}$ to correctly compute $f_\varphi(x_\varphi^{1/r(\varphi,3)})$ with a probability greater than a certain probability and sets the obtained result of the computation as third output information $z_{\varphi,3}$. The result of the computation may or may not be correct. That is, the result of the computation by the third output information computing unit 23203 may or may not be $f_\varphi(x_\varphi^{r(\varphi,3)})$ (step S23209). Then the process proceeds to step S23203.

If it is determined at step S23205 that $b(\varphi)=1$, the third output information computing unit 23203 uses the second input information $\tau_{\varphi,1} = x_\varphi^{r(\varphi,3)}$ to correctly compute $f_\varphi(x_\varphi^{r(\varphi,3)})$ with a probability greater than a certain probability and sets the obtained result of the computation as third output information $z_{\varphi,3}$. The result of the computation may or may not be correct. That is, the result of the computation by the third output information computing unit 23203 may or may not be $f_\varphi(x_\varphi^{r(\varphi,3)})$ (step S23206).

Then, determination is made by the controller 21113-$\varphi$ as to whether $a(\varphi)$ is equal to 1 (step S23207). If it is determined that $a(\varphi)=1$, the process proceeds to step S23203; if it is determined $a(\varphi) \neq 1$, the process proceeds to step S22202.

At step S23203, the first output information computing unit 22201, which has generated the first output information $z_{\varphi,1}$, outputs the first output information $z_{\varphi,1}$, the second output information computing unit 22202, which has generated the second output information $z_{\varphi,2}$, outputs the second output information $z_{\varphi,2}$, and the third output information computing unit 23202, which has generated the third output information $z_{\varphi,3}$, outputs the third output information $z_{\varphi,3}$ (step S23203).

<<Processes at Steps S23104 and S23105>>

Returning to FIG. 37, under the control of the controller 21113-$\varphi$, the first output information $z_{\varphi,1}$ is input in the first computing unit 22105-$\varphi$ of the computing apparatus 231-$\varphi$ (FIG. 32), the second output information $z_{\varphi,2}$ is input in the second computing unit 22108-$\varphi$, and the third output information $z_{\varphi,3}$ is input in the third computing unit 23109-$\varphi$ (step S23104).

If $b(\varphi) \neq 1$, the first computing unit 22105-$\varphi$ performs the process at step S22105 described above to generate $u_\varphi$; if $b(\varphi)=1$, the third computing unit 23109-$\varphi$ computes $z_{\varphi,3}^{1/r(\varphi,3)}$ and sets the result of the computation as $u_\varphi$. The computation result $u_\varphi$ is sent to the first power computing unit 21106-$\varphi$. Here, if $b(\varphi)=1$, then $u_\varphi = z_{\varphi,3}^{1/r(\varphi,3)} = f_\varphi(x_\varphi) x_{\varphi,3}$. That is, $z_{\varphi,3}^{1/r(\varphi,3)}$ serves as a sampler having an error $X_{\varphi,3}$ for $f_\varphi(x_\varphi)$. The reason will be described later (step S23105).

<<Process at Step S23108>>

If $a(\varphi) \neq 1$, the second computing unit 22108-$\varphi$ performs the process at step S22108 described above to generate $v_\varphi$; if $a(\varphi)=1$, the third computing unit 23109-$\varphi$ computes $z_{\varphi,3}^{1/r(\varphi,3)}$ and sets the result of the computation as $v_\varphi$. The computation result $v_\varphi$ is sent to the second power computing unit 21109-$\varphi$. Here, if $a(\varphi)=1$, then $v_\varphi = z_{\varphi,3}^{1/r(\varphi,3)} = f_\varphi(x_\varphi) x_{\varphi,3}$. That is, $z_{\varphi,3}^{1/r(\varphi,3)}$ serves as a sampler having an error $X_{\varphi,3}$ for $f_\varphi(x_\varphi)$. The reason will be described later (step S23108).

Note that if $z_{\varphi,3}^{1/r(\varphi,3)}$, that is, the radical root of $z_{\varphi,3}$, is hard to compute, $u_\varphi$ and/or $v_\varphi$ may be calculated as follows. The third computing unit 23109-$\varphi$ may store each pair of a random number $r(\varphi, 3)$ and $z_{\varphi,3}$ computed on the basis of that random number $r(\varphi, 3)$ in a storage, not depicted, in sequence as $(\alpha_1, \beta_1), (\alpha_2, \beta_2), \ldots, (\alpha_m, \beta_m), \ldots$, where $m$ is a natural number. The third computing unit 23109-$\varphi$ may compute $\gamma_1, \gamma_2, \ldots, \gamma_m$ that satisfy $\gamma_1\alpha_1 + \gamma_2\alpha_2 + \ldots + \gamma_m\alpha_m = 1$ when the least common multiple of $\alpha_1, \alpha_2, \ldots, \alpha_m$ is 1, where $\gamma_1, \gamma_2, \ldots, \gamma_m$ are integers. The third computing unit 32109-$\varphi$ may then use the resulting $\gamma_1, \gamma_2, \ldots, \gamma_m$ to compute $\prod_{i=1}^{m} \beta_i^{\gamma_i} = \beta_1^{\gamma_1} \beta_2^{\gamma_2} \ldots \beta_m^{\gamma_m}$ and may set the results of the computation as $u_\varphi$ and/or $v_\varphi$.

<<Reason why $z_{\varphi,3}^{1/r(\varphi,3)}$ Serves as a Sampler Having an Error $X_{\varphi,3}$ for $f_\varphi(x_\varphi)$>>

Let R be a random number and $B(x_\varphi^R)$ be the result of computation performed by the capability providing apparatus 232 using $x_\varphi^R$. That is, let $z_\varphi = B(x_\varphi^R)$ be computation results returned by the first output information computing unit 22201, the second output information computing unit 22202, and the third output information computing unit 23203 to the computing apparatus 231-$\varphi$. Furthermore, a random variable $X_\varphi$ having a value in the group $G_\varphi$ is defined as $X_\varphi = B(x_\varphi^R)^{1/R} f_\varphi(x_\varphi)^{-1}$.

Then, $z_\varphi^{1/R} = B(x_\varphi^R)^{1/R} = X_\varphi f_\varphi(x_\varphi) = f_\varphi(x_\varphi) X_\varphi$. That is, $z_\varphi^{1/R}$ serves as a sampler having an error $X_\varphi$ for $f_\varphi(x_\varphi)$.

The expansion of formula given above uses the properties such that $X_\varphi = B(x_\varphi^R)^{1/R} f_\varphi(x_\varphi^R)^{-1}$ and that $B(x_\varphi^R)^{1/R} = X_\varphi f_\varphi(x_\varphi^R)$. The properties are based on the fact that R is a random number.

Therefore, considering that $r(\varphi, 3)$ is a random number, $z_\varphi^{1/R}$ serves as a sampler having an error $X_{\varphi,3}$ for $f_\varphi(x_\varphi)$, likewise.

Fifteenth Embodiment

A proxy computing system of a fifteenth embodiment is another example that embodies the first and second randomizable samplers described above. Specifically, in this embodiment, $f_\varphi(x_\varphi)$ is a function for converting an element $x_\varphi = C_{\varphi,1}(y(\varphi, 1), m_\varphi)$ of a group $H_\varphi$ which is a first ciphertext to a second ciphertext $f_\varphi(x_\varphi) = C_{\varphi,2}(y(\varphi,2), m_\varphi)$ which is an element of a group $G_\varphi$. Here, the first ciphertext $C_{\varphi,1}(y(\varphi, 1), m_\varphi)$ is a ciphertext obtained by encrypting a plaintext $m_\varphi$ with a first encryption key $y(\varphi, 1)$ according to a first encryption scheme $ENC_{\varphi,1}$ and the second ciphertext $C_{\varphi,2}(y(\varphi, 2), m_\varphi)$ is a ciphertext obtained by encrypting the plaintext $m_\varphi$ with a second encryption key $y(\varphi, 2)$ according to a second encryption scheme $ENC_{\varphi,2}$. The second encryption scheme $ENC_{\varphi,2}$ is the ElGamal encryption and the function $f_\varphi(x_\varphi)$ is a homomorphic function. The first encryption scheme $ENC_{\varphi,1}$ may be any encryption scheme; the first encryption scheme $ENC_{\varphi,1}$ may be probabilistic encryption such as the ElGamal encryption or may be deterministic encryption such as RSA encryption.

The following description will focus on differences from the twelfth embodiment and repeated description of commonalities with the twelfth embodiment will be omitted.

As illustrated in FIG. 31, a proxy computing system 204 of the fifteenth embodiment includes a computing apparatus 241-$\varphi$ in place of the computing apparatus 221-$\varphi$ and a capability providing apparatus 242 in place of the capability providing apparatus 212.

Figure 35:
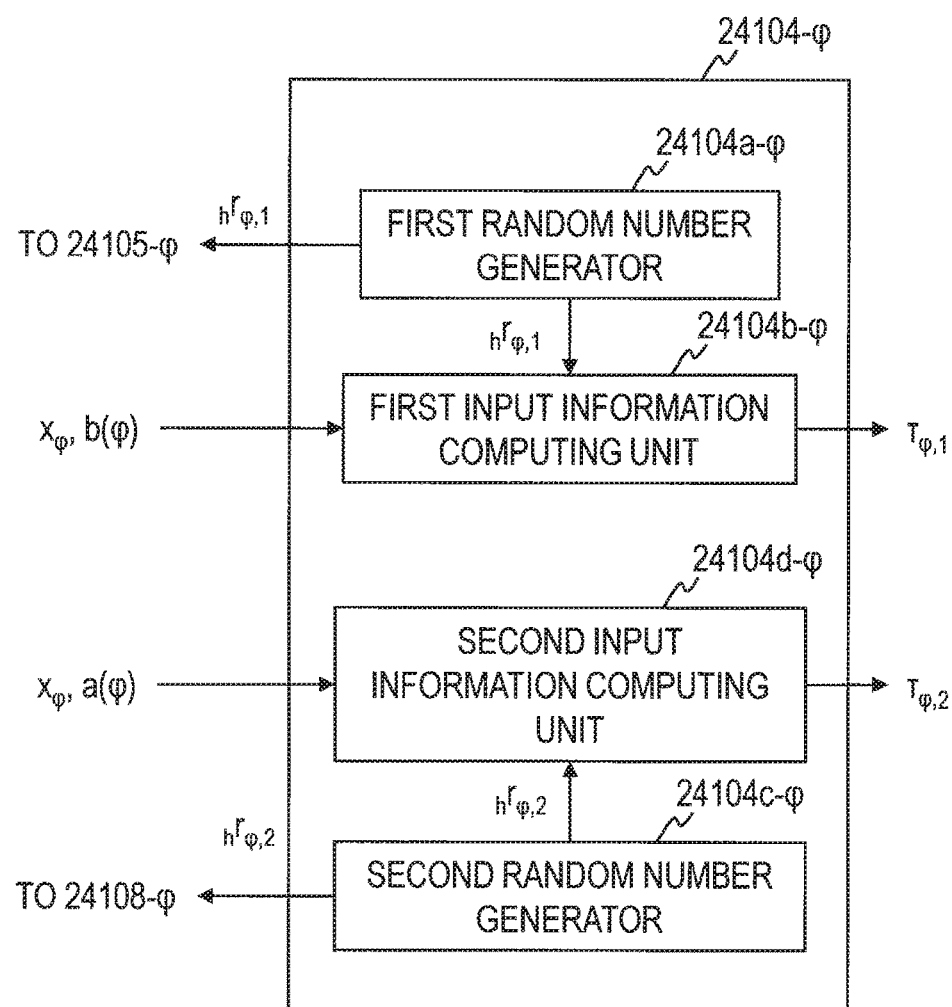
FIG. 35 is a block diagram illustrating a configuration of an input information providing unit of an embodiment.

As illustrated in FIG. 32, the computing apparatus 241-$\varphi$ of the fifteenth embodiment includes, for example, a natural number storage 21101-$\varphi$, a natural number selecting unit 21102-$\varphi$, an integer computing unit 21103-$\varphi$, an input information providing unit 24104-$\varphi$, a first computing unit 24105-$\varphi$, a first power computing unit 21106-$\varphi$, a first list storage 21107-$\varphi$, a second computing unit 24108-$\varphi$, a second power computing unit 21109-$\varphi$, a second list storage 21110-$\varphi$, a determining unit 24111-$\varphi$, a final output unit 21112-$\varphi$, and a controller 21113-$\varphi$. As illustrated in FIG. 35, the input information providing unit 24104-$\varphi$ of this embodiment includes, for example, a first random number generator 24104a-$\varphi$, a first input information computing unit 24104b-$\varphi$, a second random number generator 24104c-$\varphi$, and a second input information computing unit 24104d-$\varphi$.

As illustrated in FIG. 33, the capability providing apparatus 242 of the fifteenth embodiment includes, for example, a first output information computing unit 24201, a second output information computing unit 24202, and a controller 21205.

<Assumptions for Processes>

In the fifteenth embodiment, the group $G_\varphi$ is the direct product group $G_{\varphi,1} \times G_{\varphi,2}$ of cyclic groups $G_{\varphi,1}$ and $G_{\varphi,2}$, $\mu_{\varphi,g1}$ is a generator of the group $G_{\varphi,1}$, $\mu_{\varphi,g2}$ is a generator of the group $G_{\varphi,2}$, the second encryption key $y(\varphi, 2)$ is $\mu_{\varphi,g2}^{s(\varphi,2)}$, an element $C_{\varphi,2}(y(\varphi, 2), m_\varphi)$ is $(\mu_{\varphi,g1}^{r(\varphi)}, m_\varphi y(\varphi, 2)^{r(\varphi)}) \in G_{\varphi,1} \times G_{\varphi,2}$, $r(\varphi)$ is an integer random number, a value $u_\varphi^{a(\varphi)}$ is $(c_{\varphi,1u}, c_{\varphi,2u}) \in G_{\varphi,1} \times G_{\varphi,2}$, and a value $v_\varphi^{b(\varphi)}$ is $(c_{\varphi,1v}, c_{\varphi,2v}) \in G_{\varphi,1} \times G_{\varphi,2}$. $G_{\varphi,1}$ may be equal to $G_{\varphi,2}$ or may be unequal to $G_{\varphi,2}$. The first encryption scheme $ENC_{\varphi,1}$ may be any encryption scheme as stated above. If the first encryption scheme $ENC_{\varphi,1}$ is the ElGamal encryption, the group $H_\varphi$ is the direct product group $H_{\varphi,1} \times H_{\varphi,2}$ of cyclic groups $H_{\varphi,1}$ and $H_{\varphi,2}$, $r'(\varphi)$ is an integer random number, $\mu_{\varphi,h1}$ is a generator of the group $H_{\varphi,1}$, $\mu_{\varphi,h2}$ is a generator of the group $H_{\varphi,2}$, the first encryption key $y(\varphi, 1)$ is $\mu_{\varphi,h2}^{s(\varphi,1)}$, the first ciphertext $C_{\varphi,1}(y(\varphi, 1), m_\varphi)$ is $(\mu_{\varphi,h1}^{r'(\varphi)}, m_\varphi y(\varphi, 1)^{r'(\varphi)}) \in H_{\varphi,1} \times H_{\varphi,1} \times H_{\varphi,2}$. $H_{\varphi,1}$ may be equal to $H_{\varphi,2}$ or may be unequal to $H_{\varphi,2}$.

Note that if $A = (\alpha_1, \alpha_2) \in G_{\varphi,1} \times G_{\varphi,2}$, $B = (\beta_1, \beta_2) \in G_{\varphi,1} \times G_{\varphi,2}$, and $\varepsilon$ is a natural number, then $A^\varepsilon$ represents $(\alpha_1^\varepsilon, \alpha_2^\varepsilon)$, $A^{-\varepsilon}$ represents $(\alpha_1^{-\varepsilon}, \alpha_2^{-\varepsilon})$, and $AB$ represents $(\alpha_1\beta_1, \alpha_2\beta_2)$. Similarly, if $\varepsilon$ is a natural number, $A = (\alpha_1, \alpha_2) \in H_{\varphi,1} \times H_{\varphi,2}$, and $B = (\beta_1, \beta_2) \in H_{\varphi,1} \times H_{\varphi,2}$, then $A^\varepsilon$ represents $(\alpha_1^\varepsilon, \alpha_2^\varepsilon)$, $A^{-\varepsilon}$ represents $(\alpha_1^{-\varepsilon}, \alpha_2^{-\varepsilon})$, and $AB$ represents $(\alpha_1\beta_1, \alpha_2\beta_2)$. $e_\varphi(\alpha, \beta)$ is a bilinear map that gives an element of a cyclic group $G_{\varphi,T}$ for $(\alpha, \beta) \in G_{\varphi,1} \times G_{\varphi,2}$. Examples of the bilinear map include functions and algorithms for performing pairing computations such as Weil pairing and Tate pairing (see Reference literature 2: Alfred J. Menezes, "ELLIPTIC CURVE PUBLIC KEY CRYPTOSYSTEMS", KLUWER ACADEMIC PUBLISHERS, ISBN 0-7923-9368-6, pp. 61-81 and Reference literature 3: RFC 5091, "Identity-Based Cryptography Standard (IBCS) #1", Supersingular Curve Implementations of the BF and BB1 Cryptosystems, for example).

<Processes>

As illustrated in FIGS. 37 and 38, a process of the fifteenth embodiment is the same as the process of the twelfth embodiment except that steps S21103 through S21105, S21107, S21108, S21110, and S21200 through S21203 of the twelfth embodiment are replaced with steps S24103 through S24105, S241017, S24108, S24110, and S24200 through S24203, respectively. In the following, only processes at steps S24103 through S24105, S24107, S24108, S24110, and S24200 through S24203 will be described.

<<Process at Step S24103>>

Figure 40:
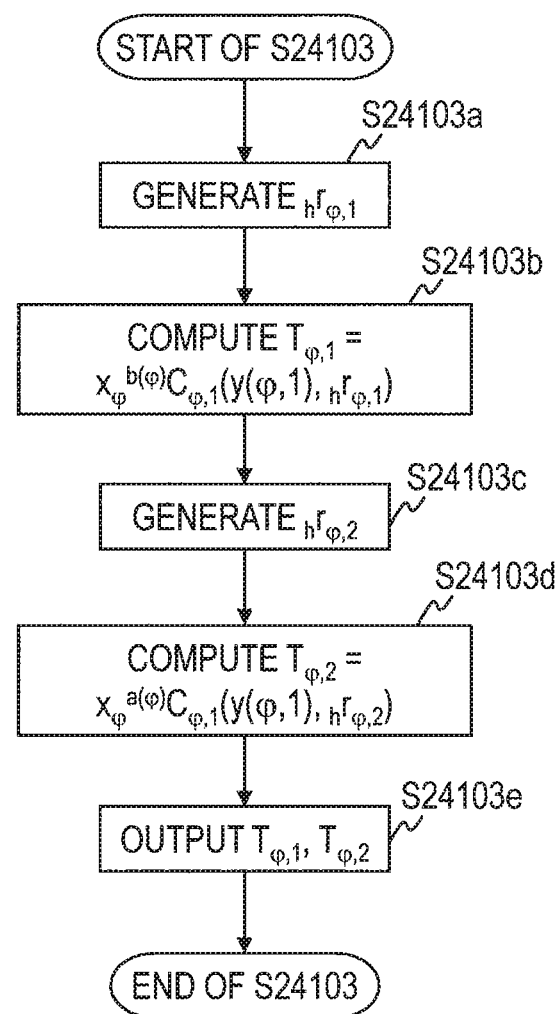
FIG. 40 is a flowchart illustrating a process at step S24103.

The input information providing unit 24104-$\varphi$ of the computing apparatus 241-$\varphi$ (FIG. 32) generates and outputs first input information $\tau_{\varphi,1}$ and second input information $\tau_{\varphi,2}$ corresponding to an input element $x_\varphi = C_{\varphi,1}(y(\varphi, 1), m_\varphi)$ (step S24103 of FIG. 37). The process at step S24103 of this embodiment will be described below with reference to FIG. 40.

The first random number generator 24104a-$\varphi$ (FIG. 35) generates an arbitrary element ${}_hr_{\varphi,1} \in H_\varphi$ of the group $H_\varphi$. In this embodiment an element ${}_hr_{\varphi,1}$ is randomly and uniformly selected from the group $H_\varphi$ (uniform random number). The generated element ${}_hr_{\varphi,1}$ is sent to the first input information computing unit 24104b-$\varphi$ and the first computing unit 24105-$\varphi$ (step S24103a).

The first input information computing unit 24104b-$\varphi$ uses a natural number $b(\varphi)$ selected by the natural number selecting unit 21102-$\varphi$, the element $x_\varphi$, the element ${}_hr_{\varphi,1}$, and the first encryption key $y(\varphi, 1)$ to compute $x_\varphi^{b(\varphi)} C_{\varphi,1}(y(\varphi, 1), {}_hr_{\varphi,1})$ as first input information $\tau_{\varphi,1}$ (step S24103b).

The second random number generator 24104c-$\varphi$ generates an arbitrary element ${}_hr_{\varphi,2} \in H_\varphi$ of the group $H_\varphi$. In this embodiment an element ${}_hr_{\varphi,2}$ is randomly and uniformly selected from the group $H_\varphi$ (uniform random number). The generated element ${}_hr_{\varphi,2}$ is sent to the second input information computing unit 24104d-$\varphi$ and the second computing unit 24108-$\varphi$ (step S24103c).

The second input information computing unit 24104b-$\varphi$ uses a natural number $a(\varphi)$ selected by the natural number selecting unit 21102-$\varphi$, the element $x_\varphi$, the element ${}_hr_{\varphi,2}$, and the first encryption key $y(\varphi, 1)$ to compute $x_\varphi^{a(\varphi)} C_{\varphi,1}(y(\varphi, 1), {}_hr_{\varphi,2})$ as second input information $\tau_{\varphi,2}$ (step S24103d).

The first input information computing unit 24104b-$\varphi$ outputs the first input information $\tau_{\varphi,1} = x_\varphi^{b(\varphi)} C_{\varphi,1}(y(\varphi, 1), {}_hr_{\varphi,1})$ computed as described above. The second input information computing unit 24104d-$\varphi$ outputs the second input information $\tau_{\varphi,2} = x_\varphi^{a(\varphi)} C_{\varphi,1}(y(\varphi, 1), {}_hr_{\varphi,2})$ computed as described above (step S24103e).

<<Processes at Steps S24200 Through S24203>>

As illustrated in FIG. 38, first, the first input information $\tau_{\varphi,1} = x_\varphi^{b(\varphi)} C_{\varphi,1}(y(\varphi, 1), {}_hr_{\varphi,1})$ is input in the first output information computing unit 24201 of the capability providing apparatus 242 (FIG. 33) and the second input information $\tau_{\varphi,2}=x_\varphi^{a(\varphi)}C_{\varphi,1}(y(\varphi, 1), {}_h r_{\varphi,2})$ is input in the second output information computing unit 24202 (step S24200).

The first output information computing unit 24201 uses the first input information $\tau_{\varphi,1}=x_\varphi^{b(\varphi)}C_{\varphi,1}(y(\varphi, 1), {}_h r_{\varphi,1})$, a first decryption key $s(\varphi, 1)$ corresponding to the first encryption key $y(\varphi, 1)$, and the second encryption key $y(\varphi, 2)$ to correctly compute $f_\varphi(x_\varphi^{b(\varphi)}C_{\varphi,1}(y(\varphi, 1), {}_h r_{\varphi,1}))$ with a probability greater than a certain probability and sets the result of the computation as first output information $z_{\varphi,1}$. The result of the computation may or may not be correct. That is, the result of the computation by the first output information computing unit 24201 may or may not be $f_\varphi(x_\varphi^{b(\varphi)}C_{\varphi,1}(y(\varphi, 1), {}_h r_{\varphi,1}))$ (step S24201).

Note that the function $f_\varphi$ in this embodiment is a homomorphic function for encrypting a value that can be obtained by decrypting a ciphertext with the first decryption key $s(\varphi, 1)$ according to the first encryption scheme $ENC_{\varphi,1}$ with the second encryption key $y(\varphi, 2)$ according to the ElGamal encryption. For example, if both of the first encryption scheme $ENC_{\varphi,1}$ and the second encryption scheme $ENC_{\varphi,2}$ are the ElGamal encryption, the function $f_\varphi$ is a homomorphic function for encrypting a value that can be obtained by decrypting a ciphertext with the first decryption key $s(\varphi, 1)$ according to the ElGamal encryption with the second encryption key $y(\varphi, 2)$ according to the ElGamal encryption.

The second output information computing unit 24202 can use the second input information $r_{\varphi,2}=x_\varphi^{a(\varphi)}C_{\varphi,1}(y(\varphi, 1), {}_h r_{\varphi,2})$, the first decryption key $s(\varphi, 1)$, and the second encryption key $y(\varphi, 2)$ to correctly compute $f_\varphi(x_\varphi^{a(\varphi)}C_{\varphi,1}(y(\varphi, 1), {}_h r_{\varphi,2}))$ with a probability greater than a certain probability and sets the result of the computation as second output information $z_{\varphi,2}$. The result of the computation may or may not be correct. That is, the result of the computation by the second output information computing unit 24202 may or may not be $f_\varphi(x_\varphi^{a(\varphi)}C_{\varphi,1}(y(\varphi, 1), {}_h r_{\varphi,2}))$ (step S24202).

The first output information computing unit 24201 outputs the first output information $z_{\varphi,1}$ and the second output information computing unit 24202 outputs the second output information $z_{\varphi,2}$ (step S24203).

<<Processes at Steps S24104 and S24105>>

Returning to FIG. 37, the first output information $z_{\varphi,1}$ is input in the first computing unit 24105-$\varphi$ of the computing apparatus 241-$\varphi$ (FIG. 32) and the second output information $z_{\varphi,2}$ is input in the second computing unit 24108-$\varphi$ (step S24104).

The first computing unit 24105-$\varphi$ uses the input first output information $z_{\varphi,1}$, the element ${}_h r_{\varphi,1}$, and the second encryption key $y(\varphi, 2)$ to compute $z_{\varphi,1}(C_{\varphi,2}(y(\varphi, 2), {}_h r_{\varphi,1}))^{-1}$ and sets the result of the computation as $u_\varphi$ (step S24105). The result $u_\varphi$ of the computation is sent to the first power computing unit 21106-$\varphi$. Here, $u_\varphi=z_{\varphi,1}(C_{\varphi,2}(y(\varphi, 2), {}_h r_{\varphi,1}))^{-1}=f_\varphi(x_\varphi)^{b(\varphi)}x_{\varphi,1}$. That is, $z_{\varphi,1}(C_{\varphi,2}(y(\varphi, 2), {}_h r_{\varphi,1}))^{-1}$ is an output of a randomizable sampler having an error $X_{\varphi,1}$ for $f_\varphi(x_\varphi)$. The reason will be described later.

<<Process at Step S24108>>

The second computing unit 24108-$\varphi$ uses the input second output information $z_{\varphi,2}$, the element ${}_h r_{\varphi,2}$, and the second encryption key $y(\varphi, 2)$ to compute $z_{\varphi,2}(C_{\varphi,2}(y(\varphi, 2), {}_h r_{\varphi,2}))^{-1}$ and sets the result of the computation as $v_\varphi$. The result $v_\varphi$ of the computation is sent to the second power computing unit 21109-$\varphi$. Here, $v_\varphi=z_{\varphi,2}(C_{\varphi,2}(y(\varphi, 2), {}_h r_{\varphi,2}))^{-1}=f_\varphi(x_\varphi)^{a(\varphi)}x_{\varphi,2}$. That is, $z_{\varphi,2}(C_{\varphi,2}(y(\varphi, 2), {}_h r_{\varphi,2}))^{-1}$ is an output of a randomizable sampler having an error $X_{\varphi,2}$ for $f_\varphi(x_\varphi)$. The reason will be described later.

<<Process at Step S24107>>

The determining unit 24111-$\varphi$ determines whether or not there is a pair of $u_\varphi'$ and $v_\varphi'$ that belong to a class $CL_\varphi(M_\varphi)$ corresponding to the same element $M_\varphi$ among the pairs $(u_\varphi, u_\varphi')$ stored in the first list storage 21107-$\varphi$ and the pairs $(v_\varphi, v_\varphi')$ stored in the second list storage 21110-$\varphi$. The determining unit 24111-$\varphi$ of this embodiment determines whether or not there is a pair that satisfies the relation $e_\varphi(\mu_{\varphi,g1}, c_{\varphi,2u})/e_\varphi(c_{\varphi,1u}, y(\varphi,2))=e_\varphi(\mu_{\varphi,g1}, c_{\varphi,2v})/e_\varphi(c_{\varphi,1v}, y(\varphi, 2))$ for $u_\varphi'=(c_{\varphi,1u}, c_{\varphi,2u})$ and $v_\varphi'=(c_{\varphi,1v}, c_{\varphi,2v})$ (step S24107). The reason why the determination as to whether $u_\varphi'$ and $v_\varphi'$ belong to the class $CL_\varphi(M_\varphi)$ corresponding to the same element $M_\varphi$ can be made by determining whether $u_\varphi'$ and $v_\varphi'$ satisfy the relation will be described later.

If a pair $(v_\varphi, v_\varphi')$ is not stored in the second list storage 21110-$\varphi$, a process at step S21108 is performed without performing the process at step S24107. If there is a pair of $u_\varphi'$ and $v_\varphi'$ that belong to the class $CL_\varphi(M_\varphi)$ corresponding to the same element $M_\varphi$ (if there is a pair of $u_\varphi'$ and $v_\varphi'$ that satisfy the relation given above), the process proceeds to step S21114. If there is not a pair of $u_\varphi'$ and $v_\varphi'$ that belong to the class $CL_\varphi(M_\varphi)$ corresponding to the same element $M_\varphi$, the process proceeds to step S24108.

<<Process at Step S24110>>

The determining unit 24111-$\varphi$ determines whether there is a pair of $u_\varphi'$ and $v_\varphi'$ that belong to a class $CL_\varphi(M_\varphi)$ corresponding to the same element $M_\varphi$ among the pairs $(u_\varphi, u_\varphi')$ stored in the first list storage 21107-$\varphi$ and the pairs $(v_\varphi, v_\varphi')$ stored in the second list storage 24110-$\varphi$. The determining unit 24111-$\varphi$ of this embodiment determines whether there is a pair that satisfies the relation $e_\varphi(\mu_{\varphi,g1}, c_{\varphi,2u})/e_\varphi(c_{\varphi,1u}, y(\varphi, 2))=e_\varphi(\mu_{\varphi,g1}, c_{\varphi,2v})/e_\varphi(c_{\varphi,1v}, y(\varphi, 2))$ for $u_\varphi'=(c_{\varphi,1u}, c_{\varphi,2u})$ and $v_\varphi'=(c_{\varphi,1v}, c_{\varphi,2v})$ (step S24110). If there is a pair of $u_\varphi'$ and $v_\varphi'$ that belong the class $CL_\varphi(M_\varphi)$ corresponding to the same element $M_\varphi$, the process proceeds to step S21114. If there is not a pair of $u_\varphi'$ and $v_\varphi'$ that belong to the class $CL_\varphi(M_\varphi)$ corresponding to the same element $M_\varphi$, the process proceeds to step S21111.

Note that using special groups $G_{\varphi,1}$, $G_{\varphi,2}$ and the bilinear map $e_\varphi$ can allow only a permitted person to cause the computing apparatus 241-$\varphi$ to perform the processes of steps S24107 and S24110. Details of this will be described later.

<<Reason why $z_{\varphi,1}(C_{\varphi,2}(y(\varphi, 2), {}_h r_{\varphi,1}))^{-1}$ and $z_{\varphi,2}(C_{\varphi,2}(y(\varphi, 2), {}_h r_{\varphi,2}))^{-1}$ are Outputs of Randomizable Samplers Having Errors $X_{\varphi,1}$ and $X_{\varphi,2}$, Respectively, for $f_\varphi(x_\varphi)$>>

Suppose that an arbitrary element ${}_h r_{\varphi,1}$ is fixed, then the relation given below holds for a probability distribution over a probability space of random numbers $r(\varphi)$ in elements $C_{\varphi,2}(y(\varphi, 2), m_\varphi)=(\mu_{\varphi,g1}^{r(\varphi)}, m_\varphi y(\varphi, 2)^{r(\varphi)})$:

$$[z_{\varphi,2}(C_{\varphi,2}(y(\varphi,2),{}_h r_{\varphi,2}))^{-1}]=[f_\varphi(x_\varphi^{a(\varphi)}C_{\varphi,2}(y(\varphi,1),{}_h r_{\varphi,2}))(C_{\varphi,2}(y(\varphi,2),{}_h r_{\varphi,2}))^{-1}]=[f_\varphi(C_{\varphi,2}(y(\varphi,1),D_{\varphi,1}(s(\varphi,1),x_\varphi)^{a(\varphi)}{}_h r_{\varphi,2}))(C_{\varphi,2}(y(\varphi,2),{}_h r_{\varphi,2}))^{-1}]=$$
$$[f_\varphi(C_{\varphi,2}(y(\varphi,1),D_{\varphi,1}(s(\varphi,1),x_\varphi)^{a(\varphi)}{}_h r_{\varphi,2}))C_{\varphi,2}(y(\varphi,2),D_{\varphi,1}(s(\varphi,1),x_\varphi)^{a(\varphi)}{}_h r_{\varphi,2})^{-1}C_{\varphi,2}(y(\varphi,2),D_{\varphi,1}(s(\varphi,1),x_\varphi)^{a(\varphi)})]=[f_\varphi(C_{\varphi,2}(y(\varphi,1),{}_h r_{\varphi,2}'))C_{\varphi,2}(y(\varphi,2),{}_h r_{\varphi,2}')^{-1}C_{\varphi,2}(y(\varphi,2),D_{\varphi,1}(s(\varphi,1),x_\varphi)^{a(\varphi)})]$$

where $[\psi_1]=[\psi_2]$ means that $\psi_1$ is equal to $\psi_2$ as probability distributions over probability spaces of random numbers $r$. $D_{\varphi,1}(s(\varphi, 1), x_\varphi)$ represents a function for decrypting elements $x_\varphi$ with the first decryption key $s(\varphi, 1)$ according to a first encryption scheme $ENC_{\varphi,1}$. It is assumed that ${}_h r_{\varphi,2}'=D_{\varphi,1}(s(\varphi, 1), x_\varphi)^{a(\varphi)}{}_h r_{\varphi,2}$.

Therefore, assuming that both of the random number $r(\varphi)$ and the uniform random element ${}_g r_\varphi$ on the group $G_\varphi$ are probability spaces and a random variable having a value in the group $G_\varphi$ is $X_{\varphi,2}=f_\varphi(C_{\varphi,2}(y(\varphi, 1), {}_h r_{\varphi,2}'))C_{\varphi,2}(y(\varphi, 2), {}_h r_{\varphi,2}')^{-1}$, then the relation given below holds for $x_{\varphi,2}\in X_{\varphi,2}$:

$$z_{\varphi,2}(C_{\varphi,2}(y(\varphi,2),{}_h r_{\varphi,2}))^{-1}=x_{\varphi,2}C_{\varphi,2}(y(\varphi,2),D_{\varphi,1}(s(\varphi,1),x_\varphi)^{a(\varphi)})=x_{\varphi,2}f_\varphi(x_\varphi^{a(\varphi)})=f_\varphi(x_\varphi)^{a(\varphi)}x_{\varphi,2}$$

Likewise, the relation $z_{\varphi,1}(C_{\varphi,2}(y(\varphi, 2),\ _h r_{\varphi,1}))^{-1} = f_\varphi(x_\varphi)^{b(\varphi)} x_{\varphi,1}$ holds for $x_{\varphi,1} \in X_{\varphi,1}$. Therefore, $z_{\varphi,1}(C_{\varphi,2}(y(\varphi, 2),\ _h r_{\varphi,1}))^{-1}$ and $z_{\varphi,2}(C_{\varphi,2}(y(\varphi, 2),\ _h r_{\varphi,2}))^{-1}$ are outputs of randomizable samples having errors $X_{\varphi,1}$ and $X_{\varphi,2}$, respectively, for $f_\varphi(x_\varphi)$.

<<Why Determining Whether Relation $e_\varphi(\mu_{\varphi,g1}, c_{\varphi,2u})/e_\varphi(c_{\varphi,1u}, y(\varphi, 2)) = e_\varphi(\mu_{\varphi,g1}, c_{\varphi,2v})/e_\varphi(c_{\varphi,1v}, y(\varphi, 2))$ is Satisfied can Determine Whether $u_\varphi'$ and $v_\varphi'$ Belong to Class $CL_\varphi(M_\varphi)$ Corresponding to the Same $M_\varphi$>>

Assume that $u_\varphi'$ and $v_\varphi'$ belong to a class $CL_\varphi(M_\varphi)$ corresponding to the same element $M_\varphi = x_\varphi$. Then, it is highly probable that the first randomizable sampler has correctly computed $u_\varphi = f(x_\varphi)^{b(\varphi)}$ and that the second randomizable sampler has correctly computed $v_\varphi = f_\varphi(x_\varphi)^{a(\varphi)}$ (that is, $x_{\varphi,1}$ and $x_{\varphi,2}$ are identity elements $e_{\varphi,g}$ of the group $G_\varphi$). Accordingly, it is highly probable that $u_\varphi' = (\mu_{\varphi,g1}^{r'''(\varphi)}, m_\varphi y(\varphi, 2)^{r'''(\varphi)})$ and $v_\varphi' = (\mu_{\varphi,g1}^{r'''(\varphi)}, m_\varphi y(\varphi, 2)^{r'''(\varphi)})$, where $r'''(\varphi)$ and $r''''(\varphi)$ are values that are determined by a pair of a random number component of ElGamal encryption and a natural number selected by the natural number selecting unit $21102$-$\varphi$. Then, from the properties of the bilinear map $e_\varphi$, it is highly probable for $u_\varphi' = (c_{\varphi,1u}, c_{\varphi,2u})$, the following is satisfied:

$$e_\varphi(\mu_{\varphi,g1}, c_{\varphi,2u})/e_\varphi(c_{\varphi,1u}, y(\varphi,2)) = e_\varphi(\mu_{\varphi,g1}, m_\varphi y(\varphi,2)^{r'''(\varphi)})/e_\varphi(\mu_{\varphi,g1}^{r'''(\varphi)}, y(\varphi,2)) = e_\varphi(\mu_{\varphi,g1}, m_\varphi y(\varphi,2))^{r''''(\varphi)}/e_\varphi(\mu_{\varphi,g1}, y(\varphi,2))^{r''''(\varphi)} = e_\varphi(\mu_{\varphi,g1}, m_\varphi) e_\varphi(\mu_{\varphi,g1}, y(\varphi,2))/e_\varphi(\mu_{\varphi,g1}, y(\varphi,2)) = e_\varphi(\mu_{\varphi,g1}, m_\varphi).$$

For $v_\varphi' = (c_{\varphi,1v}, c_{\varphi,2v})$, it is highly probable that the following is satisfied:

$$e_\varphi(\mu_{\varphi,g1}, c_{\varphi,2v})/e_\varphi(c_{\varphi,1v}, y(\varphi,2)) = e_\varphi(\mu_{\varphi,g1}, m_\varphi y(\varphi,2)^{r'''(\varphi)})/e_\varphi(\mu_{\varphi,g1}^{r'''(\varphi)}, y(\varphi,2)) = e_\varphi(\mu_{\varphi,g1}, m_\varphi y(\varphi,2))^{r''''(\varphi)}/e_\varphi(\mu_{\varphi,g1}, y(\varphi,2))^{r''''(\varphi)} = e_\varphi(\mu_{\varphi,g1}, m_\varphi) e_\varphi(\mu_{\varphi,g1}, y(\varphi,2))/e_\varphi(\mu_{\varphi,g1}, y(\varphi,2)) = e_\varphi(\mu_{\varphi,g1}, m_\varphi).$$

Therefore, if $u_\varphi'$ and $v_\varphi'$ belong to the class $CL_\varphi(M_\varphi)$ corresponding to the same element $M_\varphi$, it is highly probable that the relation $e_\varphi(\mu_{\varphi,g1}, c_{\varphi,2u})/e_\varphi(c_{\varphi,1u}, y(\varphi, 2)) = e_\varphi(\mu_{\varphi,g1}, c_{\varphi,2v})/e_\varphi(c_{\varphi,1v}, y(\varphi, 2))$ is satisfied.

Next, assume that $u_\varphi'$ and $v_\varphi'$ belong to classes corresponding to different elements. That is, $u_\varphi'$ belongs a class $CL_\varphi(m_{\varphi,\ u})$ corresponding to an element $m_{\varphi,u}$ and $v_\varphi'$ belongs to a class $CL_\varphi(m_{\varphi,v})$ corresponding to an element $m_{\varphi,v}$ ($m_{\varphi,v} \neq m_{\varphi,u}$). Then, $u_\varphi' = (\mu_{\varphi,g1}^{r'''(\varphi)}, m_{\varphi,u} y(\varphi, 2)^{r'''(\varphi)}) x_{\varphi,1}$ and $v_\varphi' = (\mu_{\varphi,g1}^{r'''(\varphi)}, m_{\varphi,v} y(\varphi, 2)^{r'''(\varphi)}) x_{\varphi,2}$. Accordingly, $e_\varphi(\mu_{\varphi,g1}, c_{\varphi,2u})/e_\varphi(c_{\varphi,1u}, y(\varphi, 2)) = e_\varphi(\mu_{\varphi,g1}, m_{\varphi,u}) x_{\varphi,1}$ is satisfied for $u_\varphi' = (c_{\varphi,1u}, c_{\varphi,2u})$ and $e_\varphi(\mu_{\varphi,g1}, c_{\varphi,2v})/e_\varphi(c_{\varphi,1v}, y(\varphi, 2)) = e_\varphi(\mu_{\varphi,g1}, m_{\varphi,v}) x_{\varphi,2}$ is satisfied for $v_\varphi' = (c_{\varphi,1v}, c_{\varphi,2v})$. Therefore, if $u_\varphi'$ and $v_\varphi'$ belong to classes corresponding to different elements, it is highly probable that the relation $e_\varphi(\mu_{\varphi,g1}, c_{\varphi,2u})/e_\varphi(c_{\varphi,1u}, y(\varphi, 2)) \neq e_\varphi(\mu_{\varphi,g1}, c_{\varphi,2v})/e_\varphi(c_{\varphi,1v}, y(\varphi, 2))$ is satisfied.

<<Special Groups $G_{\varphi,1}$, $G_{\varphi,2}$ and Bilinear Map $e_\varphi$>>

Setting the following restriction on the constructions of groups $G_{\varphi,1}$, $G_{\varphi,2}$ and the bilinear map $e_\varphi$ can allow only a permitted person to cause the computing apparatus $241$-$\varphi$ to perform the processes of steps S24107 and S24110. Details of this will be described below.

In this special example, $N_\varphi$ is the composite number of primes $\omega_\varphi$ and primes $\iota_\varphi$, groups $G_{\varphi,1}$ and $G_{\varphi,2}$ are subgroups consisting of points on a first elliptic curve $E_{\varphi,1}$ defined on a factor ring $Z/N_\varphi Z$ modulo composite number $N_\varphi$, $G_{\varphi,1\omega}$ and $G_{\varphi,2\omega}$ are subgroups consisting of points on a second elliptic curve $E_{\varphi,2}$ defined on a factor ring $Z/\omega_\varphi Z$ modulo prime $\omega_\varphi$, $G_{\varphi,1\iota}$ and $G_{\varphi,2\iota}$ are subgroups consisting of points on a third elliptic curve $E_{\varphi,3}$ defined on a factor ring $Z/\iota_\varphi Z$ modulo prime $\iota_\varphi$, $e_\varphi(\alpha, \beta)$ is a bilinear map that yields an element of a cyclic group $G_{\varphi,T}$ for $(\alpha, \beta) \in G_{\varphi,1} \times G_{\varphi,2}$, $e_{\varphi,\omega}(\alpha_\omega, \beta_\omega)$ is a second bilinear map that yields an element of a cyclic group $G_{\varphi,T\omega}$ for $(\alpha_\omega, \beta_\omega) \in G_{\varphi,1\omega} \times G_{\varphi,2\omega}$, $e_{\varphi,\iota}(\alpha_\iota, \beta_\iota)$ is a third bilinear map that yields an element of a cyclic group $G_{\varphi,T\iota}$ for $(\alpha_\iota, \beta_\iota) \in G_{\varphi,1\iota} \times G_{\varphi,2\iota}$, $HM_\varphi$ is an isomorphism map that maps a point on the first elliptic curve $E_{\varphi,1}$ to a point on the second elliptic curve $E_{\varphi,2}$, and a point on the third elliptic curve $E_{\varphi,3}$, and $HM_\varphi^{-1}$ is the inverse map of the isomorphism map $HM_\varphi$.

In this example, the bilinear map $e_\varphi(\alpha, \beta)$ is defined on the first elliptic curve $E_{\varphi,1}$ defined on the factor ring $Z/N_\varphi Z$. However, there is not a known method for computing the bilinear map $e_\varphi(\alpha, \beta)$ defined on an elliptic curve defined on a factor ring in polynomial time nor a method for constructing a bilinear map $e_\varphi(\alpha, \beta)$ defined on an elliptic curve defined on a factor ring that can be computed in polynomial time (Reference literature 4: Alexander W. Dent and Steven D. Galbraith, "Hidden Pairings and Trapdoor DDH Groups," ANTS 2006, LNCS 4076, pp. 436-451, 2006). In such a setting, the determining unit 24111 cannot determine whether or not the relation $e_\varphi(\mu_{\varphi,g1}, c_{\varphi,2u})/e_\varphi(c_{\varphi,1u}, y(\varphi, 2)) = e_\varphi(\mu_{\varphi,g1}, c_{\varphi,2v})/e_\varphi(c_{\varphi,1v}, y(\varphi, 2))$ is satisfied by directly computing the bilinear map $e_\varphi$ on the factor ring $Z/N_\varphi Z$.

On the other hand, as for $e_{\varphi,\omega}(\alpha_\omega, \beta_\omega)$ and $e_{\varphi,\iota}(\alpha_\iota, \beta_\iota)$ defined on elliptic curves defined on residual fields $Z/\omega_\varphi Z$ and $Z/\iota_\varphi Z$, there are pairings such as Weil pairing and Tate pairing which can be computed in polynomial time (see Reference literatures 2 and 3, for example). Algorithms for computing such $e_{\varphi,\omega}(\alpha_\omega, \beta_\omega)$ and $e_{\varphi,\iota}(\alpha_\iota, \beta_\iota)$ in polynomial time, such as Miller's algorithm, are well known (Reference literature 5: V. S. Miller, "Short Programs for functions on Curves," 1986, Internet <http://crypto.standford.edu/miller/miller.pdf>). Furthermore, methods for constructing elliptic curves and cyclic groups for efficiently computing such $e_{\varphi,\omega}(\alpha_\omega, \beta_\omega)$ and $e_{\varphi,\iota}(\alpha_\iota, \beta_\iota)$ are also well known (See, for example, Reference literatures 3 and 6: A Miyaji, M. Nakabayashi, S. Takano, "New explicit conditions of elliptic curve Traces for FR-Reduction," IEICE Trans. Fundamentals, vol. E84-A, no. 05, pp. 1234-1243, May 2001", Reference literature 7: P. S. L. M. Barreto, B. Lynn, M. Scott, "Constructing elliptic curves with prescribed embedding degrees," Proc. SCN 2002, LNCS 2576, pp. 257-267, Springer-Verlag, 2003", Reference literature 8: R. Dupont, A. Enge, F. Morain, "Building curves with arbitrary small MOV degree over finite prime fields," http://eprintiacr.org/2002/094).

It is well known that, based on the Chinese remainder theorem, there is an isomorphic map that maps from a factor ring $Z/N_\varphi Z$ modulo composite number $N_\varphi$ ($N_\varphi = \omega_\varphi \cdot \iota_\varphi$) to the direct product of a residue field $Z/\omega_\varphi Z$ and a residue field $Z/\iota_\varphi Z$, and that there is an isomorphic map that maps from the direct map of a residue field $Z/\omega_\varphi Z$ and a residue field $Z/\iota_\varphi Z$ to a factor ring $Z/N_\varphi Z$ (Reference literature 9: Johannes Buchmann "Introduction to Cryptography", Springer Verlag Tokyo, (2001/07), ISBN-10: 4431708669 ISBN-13, pp. 52-56). That is, there are an isomorphic map $HM_\varphi$ that maps a point on the first elliptic curve $E_{\varphi,1}$ to a point on the second elliptic curve $E_{\varphi,\ 2}$ and a point on the third elliptic curve $E_{\varphi,3}$, and its inverse map $HM_\varphi^{-1}$. To take an example, an isomorphic map that maps an element $\kappa$ mod $N_\varphi$ of a factor ring $Z/N_\varphi Z$ to an element $\kappa$ mod $\omega_\varphi$ of a residue field $Z/\omega_\varphi Z$ and an element $\kappa$ mod $\iota_\varphi$ of a residue field $Z/\iota_\varphi Z$ can be $HM_\varphi$ and a map that maps an element $\kappa_\omega$ mod $\omega_\varphi$ of a residue field $Z/\omega_\varphi Z$ and an element $\kappa_\iota$ mod $\iota_\varphi$ of a residue field $Z/\iota_\varphi Z$ to a an element $\kappa_\omega \iota_\omega \iota_\omega' + \kappa_\iota \omega_\varphi \omega_\varphi'$ mod $N_\varphi$ of factor ring $Z/N_\varphi Z$ can be $HM_\varphi^{-1}$. Here, $\omega_\varphi'$ and $\iota_\varphi'$ are natural numbers that satisfy $\omega_\varphi \omega_\varphi' + \iota_\varphi \iota_\varphi' = 1$. Such $\omega_\varphi'$ and $\iota_\varphi'$ can be easily generated by using the extended Euclidean algorithm. From the relation $\omega_\varphi \omega_\varphi' + \iota_\varphi \iota_\varphi' = 1$, application of $HM_\varphi$ to $\kappa_\omega \iota_\varphi \iota_\varphi' + \kappa_\iota \omega_\varphi \omega_\varphi'$ mod N yields $$\kappa_\omega \iota_\varphi \iota_\varphi' + \kappa_\iota \omega_\varphi \omega_\varphi' \bmod \omega_\varphi = \kappa_\omega \iota_\varphi \iota_\varphi' \bmod \omega_\varphi = \kappa_\omega (1 - \omega_\varphi \omega_\varphi') \bmod \omega_\varphi = \kappa_\omega \bmod \omega_\varphi \in Z/\omega_\varphi Z$$

$$\kappa_\omega \iota_\varphi \iota_\varphi' + \kappa_\iota \omega_\varphi \omega_\varphi' \bmod \iota_\varphi = \kappa_\iota \omega_\varphi \omega_\varphi' \bmod \iota_\varphi = \kappa_\iota (1 - \iota_\varphi \iota_\varphi') \bmod \iota_\varphi = \kappa_\iota \bmod \iota_\varphi \in Z/\iota_\varphi Z$$

Thus, it can be seen that the mapping in this example is between $HM_\varphi$ and $HM_\varphi^{-1}$.

Therefore, if values resulting from factorization of the composite number $N_\varphi$ into primes are given, that is, values of primes $\omega_\varphi$ and $\iota_\varphi$ are given, the determining unit 24111 can compute the bilinear map $e_\varphi(\alpha, \beta)$ on the first elliptic curve $E_{\varphi,1}$ defined on the factor ring $Z/N_\varphi Z$ by performing the following process of steps A to D.

(Step A) The determining unit 24111 uses the isomorphic map $HM_\varphi$ to map a point $\alpha \in G_{\varphi,1}$ on the first elliptic curve $E_{\varphi,1}$ defined on the factor ring $Z/N_\varphi Z$ to a point $\theta_\omega(\alpha) \in G_{\varphi,1\omega}$ on the second elliptic curve $E_{\varphi,2}$ defined on the residue field $Z/\omega_\varphi Z$ and a point $\theta_\iota(\alpha) \in G_{\varphi,1\iota}$ on the third elliptic curve $E_{\varphi,3}$ defined on the residue field $Z/\iota_\varphi Z$.

(Step B) The determining unit 24111 uses the isomorphic map $HM_\varphi$ to map a point $\beta \in G_{\varphi,2}$ on the first elliptic curve $E_{\varphi,1}$ defined on the factor ring $Z/N_\varphi Z$ to a point $\theta_\omega(\beta) \in G_{\varphi,2\omega}$ on the second elliptic curve $E_{\varphi,2}$ defined on the residue field $Z/\omega_\varphi Z$ and a point $\theta_\iota(\beta) \in G_{\varphi,2\iota}$ on the third elliptic curve $E_{\varphi,3}$ defined on the residue field $Z/\iota_\varphi Z$.

(Step C) The determining unit 24111 obtains $e_{\varphi,\omega}(\theta_\omega(\alpha), \theta_\omega(\beta))$ and $e_{\varphi,\iota}(\theta_\iota(\alpha), \theta_\iota(\beta))$ on the second elliptic curve $E_{\varphi,2}$ and the third elliptic curve $E_{\varphi,3}$.

(Step D) The determining unit 24111 applies the inverse map $HM_\varphi^{-1}$ to the obtained results of the computations $e_{\varphi,\omega}(\theta_\omega(\alpha), \theta_\omega(\beta))$ and $e_{\varphi,\iota}(\theta_\iota(\alpha), \theta_\iota(\beta))$ to obtain a value $e_\varphi(\alpha, \beta)$.

Thus, if values of primes $\omega_\varphi$ and $\iota_\varphi$ are given, the determining unit 24111 can compute $e_\varphi(\mu_{\varphi,g1}, c_{\varphi,2u})$, $e_\varphi(c_{\varphi,1u}, y(\varphi, 2))$, $e_\varphi(\mu_{\varphi,g1}, c_{\varphi,2v})$, and $e_\varphi(c_{\varphi,1v}, y(\varphi, 2))$ by following steps A through D to determine whether or not the relation $e_\varphi(\mu_{\varphi,g1}, c_{\varphi,2u})/e_\varphi(c_{\varphi,1u}, y(\varphi, 2)) = e_\varphi(\mu_{\varphi,g1}, c_{\varphi,2v})/e_\varphi(c_{\varphi,1v}, y(\varphi, 2))$ is satisfied.

On the other hand, no method for factorizing a large composite number $N_\varphi$ into primes in polynomial time is known. Therefore, in this setting, the determining unit 24111 to which at least one of the primes $\omega_\varphi$ and $\iota_\varphi$ is not given cannot determine whether or not the relation $e_\varphi(\mu_{\varphi,g1}, c_{\varphi,2u})/e_\varphi(c_{\varphi,1u}, y(\varphi, 2)) = e_\varphi(\mu_{\varphi,g1}, c_{\varphi,2v})/e_\varphi(c_{\varphi,1v}, y(\varphi, 2))$ is satisfied.

Using the special groups $G_{\varphi,1}$, $G_{\varphi,2}$ and the bilinear map $e_\varphi$ described above can allow only a person who knows at least one of the primes $\omega_\varphi$ and $\iota_\varphi$ to cause the computing apparatus 241-$\varphi$ to perform the processes of steps S24107 and S24110.

Sixteenth Embodiment

A proxy computing system of a sixteenth embodiment is another example that embodies the first randomizable sampler and the second randomizable sampler described above. Specifically, the proxy computing system embodies an example of the first randomizable sampler and the second randomizable sampler in which $H_\varphi$ is the direct product $G_\varphi \times G_\varphi$ of groups $G_\varphi$ which are cyclic groups, a function $f_\varphi(x_\varphi)$ is a decryption function of the ElGamal encryption, that is, $f_\varphi(c_{\varphi,1}, c_{\varphi,2}) = c_{\varphi,1} c_{\varphi,2}^{-s(\varphi)}$ for an element $x_\varphi = (c_{\varphi,1}, c_{\varphi,2})$ which is a ciphertext and a decryption key $s(\varphi)$. The following description will focus on differences from the twelfth embodiment and description of commonalities with the twelfth embodiment will be omitted.

As illustrated in FIG. 31, the proxy computing system 205 of the sixteenth embodiment includes a computing apparatus 251-$\varphi$ in place of the computing apparatus 211-$\varphi$ and a capability providing apparatus 252 in place of the capability providing apparatus 212.

Figure 36:
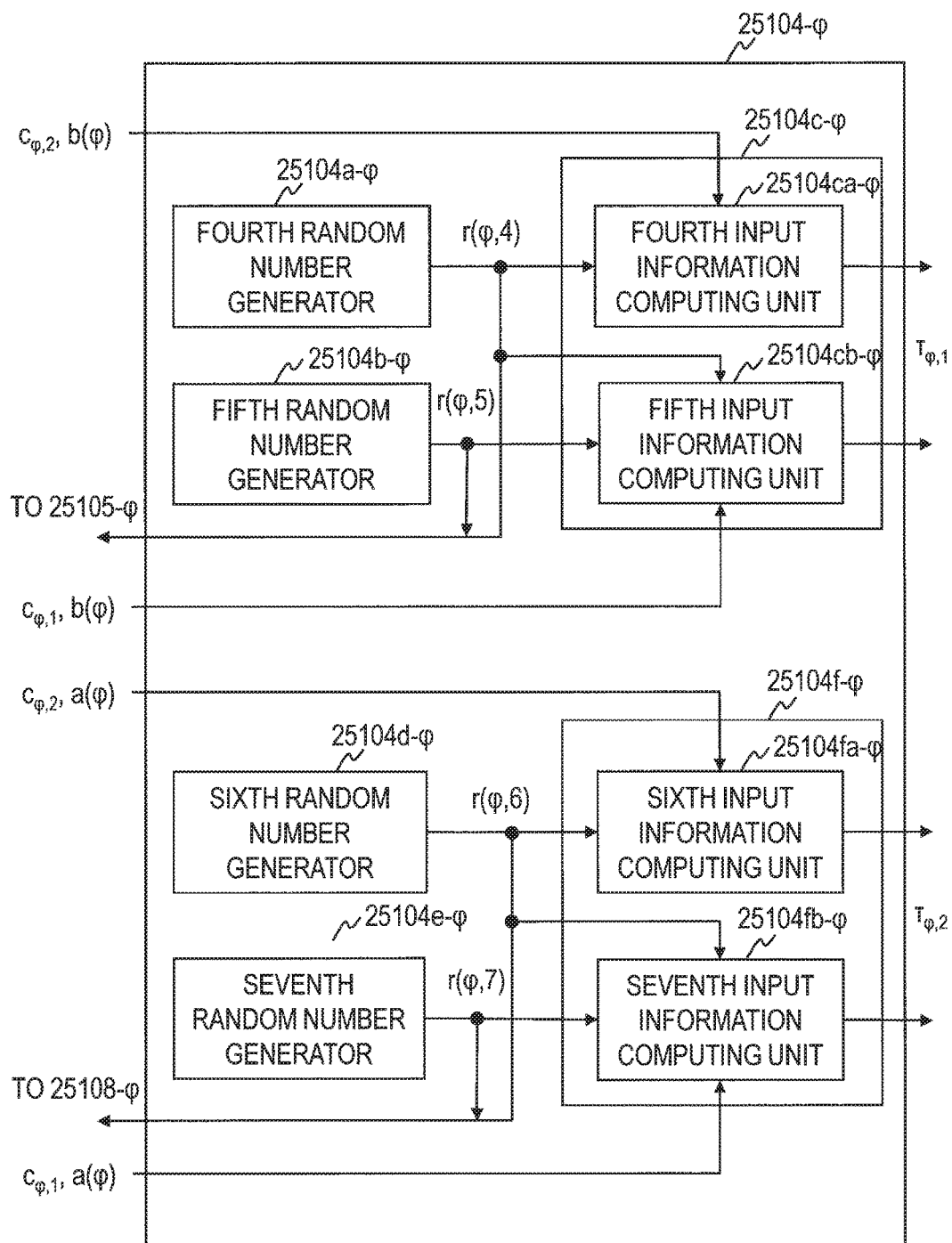
FIG. 36 is a block diagram illustrating a configuration of an input information providing unit of an embodiment.

As illustrated in FIG. 32, the computing apparatus 251-$\varphi$ of the sixteenth embodiment includes, for example, a natural number storage 21101-$\varphi$, a natural number selecting unit 21102-$\varphi$, an integer computing unit 21103-$\varphi$, an input information providing unit 25104-$\varphi$, a first computing unit 25105-$\varphi$, a first power computing unit 21106-$\varphi$, a first list storage 21107-$\varphi$, a second computing unit 25108-$\varphi$, a second power computing unit 21109-$\varphi$, a second list storage 21110-$\varphi$, a determining unit 21111-$\varphi$, a final output unit 21112-$\varphi$, and a controller 21113-$\varphi$. As illustrated in FIG. 36, the input information providing unit 25104-$\varphi$ of this embodiment includes, for example, a fourth random number generator 25104*a*-$\varphi$, a fifth random number generator 25104*b*-$\varphi$, a first input information computing unit 25104*c*-$\varphi$, a sixth random number generator 25104*d*-$\varphi$, a seventh random number generator 25104*e*-$\varphi$, and a second input information computing unit 25104*f*-$\varphi$. The first input information computing unit 25104*c*-$\varphi$ includes, for example, a fourth input information computing unit 25104*ca*-$\varphi$ and a fifth input information computing unit 25104*cb*-$\varphi$. The second input information computing unit 25104*f*-$\varphi$ includes, for example, a sixth input information computing unit 25104*fa*-$\varphi$ and a seventh input information computing unit 25104*fb*-$\varphi$.

As illustrated in FIG. 33, the capability providing apparatus 252 of the sixteenth embodiment includes, for example, a first output information computing unit 25201, the second output information computing unit 25202, and a controller 21205.

<Processes>

Processes of this embodiment will be described below. In the sixteenth embodiment, it is assumed that a group $H_\varphi = G_\varphi \times G_\varphi$, an element $x_\varphi = (c_{\varphi,1}, c_{\varphi,2}) \in H_\varphi$, $f_\varphi(c_{\varphi,1}, c_{\varphi,2})$ is a homomorphic function, a generator of the group $G_\varphi$ is $\mu_{\varphi,g}$, the order of the group $G_\varphi$ is $K_{\varphi,G}$, a pair of a ciphertext $(V_\varphi, W_\varphi) \in H_\varphi$ and a decrypted text $f_\varphi(V_\varphi, W_\varphi) = Y_\varphi \in G_\varphi$ decrypted from the ciphertext for the same decryption key $s(\varphi)$ is preset in the computing apparatus 251-$\varphi$ and the capability providing apparatus 252, and the computing apparatus 251-$\varphi$ and the capability providing apparatus 252 can use the pair.

As illustrated in FIGS. 37 and 38, a process of the sixteenth embodiment is the same as the process of the twelfth embodiment except that steps S21103 through S21105, S21108, and S21200 through S21203 of the twelfth embodiment are replaced with steps S25103 through S25105, S25108, and S25200 through S25203, respectively. In the following, only processes at steps S25103 through S25105, S25108, and S25200 through S25203 will be described.

<<Process at Step S25103>>

Figure 41:
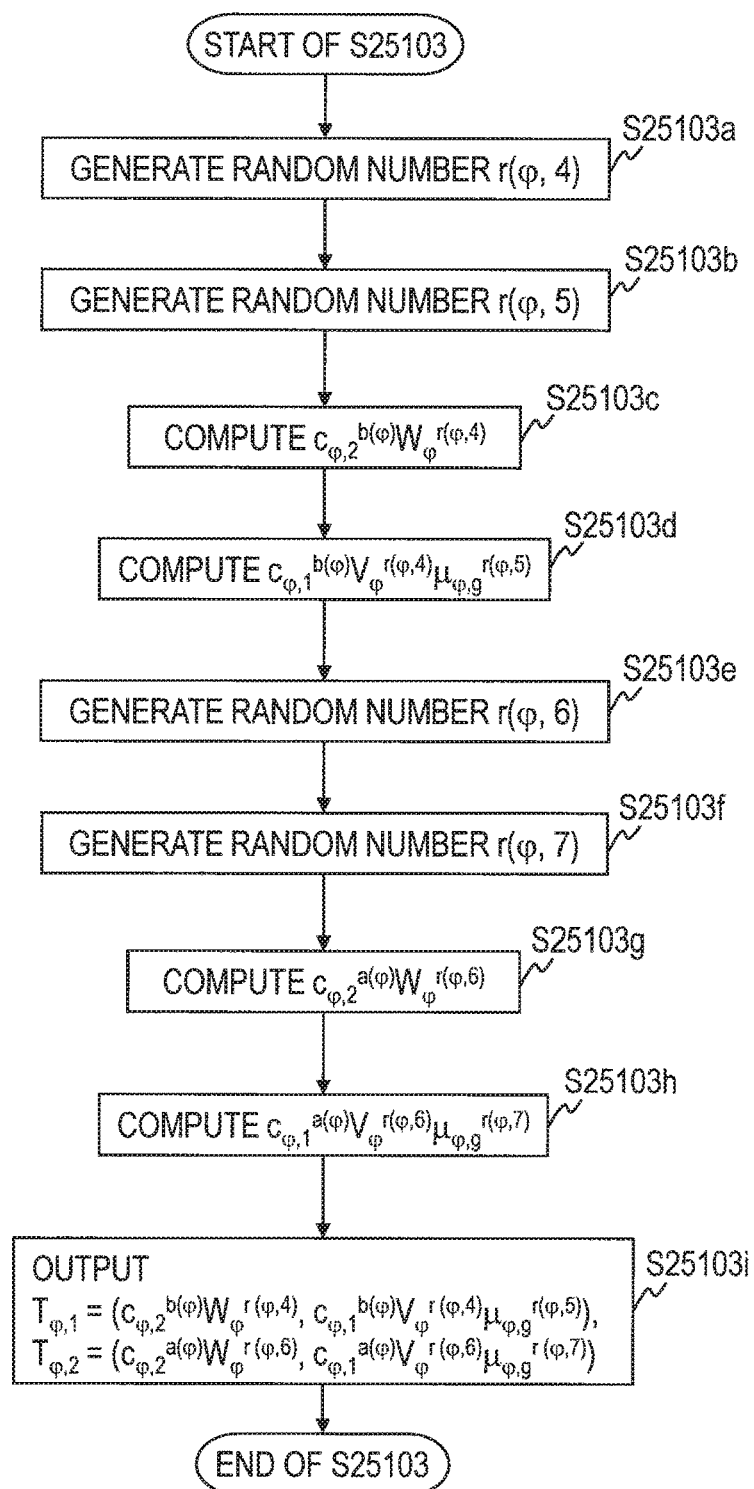
FIG. 41 is a flowchart illustrating a process at step S25103.

The input information providing unit 25104-$\varphi$ of the computing apparatus 251-$\varphi$ (FIG. 32) generates and outputs first input information $\tau_{\varphi,1}$ corresponding to an input element $x_\varphi = (c_{\varphi,1}, c_{\varphi,2})$ and second input information $\tau_{\varphi,2}$ corresponding to the input element $x_\varphi = (c_{\varphi,1}, c_{\varphi,2})$ (step S25103 of FIG. 37). A process at step S25103 of this embodiment will be described below with reference to FIG. 41.

The fourth random number generator 25104a-φ (FIG. 36) generates a uniform random number r(φ, 4) that is a natural number greater than or equal to 0 and less than $K_{φ,G}$. The generated random number r(φ, 4) is sent to the fourth input information computing unit 25104ca-φ, the fifth input information computing unit 25104cb-φ, and the first computing unit 25105-φ (step S25103a). The fifth random number generator 25104b-φ generates a uniform random number r(φ, 5) that is a natural number greater than or equal to 0 and less than $K_{φ,G}$. The generated random number r(φ, 5) is sent to the fifth input information computing unit 25104cb-φ and the first computing unit 25105-φ (step S25103b).

The fourth input information computing unit 25104ca-φ uses a natural number b(φ) selected by the natural number selecting unit 21102-φ, $c_{φ,2}$ included in the element $x_φ$, and the random number r(φ, 4) to compute fourth input information $c_{φ,2}^{b(φ)}W_φ^{r(φ,4)}$ (step S25103c). The fifth input information computing unit 25104cb-φ uses the natural number b(φ) selected by the natural number selecting unit 21102-φ, $c_{φ,1}$ included in the element $x_φ$, and random numbers r(φ, 4) and r(φ, 5) to compute fifth input information $c_{φ,1}^{b(φ)}V_φ^{r(φ,4)}μ_{φ,g}^{r(φ,5)}$ (step S25103d).

The sixth random number generator 25104d-φ generates a uniform random number r(φ, 6) that is a natural number greater than or equal to 0 and less than $K_{φ,G}$. The generated random number r(φ, 6) is sent to the sixth input information computing unit 25104fa-φ, the seventh input information computing unit 25104fb-φ, and the second computing unit 25108-φ (step S25103e). The seventh random number generator 25104e-φ generates a uniform random number r(φ, 7) that is a natural number greater than or equal to 0 and less than $K_{φ,G}$. The generated random number r(φ, 7) is sent to the seventh input information computing unit 25104fb-φ and the second computing unit 25108-φ (step S25103f).

The sixth input information computing unit 25104fa-φ uses a natural number a(φ) selected by the natural number selecting unit 21102-φ, $c_{φ,2}$ included in the element $x_φ$, and the random number r(φ, 6) to compute sixth input information $c_{φ,2}^{a(φ)}W_φ^{r(φ,6)}$ (step S25103g). The seventh input information computing unit 25104fb-φ uses the natural number a(φ) selected by the natural number selecting unit 21102-φ, $c_{φ,1}$ included in the element $x_φ$, and the random numbers r(φ, 6) and r(φ, 7) to compute seventh input information $c_{φ,1}^{a(φ)}V_φ^{r(φ,6)}μ_g^{r(φ,7)}$ (step S25103h).

The first input information computing unit 25104c-φ outputs the fourth input information $c_{φ,2}^{b(φ)}W^{r(φ,4)}$ and the fifth input information $c_{φ,1}^{b(φ)}V_φ^{r(φ,4)}μ_{φ,g}^{r(φ,5)}$ generated as described above as first input information $τ_{φ,1}=(c_{φ,2}^{b(φ)}W_φ^{r(φ,4)}, c_{φ,1}^{b(φ)}V_φ^{r(φ,4)}μ_{φ,g}^{r(φ,5)})$. The second input information computing unit 25104f-φ outputs the sixth input information $c_{φ,2}^{a(φ)}W_φ^{r(φ,6)}$ and the seventh input information $c_{φ,1}^{a(φ)}V_φ^{r(φ,6)}μ_{φ,g}^{r(φ,7)}$ generated as described above as second input information $τ_{φ,2}=(c_{φ,2}^{a(φ)}W_φ^{r(φ,6)}, c_{φ,1}^{a(φ)}V_φ^{r(φ,6)}μ_{φ,g}^{r(φ,7)})$ (step S25103i).

<<Processes at Steps S25200 Through S25203>>

As illustrated in FIG. 38, first, the first input information $τ_{φ,1}=(c_{φ,2}^{b(φ)}W_φ^{r(φ,4)}, c_{φ,1}^{b(φ)}V_φ^{r(φ,4)}μ_{φ,g}^{r(φ,5)})$ is input in the first output information computing unit 25201 of the capability providing apparatus 252 (FIG. 33) and the second input information $τ_{φ,2}=(c_{φ,2}^{a(φ)}W_φ^{r(φ,6)}, c_{φ,1}^{a(φ)}V_φ^{r(φ,6)}μ_{φ,g}^{r(φ,7)})$ is input in the second output information computing unit 25202 (step S25200).

The first output information computing unit 25201 uses the first input information $τ_{φ,1}=(c_{φ,2}^{b(φ)}W_φ^{r(φ,4)}, c_{φ,1}^{b(φ)}V_φ^{r(φ,4)}μ_{φ,g}^{r(φ,5)})$ and the decryption key s(φ) to correctly compute $f_φ(c_{φ,1}^{b(φ)}V_φ^{r(φ,4)}μ_{φ,g}^{r(φ,5)}, c_{φ,2}^{b(φ)}W_φ^{r(φ,4)})$ with a probability greater than a certain probability and sets the result of the computation as first output information $z_{φ,1}$. The result of the computation may or may not be correct. That is, the result of the computation by the first output information computing unit 25201 may or may not be $f_φ(c_{φ,1}^{b(φ)}V_φ^{r(φ,4)}μ_{φ,g}^{r(φ,5)}, c_{φ,2}^{b(φ)}W_φ^{r(φ,4)})$ (step S25201).

The second output information computing unit 25202 can use the second input information $τ_{φ,2}=(c_{φ,2}^{a(φ)}W_φ^{r(φ,6)}, c_{φ,1}^{a(φ)}V_φ^{r(φ,6)}μ_{φ,g}^{r(φ,7)})$ and the decryption key s(φ) to correctly compute $f_φ(c_{φ,1}^{a(φ)}V_φ^{r(φ,6)}μ_{φ,g}^{r(φ,7)}, c_{φ,2}^{a(φ)}W_φ^{r(φ,6)})$ with a probability greater than a certain probability and sets the result of the computation as second output information $z_{φ,2}$. The result of the computation may or may not be correct. That is, the result of the computation by the second output information computing unit 25202 may or may not be $f_φ(c_{φ,1}^{a(φ)}V_φ^{r(φ,6)}μ_{φ,g}^{r(φ,7)}, c_{φ,2}^{a(φ)}W_φ^{r(φ,6)})$ (step S25202).

The first output information computing unit 25201 outputs the first output information $z_{φ,1}$ and the second output information computing unit 25202 outputs the second output information $z_{φ,2}$ (step S25203).

<<Processes at Steps S25104 and S25105>>

Returning to FIG. 37, the first output information $z_{φ,1}$ is input in the first computing unit 25105-φ of the computing apparatus 251-φ (FIG. 32) and the second output information $z_{φ,2}$ is input in the second computing unit 25108-φ (step S25104).

The first computing unit 25105-φ uses the input first output information $z_{φ,1}$ and the random numbers r(φ, 4) and r(φ, 5) to compute $z_{φ,1}Y_φ^{-r(φ,4)}μ_{φ,g}^{-r(φ,5)}$ and sets the result of the computation as $u_φ$ (step S25105). The result $u_φ$ of the computation is sent to the first power computing unit 21106-φ. Here, $u_φ=z_{φ,4}Y_φ^{-r(φ,4)}μ_{φ,g}^{-r(φ,5)}=f_φ(c_{φ,1}, c_{φ,2})^{b(φ)}X_{φ,1}$. That is, $z_{φ,4}Y_φ^{-r(φ,4)}μ_{φ,g}^{-r(φ,5)}$ is an output of a randomizable sampler having an error $X_{φ,1}$ for $f_φ(c_{φ,1}, c_{φ,2})$. The reason will be described later.

<<Process at Step S25108>>

The second computing unit 25108-φ uses the input second output information $z_{φ,2}$ and the random numbers r(φ,6) and r(φ,7) to compute $z_{φ,2}Y_φ^{-r(φ,6)}μ_{φ,g}^{-r(φ,7)}$ and sets the result of the computation as $v_φ$. The result $v_φ$ of the computation is sent to the second power computing unit 21109-φ. Here, $v_φ=z_{φ,5}Y_φ^{-r(φ,6)}μ_{φ,g}^{-r(φ,7)}=f_φ(c_{φ,1}, c_{φ,2})^{a(φ)}X_{φ,2}$. That is, $z_{φ,5}Y_φ^{-r(φ,6)}μ_{φ,g}^{-r(φ,7)}$ is an output of a randomizable sampler having an error $X_{φ,2}$ for $f_φ(c_{φ,1}, c_{φ,2})$. The reason will be described later.

<<Reason why $z_{φ,4}Y_φ^{-r(φ,4)}μ_{φ,g}^{-r(φ,5)}$ and $z_{φ,5}Y_φ^{-r(φ,6)}μ_{φ,g}^{-r(φ,7)}$ are Outputs of Randomizable Samplers Having Errors $X_{φ,1}$ and $X_{φ,2}$, Respectively, for $f_φ(c_{φ,1}, c_{φ,2})$>>

Let c be a natural number, $R_1$, $R_2$, $R_1'$ and $R_2'$ be random numbers, and $B(c_{φ,1}^{c}V_φ^{R1}μ_{φ,g}^{R2}, c_{φ,2}^{c}W_φ^{R1})$ be the result of computation performed by the capability providing apparatus 252 using $c_{φ,1}^{c}V_φ^{R1}μ_{φ,g}^{R2}$ and $c_{φ,2}^{c}W_φ^{R1}$. That is, the first output information computing unit 25201 and the second output information computing unit 25202 return $z_φ=B(c_{φ,1}^{c}V_φ^{R1}μ_{φ,g}^{R2}, c_{φ,2}^{c}W_φ^{R1})$ as the results of computations to the computing apparatus 251-φ. Furthermore, a random variable $X_φ$ having a value in a group $G_φ$ is defined as $X_φ=B(V_φ^{R1'}μ_{φ,g}^{R2'}, W_φ^{R1'})f_φ(V_φ^{R1'}μ_{φ,g}^{R2'}, W_φ^{R1'})^{-1}$.

Here, $z_φY_φ^{-R1}μ_{φ,g}^{-R2}=B(c_{φ,1}^{c}V_φ^{R1}μ_{φ,g}^{R2}, c_{φ,2}^{c}W_φ^{R1})Y_φ^{-R1}μ_{φ,g}^{-R2}=X_φf_φ(c_{φ,1}^{c}V_φ^{R1}μ_{φ,g}^{R2}, c_{φ,2}^{c}W_φ^{R1})Y_φ^{-R1}μ_{φ,g}^{-R2}=X_φf_φ(c_{φ,1}, c_{φ,2})^{c}f_φ(V_φ, W_φ)^{R1}f_φ(μ_{φ,g}, e_{φ,g})^{R2}Y_φ^{-R1}μ_{φ,g}^{-R2}=X_φf_φ(c_{φ,1}, c_{φ,2})^{c}V_φ^{R1}μ_{φ,g}^{R2}Y_φ^{-R1}μ_{φ,g}^{-R2}=f_φ(c_{φ,1}, c_{φ,2})^{c}X_φ$. That is, $z_φY_φ^{-R1}μ_{φ,g}^{-R2}$ is an output of a randomizable sampler having an error $X_φ$ for $f_φ(x_φ)$. Note that $e_{φ,g}$ is an identity element of the group $G_φ$.

The expansion of formula given above uses the properties such that $X_φ=B(V_φ^{R1'}μ_{φ,g}^{R2'}, W_φ^{R1'})f_φ(V_φ^{R1'}μ_{φ,g}^{R2'}, W_φ^{R1'})^{-1}=B(c_{φ,1}^{c}V_φ^{R1}μ_{φ,g}^{R2}, c_{φ,2}^{c}W_φ^{R1})f_φ(c_{φ,1}^{c}V_φ^{R1}μ_{φ,g}^{R2}, $c_{\varphi,2}{}^c W_\varphi{}^{R1}$) and that $B(c_{\varphi,1}{}^c V_\varphi{}^{R1} \mu_{\varphi,g}{}^{R2}, c_{\varphi,2}{}^c W_\varphi{}^{R1}) = X_\varphi f_\varphi(c_{\varphi,1}{}^c V_\varphi{}^{R1} \mu_{\varphi,g}{}^{R2}, c_{\varphi,2}{}^c W_\varphi{}^{R1})$. The properties are based on the fact that $R_1$, $R_2$, $R_1'$ and $R_2'$ are random numbers.

Therefore, considering that $a(\varphi)$ and $b(\varphi)$ are natural numbers and $r(\varphi, 4)$, $r(\varphi, 5)$, $r(\varphi, 6)$, and $r(\varphi, 7)$ are random numbers, $z_{\varphi,4} Y_\varphi{}^{-r(\varphi,4)} \mu_{\varphi,g}{}^{-r(\varphi,5)}$ and $z_{\varphi,5} Y_\varphi{}^{-R(\varphi,6)} \mu_{\varphi,g}{}^{-R(\varphi,7)}$ are, likewise, outputs of randomizable samplers having errors $X_{\varphi,1}$ and $X_{\varphi,2}$, respectively, for $f_\varphi(c_{\varphi,1}, c_{\varphi,2})$.

Seventeenth Embodiment

A proxy computing system of a seventeenth embodiment is another example that embodies the first randomizable sampler and the second randomizable sampler described above. Specifically, the proxy computing system embodies an example of a first randomizable sampler and a second randomizable sampler in which a group $H_\varphi$ is the direct product $H_{1,\varphi} \times H_{2,\varphi}$ of cyclic groups $H_{1,\varphi}$ and $H_{2,\varphi}$, a generator of the cyclic group $H_{1,\varphi}$ is $\eta_{1,\varphi}$, a generator of the cyclic group $H_{2,\varphi}$ is $\eta_{2,\varphi}$, $f_\varphi$ is a bilinear map that maps a pair of an element of the cyclic group $H_{1,\varphi}$ and an element of the cyclic group $H_{2,\varphi}$ to an element of a cyclic group $G_\varphi$, an element $x_\varphi$ of a cyclic group $H_\varphi$ is a pair of an element $\lambda_{1,\varphi}$ of the cyclic group $H_{1,\varphi}$ and an element $\lambda_{2,\varphi}$ of the cyclic group $H_{2,\varphi}$, and $\Omega_\varphi = f_\varphi(\eta_{1,\varphi}, \eta_{2,\varphi})$. Examples of the bilinear map $f_\varphi$ include functions and algorithms for computing pairings such as Weil pairing and Tate pairing. The following description will focus on differences from the twelfth embodiment and repeated description of commonalities with the twelfth embodiment will be omitted.

As illustrated in FIG. 31, the proxy computing system 207 of the seventeenth embodiment includes a computing apparatus 271-φ in place of the computing apparatus 211-φ and a capability providing apparatus 272 in place of the capability providing apparatus 212.

Figure 42:
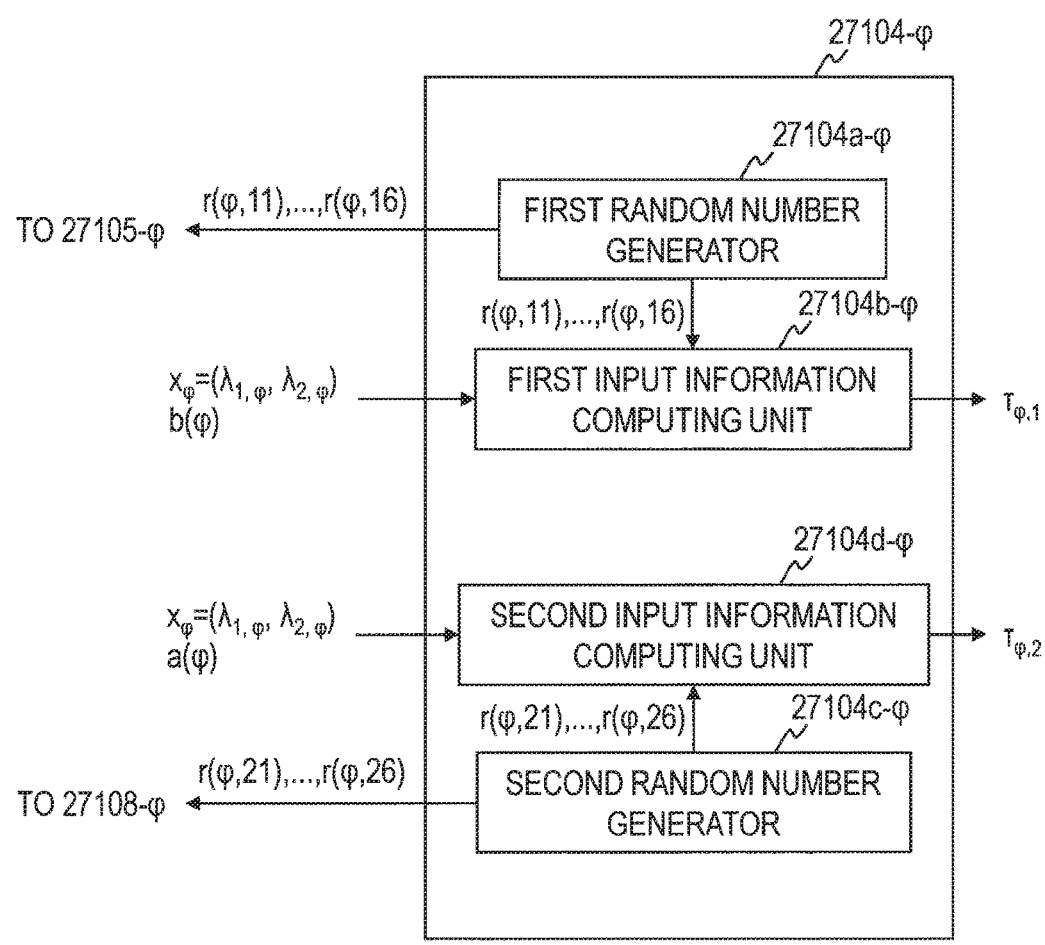
FIG. 42 is a block diagram illustrating a configuration of an input information providing unit of an embodiment.

As illustrated in FIG. 32, the computing apparatus 271-φ of the seventeenth embodiment includes, for example, a natural number storage 21101-φ, a natural number selecting unit 21102-φ, an integer computing unit 21103-φ, an input information providing unit 27104-φ, a first computing unit 27105-φ, a first power computing unit 21106-φ, a first list storage 21107-φ, a second computing unit 27108-φ, a second power computing unit 21109-φ, a second list storage 21110-φ, a determining unit 27111-φ, a final output unit 21112-φ, and a controller 21113-φ. As illustrated in FIG. 42, the input information providing unit 27104-φ of this embodiment includes, for example, a first random number generator 27104a-φ, a second random number generator 27104c-φ, a first input information computing unit 27104b-φ, and a second input information computing unit 27104d-φ.

As illustrated in FIG. 33, the capability providing apparatus 272 of the seventeenth embodiment includes, for example, a first output information computing unit 27201, the second output information computing unit 27202, and a controller 21205.

<Processes>

Processes of this embodiment will be described below. In the seventeenth embodiment, it is assumed that a group $H_\varphi$ is the direct product $H_{1,\varphi} \times H_{2,\varphi}$ of cyclic groups $H_{1,\varphi}$ and $H_{2,\varphi}$, a generator of the cyclic group $H_{1,\varphi}$ is $\eta_{1,\varphi}$, a generator of the cyclic group $H_{2,\varphi}$ is $\eta_{2,\varphi}$, $f_\varphi$ is a bilinear map that maps a pair of an element of the cyclic group $H_{1,\varphi}$ and an element of the cyclic group $H_{2,\varphi}$ to an element of a cyclic group $G_\varphi$, and an element $x_\varphi$ of a group $H_\varphi$ is a pair of an element $\lambda_{1,\varphi}$ of the cyclic group $H_{1,\varphi}$ and an element $\lambda_{2,\varphi}$ of the cyclic group $H_{2,\varphi}$, $\Omega_\varphi = f_\varphi(\eta_{1,\varphi}, \eta_{2,\varphi})$. Here, $\Omega_\varphi = f_\varphi(\eta_{1,\varphi}, \eta_{2,\varphi})$ is computed beforehand.

As illustrated in FIGS. 37 and 38, a process of the seventeenth embodiment is the same as the process of the twelfth embodiment except that steps S21103 through S21105, S21107, S21108, S21110, and S21200 through S21203 of the twelfth embodiment are replaced with steps S27103 through S27105, S27107, S27108, S27110, and S27200 through S27203, respectively. In the following, only processes at steps S27103 through S27105, S27107, S27108, S27110 and S27200 through S27203 will be described.

<<Process at Step S27103>>

Figure 43:
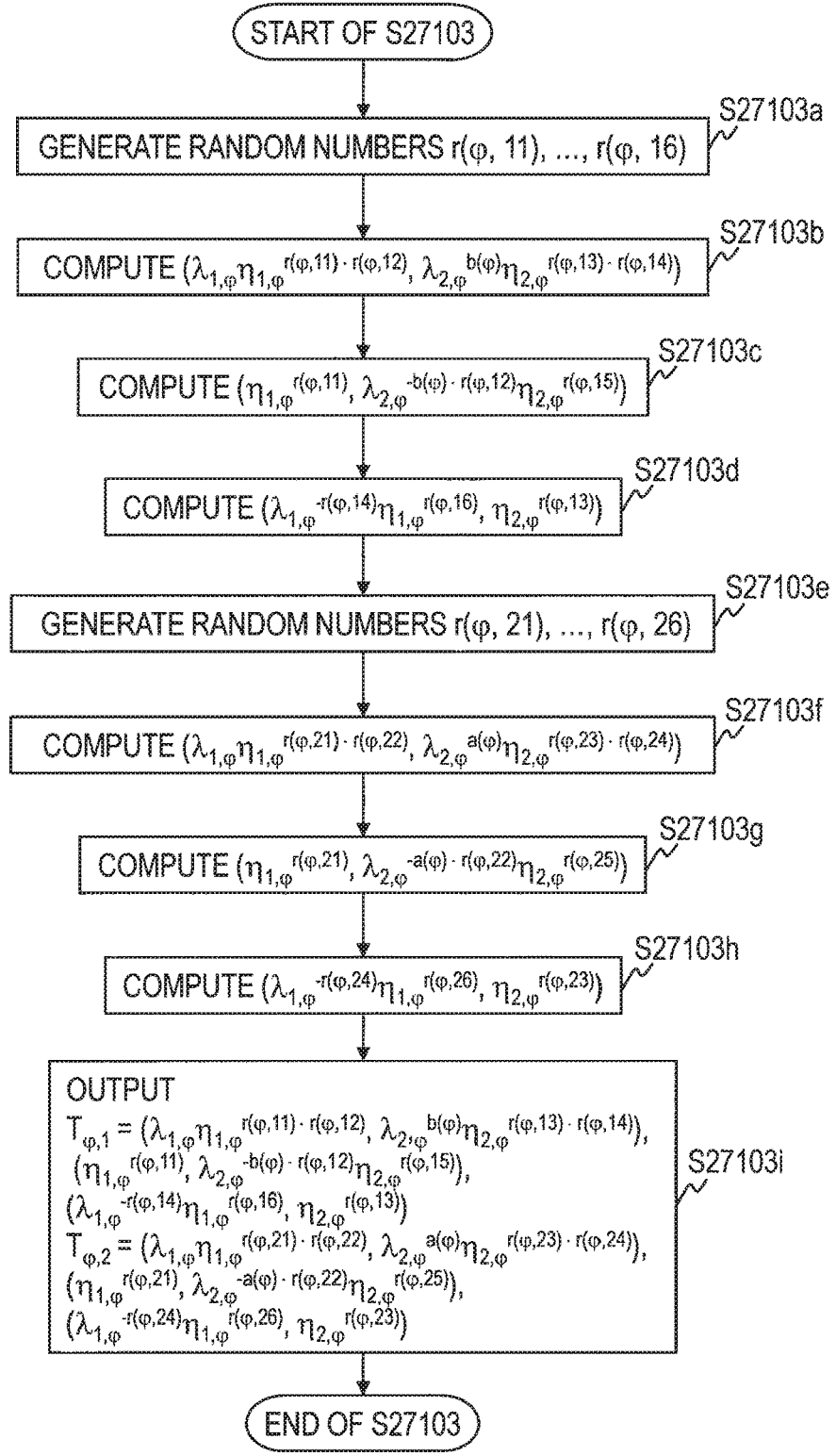
FIG. 43 is a flowchart illustrating a process at step S27103.

The input information providing unit 27104-φ of the computing apparatus 271-φ (FIG. 32) generates and outputs first input information $\tau_{\varphi,1}$ corresponding to an input pair $x_\varphi = (\lambda_{1,\varphi}, \lambda_{2,\varphi})$ of an element $\lambda_{1,\varphi}$ of the cyclic group $H_{1,\varphi}$ and an element $\lambda_{2,\varphi}$ of the cyclic group $H_{2,\varphi}$ and second input information $\tau_{\varphi,2}$ corresponding to $x_\varphi = (\lambda_{1,\varphi}, \lambda_{2,\varphi})$ (step S27103 of FIG. 37). A process at step S27103 of this embodiment will be described below with reference to FIG. 43.

The first random number generator 27104a-φ (FIG. 42) generates uniform random numbers $r(\varphi, 11)$, $r(\varphi, 12)$, $r(\varphi, 13)$, $r(\varphi, 14)$, $r(\varphi, 15)$, and $r(\varphi, 16)$ that are natural numbers greater than or equal to 0 and less than or equal to $2^{\mu(k)+k}$. Here, $\mu(k)$ represents a function value of a security parameter k. The generated random numbers $r(\varphi, 11)$, $r(\varphi, 12)$, $r(\varphi,13)$, $r(\varphi,14)$, $r(\varphi, 15)$, and $r(\varphi, 16)$ are sent to the first input information computing unit 27104b-φ and the first computing unit 27105-φ (step S27103a).

The first input information computing unit 27104b-φ uses a natural number $b(\varphi)$ selected by the natural number selecting unit 21102-φ, the input value $x_\varphi = (\lambda_{1,\varphi}, \lambda_{2,\varphi})$, generators $\eta_{1,\varphi}$ and $\eta_{2,\varphi}$, and random numbers $r(\varphi, 11)$, $r(\varphi, 12)$, $r(\varphi, 13)$, $r(\varphi,14)$, $r(\varphi, 15)$, and $r(\varphi, 16)$ to compute $(\lambda_{1,\varphi} \eta_{1,\varphi}{}^{r(\varphi,11) \cdot r(\varphi,12)}, \lambda_{2,\varphi}{}^{b(\varphi)} \eta_{2,\varphi}{}^{r(\varphi,13) \cdot r(\varphi,14)})$, $(\eta_{1,\varphi}{}^{r(\varphi,11)}, \lambda_{2,\varphi}{}^{-b(\varphi) \cdot r(\varphi,12)} \eta_{2,\varphi}{}^{r(\varphi,15)})$ and $(\lambda_{1,\varphi}{}^{-r(\varphi,14)} \eta_{1,\varphi}{}^{r(\varphi,16)}, \eta_{2,\varphi}{}^{r(\varphi,13)})$ as first input information $\tau_{\varphi,1}$ (steps S27103b through S27103d).

The second random number generator 27104c-φ (FIG. 42) generates uniform random numbers $r(\varphi, 21)$, $r(\varphi, 22)$, $r(\varphi, 23)$, $r(\varphi,24)$, $r(\varphi, 25)$ and $r(\varphi, 26)$ that are natural numbers greater than or equal to 0 and less than or equal to $2^{\mu(k)+k}$. The generated random numbers $r(\varphi, 21)$, $r(\varphi, 22)$, $r(\varphi, 23)$, $r(\varphi,24)$, $r(\varphi, 25)$ and $r(\varphi, 26)$ are sent to the second input information computing unit 27104d-φ and the second computing unit 27108-φ (step S27103e).

The second input information computing unit 27104d-φ uses a natural number $a(\varphi)$ selected by the natural number selecting unit 21102-φ, the input value $x_\varphi = (\lambda_{1,\varphi}, \lambda_{2,\varphi})$, the generators $\eta_{1,\varphi}$ and $\eta_{2,\varphi}$, and the random numbers $r(\varphi, 21)$, $r(\varphi, 22)$, $r(\varphi, 23)$, $r(\varphi,24)$, $r(\varphi, 25)$ and $r(\varphi, 26)$ to compute $(\lambda_{1,\varphi} \eta_{1,\varphi}{}^{r(\varphi,21) \cdot r(\varphi,22)}, \lambda_{2,\varphi}{}^{a(\varphi)} \eta_{2,\varphi}{}^{r(\varphi,23) \cdot r(\varphi,24)})$, $(\eta_{1,\varphi}{}^{r(\varphi,21)}, \lambda_{2,\varphi}{}^{-a(\varphi) \cdot r(\varphi,22)} \eta_{2,\varphi}{}^{r(\varphi,25)})$ and $(\lambda_{1,\varphi}{}^{-r(\varphi,24)} \eta_{1,\varphi}{}^{r(\varphi,26)}, \eta_{2,\varphi}{}^{r(\varphi,23)})$ as second input information $\tau_{\varphi,2}$ (steps S27103f through S27103h).

The first input information computing unit 27104b-φ outputs $(\lambda_{1,\varphi} \eta_{1,\varphi}{}^{r(\varphi,11) \cdot r(\varphi,12)}, \lambda_{2,\varphi}{}^{b(\varphi)} \eta_{2,\varphi}{}^{r(\varphi,13) \cdot r(\varphi,14)})$, $(\eta_{1,\varphi}{}^{r(\varphi,11)}, \lambda_{2,\varphi}{}^{-b(\varphi) \cdot r(\varphi,12)} \eta_{2,\varphi}{}^{r(\varphi,15)})$, and $(\lambda_{1,\varphi}{}^{-r(\varphi,14)} \eta_{1,\varphi}{}^{r(\varphi,16)}, \eta_{2,\varphi}{}^{r(\varphi,13)})$ as the first input information $\tau_{\varphi,1}$. The second input information computing unit 27104d-φ outputs $(\lambda_{1,\varphi} \eta_{1,\varphi}{}^{r(\varphi,21) \cdot r(\varphi,22)}, \lambda_{2,\varphi}{}^{a(\varphi)} \eta_{2,\varphi}{}^{r(\varphi,23) \cdot r(\varphi,24)})$, $(\eta_{1,\varphi}{}^{r(\varphi,21)}, \lambda_{2,\varphi}{}^{-a(\varphi) \cdot r(\varphi,22)} \eta_{2,\varphi}{}^{r(\varphi,25)})$ and $(\lambda_{1,\varphi}{}^{-r(\varphi,24)} \eta_{1,\varphi}{}^{r(\varphi,26)}, \eta_{2,\varphi}{}^{r(\varphi,23)})$ as the second input information $\tau_{\varphi,2}$ (step S27103i).

<<Processes at Steps S27200 Through S27203>>

As illustrated in FIG. 38, $(\lambda_{1,\varphi} \eta_{1,\varphi}{}^{r(\varphi,11) \cdot r(\varphi,12)}, \lambda_{2,\varphi}{}^{b(\varphi)} \eta_{2,\varphi}{}^{r(\varphi,13) \cdot r(\varphi,14)})$, $(\eta_{1,\varphi}{}^{r(\varphi,11)}, \lambda_{2,\varphi}{}^{-b(\varphi) \cdot r(\varphi,12)} \eta_{2,\varphi}{}^{r(\varphi,15)})$ and $(\lambda_{1,\varphi}{}^{-r(\varphi,14)} \eta_{1,\varphi}{}^{r(\varphi,16)}, \eta_{2,\varphi}{}^{r(\varphi,13)})$, which are the first input information $\tau_{\varphi,1}$, are input in the first output information computing unit 27201 of the capability providing apparatus 272 (FIG. 33). $(\lambda_{1,\varphi}\eta_{1,\varphi}{}^{r(\varphi,21)\cdot r(\varphi,22)}, \lambda_{2,\varphi}{}^{a(\varphi)}\eta_{2,\varphi}{}^{r(\varphi,23)\cdot r(\varphi,24)})$, $(\eta_{1,\varphi}{}^{r(\varphi,21)}, \lambda_{2,\varphi}{}^{-a(\varphi)\cdot r(\varphi,22)}\eta_{2,\varphi}{}^{r(\varphi,25)})$ and $(\lambda_{1,\varphi}{}^{-r(\varphi,24)}\eta_{1,\varphi}{}^{r(\varphi,26)}, \eta_{2,\varphi}{}^{r(\varphi,23)})$, which are the second input information $\tau_{\varphi,2}$, are input in the second output information computing unit 27202 (step S27200).

The first output information computing unit 27201 uses the first input information $\tau_{\varphi,1}$ to correctly compute $f_\varphi(\lambda_{1,\varphi}\eta_{1,\varphi}{}^{r(\varphi,11)\cdot r(\varphi,12)}, \lambda_{2,\varphi}{}^{b(\varphi)}\eta_{2,\varphi}{}^{r(\varphi,13)\cdot(\varphi,14)})$, $f_\varphi(\eta_{1,\varphi}{}^{r(\varphi,11)}, \lambda_{2,\varphi}{}^{-b(\varphi)\cdot r(\varphi,12)}\eta_{2,\varphi}{}^{r(\varphi,15)})$, and $f_\varphi(\lambda_{1,\varphi}{}^{-r(\varphi,14)}\eta_{1,\varphi}{}^{r(\varphi,16)}, \eta_{2,\varphi}{}^{r(\varphi,13)})$ with a probability greater than a certain probability and sets the obtained results of the computations, $z_{\varphi,1,1}$, $z_{\varphi,1,2}$ and $z_{\varphi,1,3}$, as first output information $z_{\varphi,1}$. The results of the computations may or may not be correct (step S27201).

The second output information computing unit 27202 uses the second input information $\tau_{\varphi,2}$ to correctly compute $f_\varphi(\lambda_{1,\varphi}\eta_{1,\varphi}{}^{r(\varphi,21)\cdot r(\varphi,22)}, \lambda_{2,\varphi}{}^{a(\varphi)}\eta_{2,\varphi}{}^{r(\varphi,23)\cdot r(\varphi,24)})$, $f_\varphi(\eta_{1,\varphi}{}^{r(\varphi,21)}, \lambda_{2,\varphi}{}^{-a(\varphi)\cdot r(\varphi,22)}\eta_{2,\varphi}{}^{r(\varphi,25)})$ and $f_\varphi(\lambda_{1,\varphi}{}^{-r(\varphi,24)}\eta_{1,\varphi}{}^{r(\varphi,26)}, \eta_{2,\varphi}{}^{r(\varphi,23)})$ with a probability greater than a certain probability and sets the obtained results of the computations, $z_{\varphi,2,1}$, $z_{\varphi,2,2}$ and $z_{\varphi,2,3}$, as second output information $z_{\varphi,2}$. The results of the computations may or may not be correct (step S27202). The first output information computing unit 27201 outputs the first output information $z_{\varphi,1}$ and the second output information computing unit 27202 outputs the second output information $z_{\varphi,2}$ (step S27203).

<<Processes at Steps S27104 and S27105>>

Returning to FIG. 37, the first output information $z_{\varphi,1}$ is input in the first computing unit 27105-$\varphi$ of the computing apparatus 271-$\varphi$ (FIG. 32) and the second output information $z_{\varphi,2}$ is input in the second computing unit 27108-$\varphi$ (step S27104).

The first computing unit 27105-$\varphi$ uses the input first output information $z_{\varphi,1}=(z_{\varphi,1,1}, z_{\varphi,1,2}, z_{\varphi,1,3})$ and the random numbers r($\varphi$, 11), r($\varphi$, 12), r($\varphi$, 13), r($\varphi$,14), r($\varphi$, 15), and r($\varphi$, 16) to compute $u_\varphi = z_{\varphi,1,1}{}^{z_{\varphi,1,2}z_{\varphi,1,3}} \Omega_\varphi{}^{-r(\varphi,11)\cdot r(\varphi,12)\cdot r(\varphi,13)\cdot r(\varphi,14)-r(\varphi,11)\cdot r(\varphi,15)-r(\varphi,13)\cdot r(\varphi,16)}$ to obtain the result $u_\varphi$ of the computation (step S27105). The result $u_\varphi$ of the computation is sent to the first power computing unit 21106-$\varphi$. Here, $u_\varphi = f_\varphi(\lambda_{1,\varphi}, \lambda_{2,\varphi})^{b(\varphi)} x_{\varphi,1}$. That is, $z_{\varphi,1,1}{}^{z_{\varphi,1,2}z_{\varphi,1,3}} \Omega_\varphi{}^{-r(\varphi,11)\cdot r(\varphi,12)\cdot r(\varphi,13)\cdot r(\varphi,14)-r(\varphi,11)\cdot r(\varphi,15)-r(\varphi,13)\cdot r(\varphi,16)}$ is an output of a randomizable sampler having an error $X_{\varphi,1}$ for $f_\varphi(\lambda_{1,\varphi}, \lambda_{2,\varphi})$. The reason will be described later.

<<Process at Step S27108>>

The second computing unit 27108-$\varphi$ uses the input second output information $z_{\varphi,2}=(z_{\varphi,2,1}, z_{\varphi,2,2}, z_{\varphi,2,3})$ and the random numbers r($\varphi$, 21), r($\varphi$, 22), r($\varphi$, 23), r($\varphi$,24), r($\varphi$, 25), and r($\varphi$, 26) to compute $v_\varphi = z_{\varphi,2,1}{}^{z_{\varphi,2,2}z_{\varphi,2,3}} \Omega_\varphi{}^{-r(\varphi,21)\cdot r(\varphi,22)\cdot r(\varphi,23)\cdot r(\varphi,24)-r(\varphi,21)\cdot r(\varphi,25)-r(\varphi,23)\cdot r(\varphi,26)}$ to obtain the result $v_\varphi$ of the computation. The result $v_\varphi$ of the computation is sent to the second power computing unit 21109-$\varphi$. Here, $v_\varphi = f_\varphi(\lambda_{1,\varphi}, \lambda_{2,\varphi})^{a(\varphi)} x_{\varphi,2}$. That is, $z_{\varphi,2,1}{}^{z_{\varphi,2,2}z_{\varphi,2,3}} \Omega_\varphi{}^{-r(\varphi,21)\cdot r(\varphi,22)\cdot r(\varphi,23)\cdot r(\varphi,24)-r(\varphi,21)\cdot r(\varphi,25)-r(\varphi,23)\cdot r(\varphi,26)}$ is an output of a randomizable sampler having an error $X_{\varphi,2}$ for $f_\varphi(\lambda_{1,\varphi}, \lambda_{2,\varphi})$. The reason will be described later.

<<Processes at Steps S27107 and S27110>>

At steps S27107 and S27110, the determining unit 27111-$\varphi$ determines whether $u_\varphi' = v_\varphi'$. If it is determined at step S27107 that $u_\varphi' = v_\varphi'$, the process proceeds to step S21114; otherwise, the process proceeds to step S27108. If it is determined at step S27110 that $u_\varphi' = v_\varphi'$, the process proceeds to step S21114; otherwise, the process proceeds to step S21111.

<<Reason why $\Omega_\varphi{}^{-r(\varphi,11)\cdot r(\varphi,12)\cdot r(\varphi,13)\cdot r(\varphi,14)-r(\varphi,11)\cdot r(\varphi,15)-r(\varphi,13)\cdot r(\varphi,16)} z_{\varphi,1,1}{}^{z_{\varphi,1,2} z_{\varphi,1,3}}$ and $\Omega_\varphi{}^{-r(\varphi,21)\cdot r(\varphi,22)\cdot r(\varphi,23)\cdot r(\varphi,24)-r(\varphi,21)\cdot r(\varphi,25)-r(\varphi,23)\cdot r(\varphi,26)} z_{\varphi,2,1}{}^{z_{\varphi,2,2} z_{\varphi,2,3}}$ are Output of Randomizable Samplers Having Errors $X_{\varphi,1}$ and $X_{\varphi,2}$, Respectively, for $f_\varphi(\lambda_{1,\varphi}, \lambda_{2,\varphi})$>>

Because of the bilinearity of $f_\varphi$, the following relation holds for $v_\varphi$.

$$v_\varphi f_\varphi(\lambda_{1,\varphi}, \lambda_{2,\varphi})^{-a(\varphi)} = z_{\varphi,2,1}' z_{\varphi,2,2}' z_{\varphi,2,3}' \Omega_\varphi{}^{r(\varphi,21)\cdot r(\varphi,22)\cdot r(\varphi,23)\cdot r(\varphi,24)-r(\varphi,21)\cdot r(\varphi,25)-r(\varphi,23)\cdot r(\varphi,26)} f_\varphi(\lambda_{1,\varphi}, \lambda_{2,\varphi})^{-a(\varphi)} = z_{\varphi,2,1} z_{\varphi,2,2} z_{\varphi,2,3} f_\varphi(\lambda_{1,\varphi}\eta_{1,\varphi}{}^{r(\varphi,21)\cdot r(\varphi,22)}, \lambda_{2,\varphi}{}^{a(\varphi)}\eta_{2,\varphi}{}^{r(\varphi,23)\cdot r(\varphi,24)})^{-1} f_\varphi(\lambda_{1,\varphi}, \lambda_{2,\varphi})^{-a(\varphi)} \cdots$$

Here, $z_{\varphi,2,1}' = z_{\varphi,2,1} f_\varphi(\lambda_{1,\varphi}\eta_{1,\varphi}{}^{r(\varphi,21)\cdot r(\varphi,22)}, \lambda_{2,\varphi}{}^{a(\varphi)}\eta_{2,\varphi}{}^{r(\varphi,23)\cdot r(\varphi,24)})^{-1}$, $z_{\varphi,2,2}' = z_{\varphi,2,2} f_\varphi(\eta_{1,\varphi}{}^{r(\varphi,21)}, \lambda_{2,\varphi}{}^{-a(\varphi)\cdot r(\varphi,22)}\eta_{2,\varphi}{}^{r(\varphi,25)})^{-1}$, and $z_{\varphi,2,3}' = z_{\varphi,2,3} f_\varphi(\lambda_{1,\varphi}{}^{-r(\varphi,24)}\eta_{1,\varphi}{}^{r(\varphi,26)}, \eta_{2,\varphi}{}^{r(\varphi,23)})^{-1}$ are satisfied.

Each of $z_{\varphi,2,1}'$, $z_{\varphi,2,2}'$ and $z_{\varphi,2,3}'$ is statistically close to a probability distribution that is independent of a($\varphi$). Accordingly, a probability distribution formed by $v_\varphi f_\varphi(\lambda_{1,\varphi}, \lambda_{2,\varphi})^{-a(\varphi)}$ is statistically close to a certain probability distribution $X_{\varphi,2}$ that is independent of a($\varphi$). Therefore, $v_\varphi$ is an output of a randomizable sampler having an error $X_{\varphi,2}$ for $f_\varphi(\lambda_{1,\varphi}, \lambda_{2,\varphi})$. Similarly, $u_\varphi$ is an output of a randomizable sampler having an error $X_{\varphi,1}$ for $f_\varphi(\lambda_{1,\varphi}, \lambda_{2,\varphi})$.

Eighteenth Embodiment

In the embodiments described above, a plurality of pairs (a($\varphi$), b($\varphi$)) of natural numbers a($\varphi$) and b($\varphi$) that are relatively prime to each other are stored in the natural number storage 21101-$\varphi$ of the computing apparatus and the pairs (a($\varphi$), b($\varphi$)) are used to perform the processes. However, one of a($\varphi$) and b($\varphi$) may be a constant. For example, a($\varphi$) may be fixed at 1 or b($\varphi$) may be fixed at 1. In other words, one of the first randomizable sampler and the second randomizable sampler may be replaced with a sampler. If one of a($\varphi$) and b($\varphi$) is a constant, the process for selecting the constant a($\varphi$) or b($\varphi$) is unnecessary, a($\varphi$) or b($\varphi$) as a constant is not input in the processing units, and the processing units can treat it as a constant in computations. If a($\varphi$) or b($\varphi$) as a constant is equal to 1, $f_\varphi(x_\varphi) = u_\varphi{}^{b'(\varphi)} v_\varphi{}^{a'(\varphi)}$ can be obtained as $f_\varphi(x_\varphi) = v_\varphi$ or $f_\varphi(x_\varphi) = u_\varphi$ without using a'($\varphi$) or b'($\varphi$).

An eighteenth embodiment is an example of such a variation, in which b($\varphi$) is fixed at 1 and the second randomizable sampler is replaced with a sampler. The following description will focus on differences from the twelfth embodiment. Specific examples of the first randomizable sampler and the sampler are similar to those described in the thirteenth to seventeenth embodiments and therefore description of the first randomizable sampler and the sampler will be omitted.

<Configuration>

As illustrated in FIG. 31, a proxy computing system 206 of the eighteenth embodiment includes a computing apparatus 261-$\varphi$ in place of the computing apparatus 211-$\varphi$ of the twelfth embodiment and a capability providing apparatus 262 in place of the capability providing apparatus 212.

Figure 44:
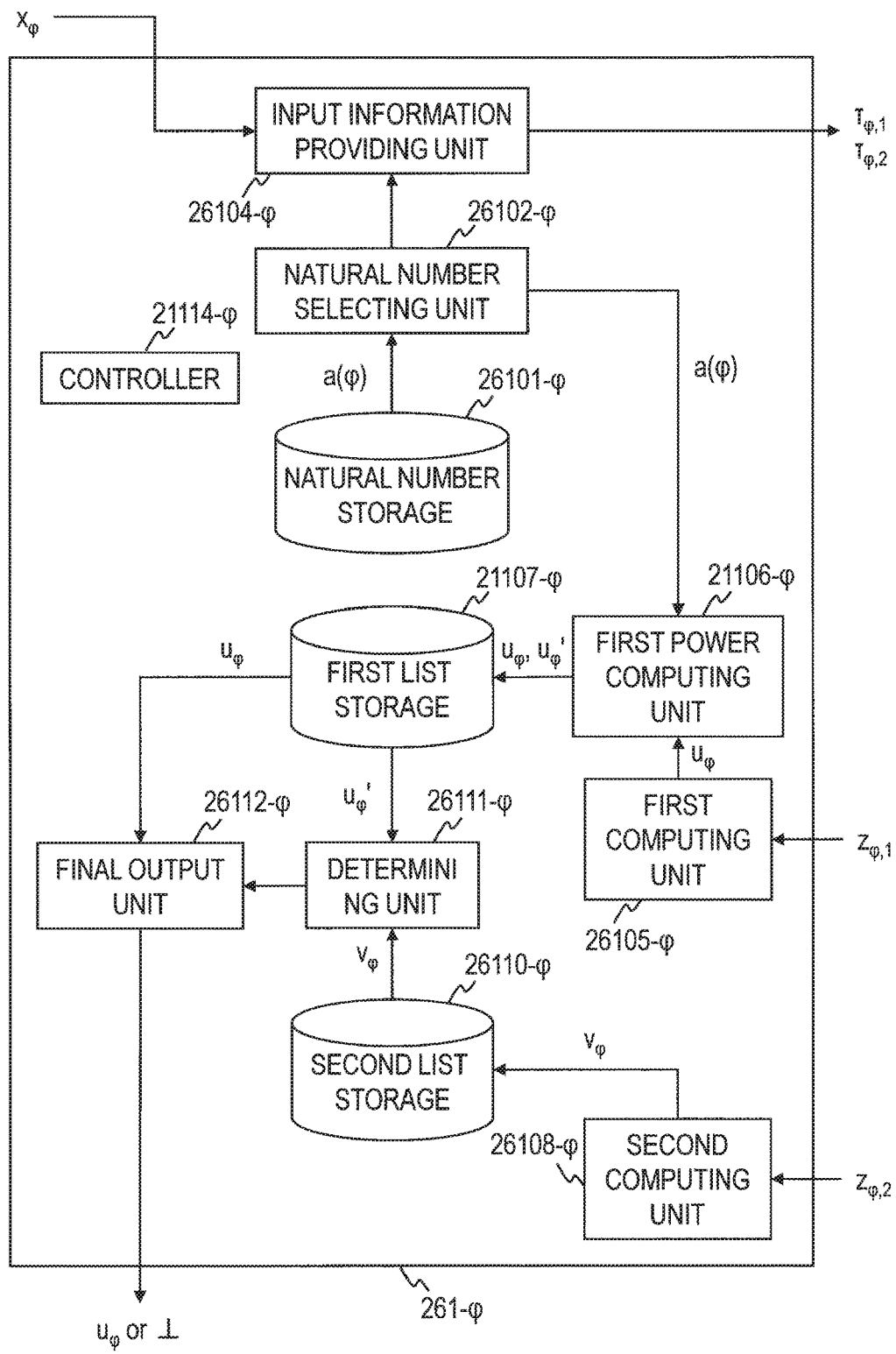
FIG. 44 is a block diagram illustrating a configuration of a computing apparatus of an embodiment.

As illustrated in FIG. 44, the computing apparatus 261-φ of the eighteenth embodiment includes, for example, a natural number storage 26101-φ, a natural number selecting unit 26102-φ, an input information providing unit 26104-φ, a first computing unit 26105-φ, a first power computing unit 21106-φ, a first list storage 21107-φ, a second computing unit 26108-φ, a second list storage 26110-φ, a determining unit 26111-φ, a final output unit 21112-φ, and a controller 21113-φ.

As illustrated in FIG. 33, the capability providing apparatus 262 of the eighteenth embodiment includes, for example, a first output information computing unit 26201, a second output information computing unit 26202, and a controller 21205.

<Assumptions for Processes>

No natural number b(φ) is stored in the natural number storage 26101-φ of the computing apparatus 261-φ and only a plurality of natural numbers a(φ) are stored. The rest of the assumptions are the same as those in any of the twelfth to seventeenth embodiments.

<Processes>

Figure 45:
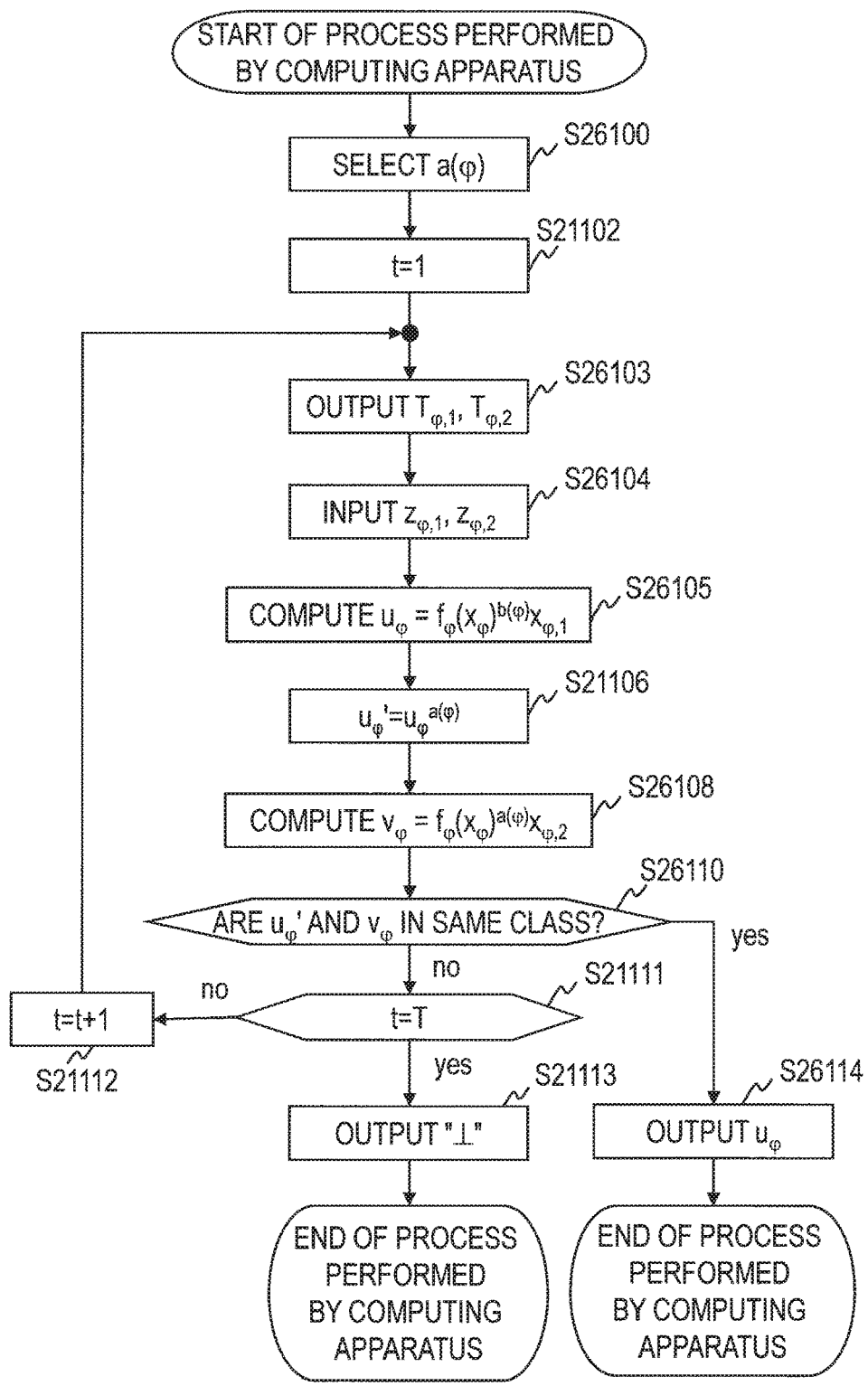
FIG. 45 is a flowchart illustrating a process performed by a computing apparatus of an embodiment.

As illustrated in FIG. 45, first, the natural number selecting unit 26102-φ of the computing apparatus 261-φ (FIG. 44) randomly reads one natural number a(φ) from among the plurality of natural numbers a(φ) stored in the natural number storage 26101-φ. Information on the read natural number a(φ) is sent to the input information providing unit 26104-φ and the first power computing unit 21106-φ (step S26100).

The controller 21113-φ sets t=1 (step S21102).

The input information providing unit 26104-φ generates and outputs first input information $\tau_{\varphi,1}$ and second input information $\tau_{\varphi,2}$ each of that corresponds to an input element $x_\varphi$. Preferably, the first input information $\tau_{\varphi,1}$ and the second input information $\tau_{\varphi,2}$ are information whose relation with the element $x_\varphi$ is scrambled. This enables the computing apparatus 261-φ to conceal the element $x_\varphi$ from the capability providing apparatus 262. Preferably, the second input information $\tau_{\varphi,2}$ of this embodiment further corresponds to the natural number a(φ) selected by the natural number selecting unit 26102-φ. This enables the computing apparatus 261-φ to evaluate the computation capability provided by the capability providing apparatus 262 with a high degree of accuracy (step S26103). A specific example of a pair of the first input information $\tau_{\varphi,1}$ and the second input information $\tau_{\varphi,2}$ is a pair of first input information $\varphi_{\varphi,1}$ and second input information $\tau_{\varphi,2}$ when b(φ)=1 in any of the thirteenth to seventeenth embodiments.

As illustrated in FIG. 38, the first input information $\tau_{\varphi,1}$ is input in the first output information computing unit 26201 of the capability providing apparatus 262 (FIG. 33) and the second input information $\tau_{\varphi,2}$ is input in the second output information computing unit 26202 (step S26200).

The first output information computing unit 26201 uses the first input information $\tau_{\varphi,1}$ to correctly compute $f_\varphi(\tau_{\varphi,1})$ with a probability greater than a certain probability and sets the obtained result of the computation as first output information $z_{\varphi,1}$ (step S26201). The second output information computing unit 26202 uses the second input information $\tau_{\varphi,2}$ to correctly compute $f_\varphi(\tau_{\varphi,2})$ with a probability greater than a certain probability and sets the obtained result of the computation as second output information $z_{\varphi,2}$ (step S26202). That is, the first output information computing unit 26201 and the second output information computing unit 26202 can output computation results that have an intentional or unintentional error. In other words, the result of the computation by the first output information computing unit 26201 may or may not be $f_\varphi(\tau_{\varphi,1})$ and the result of the computation by the second output information computing unit 26202 may or may not be $f_\varphi(\tau_{\varphi,2})$. A specific example of a pair of the first output information $z_{\varphi,1}$ and the second output information $z_{\varphi,2}$ is a pair of first output information $z_{\varphi,1}$ and second output information $z_{\varphi,2}$ when b(φ)=1 in any of the thirteenth to seventeenth embodiments.

The first output information computing unit 26201 outputs the first output information $z_{\varphi,1}$ and the second output information computing unit 26202 outputs the second output information $z_{\varphi,2}$ (step S26203).

Returning to FIG. 45, the first output information $z_{\varphi,1}$ is input in the first computing unit 26105-φ of the computing apparatus 261-φ (FIG. 44) and the second output information $z_{\varphi,2}$ is input in the second computing unit 26108-φ. The first output information $z_{\varphi,1}$ and the second output information $z_{\varphi,2}$ are equivalent to the computation capability provided by the capability providing apparatus 262 to the computing apparatus 261-φ (step S26104).

The first computing unit 26105-φ generates a computation result $u_\varphi = f_\varphi(x_\varphi)x_{\varphi,1}$ from the first output information $z_{\varphi,1}$. A specific example of the result $u_\varphi$ of the computation is the result $u_\varphi$ of the computation in any of the thirteenth to seventeenth embodiments when b(φ)=1. The result $u_\varphi$ of the computation is sent to the first power computing unit 21106-φ (step S26105).

The first power computing unit 21106-φ computes $u_\varphi' = u_\varphi^{a(\varphi)}$. The pair of the result $u_\varphi$ of the computation and $u_\varphi'$ computed on the basis of the result of the computation, ($u_\varphi$, $u_\varphi'$), is stored in the first list storage 21107-φ (step S21106).

The second computing unit 26108-φ generates a computation result $v_\varphi = f_\varphi(x_\varphi)^{a(\varphi)} x_{\varphi,2}$ from the second output information $z_{\varphi,2}$. A specific example of the result $v_\varphi$ of the computation is the result $v_\varphi$ of the computation in any of the thirteenth to seventeenth embodiments. The result $v_\varphi$ of the computation is stored in the second list storage 26110-φ (step S26108).

The determining unit 26111-φ determines whether or not there is a pair of $u_\varphi'$ and $v_\varphi$ that belong to a class $CL_\varphi(M_\varphi)$ corresponding to the same element $M_\varphi$ among the pairs ($u_\varphi$, $u_\varphi'$) stored in the first list storage 21107-φ and $v_\varphi$ stored in the second list storage 26110-φ as in any of the twelfth to seventeenth embodiments (step S26110). If there is a pair of $u_\varphi'$ and $v_\varphi$ that belong to the class $CL_\varphi(M_\varphi)$ corresponding to the same $M_\varphi$, the process proceeds to step S26114. If there is not a pair of $u_\varphi'$ and $v_\varphi$ that belong to the class $CL_\varphi(M_\varphi)$ corresponding to the same element $M_\varphi$, the process proceeds to step S21111.

At step S21111, the controller 21113-φ determines whether or not t=T (step S21111). T is a predetermined natural number. If t=T, the controller 21113-φ outputs information indicating that the computation is impossible, for example the symbol "⊥" (step S21113) and the process ends. If not t=T, the controller 21113-φ increments t by 1, that is, sets t=t+1 (step S21112) and the process returns to step S26103.

At step S26114, the final output unit 21112-φ outputs $u_\varphi$ corresponding to $u_\varphi'$ included in the pair of $u_\varphi'$ and $v_\varphi$ determined to belong to the class $CL_\varphi(M_\varphi)$ corresponding to the same element $M_\varphi$ (step S26114). The u thus obtained corresponds to $u_\varphi^{b'(\varphi)} v_\varphi^{a'(\varphi)}$ in the twelfth to seventeenth embodiments when b(φ)=1. That is, $u_\varphi$ thus obtained can be $f_\varphi(x_\varphi)$ with a high probability. Therefore, a predetermined reliability that the selected $u_\varphi$ is equal to $f_\varphi(x_\varphi)$ or higher can be achieved by repeating at least the process described above multiple times and selecting the value $u_\varphi$ obtained with the highest frequency among the values obtained at step S26114. As will be described, $u_\varphi = f_\varphi(x_\varphi)$ can result with an overwhelming probability, depending on settings.

<<Reason why $f_\varphi(x_\varphi)$ can be Obtained>>

The reason why a decryption result $f_\varphi(x_\varphi)$ can be obtained on the computing apparatus 261-$\varphi$ of this embodiment will be describe below. Terms required for the description will be defined first.

Black-Box:

A black-box $F_\varphi(\tau_\varphi)$ of $f_\varphi(\tau_\varphi)$ is a processing unit that takes an input of $\tau_\varphi \in H_\varphi$ and outputs $z_\varphi \in G_\varphi$. In this embodiment, each of the first output information computing unit 26201 and the second output information computing unit 26202 is equivalent to the black box $F_\varphi(\tau_1)$ for the decryption function $f_\varphi(\tau_\varphi)$. A black-box $F_\varphi(\tau_\varphi)$ that satisfies $z_\varphi = f_\varphi(\tau_\varphi)$ for elements $\tau_\varphi \in_U H_\varphi$ and $z_\varphi = F_\varphi(\tau_\varphi)$ arbitrarily selected from a group $H_\varphi$ with a probability greater than $\delta$ ($0 < \delta \leq 1$), that is, a black-box $F_\varphi(\tau_\varphi)$ for $f_\varphi(\tau_\varphi)$ that satisfies $$\Pr[z_\varphi = f_\varphi(\tau_\varphi) | \tau_\varphi \in_U H_\varphi, z_\varphi = F_\varphi(\tau_\varphi)] > \delta \qquad (15)$$

is called the $\delta$-reliable black-box $F_\varphi(\tau_\varphi)$ for $f_\varphi(\tau_\varphi)$. Here, $\delta$ is a positive value and is equivalent to the "certain probability" mentioned above.

Self-Corrector:

A self-corrector $C^F(x_\varphi)$ is a processing unit that takes an input of $x_\varphi \in H_\varphi$, performs computation by using a black-box $F_\varphi(\tau_p)$ for $f_\varphi(\tau_\varphi)$ and outputs $j \in G \cup \bot$. In this embodiment, the computing apparatus 261-$\varphi$ is equivalent to the self-corrector $C^F(x_\varphi)$.

Almost Self-Corrector:

Assume that a self-corrector $C^F(x_\varphi)$ that takes an input of $x_\varphi \in H_\varphi$ and uses the $\delta$-reliable black-box $F_\varphi(\tau_\varphi)$ for $f_\varphi(\tau_\varphi)$ outputs a correct value $j = f_\varphi(x_\varphi)$ with a probability sufficiently greater than the provability with which the self-corrector $C^F(x_\varphi)$ outputs an incorrect value $j \neq f_\varphi(x_\varphi)$. That is, assume that a self-corrector $C^F(x_\varphi)$ satisfies $$\Pr[j = f_\varphi(x_\varphi) | j = C^F(x_\varphi), j \neq \bot] > \Pr[j \neq f_\varphi(x_\varphi) | j = C^F(x_\varphi), j \neq \bot] + \Delta \qquad (16)$$

Here, $\Delta$ is a certain positive value ($0 < \Delta < 1$). If this is the case, the self-corrector $C^F(x_\varphi)$ is called an almost self-corrector. For example, for a certain positive value $\Delta'$ ($0 < \Delta' < 1$), if a self-corrector $C^F(x_\varphi)$ satisfies $$\Pr[j = f_\varphi(x_\varphi) | j = C^F(x_\varphi)] > (1/3) + \Delta'$$

$$\Pr[j = \bot | j = C^F(x_\varphi)] < 1/3$$

$$\Pr[j \neq f_\varphi(x_\varphi) \text{ and } j \neq \bot | j = C^F(x_\varphi)] < 1/3,$$

then the self-corrector $C^F(x_\varphi)$ is an almost self-corrector. Examples of $\Delta'$ include $\Delta' = 1/12$ and $\Delta' = 1/3$.

Robust Self-Corrector:

Assume that a self-corrector $C^F(x_\varphi)$ that takes an input of $x_\varphi \in H$ and uses a $\delta$-reliable black-box $F_\varphi(\tau_\varphi)$ for $f_\varphi(x_\varphi)$ to output a correct value $j = f_\varphi(x_\varphi)$ or $j = \bot$ with an overwhelming probability. That is, assume that for a negligible error $\xi$ ($0 \leq \xi < 1$), a self-corrector $C^F(x_\varphi)$ satisfies $$\Pr[j = f_\varphi(x_\varphi) \text{ or } j = \bot | j = C^F(x_\varphi)] > 1 - \xi \qquad (17)$$

If this is the case, the self-corrector $C^F(x_\varphi)$ is called a robust self-corrector. An example of the negligible error $\xi$ is a function vale $\xi(k)$ of a security parameter k. An example of the function value $\xi(k)$ is a function value $\xi(k)$ such that $\{\xi(k)p(k)\}$ converges to 0 for a sufficiently large k, where p(k) is an arbitrary polynomial. Specific examples of the function value $\xi(k)$ include $\xi(k) = 2^{-k}$ and $\xi(k) = 2^{-\sqrt{k}}$.

A robust self-corrector can be constructed from an almost self-corrector. Specifically, a robust self-corrector can be constructed by executing an almost self-constructor multiple times for the same x and selecting the most frequently output value, except $\bot$, as j. For example, an almost self-corrector is executed $O(\log(1/\xi))$ times for the same x and the value most frequently output is selected as j, thereby a robust self-corrector can be constructed. Here, $O(\cdot)$ represents O notation.

Pseudo-Free Action:

An Upper Bound of the Probability $$\Pr[\alpha_\varphi^{a(\varphi)} = \beta_\varphi \text{ and } \alpha_\varphi \neq e_{\varphi,g} | a(\varphi) \in_U \Omega, \alpha_\varphi \in X_{\varphi,1}, \beta_\varphi \in X_{\varphi,2}] \qquad (18)$$

of satisfying $\alpha_\varphi^{a(\varphi)} = \beta_\varphi$ for all possible $X_{\varphi,1}$ and $X_{\varphi,2}$ is called a pseudo-free indicator of a pair $(G_\varphi, \Omega_\varphi)$ and is represented as $P(G_\varphi, \Omega_\varphi)$, where $G_\varphi$ is a group $G_\varphi$, $\Omega_\varphi$ is a set of natural numbers $\Omega_\varphi = \{0, \ldots, M_\varphi\}$ ($M_\varphi$ is a natural number greater than or equal to 1), $\alpha_\varphi$ and $\beta_\varphi$ are realizations $\alpha_\varphi \in X_{\varphi,1}$ ($\alpha_\varphi \neq e_{\varphi,g}$) and $\mu_\varphi \in X_{\varphi,2}$ of random variables $X_{\varphi,1}$ and $X_{\varphi,2}$ that have values in the group $G_\varphi$, and $a(\varphi) \in \Omega_\varphi$. If a certain negligible function $\zeta(k)$ exists and $$P(G_\varphi, \Omega_\varphi) < \zeta(k) \qquad (19),$$

then a computation defined by the pair $(G_\varphi, \Omega_\varphi)$ is called a pseudo-free action. Note that "$\alpha_\varphi^{a(\varphi)}$" means that a computation defined on the group $G_\varphi$ is applied $a(\varphi)$ times to $\alpha_\varphi$. An example of the negligible function $\zeta(k)$ is such that $\{\zeta(k)p(k)\}$ converges to 0 for a sufficiently large k, where p(k) is an arbitrary polynomial. Specific examples of the function $\zeta(k)$ include $\zeta(k) = 2^{-k}$ and $\zeta(k) = 2^{-\sqrt{k}}$. For example, if the probability of Formula (18) is less than $O(2^{-k})$ for a security parameter k, a computation defined by the pair $(G_\varphi, \Omega_\varphi)$ is a pseudo-free action. For example, if the number of the elements $|\Omega_\varphi \cdot \alpha_\varphi|$ of a set $\Omega_\varphi \cdot \alpha_\varphi = \{a(\varphi)(\alpha_\varphi) | a(\varphi) \in \Omega_\varphi\}$ exceeds $2^k$ for any $\alpha_\varphi \in G_\varphi$ where $\alpha_\varphi \neq e_{\varphi,g}$, a computation defined by the pair $(G_\varphi, \Omega_\varphi)$ is a pseudo-free action. Note that $a(\varphi)(\alpha_\varphi)$ represents the result of a given computation on $a(\varphi)$ and $\alpha_\varphi$. There are many such examples. For example, if the group $G_\varphi$ is a residue group $Z/pZ$ modulo prime p, the prime p is the order of $2^k$, the set $\Omega_\varphi = \{0, \ldots, p-2\}$, $a(\varphi)(\alpha_\varphi)$ is $\alpha_\varphi^{a(\varphi)} \in Z/pZ$, and $\alpha_\varphi \neq e_{\varphi,g}$, then $\Omega_\varphi \cdot \alpha_\varphi = \{\alpha_\varphi^{a(\varphi)} | a(\varphi) = 0, \ldots, p-2\} = \{e_{\varphi,g}, \alpha_\varphi^1, \ldots, \alpha_\varphi^{p-2}\}$ and $|\Omega_\varphi \cdot \alpha_\varphi| = p - 1$. If a certain constant C exists and k is sufficiently large, $|\Omega_\varphi \cdot \alpha_\varphi| > C 2^k$ is satisfied because the prime p is the order of $2^k$. Here, the probability of Formula (18) is less than $C^{-1} 2^{-k}$ and a computation defined by such pair $(G_\varphi, \Omega_\varphi)$ is a pseudo-free action.

$\delta^\gamma$-Reliable Randomizable Sampler:

A randomizable sampler that whenever a natural number $a(\varphi)$ is given, uses the black-box $F_\varphi(\tau_\varphi)$ for $\delta$-reliable $f_\varphi(\tau_\varphi)$ and returns $w_\varphi^{a(\varphi)} x_\varphi'$ corresponding to a sample $x_\varphi'$ that depends on a random variable $X_\varphi$ for $w_\varphi \in G_\varphi$, where the probability that $w_\varphi^{a(\varphi)} x_\varphi' = w_\varphi^{a(\varphi)}$ is greater than $\delta^\gamma$ ($\gamma$ is a positive constant), that is, $$\Pr[w_\varphi^{a(\varphi)} x_\varphi' = w_\varphi^{a(\varphi)}] > \delta^\gamma \qquad (20)$$

is satisfied, is called a $\delta^\gamma$-reliable randomizable sampler. The combination of the input information providing unit 26104-$\varphi$, the second output information computing unit 26202, and the second computing unit 26108-$\varphi$ of this embodiment is a $\delta^\gamma$-reliable randomizable sampler for $w_\varphi = f_\varphi(x_\varphi)$.

The definitions given above will be used to describe the reason why $f_\varphi(x_\varphi)$ can be obtained on the computing apparatus 261-$\varphi$. At step S26110 of this embodiment, determination is made as to whether there is a pair of $u_\varphi'$ and $v_\varphi$ that belong to a class corresponding to the same element, that is, whether there is a pair of $u_\varphi^{a(\varphi)}$ and $v_\varphi$ that belong to a class corresponding to the same element. Since the combination of the input information providing unit 26104-$\varphi$, the second output information computing unit 26202, and the second computing unit 26108-$\varphi$ is a $\delta^\gamma$-reliable randomizable sampler (Formula (20)), $u_\varphi^{a(\varphi)}$ and $v_\varphi$ belong to a class $CL_\varphi(M_\varphi)$ corresponding to the same element $M_\varphi$ with an asymptotically large probability if T is a large value greater than a certain value determined by k, $\delta$ and $\gamma$ (Yes at step S26110). For example, Markov's inequality can be used to show that if $T \geq 4/\delta^\gamma$, the probability that $u_\varphi^{a(\varphi)}$ and $v_\varphi$ belong to a class corresponding to the same element (Yes at step S26110) is greater than ½.

Since $u_\varphi = f_\varphi(x_\varphi)x_{\varphi,1}$ and $v_\varphi = f_\varphi(x_\varphi)^{a(\varphi)}x_{\varphi,2}$ in this embodiment, $u_\varphi^{a(\varphi)} = v_\varphi$ is satisfied and $x_{\varphi,1}^{a(\varphi)} = x_{\varphi,2}$ holds if the determination at step S26110 is yes, provided that the function $f_\varphi(x_\varphi)$ is an injective function for the element $x_\varphi$. Even where the function $f_\varphi(x_\varphi)$ is not an injective function for an element $x_\varphi$, $x_{\varphi,1}^{a(\varphi)} = x_{\varphi,2}$ holds if the determination at step S26110 is yes, provided that $f_\varphi(x_\varphi)$ is a homomorphic function.

$x_{\varphi,1}^{a(\varphi)} = x_{\varphi,2}$ holds if $x_{\varphi,1} = x_{\varphi,2} = e_{\varphi,g}$ or $x_{\varphi,1} \neq e_{\varphi,g}$. If $x_{\varphi,1} = x_{\varphi,2} = e_{\varphi,g}$, then $u_\varphi = f_\varphi(x_\varphi)$ and therefore $u_\varphi$ output at step S26114 is a correct decryption result $f_\varphi(x_\varphi)$. On the other hand, if $x_{\varphi,1} \neq e_{\varphi,g}$, then $u_\varphi \neq f_\varphi(x_\varphi)$ and therefore $u_\varphi$ output at step S26114 is not a correct decryption result $f_\varphi(x_\varphi)$.

If an computation defined by a pair $(G_\varphi, \Omega_\varphi)$ of a group $G_\varphi$ and a set $\Omega_\varphi$ to which a natural number $a(\varphi)$ belongs is pseudo-free action or $T^2P(G_\varphi, \Omega_\varphi)$ is asymptotically small for a pseudo-free index $P(G_\varphi, \Omega_\varphi)$, the probability that $x_{\varphi,1} \neq e_{\varphi,g}$ when $x_{\varphi,1}^{a(\varphi)} = x_{\varphi,2}$ (Formula (18)) is asymptotically small. Accordingly, the probability that $x_{\varphi,1} = e_{\varphi,g}$ when $x_{\varphi,1}^{a(\varphi)} = x_{\varphi,2}$ is asymptotically large. Therefore, if an computation defined by a pair $(G_\varphi, \Omega_\varphi)$ is a pseudo-free action or $T^2P(G_\varphi, \Omega_\varphi)$ is asymptotically small, the probability that an incorrect decryption result $f_\varphi(x_\varphi)$ is output when $u_\varphi^{a(\varphi)}$ and $v_\varphi$ belong to the class $CL_\varphi(M_\varphi)$ corresponding to the same element $M_\varphi$ is sufficiently smaller than the probability that a correct decryption result $f_\varphi(x_\varphi)$ is output when $u_\varphi^{a(\varphi)}$ and $v_\varphi$ belong to the class $CL_\varphi(M_\varphi)$ corresponding to the same element $M_\varphi$. In this case, it can be said that the computing apparatus 261-$\varphi$ is an almost self-corrector (see Formula (16)). Therefore, a robust self-corrector can be constructed from the computing apparatus 261-$\varphi$ as described above and a correct decryption result $f_\varphi(x_\varphi)$ can be obtained with an overwhelming probability. If a computation defined by $(G_\varphi, \Omega_\varphi)$ is a pseudo-free action, the probability that an incorrect decryption result $f_\varphi(x_\varphi)$ is output when $u_\varphi^{a(\varphi)}$ and $v_\varphi$ belong to the class $CL_\varphi(M_\varphi)$ corresponding to the same element $M_\varphi$ is also negligible. In that case, the computing apparatus 261-$\varphi$ outputs a correct decryption result $f_\varphi(x_\varphi)$ or $\bot$ with an overwhelming probability.

Note that "$\eta(k')$ is asymptotically small" means that $k_0$ is determined for an arbitrary constant $\rho$ and the function value $\eta(k')$ for any k' that satisfies $k_0 < k'$ for $k_0$ is less than $\rho$. An example of k' is a security parameter k. "$\eta(k')$ is asymptotically large" means that $k_0$ is determined for an arbitrary constant $\rho$ and the function value $1 - \eta(k')$ for any k' that satisfies $k_0 < k'$ for $k_0$ is less than $\rho$.

The proof given above also proves that "if $u_\varphi'$ and $v_\varphi'$ belong to the class $CL_\varphi(M_\varphi)$ corresponding to the same element $M_\varphi$, it is highly probable that the first randomizable sampler has correctly computed $u_\varphi = f_\varphi(x_\varphi)^{b(\varphi)}$ and the second randomizable sampler has correctly computed $v_\varphi = f_\varphi(x_\varphi)^{a(\varphi)}$ ($x_{\varphi,1}$ and $x_{\varphi,2}$ are identity elements $e_{\varphi,g}$ of the group $G_\varphi$)" stated in the twelfth embodiment, as can be seen by replacing $a(\varphi)$ with $a(\varphi)/b(\varphi)$.

<<$\delta^\gamma$-Reliable Randomizable Sampler and Security>>
Consider the following attack.
- A black-box $F_\varphi(\tau_\varphi)$ or part of the black-box $F_\varphi(\tau_\varphi)$ intentionally outputs an invalid $z_\varphi$ or a value output from the black-box $F_\varphi(\tau_\varphi)$ is changed to an invalid $z_\varphi$.
- $w_\varphi^{a(\varphi)}x_\varphi'$ corresponding to the invalid $z_\varphi$ is output from the randomizable sampler.
- $w_\varphi^{a(\varphi)}x_\varphi'$ corresponding to the invalid $z_\varphi$ increases the probability with which the self-corrector $C^F(x_\varphi)$ outputs an incorrect value even though $w_\varphi^{a(\varphi)}x_\varphi'$ corresponding to the invalid $z_\varphi$ causes the self-corrector $C^F(x_\varphi)$ to determine that $u_\varphi^{a(\varphi)}$ and $v_\varphi$ belong to the class $CL_\varphi(M_\varphi)$ corresponding to the same $M_\varphi$ (Yes at step S26110).

Such an attack is possible if the probability distribution $D_a = w_\varphi^{a(\varphi)}x_\varphi' w_\varphi^{-a(\varphi)}$ of an error of $w_\varphi^{a(\varphi)}x_\varphi'$ output from the randomizable sampler for a given natural number $a(\varphi)$ depends on the natural number $a(\varphi)$. For example, if tampering is made so that $v_\varphi$ output from the second computing unit 26108-$\varphi$ is $f_\varphi(x_\varphi)^{a(\varphi)}x_{\varphi,1}^{a(\varphi)}$, always $u_\varphi^{a(\varphi)} = v_\varphi$ holds and it is determined that $u_\varphi^{a(\varphi)}$ and $v_\varphi$ belong to the class $CL_\varphi(M_\varphi)$ corresponding to the same $M_\varphi$ regardless of the value of $x_{\varphi,1}$. Therefore it is desirable that the probability distribution $D_a = w_\varphi^{a(\varphi)}x_\varphi' w_\varphi^{-a(\varphi)}$ of an error of $w_\varphi^{a(\varphi)}x_\varphi'$ output from the randomizable sampler for a given natural number $a(\varphi)$ do not depend on the natural number $a(\varphi)$.

Alternatively, it is desirable that the randomizable sampler be such that there is a probability distribution D that has a value in a group $G_\varphi$ and is indistinguishable from the probability distribution $D_a = w_\varphi^{a(\varphi)}x_\varphi' w_\varphi^{-a(\varphi)}$ of an error of $w_\varphi^{a(\varphi)}x_\varphi'$ for any element $a(\varphi) \in {}^\forall \Omega_\varphi$ of a set $\Omega_\varphi$ (the probability distribution $D_a$ and the probability distribution D are statistically close to each other). Note that the probability distribution D is not dependent on the natural number $a(\varphi)$. That the probability distribution $D_a$ and the probability distribution D are indistinguishable from each other means that the probability distribution $D_a$ and the probability distribution D cannot be distinguished from each other by a polynomial time algorithm. For example, if $$\Sigma_{g \in G} |\Pr[g \in D] - \Pr[g \in D_a]| < \zeta \quad (21)$$

is satisfied for negligible $\zeta (0 \leq \zeta \leq 1)$, the probability distribution $D_a$ and the probability distribution D cannot be distinguished from each other by a polynomial time algorithm. An example of negligible $\zeta$ is a function value $\zeta(k)$ of the security parameter k. An example of the function value $\zeta(k)$ is a function value such that $\{\zeta(k)p(k)\}$ converges to 0 for a sufficiently large k where $p(k)$ is an arbitrary polynomial. Specific examples of the function $\zeta(k)$ include $\zeta(k) = 2^{-k}$ and $\zeta(k) = 2^{-\sqrt{k}}$. These also apply to the twelfth to seventeenth embodiments which use natural numbers $a(\varphi)$ and $b(\varphi)$.

Variations of the Twelfth to Eighteenth Embodiments

In a variation of the twelfth to eighteenth embodiments, even though it is not guaranteed that the capability providing apparatus always performs correct computations, a value $u_\varphi^{b'(\varphi)}v_\varphi^{a'(\varphi)}$ obtained on each of the computing apparatuses $\varphi$ will be $f_\varphi(x_\varphi)$ with a high probability when the capability providing apparatus correctly computes $f_\varphi(\tau_{\varphi,1})$ and $f_\varphi(\tau_{\varphi,2})$ with a probability greater than a certain probability. Therefore, each of the computing apparatuses $\varphi$ can cause the capability providing apparatus to perform a computation without performing authentication and can obtain a correct result of the computation (for example, the result of decryption of a ciphertext) by using the result of the computation.

The present invention is not limited to the embodiments described above. For example, random variables $X_{\varphi,1}$, $X_{\varphi,2}$ and $X_{\varphi,3}$ may or may not be the same.

Each of the random number generators generates uniform random numbers to increase the security of the proxy computing system to the highest level. However, if the level of security required is not so high, at least some of the random number generators may generate random numbers that are not uniform random numbers. While it is desirable from the computational efficiency point of view that random natural numbers selected are natural numbers greater than or equal to 0 and less than $K_{\varphi,H}$ or natural numbers greater than or equal to 0 and less than or equal to $2^{\mu(k)+k}$ in the embodiments described above, random numbers that are natural numbers greater than or equal to $K_{\varphi,H}$ or natural numbers greater than $2^{\mu(k)+k}$ may be selected instead. Here, $\mu$ is a function of k. For example, $\mu$ may be the length of an element of the group $H_\varphi$ as a bit string.

The process of the capability providing apparatus may be performed multiple times each time the computing apparatus provides first input information $\tau_{\varphi,1}$ and second input information $\tau_{\varphi,2}$ corresponding to the same $a(\varphi)$ and $b(\varphi)$ to the capability providing apparatus. This enables the computing apparatus to obtain a plurality of pieces of first output information $z_{\varphi,1}$, second output information $z_{\varphi,2}$, and third output information $z_{\varphi,3}$ each time the computing apparatus provides first input information $\tau_{\varphi,1}$, and second input information $\tau_{\varphi,2}$ to the capability providing apparatus. Consequently, the number of exchanges and the amount of communication between the computing apparatus and the capability providing apparatus can be reduced.

The computing apparatus may provide a plurality of pieces of the first input information $\tau_{\varphi,1}$ and the second input information $\tau_{\varphi,2}$ to the capability providing apparatus at once and may obtain a plurality of pieces of corresponding first output information $z_{\varphi,1}$, second output information $z_{\varphi,2}$ and third output information $z_{\varphi,3}$ at once. This can reduce the number of exchanges between the computing apparatus and the capability providing apparatus.

The units of the computing apparatus may exchange data directly or through a memory, which is not depicted. Similarly, the units of the capability providing apparatus may exchange data directly or through a memory, which is not depicted.

Check may be made to see whether $u_\varphi$ and $v_\varphi$ obtained at the first computing unit and the second computing unit of any of the embodiments are elements of the group $G_\varphi$. They are elements of the group $G_\varphi$, the process described above may be continued; if $u_\varphi$ or $v_\varphi$ is not an element of the group $G_\varphi$, information indicating that the computation is impossible, for example the symbol "⊥", may be output.

Furthermore, the processes described above may be performed not only in time sequence as is written or may be performed in parallel with one another or individually, depending on the throughput of the apparatuses that perform the processes or requirements. It would be understood that other modifications can be made without departing from the spirit of the present invention.

If any of the configurations described above is implemented by a computer, the processes of the functions the apparatuses need to include are described by a program. The processes of the functions are implemented on the computer by executing the program on the computer. The program describing the processes can be recorded on a computer-readable recording medium. An example of the computer-readable recording medium is a non-transitory recording medium. Examples of such a recording medium include a magnetic recording device, an optical disc, a magneto-optical recording medium, and a semiconductor memory.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another mode of execution of the program, the computer may read the program directly from a portable recording medium and execute the processes according to the program or may execute the processes according to the program each time the program is transferred from the server computer to the computer. Alternatively, the processes may be executed using a so-called ASP (Application Service Provider) service in which the program is not transferred from a server computer to the computer but process functions are implemented by instructions to execute the program and acquisition of the results of the execution. Note that the program in this mode encompasses information that is provided for processing by an electronic computer and is equivalent to the program (such as data that is not direct commands to a computer but has the nature that defines processing of the computer).

While the apparatuses are configured by causing a computer to execute a predetermined program in the embodiments described above, at least some of the processes may be implemented by hardware.

INDUSTRIAL APPLICABILITY

As has been described above, each of the computing apparatuses of the embodiments are capable of obtaining a correct result of computation by using the computation capability provided by the capability providing apparatus even if the capability providing apparatus is in a condition where the capability providing apparatus does not always perform a correct process. Accordingly, the computing apparatus does not need to perform verification for confirming the validity of the capability providing apparatus. Furthermore, if a plurality of computing apparatuses share the capability providing apparatus, the computing apparatuses can obtain a correct result of computation.

Such a proxy computing system can be used in, for example, volunteer-based distributed computing, P2P computing services, computing services paid for with payments for advertisements, computing services that are provided as network services or public infrastructures, and network services that are substitutes for computing packages licensed in the form of libraries.

DESCRIPTION OF REFERENCE NUMERALS

1-5, 101-105, 201-207: Proxy computing system
11-61, 111-151, 211-271: Computing apparatus
12-62, 112-152, 212-272: Capability providing apparatus.

What is claimed is:

1. A proxy computing system comprising a computing apparatus and a capability providing apparatus, wherein $G_M$ and $H_M$ are sets of matrices, $f_M(x_M)$ is a decryption function for decrypting a ciphertext $x_M$ which is an element of a set $H_M$ with a particular decryption key to obtain an element of the set $G_M$, $_MX_1$, and $_MX_2$ are random variables having values in the set $G_M$, $_Mx_1$ is a realization of the random variable $_MX_1$, $_Mx_2$ is a realization of the random variable $_MX_2$, and $a_M$ is an element of the set $H_M$;

the computing apparatus comprises processing circuitry configured to implement an input information providing unit outputting first input information $_M\tau_1$ and second input information $_M\tau_2$ that correspond to the ciphertext $x_M$ and are elements of the set $H_M$;

the capability providing apparatus comprises processing circuitry configured to implement:

a first output information computing unit using the first input information $_M\tau_1$ to correctly compute $f_M(_M\tau_1)$ with a probability greater than a certain provability and setting an obtained result of the computation as first output information $_Mz_1$; and a second output information computing unit using the second input information $_M\tau_2$ to correctly compute $f_M(_M\tau_2)$ with a probability greater than a certain provability and setting an obtained result of the computation as second output information $_Mz_2$;

the processing circuitry of the computing apparatus is further configured to implement:

a first computing unit configured to generate a computation result $u_M = f_M(x_M) + _Mx_1$ from the first output information $_Mz_1$ and generate a computation result $u_M' = u_M \cdot a_M$;

a second computing unit configured to generate a computation result $v_M = f_M(x_M) a_M + _Mx_2$ from the second output information $_Mz_2$;

a determining unit configured to determine whether or not there are values of $u_M'$ and $v_M$ that satisfy $u_M' = v_M$ after every calculation of $u_M'$ and $v_M$ for no more than a predetermined number of iterations of receiving newly calculated values of $u_M$ and $v_M$; and a final output unit configured to output $u_M$ when the computation results uM and vM satisfy uM'=vM, wherein the determining unit determines that calculation of uM is impossible based on a calculation reliability of the capability providing apparatus being lower than a reference value when there are no values of $u_M'$ and $v_M$ that satisfy $u_M' = v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

2. The proxy computing system according to claim 1, wherein the computing apparatus comprises a matrix selecting unit selecting an element $a_M$ of the set $H_M$;

the second input information $_M\tau_2$ further corresponds to the element $a_M$.

3. The proxy computing system according to claim 2, wherein the input information providing unit sets pieces of information whose relation with the ciphertext $x_M$ is scrambled as the first input information $_M\tau_1$ and the second input information $_M\tau_2$.

4. The proxy computing system according to claim 1, wherein the input information providing unit sets pieces of information whose relation with the ciphertext $x_M$ is scrambled as the first input information $_M\tau_1$ and the second input information $_M\tau_2$.

5. The proxy computing system according to claim 1, wherein κ, ι and q are positive integers, $\cdot^T$ is a transposed matrix of $\cdot$, $G_M$ is a set of ι×ι matrices, $H_M$ is a set of ι×ι matrices, PK is an ι×κ matrix which is an encryption key, SK is the decryption key which is an ι×ι matrix that satisfies PK·SK=0, CM is a κ×ι matrix, NM is an ι×ι matrix, UM is an ι×ι unit matrix, the decryption function $f_M$ is $SK^{-1}\{SK \cdot x_M \cdot SK^T (\bmod q)\}(SK^T)^{-1}$ (mod 2);

the input information providing unit comprises:

a first random matrix selecting unit randomly selecting an element $M_{R1}$ of the set $G_M$;

a second random matrix selecting unit selecting random matrices $CM_{11}$ and $CM_{12}$ of κ×ι;

a first encryption unit generating a first ciphertext $C_{R1} = PK \cdot CM + 2 \cdot NM + M_{R1} (\bmod q)$;

a second encryption unit generating a second ciphertext $C_{UM} = PK \cdot CM + 2 \cdot NM + UM (\bmod q)$;

a first input information computing unit obtaining $(x_M \cdot C_{UM} + C_{R1}) + PK \cdot CM_{11} + 2 \cdot NM + CM_{12}^T \cdot PK^T$ as the first input information $_M\tau_1$;

a third random matrix selecting unit randomly selecting an element $M_{R2}$ of the set $G_M$;

a fourth random matrix selecting unit selecting random matrices $CM_{21}$ and $CM_{22}$ of κ×ι;

a third encryption unit generating a third ciphertext $C_{R2} = PK \cdot CM + 2 \cdot NM + M_{R2} (\bmod q)$;

a fourth encryption unit generating a fourth ciphertext $C_a = PK \cdot CM + 2 \cdot NM + a_M (\bmod q)$; and a second input information computing unit obtaining $(x_M \cdot C_a + C_{R2}) + PK \cdot CM_{21} + 2 \cdot NM + CM_{22}^T \cdot PK^T$ as the second input information $_M\tau_2$;

the first computing unit generates $_Mz_1 - M_{R1}$ as the computation result $u_M$; and the second computing unit generates $_Mz_2 - M_{R2}$ as the computation result $v_M$.

6. The proxy computing system according to claim 1, further comprising a decryption control apparatus, wherein the decryption control apparatus comprises an output unit outputting a decryption control instruction controlling a decryption process of the computing apparatus to the capability providing apparatus; and the capability providing apparatus comprises a controller controlling, in accordance with the decryption control instruction, whether or not to output both of the first output information $_Mz_1$ and the second output information $_Mz_2$ from the first output information computing unit and the second output information computing unit.

7. The proxy computing system according to claim 5, further comprising a decryption control apparatus, wherein the decryption control apparatus comprises an output unit outputting a decryption control instruction controlling a decryption process of the computing apparatus to the capability providing apparatus; and the capability providing apparatus comprises a controller controlling, in accordance with the decryption control instruction, whether or not to output both of the first output information $_Mz_1$ and the second output information $_Mz_2$ from the first output information computing unit and the second output information computing unit.

8. A computing apparatus comprising:

processing circuitry configured to implement an input information providing unit outputting first input information $_M\tau_1$ and second input information $_M\tau_2$ that correspond to the ciphertext $x_M$ and are elements of the set $H_M$, wherein $G_M$ and $H_M$ are sets of matrices, $f_M(x_M)$ is a decryption function for decrypting a ciphertext $x_M$ which is an element of the set $H_M$ with a particular decryption key to obtain an element of the set $G_M$, $_MX_1$, and $_MX_2$ are random variables having values in the set $G_M$, $_MX_1$ is a realization of the random variable $_MX_1$, $_MX_2$ is a realization of the random variable $_MX_2$, and $a_M$ is an element of the set $H_M$;

wherein the processing circuitry is configured to output the first input information $_M\tau_1$ and the second input information $_M\tau_2$ to a capability providing apparatus, wherein the capability providing apparatus is configured to implement:

a first output information computing unit using the first input information $_M\tau_1$ to correctly compute $f_M(_M\tau_1)$ with a probability greater than a certain provability and setting an obtained result of the computation as first output information $_Mz_1$; and a second output information computing unit using the second input information $_M\tau_2$ to correctly compute $f_M(_M\tau_2)$ with a probability greater than a certain provability and setting an obtained result of the computation as second output information $_Mz_2$, the processing circuitry of the computing apparatus is further configured to implement:

a first computing unit configured to generate a computation result $u_M = f_M(x_M) + _Mx_1$ from the first output information $_Mz_1$ and generate a computation result $u_M' = u_M \cdot a_M$;

a second computing unit configured to generate a computation result $v_M = f_M(x_M) a_M + _Mx_2$ from the second output information $_Mz_2$;

a determining unit configured to determine whether or not there are values of $u_M'$ and $v_M$ that satisfy $u_M' = v_M$ after every calculation of $u_M'$ and $v_M$ for no more than a predetermined number of iterations of receiving newly calculated values of $u_M$ and $v_M$; and a final output unit configured to output $u_M$ when the computation results $u_M$ and $v_M$ satisfy $u_M' = v_M$, wherein the determining unit determines that calculation of $u_M$ is impossible based on a calculation reliability of the capability providing apparatus being lower than a reference value when there are no values of $u_M'$ and $v_M$ that satisfy $u_M' = v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

9. The computing apparatus according to claim 8, further comprising a matrix selecting unit selecting an element $a_M$ of the set $H_M$;

wherein the second input information $_M\tau_2$ further corresponds to the element $a_M$.

10. The computing apparatus according to claim 9, wherein the input information providing unit sets pieces of information whose relation with the ciphertext $x_M$ is scrambled as the first input information $_M\tau_1$ and the second input information $_M\tau_2$.

11. The computing apparatus according to claim 8, wherein the input information providing unit sets pieces of information whose relation with the ciphertext $x_M$ is scrambled as the first input information $_M\tau_1$ and the second input information $_M\tau_2$.

12. The computing apparatus according to claim 8, wherein $\kappa$, $\iota$ and $q$ are positive integers, $\bullet^T$ is a transposed matrix of $\bullet$, $G_M$ is a set of $\iota \times \iota$ matrices, $H_M$ is a set of $\iota \times \iota$ matrices, PK is an $\iota \times \kappa$ matrix which is an encryption key, SK is the decryption key which is an $\iota \times \iota$ matrix that satisfies PK·SK=0, CM is a $\kappa \times \iota$ matrix, NM is an $\iota \times \iota$ matrix, UM is an $\iota \times \iota$ unit matrix, the decryption function $f_M$ is $SK^{-1}\{SK \cdot x_M \cdot SK^T (\bmod q)\}(SK^T)^{-1}$ (mod 2);

the input information providing unit comprises:

a first random matrix selecting unit randomly selecting an element $M_{R1}$ of the set $G_M$;

a second random matrix selecting unit selecting random matrices $CM_{11}$ and $CM_{12}$ of $\kappa \times \iota$;

a first encryption unit generating a first ciphertext $C_{R1} = PK \cdot CM + 2 \cdot NM + M_{R1} (\bmod q)$;

a second encryption unit generating a second ciphertext $C_{UM} = PK \cdot CM + 2 \cdot NM + UM (\bmod q)$;

a first input information computing unit obtaining $(x_M \cdot C_{UM} + C_{R1}) + PK \cdot CM_{11} + 2 \cdot NM + CM_{12}^T \cdot PK^T$ as the first input information $_M\tau_1$;

a third random matrix selecting unit randomly selecting an element $M_{R2}$ of the set $G_M$;

a fourth random matrix selecting unit selecting random matrices $CM_{21}$ and $CM_{22}$ of $\kappa \times \iota$;

a third encryption unit generating a third ciphertext $C_{R2} = PK \cdot CM + 2 \cdot NM + M_{R2} (\bmod q)$;

a fourth encryption unit generating a fourth ciphertext $C_a = PK \cdot CM + 2 \cdot NM + a_M (\bmod q)$; and a second input information computing unit obtaining $(x_M \cdot C_a + C_{R2}) + PK \cdot CM_{21} + 2 \cdot NM + CM_{22}^T \cdot PK^T$ as the second input information $_M\tau_2$;

the first computing unit generates $_Mz_1 - M_{R1}$ as the computation result $u_M$; and the second computing unit generates $_Mz_2 - M_{R2}$ as the computation result $v_M$.

13. A proxy computing method implemented by a proxy computing system including a computing apparatus and a capability providing apparatus, wherein $G_M$ and $H_M$ are sets of matrices, $f_M(x_M)$ is a decryption function for decrypting a ciphertext $x_M$ which is an element of a set $H_M$ with a particular decryption key to obtain an element of the set $G_M$, $_MX_1$, and $_MX_2$ are random variables having values in the set $G_M$, $_MX_1$ is a realization of the random variable $_MX_1$, $_MX_2$ is a realization of the random variable $_MX_2$, and $a_M$ is an element of the set $H_M$, the method comprising:

by processing circuitry of the computing apparatus, outputting first input information $_M\tau_1$ and second input information $_M\tau_2$ that correspond to the ciphertext $x_M$ and are elements of the set $H_M$;

by processing circuitry of the capability providing apparatus:

using the first input information $_M\tau_1$ to correctly compute $f_M(_M\tau_1)$ with a probability greater than a certain provability and setting an obtained result of the computation as first output information $_Mz_1$; and using the second input information $_M\tau_2$ to correctly compute $f_M(_M\tau_2)$ with a probability greater than a certain provability and setting an obtained result of the computation as second output information $_Mz_2$;

by the processing circuitry of the computing apparatus:

generating a computation result $u_M = f_M(x_M) + _Mx_1$ from the first output information $_Mz_1$ and generate a computation result $u_M' = u_M \cdot a_M$;

generating a computation result $v_M = f_M(x_M) a_M + _Mx_2$ from the second output information $_Mz_2$;

determining whether or not there are values of $u_M'$ and $v_M$ that satisfy $u_M'=v_M$ after every calculation of $u_M'$ and $v_M$ for no more than a predetermined number of iterations of receiving newly calculated values of $u_M$ and $v_M$; and outputting $u_M$ when the computation results $u_M$ and $v_M$ satisfy $u_M'=v_M$, wherein the method further includes determining, by the computing apparatus, that calculation of $u_M$ is impossible based on a calculation reliability of the capability providing apparatus being lower than a reference value when there are no values of $u_M'$ and $v_M$ that satisfy $u_M'=v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

14. The proxy computing method according to claim 13, further comprising the steps of:

by a decryption control apparatus, outputting a decryption control instruction controlling a decryption process of the computing apparatus to the capability providing apparatus; and by the capability providing apparatus, controlling whether or not to output both of the first output information $_Mz_1$ and the second output information $_Mz_2$ from the first output information computing unit and the second output information computing unit, in accordance with the decryption control instruction.

15. A computing method, implemented by a computing apparatus, comprising the steps of:

generating first input information $_M\tau_1$ and second input information $_M\tau_2$ that correspond to the ciphertext $x_M$ and are elements of the set $H_M$, wherein $G_M$ and $H_M$ are sets of matrices, $f_M(x_M)$ is a decryption function for decrypting a ciphertext $x_M$ which is an element of the set $H_M$ with a particular decryption key to obtain an element of the set $G_M$, $_MX_1$, and $_MX_2$ are random variables having values in the set $G_M$, $_Mx_1$ is a realization of the random variable $_MX_1$, $_Mx_2$ is a realization of the random variable $_MX_2$, and $a_M$ is an element of the set $H_M$;

outputting the first input information $_M\tau_1$ and the second input information $_M\tau_2$ to a capability providing apparatus, wherein the capability providing apparatus is configured to perform:

using the first input information $_M\tau_1$ to correctly compute $f_M(_M\tau_1)$ with a probability greater than a certain provability and setting an obtained result of the computation as first output information $_Mz_1$; and using the second input information $_M\tau_2$ to correctly compute $f_M(_M\tau_2)$ with a probability greater than a certain provability and setting an obtained result of the computation as second output information $_Mz_2$, the method further including, by the computing apparatus, generating a computation result $u_M=f_M(x_M)+_Mx_1$ from the first output information $_Mz_1$ and generate a computation result $u_M'=u_M \cdot a_M$;

generating a computation result $v_M=f_M(x_M)a_M+_Mx_2$ from the second output information $_Mz_2$;

determining whether or not there are values of $u_M'$ and $v_M$ that satisfy $u_M'=v_M$ after every calculation of $u_M'$ and $v_M$ for no more than a predetermined number of iterations of receiving newly calculated values of $u_M$ and $v_M$; and outputting $u_M$ when the computation results $u_M$ and $v_M$ satisfy $u_M'=v_M$, wherein the method further includes determining, by the computing apparatus, that calculation of $u_M$ is impossible based on a calculation reliability of the capability providing apparatus being lower than a reference value when there are no values of $u_M'$ and $v_M$ that satisfy $u_M'=v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

16. A capability providing apparatus comprising:

processing circuitry configured to implement a first output information computing unit and a second output information computing unit, wherein $G_M$ and $H_M$ are sets of matrices, $f_M(x_M)$ is a decryption function for decrypting a ciphertext $x_M$ which is an element of the set $H_M$ with a particular decryption key to obtain an element of the set $G_M$, $_MX_1$, and $_MX_2$ are random variables having values in the set $G_M$, $_Mx_1$ is a realization of the random variable $_MX_1$, $_Mx_2$ is a realization of the random variable $_MX_2$, and $a_M$ is an element of the set $H_M$;

wherein the processing circuitry receives, from a computing apparatus, first input information $_M\tau_1$ and second input information $_M\tau_2$ that correspond to the ciphertext $x_M$ and are elements of the set $H_M$, the first output information computing unit being configured to use first input information $_M\tau_1$ to correctly compute $f_M(_M\tau_1)$ with a probability greater than a certain provability and set an obtained result of the computation as first output information $_Mz_1$; and the second output information computing unit being configured to use the second input information $_M\tau_2$ to correctly compute $f_M(_M\tau_2)$ with a probability greater than a certain provability and set an obtained result of the computation as second output information $_Mz_2$, wherein the processing circuitry transmits the first output information $_Mz_1$ and the second output information $_Mz_2$ to the computing apparatus, and the computing apparatus includes processing circuitry further configured to implement:

a first computing unit configured to generate a computation result $u_M=f_M(x_M)+_Mx_1$ from the first output information $_Mz_1$ and generate a computation result $u_M'=u_M \cdot a_M$;

a second computing unit configured to generate a computation result $v_M=f_M(x_M)a_M+_Mx_2$ from the second output information $_Mz_2$;

a determining unit configured to determine whether or not there are values of $u_M'$ and $v_M$ that satisfy $u_M'=v_M$ after every calculation of $u_M'$ and $v_M$ for no more than a predetermined number of iterations of receiving newly calculated values of $u_M$ and $v_M$; and a final output unit configured to output $u_M$ when the computation results $u_M$ and $v_M$ satisfy $u_M'=v_M$, wherein the determining unit determines that calculation of $u_M$ is impossible based on a calculation reliability of the capability providing apparatus being lower than a reference value when there are no values of $u_M'$ and $v_M$ that satisfy $u_M'=v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

17. The capability providing apparatus according to claim 16,
wherein κ, ι and q are positive integers, $\bullet^T$ is a transposed matrix of •, $G_M$ is a set of ι×ι matrices, $H_M$ is a set of ι×ι matrices, PK is an ι×κ matrix which is an encryption key, SK is the decryption key which is an ι×ι matrix that satisfies PK·SK=0, CM is a κ×ι matrix, NM is an ι×ι matrix, UM is an ι×ι unit matrix, the decryption function $f_M$ is $SK^{-1}\{SK \cdot x_M \cdot SK^T (\text{mod } q)\}(SK^T)^{-1}$ (mod 2).

18. The capability providing apparatus according to claim 16, comprising a controller controlling, in accordance with an input decryption control instruction, whether or not to output both of the first output information $_Mz_1$ and the second output information $_Mz_2$ from the first output information computing unit and the second output information computing unit.

19. A capability providing method, implemented by a capability providing apparatus, wherein $G_M$ and $H_M$ are sets of matrices, $f_M(x_M)$ is a decryption function for decrypting a ciphertext $x_M$ which is an element of the set $H_M$ with a particular decryption key to obtain an element of the set $G_M$, $_MX_1$, and $_MX_2$ are random variables having values in the set $G_M$, $_Mx_1$ is a realization of the random variable $_MX_1$, $_Mx_2$ is a realization of the random variable $_MX_2$, and $a_M$ is an element of the set $H_M$, the method comprising:

receiving, from a computing apparatus, first input information $_M\tau_1$ and second input information $_M\tau_2$ that correspond to the ciphertext $x_M$ and are elements of the set $H_M$, using first input information $_M\tau_1$ to correctly compute $f_M(_M\tau_1)$ with a probability greater than a certain provability and set an obtained result of the computation as first output information $_Mz_1$;

using the second input information $_M\tau_2$ to correctly compute $f_M(_M\tau_2)$ with a probability greater than a certain provability and set an obtained result of the computation as second output information $_Mz_2$, and transmitting the first output information $_Mz_1$ and the second output information $_Mz_2$ to the computing apparatus, wherein the computing apparatus includes processing circuitry further configured to implement:

a first computing unit configured to generate a computation result $u_M=f_M(x_M)+_Mx_1$ from the first output information $_Mz_1$ and generate a computation result $u_M'=u_M \cdot a_M$;

a second computing unit configured to generate a computation result $v_M=f_M(x_M)a_M+_Mx_2$ from the second output information $_Mz_2$;

a determining unit configured to determine whether or not there are values of $u_M'$ and $v_M$ that satisfy $u_M'=v_M$ after every calculation of $u_M'$ and $v_M$ for no more than a predetermined number of iterations of receiving newly calculated values of $u_M$ and $v_M$; and a final output unit configured to output $u_M$ when the computation results $u_M$ and $v_M$ satisfy $u_M'=v_M$, wherein the determining unit determines that calculation of $u_M$ is impossible based on a calculation reliability of the capability providing apparatus being lower than a reference value when there are no values of $u_M'$ and $v_M$ that satisfy $u_M'=v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

20. The capability providing method according to claim 19, comprising the step of controlling, in accordance with an input decryption control instruction, whether or not to output both of the first output information $_Mz_1$ and the second output information $_Mz_2$ from the first output information computing unit and the second output information computing unit.

21. A non-transitory computer-readable recording medium storing a program for causing a computing apparatus to perform a method comprising:

generating first input information $_M\tau_1$ and second input information $_M\tau_2$ that correspond to the ciphertext $x_M$ and are elements of the set $H_M$, wherein $G_M$ and $H_M$ are sets of matrices, $f_M(x_M)$ is a decryption function for decrypting a ciphertext $x_M$ which is an element of the set $H_M$ with a particular decryption key to obtain an element of the set $G_M$, $_MX_1$, and $_MX_2$ are random variables having values in the set $G_M$, $_Mx_1$ is a realization of the random variable $_MX_1$, $_Mx_2$ is a realization of the random variable $_MX_2$, and $a_M$ is an element of the set $H_M$;

outputting the first input information $_M\tau_1$ and the second input information $_M\tau_2$ to a capability providing apparatus, wherein the capability providing apparatus is configured to perform:

using the first input information $_M\tau_1$ to correctly compute $f_M(_M\tau_1)$ with a probability greater than a certain provability and setting an obtained result of the computation as first output information $_Mz_1$; and using the second input information $_M\tau_2$ to correctly compute $f_M(_M\tau_2)$ with a probability greater than a certain provability and setting an obtained result of the computation as second output information $_Mz_2$, the method further including, by the computing apparatus, generating a computation result $u_M=f_M(x_M)+_Mx_1$ from the first output information $_Mz_1$ and generate a computation result $u_M'=u_M \cdot a_M$;

generating a computation result $v_M=f_M(x_M)a_M+_Mx_2$ from the second output information $_Mz_2$;

determining whether or not there are values of $u_M'$ and $v_M$ that satisfy $u_M'=v_M$ after every calculation of $u_M'$ and $v_M$ for no more than a predetermined number of iterations of receiving newly calculated values of $u_M$ and $v_M$; and outputting $u_M$ when the computation results $u_M$ and $v_M$ satisfy $u_M'=v_M$, wherein the method further includes determining, by the computing apparatus, that calculation of $u_M$ is impossible based on a calculation reliability of the capability providing apparatus being lower than a reference value when there are no values of $u_M'$ and $v_M$ that satisfy $u_M'=v_M$ after the predetermined number of iterations are completed, and the capability providing apparatus provides a computing capability to the computing apparatus, without leaking secret information, and the computing apparatus is configured to utilize the computing capability, via the capability providing apparatus, to obtain a computing result $f_M(x_M)$ when the calculation reliability of the capability providing apparatus is verified to be above a predetermined level.

\* \* \* \* \*